United States Patent
Patel et al.

(10) Patent No.: US 12,429,322 B2
(45) Date of Patent: Sep. 30, 2025

(54) LOCATING, MEASURING, AND ERROR-CHECKING SYSTEM

(71) Applicant: CARLISLE CONSTRUCTION MATERIALS, LLC, Carlisle, PA (US)

(72) Inventors: Karan Paresh Patel, Gallatin, TN (US); Hamilton Ross Hughes, Park Hills, KY (US); James Brian McGlade, Blue Bell, PA (US); William Douglas Johnson, Marietta, GA (US); Anthony Wentzel, North Hollywood, CA (US); Noah Dawson Underwood, Atlanta, GA (US); Randall Marc Bachtel, Lawrenceville, GA (US); Michael Allan Sloan, Roswell, GA (US); Jason Lye, Atlanta, GA (US); Peter Wyndham Shipp, Jr., Woodstock, GA (US); Taylor Kopacka Leigh, Alpharetta, GA (US)

(73) Assignee: CARLISLE CONSTRUCTION MATERIALS, LLC, Carlisle, PA (US)

( * ) Notice: Subject to any disclaimer, the term of this patent is extended or adjusted under 35 U.S.C. 154(b) by 293 days.

(21) Appl. No.: 18/120,972

(22) Filed: Mar. 13, 2023

(65) Prior Publication Data
US 2023/0296120 A1    Sep. 21, 2023

Related U.S. Application Data

(60) Provisional application No. 63/320,031, filed on Mar. 15, 2022.

(51) Int. Cl.
*G01B 3/38* (2006.01)
*F16B 2/02* (2006.01)
*G01C 22/00* (2006.01)

(52) U.S. Cl.
CPC ............... *G01B 3/38* (2013.01); *F16B 2/02* (2013.01); *G01C 22/00* (2013.01)

(58) Field of Classification Search
CPC ............ G01B 3/12; G01B 3/38; G01C 15/00
(Continued)

(56) References Cited

U.S. PATENT DOCUMENTS

| | | |
|---|---|---|
| 815,509 A | 3/1906 | Campagna |
| 1,203,521 A | 10/1916 | Ford |

(Continued)

FOREIGN PATENT DOCUMENTS

| | | |
|---|---|---|
| CN | 101713626 | 5/2010 |
| FR | 2587104 | 3/1987 |
| WO | 2018212706 | 11/2018 |

OTHER PUBLICATIONS

Sarnafil Sika; Installation Guide for Wall Grip Formed Coping and Wall Grip Formed Coping Plus, published Oct. 8, 2020, 14 pgs.
(Continued)

*Primary Examiner* — George B Bennett
(74) *Attorney, Agent, or Firm* — David R. Heckadon; Gordon Rees Scully Mansukhani LLP

(57) ABSTRACT

An oriented distance measuring system can include a rail; an odometer including a wheel; a first controller; and a first sensor in communication with the first controller, the first sensor configured to sense rotation of the wheel, the first controller configured to collect data from the first sensor, the data being associated with the rotation of the wheel; and a second sensor configured to sense roll, pitch, and yaw of the system.

42 Claims, 103 Drawing Sheets
(7 of 103 Drawing Sheet(s) Filed in Color)

(58) Field of Classification Search
USPC ......... 33/772, 773, 775, 779, 780, 781, 782, 33/783, 784, 787, 788, 810, 811, 812
See application file for complete search history.

(56) References Cited

U.S. PATENT DOCUMENTS

| | | | |
|---|---|---|---|
| 1,477,002 A | 12/1923 | Parkhill | |
| 1,515,522 A | 11/1924 | Russell | |
| 1,643,166 A | 9/1927 | Martin | |
| 1,683,438 A | 9/1928 | Billings | |
| 2,028,052 A | 1/1936 | Easterly | |
| 2,162,602 A | 6/1939 | Black | |
| 2,221,317 A | 11/1940 | Wild | |
| 2,394,340 A | 2/1946 | Martin | |
| 2,535,411 A | 12/1950 | Hansen | |
| 2,878,566 A | 3/1959 | Mellen | |
| 3,092,912 A | 6/1963 | Reed | |
| 3,160,961 A | 12/1964 | Linehan | |
| 3,198,946 A | 8/1965 | Atwood | |
| 3,204,339 A | 9/1965 | Jorde | |
| 3,289,305 A | 12/1966 | Claud | |
| 3,344,701 A | 10/1967 | Rantsch | |
| 3,574,945 A | 4/1971 | Main et al. | |
| 3,628,874 A | 12/1971 | Tagnon | |
| 3,720,818 A | 3/1973 | Spragg et al. | |
| 4,027,976 A | 6/1977 | Amon | |
| 4,329,783 A | 5/1982 | Maresca | |
| 4,394,801 A | 7/1983 | Thibodeaux | |
| 4,416,063 A * | 11/1983 | Nestor ..................... | G01B 3/16 |
| | | | 33/810 |
| 4,574,554 A | 3/1986 | Gentry | |
| 4,712,307 A | 12/1987 | Kish | |
| 4,736,524 A | 4/1988 | King | |
| 4,844,614 A | 7/1989 | Henderson et al. | |
| 5,008,665 A | 4/1991 | Wakatsuki et al. | |
| 5,026,163 A | 6/1991 | McMurtry et al. | |
| 5,029,402 A | 7/1991 | Lazecki et al. | |
| 5,123,736 A | 6/1992 | Pierik et al. | |
| 5,214,859 A | 6/1993 | Buhler | |
| 5,230,158 A | 7/1993 | Wall | |
| 5,231,769 A | 8/1993 | Mahan | |
| 5,337,487 A | 8/1994 | Mangino | |
| 5,379,105 A | 1/1995 | Iki et al. | |
| 5,383,283 A * | 1/1995 | Olsen ..................... | G01B 5/02 |
| | | | 33/804 |
| 5,388,707 A * | 2/1995 | Stivison ............ | G01N 21/9054 |
| | | | 33/522 |
| 5,418,758 A | 5/1995 | Webster | |
| 5,425,181 A | 6/1995 | Calvert | |
| 5,452,522 A | 9/1995 | Kook et al. | |
| 5,457,893 A * | 10/1995 | Lemper ................... | B21B 38/04 |
| | | | 33/783 |
| 5,945,948 A | 8/1999 | Buford et al. | |
| 6,037,945 A | 3/2000 | Loveland | |
| 6,098,302 A | 8/2000 | Gilliam | |
| 6,105,266 A | 8/2000 | Cote | |
| 6,105,269 A * | 8/2000 | Kondrat ................. | A61B 5/107 |
| | | | 33/784 |
| 6,150,972 A | 11/2000 | Bickel et al. | |
| 6,293,028 B1 | 9/2001 | Sylvia | |
| 6,502,057 B1 | 12/2002 | Suzuki | |
| 6,511,741 B1 | 1/2003 | Hungarter | |
| 6,523,275 B2 | 2/2003 | Medford et al. | |
| 6,525,690 B2 | 2/2003 | Rudow et al. | |
| 6,796,046 B1 | 9/2004 | May | |
| 6,954,990 B2 | 10/2005 | Ellis | |
| 6,968,627 B1 | 11/2005 | McAllester | |
| 7,089,679 B2 | 8/2006 | Brown | |
| 7,116,268 B2 | 10/2006 | Akano | |
| 7,130,774 B2 | 10/2006 | Thomas et al. | |
| 7,133,551 B2 | 11/2006 | Chen et al. | |
| 7,170,445 B2 | 1/2007 | Thiel et al. | |
| 7,275,335 B2 | 10/2007 | Holec et al. | |
| 7,299,559 B2 | 11/2007 | Moss | |
| 7,305,983 B1 | 12/2007 | Meder et al. | |
| 7,376,284 B2 | 5/2008 | Tao et al. | |
| 7,513,054 B2 | 4/2009 | Moss | |
| 7,523,022 B2 | 4/2009 | Thomas et al. | |
| 7,617,613 B2 | 11/2009 | Merryfield | |
| 7,707,737 B2 | 5/2010 | Lightfoot | |
| 7,869,944 B2 | 1/2011 | Deaton et al. | |
| 7,886,447 B2 * | 2/2011 | Cruz ....................... | B26D 7/28 |
| | | | 33/41.5 |
| 7,979,205 B2 | 7/2011 | Coombes et al. | |
| 8,078,436 B2 | 12/2011 | Pershing et al. | |
| 8,145,578 B2 | 3/2012 | Pershing et al. | |
| 8,209,874 B1 | 7/2012 | Tribble et al. | |
| 8,264,695 B2 | 9/2012 | Arnold et al. | |
| 8,384,906 B2 | 2/2013 | Wu | |
| 8,413,039 B2 | 4/2013 | Casey | |
| 8,453,341 B2 | 6/2013 | Elsasser | |
| 8,508,749 B2 | 8/2013 | Arnold et al. | |
| 8,606,518 B2 | 12/2013 | Coombes et al. | |
| 8,724,095 B2 | 5/2014 | Goodwin et al. | |
| 8,731,234 B1 | 5/2014 | Ciarcia et al. | |
| 8,774,525 B2 | 7/2014 | Pershing | |
| 8,788,240 B2 | 7/2014 | Pioro et al. | |
| 8,863,397 B2 | 10/2014 | Wall | |
| 8,868,375 B1 | 10/2014 | Christian | |
| 8,938,090 B2 | 1/2015 | Thornberry et al. | |
| 8,995,757 B1 | 3/2015 | Ciarcia et al. | |
| 9,003,672 B2 | 4/2015 | Lozano | |
| 9,070,018 B1 | 6/2015 | Ciarcia et al. | |
| 9,121,688 B1 | 9/2015 | Schmid | |
| 9,183,538 B2 | 11/2015 | Thornberry et al. | |
| 9,185,675 B2 | 11/2015 | Chen et al. | |
| 9,224,244 B2 | 12/2015 | Mitrakis et al. | |
| 9,244,589 B2 | 1/2016 | Thornberry et al. | |
| 9,329,749 B2 | 5/2016 | Thornberry et al. | |
| 9,376,817 B2 | 6/2016 | Walker | |
| 9,389,311 B1 | 7/2016 | Moya et al. | |
| 9,395,175 B2 | 7/2016 | Lysen | |
| 9,441,974 B2 | 9/2016 | Morin et al. | |
| 9,477,230 B2 | 10/2016 | Sastre I Sastre | |
| 9,488,457 B2 | 11/2016 | Greenway | |
| 9,501,700 B2 | 11/2016 | Loveland et al. | |
| 9,506,746 B2 | 11/2016 | Holzl | |
| 9,568,332 B2 | 2/2017 | Strassenburg-Kleciak | |
| 9,582,932 B2 | 2/2017 | Van Der Merwe et al. | |
| 9,599,466 B2 | 3/2017 | Pershing | |
| 9,625,368 B2 | 4/2017 | Goodwin et al. | |
| 9,639,960 B1 | 5/2017 | Loveland et al. | |
| 9,689,652 B2 | 6/2017 | Jordil | |
| 9,719,766 B2 | 8/2017 | Wu et al. | |
| 9,727,834 B2 | 8/2017 | Reyes | |
| 9,728,079 B2 | 8/2017 | Jordil et al. | |
| 9,734,397 B1 | 8/2017 | Larson et al. | |
| 9,774,986 B2 | 9/2017 | Hoge | |
| 9,803,965 B2 | 10/2017 | Thorp et al. | |
| 9,886,632 B1 | 2/2018 | Loveland et al. | |
| 9,933,254 B2 | 4/2018 | Thornberry | |
| 9,933,257 B2 | 4/2018 | Pershing | |
| 9,996,746 B1 | 6/2018 | Larson et al. | |
| 10,012,735 B1 | 7/2018 | Loveland et al. | |
| 10,088,389 B2 | 10/2018 | Neeley et al. | |
| 10,089,529 B2 | 10/2018 | Larson et al. | |
| 10,089,530 B2 | 10/2018 | Loveland et al. | |
| 10,127,670 B2 | 11/2018 | Lewis et al. | |
| 10,169,856 B1 | 1/2019 | Farnsworth et al. | |
| 10,181,081 B2 | 1/2019 | Schultz et al. | |
| 10,197,391 B2 | 2/2019 | Thornberry et al. | |
| 10,281,262 B2 | 5/2019 | Takashima | |
| 10,318,809 B2 | 6/2019 | Schultz et al. | |
| 10,364,027 B2 | 7/2019 | Loveland et al. | |
| 10,366,287 B1 | 7/2019 | Loveland et al. | |
| 10,373,011 B2 | 8/2019 | Ananthakrishnan et al. | |
| 10,444,954 B2 | 10/2019 | Zhang et al. | |
| 10,458,790 B2 | 10/2019 | Miller et al. | |
| 10,473,473 B2 | 11/2019 | Shi et al. | |
| 10,503,842 B2 | 12/2019 | Loveland et al. | |
| 10,503,843 B2 | 12/2019 | Keane | |
| 10,515,414 B2 | 12/2019 | Pershing | |
| 10,521,664 B2 | 12/2019 | Loveland et al. | |
| 10,540,577 B2 | 1/2020 | Taylor et al. | |

(56) References Cited

U.S. PATENT DOCUMENTS

| | | |
|---|---|---|
| 10,587,863 B2 | 3/2020 | Eshima et al. |
| 10,598,820 B2 | 3/2020 | Park |
| 10,614,503 B2 | 4/2020 | High et al. |
| 10,648,800 B2 | 5/2020 | Thornberry et al. |
| 10,663,294 B2 | 5/2020 | Pershing et al. |
| 10,663,295 B2 | 5/2020 | Imaki et al. |
| 10,866,126 B2 | 12/2020 | Iori et al. |
| 10,909,482 B2 | 2/2021 | Thornberry et al. |
| 11,149,539 B2* | 10/2021 | Zeller ................. E21B 47/0228 |
| 11,164,256 B2 | 11/2021 | Ekman |
| 11,218,838 B2 | 1/2022 | Al Majid et al. |
| 11,465,310 B2* | 10/2022 | Reed ........................ B26D 7/28 |
| 11,566,891 B2 | 1/2023 | Pershing et al. |
| 11,620,714 B2 | 4/2023 | Pershing |
| 2001/0034954 A1 | 11/2001 | Medford et al. |
| 2002/0038518 A1 | 4/2002 | Barrows |
| 2003/0147553 A1 | 8/2003 | Chen et al. |
| 2003/0171957 A1 | 9/2003 | Watrous |
| 2004/0016142 A1* | 1/2004 | Beber .................... G01B 3/205 33/783 |
| 2004/0122628 A1 | 6/2004 | Laurie |
| 2004/0168334 A1 | 9/2004 | Tripp |
| 2004/0172846 A1 | 9/2004 | McRae |
| 2004/0216315 A1 | 11/2004 | Ellis |
| 2005/0046614 A1 | 3/2005 | Akano |
| 2005/0081394 A1 | 4/2005 | Ellis |
| 2006/0136126 A1 | 6/2006 | Coombes et al. |
| 2006/0162178 A1 | 7/2006 | Freidin |
| 2006/0235611 A1 | 10/2006 | Deaton et al. |
| 2006/0250303 A1 | 11/2006 | Thiel et al. |
| 2007/0206174 A1 | 9/2007 | Boegel et al. |
| 2008/0052938 A1 | 3/2008 | Moss |
| 2008/0065347 A1 | 3/2008 | Lavarec et al. |
| 2008/0089610 A1 | 4/2008 | Tao et al. |
| 2008/0120852 A1 | 5/2008 | Ramsey |
| 2008/0155844 A1 | 7/2008 | Norvell |
| 2008/0262789 A1 | 10/2008 | Pershing et al. |
| 2009/0121932 A1 | 5/2009 | Whitehead et al. |
| 2009/0271144 A1 | 10/2009 | Reibel |
| 2010/0179787 A2 | 7/2010 | Pershing et al. |
| 2011/0167660 A1 | 7/2011 | Furrow |
| 2011/0188045 A1 | 8/2011 | Wu |
| 2012/0188557 A1 | 7/2012 | Goodwin et al. |
| 2012/0330609 A1 | 12/2012 | Arnold et al. |
| 2013/0036618 A1 | 2/2013 | Wall |
| 2013/0099957 A1 | 4/2013 | Goodwin et al. |
| 2013/0103312 A1 | 4/2013 | Coombes et al. |
| 2013/0202157 A1 | 8/2013 | Pershing |
| 2013/0204575 A1 | 8/2013 | Pershing |
| 2013/0212536 A1 | 8/2013 | Thornberry et al. |
| 2013/0226515 A1 | 8/2013 | Pershing et al. |
| 2013/0262029 A1 | 10/2013 | Pershing |
| 2013/0346020 A1 | 12/2013 | Pershing |
| 2014/0022543 A1 | 1/2014 | Lysen |
| 2014/0046627 A1 | 2/2014 | Pershing |
| 2014/0132635 A1 | 5/2014 | Murdoch et al. |
| 2014/0267690 A1 | 9/2014 | Morin et al. |
| 2014/0327761 A1 | 11/2014 | Holzl |
| 2015/0033572 A1 | 2/2015 | Walker |
| 2015/0192663 A1 | 7/2015 | Hunter et al. |
| 2015/0192677 A1 | 7/2015 | Yu et al. |
| 2015/0345924 A1 | 12/2015 | Millen et al. |
| 2016/0371400 A1 | 12/2016 | Challita et al. |
| 2016/0371544 A1 | 12/2016 | MacDonald et al. |
| 2017/0154131 A1 | 6/2017 | Loveland et al. |
| 2017/0178222 A1 | 6/2017 | High et al. |
| 2018/0073847 A1* | 3/2018 | Wang ...................... G01B 3/12 |
| 2018/0089833 A1 | 3/2018 | Lewis et al. |
| 2018/0129856 A1 | 5/2018 | Larson et al. |
| 2018/0142477 A1 | 5/2018 | Park |
| 2018/0165503 A1 | 6/2018 | Larson et al. |
| 2018/0165505 A1 | 6/2018 | Loveland et al. |
| 2018/0224271 A1 | 8/2018 | Thornberry et al. |
| 2018/0252513 A1 | 9/2018 | Takashima |
| 2018/0274917 A1 | 9/2018 | Imaki et al. |
| 2018/0336409 A1 | 11/2018 | Schultz et al. |
| 2018/0357478 A1 | 12/2018 | Schultz et al. |
| 2019/0042829 A1 | 2/2019 | Loveland et al. |
| 2019/0056223 A1 | 2/2019 | Ishihara |
| 2019/0102897 A1 | 4/2019 | Lewis et al. |
| 2019/0220711 A1 | 7/2019 | Taylor et al. |
| 2019/0271550 A1 | 9/2019 | Breed et al. |
| 2019/0279420 A1 | 9/2019 | Moreno et al. |
| 2019/0303707 A1 | 10/2019 | Ananthakrishnan et al. |
| 2019/0325217 A1 | 10/2019 | Schultz et al. |
| 2020/0003554 A1 | 1/2020 | Thornberry et al. |
| 2020/0089931 A1 | 3/2020 | Loveland et al. |
| 2020/0100066 A1 | 3/2020 | Lewis et al. |
| 2020/0110847 A1 | 4/2020 | Loveland et al. |
| 2020/0202448 A1 | 6/2020 | Pershing |
| 2020/0249324 A1 | 8/2020 | Steinberg et al. |
| 2021/0232988 A1 | 7/2021 | Thornberry |
| 2023/0296120 A1 | 9/2023 | Patel et al. |
| 2023/0296365 A1 | 9/2023 | Patel et al. |

OTHER PUBLICATIONS

Iroofing; Article entitled: "How to Measure Roofs with Parapet Walls", located at <https://iroofing.org/parapet-measurements/>, publicly available prior to Mar. 15, 2022, 13 pgs.

Masser; Article entitled: "BT Caliper", located at <https://www.masser.fi/products/bt-caliper/> publicly available prior to Mar. 15, 2022, 7 pgs.

Roofsnap; Article entitled: "Your Roofing Sales Process, Simplified", located at <https://roofsnap.com/>, Copyright 2021, publicly available prior to Mar. 15, 2022, 14 pgs.

Roofgraf; Article entitled: "Roofgraf Features", located at <https://www.roofgraf.com/features/>, publicly available prior to Mar. 15, 2022, 1 pg.

Roofing Contractor; Article entitled: "MeasureOn App", located at <https://www.roofingcontractor.com/articles/92148-measureon-app>, published Mar. 22, 2017, 5 pgs.

\* cited by examiner

FIG. 4

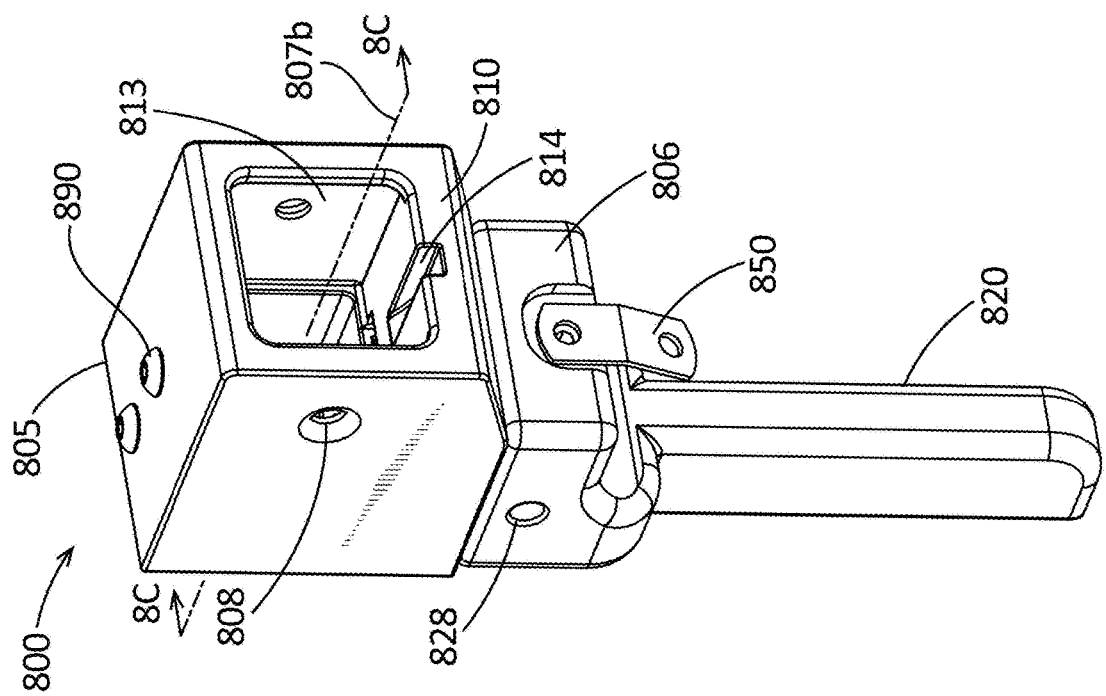
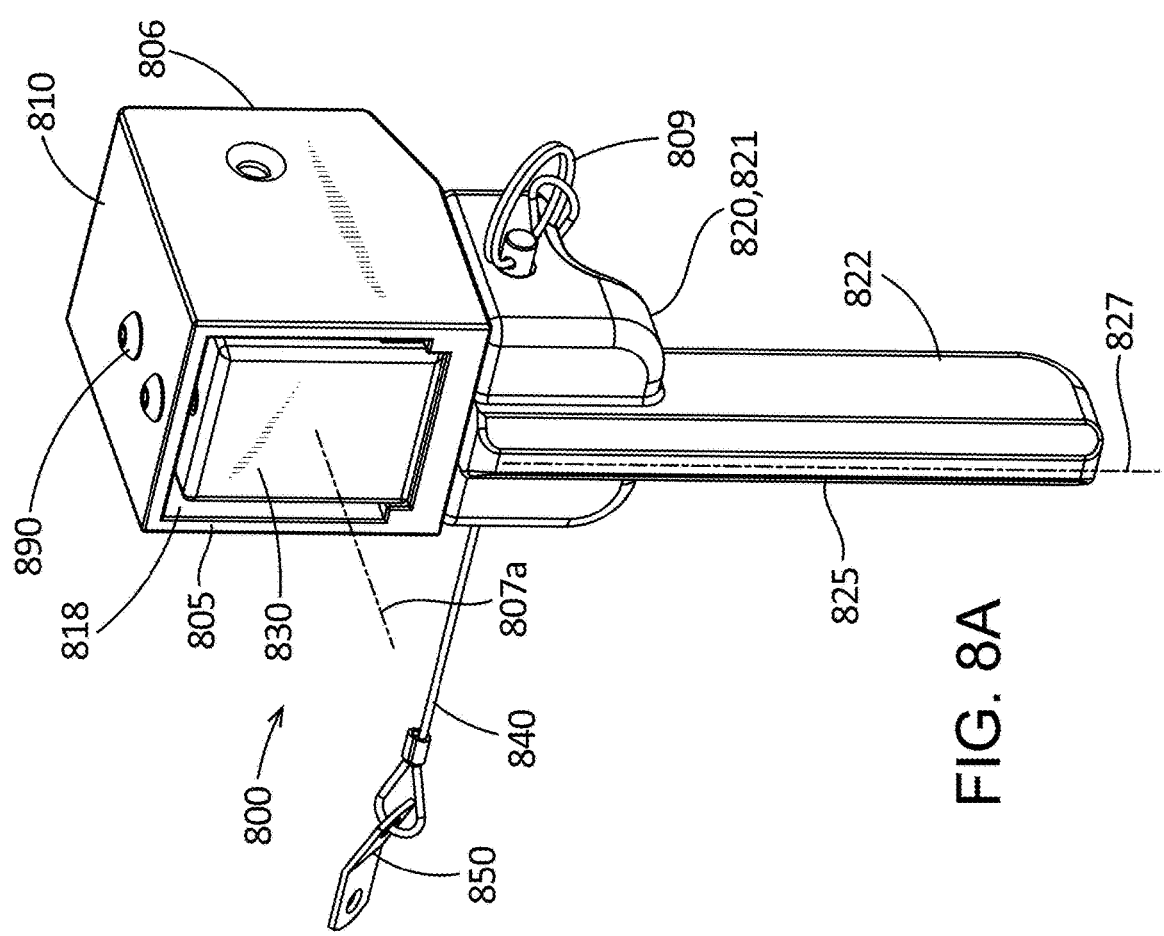
FIG. 8B
FIG. 8A

942

942

1101

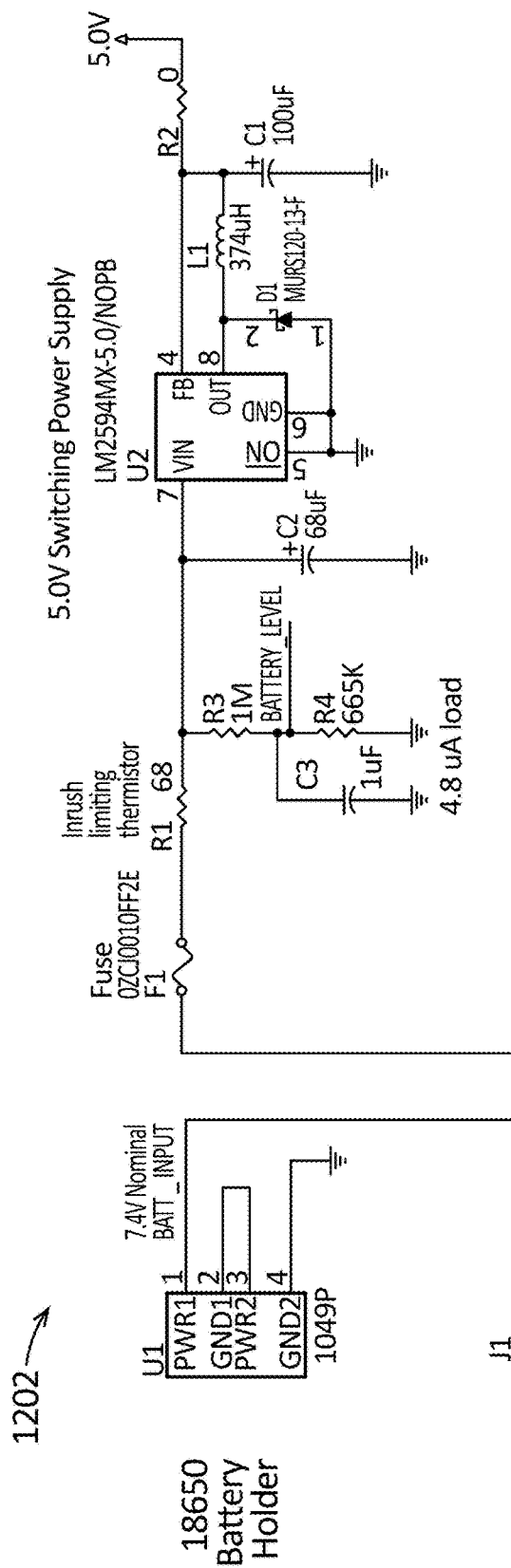
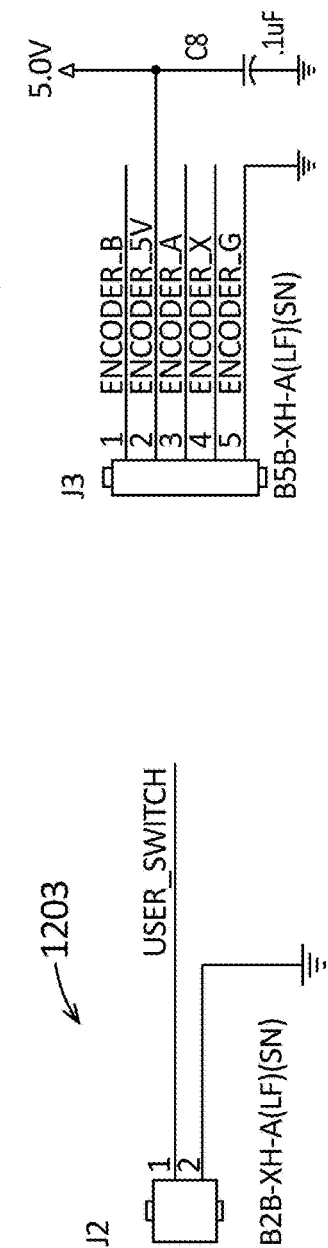
FIG. 12B
FIG. 12C
FIG. 12D

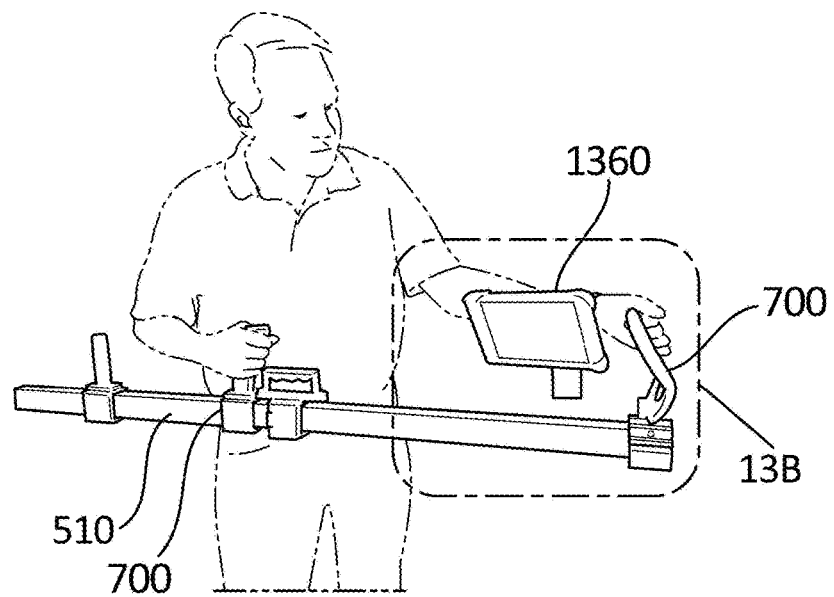
FIG. 13A
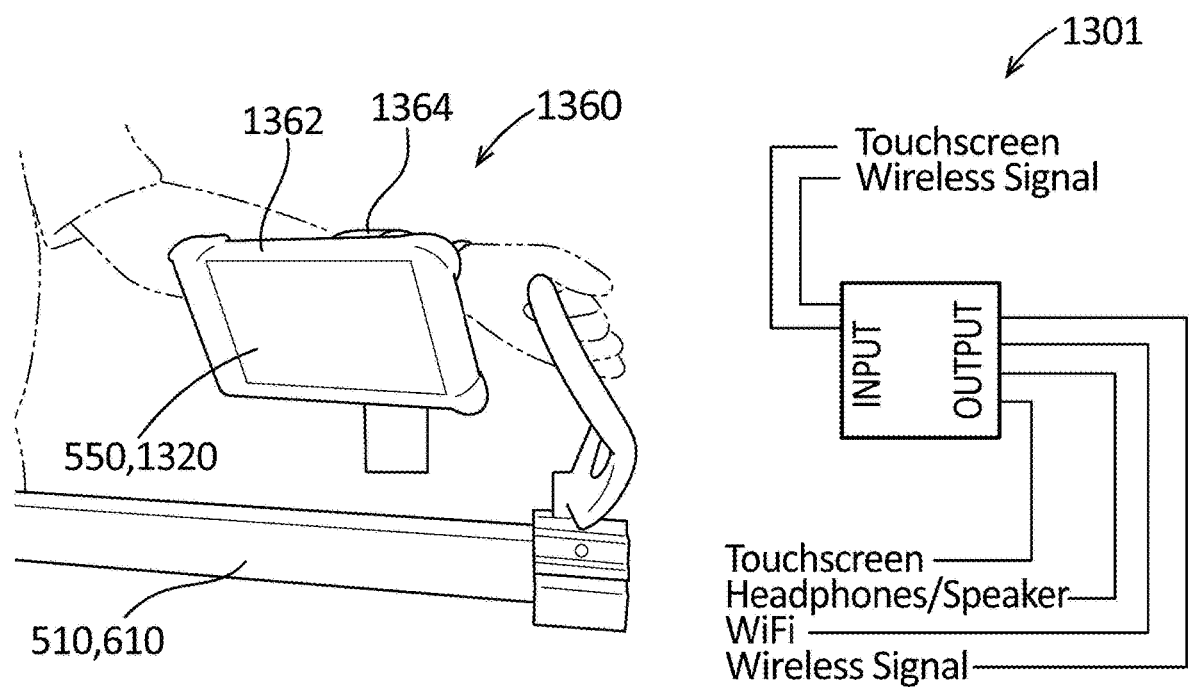
FIG. 13B
FIG. 13C

| Inside | Outside | Complex |
|--------|---------|---------|
| Radius | Arclength | Width |
| Rise | | |

Graphics Area

| Measurements ||| Calculations |||
| Width | Path Length | Yaw | Sweep | Rise | Radius |
|-------|-------------|-----|-------|------|--------|
| in | in | 15° | -5° | in | in |
| in | in | 10° | -5° | in | in |
| in | in | 5° | -5° | in | in |
| in | in | 0° | -5° | in | in |
| in | in | -5° | -5° | in | in |
| in | in | -10° | -5° | in | in |
| in | in | -15° | -5° | in | in |
| • | • | | • | | |
| • | • | | • | | |
| • | • | | • | | |
| • | • | | • | | |
| • | • | | • | | |
| • | • | | • | | |
| • | • | | • | | |
| • | • | | • | | |
| n | | | n-1 | | |

LOCATING, MEASURING, AND ERROR-CHECKING SYSTEM

REFERENCE TO RELATED APPLICATIONS

This application claims the benefit of U.S. Provisional Application No. 63/320,031, filed Mar. 15, 2022, which is hereby specifically incorporated by reference herein in its entirety.

TECHNICAL FIELD

Field of Use

This disclosure relates to locating, measuring, and error-checking the size and location of physical objects with respect to each other using a physical tool together with an accompanying app on an electronic user device. More specifically, this disclosure relates to how a user operates the tool and the app (e.g., to measure the physical objects) and how the system processes the accompanying measurements.

Related Art

Typical methods for measuring objects and especially a series of objects that vary in geometry can be very manual and thereby time-consuming and also prone to human error and waste. In the case of a roof of a building, recording or otherwise documenting roof measurements, and/or preparing engineering documents based on user measurements can require much in the way of manual analog measurements, manual (i.e., pen and paper) recording, transcribing from one format to another, and then a protracted process to convert the handwritten notes into engineering documents that can be used for quoting and production of the parts. More specifically, a typical method for measuring a thickness or width (inside to outside), height, length, shape, and orientation of each parapet section of a roof and the various roof edge sections' interconnections (e.g., to be able to prepare new or replacement parts capping a parapet of the roof) is similarly very manual, typically requires many hours to complete, and is error prone.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

In one aspect, disclosed is an oriented distance measuring system comprising: a rail; an odometer comprising: a wheel; a first controller; and a first sensor in communication with the first controller, the first sensor configured to sense rotation of the wheel, the first controller configured to collect data from the first sensor, the data being associated with the rotation of the wheel; and a second sensor configured to sense roll, pitch, and yaw of the system.

In a further aspect, disclosed is a measurement tool comprising: at least one of a caliper portion and an odometer portion, the caliper portion configured to take a thickness measurement and the odometer portion configured to take a distance measurement; a plurality of input devices defining a user input interface; and a controller configured to transmit a signal from the measurement tool to a user device separate from the measurement tool and configured to control the user device based on activation, by a user, of an input device of the plurality of input devices, the signal comprising: instructions to the user device; and data corresponding to the thickness measurement, the user device configured to display on a screen thereof at least one of the instructions and the data.

In yet another aspect, disclosed is an error-checking system comprising: a measurement tool comprising a caliper portion defining an adjustable clamp distance, the measurement tool configured to capture at least two thickness measurements for each of a plurality of physical objects, each of the plurality of physical objects arranged in series, each of the plurality of physical objects joined with at least one other of the plurality of physical objects; and a non-transitory computer-readable medium having stored thereon a device app in wireless communication with the measurement tool, the device app configured to wirelessly receive the at least two thickness measurements from the measurement tool and check for continuity in each transition between adjacent physical objects of the plurality of physical objects.

In yet another aspect, disclosed is a method comprising: capturing, with a measurement tool, at least one of a thickness measurement and a length measurement of a physical object; and transmitting data associated with the at least one of the thickness measurement and the length measurement to a user device, the data comprising data corresponding to roll, pitch, and yaw of the measurement tool during capture of the at least one of the thickness measurement and the length measurement.

In yet another aspect, disclosed is a method of manufacturing a measurement tool, the method comprising: assembling a dynamic clamp to a bar of the measurement tool, the dynamic clamp configured to move with respect to the bar during use to capture distance measurements; and assembling a first sensor to the measurement tool, the first sensor configured to sense roll, pitch, and yaw of the measurement tool.

Various implementations described in the present disclosure may comprise additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. The features and advantages of such implementations may be realized and obtained by means of the systems, methods, features particularly pointed out in the appended claims. These and other features will become more fully apparent from the following description and appended claims or may be learned by the practice of such exemplary implementations as set forth hereinafter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this specification, illustrate several aspects of the disclosure and together with the description, serve to explain various principles of the disclosure. The drawings are not necessarily drawn to scale. Corresponding features and components throughout the figures may be designated by matching reference characters for the sake of consistency and clarity.

FIG. 1A is a bottom perspective view of a building comprising a roof with a parapet and other structures in accordance with one aspect of the current disclosure.

FIG. 1B is a top perspective view of a first portion of the roof of FIG. 1A positioned on a front or street side of the building of FIG. 1A.

FIG. 1C is a side perspective view of a second portion of the roof of FIG. 1A positioned on a rear side of the building of FIG. 1A.

FIG. 1D is a side perspective view of a third portion of the roof of FIG. 1A also positioned, as in FIG. 1B, on a front or street side of the building of FIG. 1A.

FIG. 1E is a side top perspective view of a corner section of the roof of FIG. 1A.

FIG. 1F is a side top perspective view of a wall section of the roof of FIG. 1A.

FIG. 1G is a side top perspective view of a flat surface of an edge of the roof of FIG. 1A.

FIG. 1H is a side top perspective view of another wall section of the roof of FIG. 1A showing a membrane cover the wall section and hanging over an outside edge thereof.

FIG. 1I is a top plan view of the roof of FIG. 1A in accordance with another aspect of the current disclosure showing sizes, locations of other physical characteristics of a membrane attachment system comprising the roof membrane and an adhesive material in accordance with one aspect of the current disclosure.

FIG. 1J is a top plan view of a section of the membrane attachment system of FIG. 1I taken from detail 1J.

FIG. 1K is a top plan view of a section of the membrane attachment system of FIG. 1I taken from detail 1J in accordance with another aspect of the current disclosure in which the serpentine pattern has squared-off ends.

FIG. 1L is a top plan view of a section of the membrane attachment system of FIG. 1I taken from detail 1J in accordance with another aspect of the current disclosure comprising a continuous ribbon pattern.

FIG. 1M is a top plan view of the roof of FIG. 1A in accordance with another aspect of the current disclosure showing sizes, locations of other physical characteristics of a membrane attachment system comprising fasteners in accordance with another aspect of the current disclosure.

FIG. 1N is a top plan view of a section of the membrane attachment system of FIG. 1M taken from detail 1N in accordance with another aspect of the current disclosure comprising mechanical fasteners.

FIG. 1O is a top plan view of a section of the membrane attachment system of FIG. 1M taken from detail 1N in accordance with another aspect of the current disclosure comprising mechanical fasteners installed via an inductive welding process.

FIG. 1P is a top perspective view of the membrane attachment system of FIG. 1M showing also an underlying structure of the roof in accordance with another aspect of the current disclosure.

FIG. 1Q is a sectional view of the membrane attachment system of FIG. 1P taken from line 1Q-1Q of FIG. 1P.

FIG. 1R is a top plan view of the roof of FIG. 1A in accordance with another aspect of the current disclosure showing an insulation drainage system.

FIG. 1S is a top plan view of the roof of FIG. 1A in accordance with another aspect of the current disclosure showing sizes, locations of other physical characteristics of equipment and other structures positioned on the roof.

FIG. 2A is a side top perspective view of a section of parapet of a roof showing coping secured thereto.

FIG. 2B is a side top perspective view of a section of parapet of a roof showing coping secured thereto in accordance with another aspect of the current disclosure.

FIG. 2C is a side top perspective view of at least two sections of parapet of a roof showing coping secured thereto in accordance with yet another aspect of the current disclosure.

FIG. 2D is a side bottom perspective view of the building showing various other structures, e.g., edge metal and downspouts, secured thereto in accordance with yet another aspect of the current disclosure.

FIG. 3A is a side perspective view of a section of parapet of the roof of FIG. 1A showing a partially unsecured roof membrane.

FIG. 3B is a side perspective view of a section of parapet of the roof of FIG. 1A showing a pair of manual calipers being used to collect a measurement while compressing the membrane against the parapet.

FIG. 3C is a side perspective view of another section of parapet of the roof of FIG. 1A showing a pair of manual calipers being used to take additional measurements.

FIG. 3D is a side perspective view of a section of parapet of the roof of FIG. 1A showing a protractor being used to take angle measurements on an inside corner.

FIG. 3E is a side perspective view of another section of parapet of the roof of FIG. 1A showing a digital protractor being used to take angle measurements on an outside corner.

FIG. 3F is a side perspective view of a curved section of structure being manually measured.

FIG. 3G is a top perspective view of a section of parapet shown marked with notes.

FIG. 4 is an example of an engineering document generated after roof measurements are manually transferred into electronic form in a manual process of recording and processing measurements of a parapet of a roof of a building such as the roof of FIG. 1A.

FIG. 5A is a top perspective view of the measurement tool and a user device configured for use therewith.

FIG. 5B is a bottom perspective view of the measurement tool of FIG. 5A.

FIG. 5C is a sectional perspective view of the measurement tool of FIG. 5A taken from line 5C-5C of FIG. 5A.

FIG. 6A is a top plan view of a bar assembly of the measurement tool of FIG. 5A.

FIG. 6B is a bottom plan view of the bar assembly of FIG. 6A.

FIG. 6C is a sectional view of the bar assembly of FIG. 6A taken along line 6C-6C of FIG. 6B.

FIG. 6D is a top detail view of the bar assembly of FIG. 6A showing also a dynamic clamp of the measurement tool.

FIG. 6E is an exploded perspective view of the bar assembly of FIG. 6A, with a bar thereof removed for clarity.

FIG. 6F is a detail side view of a portion of a rack of the bar assembly of FIG. 6A.

FIG. 7A is a top perspective view of a static handle of the measurement tool of FIG. 5A.

FIG. 7B is an end view of the static handle of FIG. 7A.

FIG. 7C is an exploded perspective sectional view of the static handle of FIG. 7A taken along line 7C-7C of FIG. 7A.

FIG. 7D is a perspective view of a handle grip of a static handle in accordance with another aspect of the current disclosure.

FIG. 7E is a perspective view of the handle grip of a static handle in accordance with another aspect of the current disclosure.

FIG. 7F is a perspective view of the handle grip of a static handle in accordance with another aspect of the current disclosure.

FIG. 7G is a perspective view of the handle grip of a static handle in accordance with another aspect of the current disclosure.

FIG. 7H is a perspective view of a handle base in accordance with another aspect of the current disclosure.

FIG. 7I is a perspective view of the handle grip of a static handle comprising a handle adapter in accordance with another aspect of the current disclosure.

FIGS. 8A-8J are various views of a stationary clamp of the measurement tool of FIG. 5A.

FIG. 8A is a front top perspective view of a stationary clamp of the measurement tool of FIG. 5A in accordance with one aspect of the current disclosure.

FIG. 8B is a rear top perspective view of the stationary clamp of FIG. 5A.

FIG. 8C is an exploded side perspective sectional view of the stationary clamp of FIG. 8A comprising a jaw in accordance with another aspect of the current disclosure.

FIG. 8D is a front end view of a base of the stationary clamp of FIG. 8A.

FIG. 8E is a rear end view of the base of the stationary clamp of FIG. 8A.

FIG. 8F is a front end perspective view of the jaw of the stationary clamp of FIG. 8A.

FIG. 8G is a rear end perspective view of the jaw of FIG. 8A.

FIG. 8H is a top view of the jaw of FIG. 8A.

FIG. 8I is a front end perspective view of the jaw of FIG. 8C.

FIG. 8J is a top view of the jaw of FIG. 8C.

FIG. 9A is a rear perspective view of a dynamic clamp of the measurement tool of FIG. 5A showing the dynamic clamp assembled to the bar assembly of FIG. 6A.

FIG. 9B is a front top perspective view of the dynamic clamp of FIG. 9A.

FIG. 9C is a front bottom perspective view of the dynamic clamp of FIG. 9A.

FIG. 9D is a side sectional view of the dynamic clamp of FIG. 9A taken along line 9D-9D of FIG. 9A.

FIG. 9E is a side sectional view of the dynamic clamp of FIG. 9A taken along line 9E-9E of FIG. 5A with the dynamic clamp of the measurement tool in contact with the static handle of FIG. 7A and the jaws of the dynamic clamp and the stationary clamp of FIG. 8A not in contact with each other (i.e., the jaws of the measurement tool are open) in accordance with another aspect of the current disclosure.

FIG. 9F is a side sectional view of the dynamic clamp of FIG. 9E taken along line 9E-9E of FIG. 5A with the dynamic clamp of the measurement tool in contact with the stationary clamp of FIG. 8A (i.e., the jaws of the measurement tool are closed) and also showing an odometer of the measurement tool.

FIG. 9G is a side bottom exploded view of the dynamic clamp of FIG. 9A.

FIG. 9H is a front top detail perspective view of the dynamic clamp of FIG. 9A showing a user input interface taken from detail 9H of FIG. 5A.

FIG. 10A is a front top perspective view of an odometer of the measurement tool of FIG. 5A.

FIG. 10B is a front bottom perspective view of a front end of the odometer of FIG. 10A.

FIG. 10C is a front bottom perspective view of the odometer of FIG. 10A with a cover thereof removed.

FIG. 10D is a front top exploded perspective view of the odometer of FIG. 10A.

FIG. 10E is a side perspective view of an assembly comprising the odometer of FIG. 10A and a handle attached thereto in accordance with another aspect of the current disclosure.

FIG. 10F is a front perspective view of the assembly of FIG. 10E.

FIG. 11A is a top view of a printed circuit board of the controller of the dynamic clamp of FIG. 9A.

FIG. 11P is an electrical schematic diagram showing a connector circuit for the user input interface of FIG. 9H in accordance with another aspect of the current disclosure.

FIGS. 12A-12H are various views of electrical components of the odometer of FIG. 10A and/or electrical schematic diagrams of the odometer of FIG. 10A.

FIG. 12A is an electrical schematic diagram showing inputs and outputs of the odometer of FIG. 10A.

FIG. 12B is an electrical schematic diagram showing a power supply circuit of the odometer of FIG. 10A.

FIG. 12C is an electrical schematic diagram showing a user switch circuit of the odometer of FIG. 10A.

FIG. 12D is an electrical schematic diagram showing an encoder circuit of the odometer of FIG. 10A.

FIG. 12E is an electrical schematic diagram showing a level shifter circuit of the odometer of FIG. 10A.

FIG. 12F is an electrical schematic diagram showing a microcontroller circuit of the odometer of FIG. 10A.

FIG. 12G is a top view of a printed circuit board of the controller of the odometer of FIG. 10A.

FIG. 12H is a bottom view of the printed circuit board of FIG. 12G.

FIGS. 13A-13C are various views of the user device of FIG. 5A.

FIG. 13A is a side perspective view of a mount for the user device of FIG. 13A showing the mount attached to an arm of a user.

FIG. 13B is a detail side perspective view of the mount of FIG. 13A taken from detail 13B of FIG. 13A.

FIG. 13C is a schematic showing inputs and outputs of the user device of FIG. 13A.

FIG. 15A is a flow chart showing an overall operational workflow or method of using the system of FIG. 5A.

FIG. 15B is a diagram showing error-checking of measurements taken in the error-checking stage of the flow chart of FIG. 15A.

FIGS. 16A-16F are various views of a user holding or carrying the measurement tool and the user device of the system of FIG. 5A.

FIG. 16A is a perspective view of a user holding or carrying the measurement tool and the user device of the system of FIG. 5A.

FIG. 16B is a perspective view of a user positioning the measurement tool of FIG. 16A on a parapet of a roof such as the roof of FIG. 1A and taking a wall thickness or width measurement with a caliper portion of the measurement tool.

FIG. 16C is a perspective view of a user positioning the measurement tool of FIG. 16A on a wall of a roof such as the roof of FIG. 1A and taking a wall length measurement with an odometer portion of the measurement tool.

FIG. 16D is a top perspective view of a user positioning the measurement tool of FIG. 16A on a parapet step of a roof such as the roof of FIG. 1A and taking a wall height measurement with the measurement tool in accordance with another aspect of the current disclosure.

FIG. 16E is a side perspective view of the arrangement of FIG. 16C.

FIG. 16F is a top perspective view of a user using an assembly comprising the odometer of the measurement tool of FIG. 16A assembled to the handle of FIG. 10E and being pushed along a horizontal surface in accordance with another aspect of the current disclosure.

FIGS. 17A-17C are various views of a semi-automated method of taking measurements with the system of FIG. 5A.

FIG. 17A is a flow chart showing a semi-automated method of taking measurements with the system of FIG. 5A.

FIG. 17B is a flow chart showing aspects of the method of FIG. 17A showing, more specifically, a method of using the controller of the dynamic clamp of FIG. 9H.

FIG. 17C is a flow chart showing aspects of the method of FIG. 17A showing, more specifically, a method of using the controller of the odometer of FIG. 10A.

FIGS. 18-24G are various views of processes for taking measurements of various geometries of geometric features on a roof.

Figure 18:
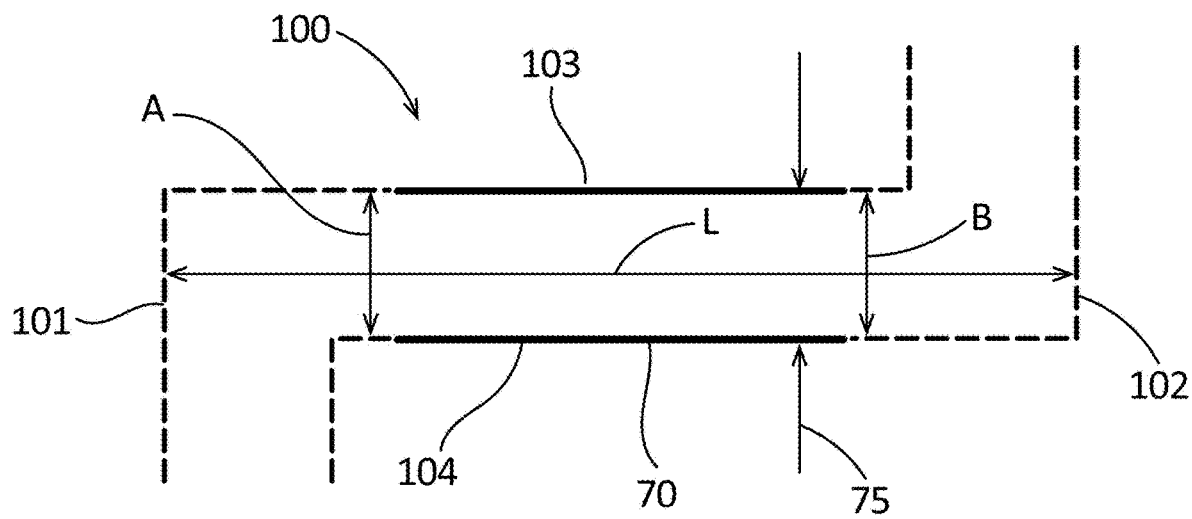

FIG. 18 is a top plan view of a geometric feature showing also a process for taking measurements of the geometric feature when it defines a wall geometry.

FIGS. 19A-19E are various views or diagrams or top plan views of a geometric feature showing also a process for taking measurements of then geometric feature when it defines a corner geometry.

Figure 19A:
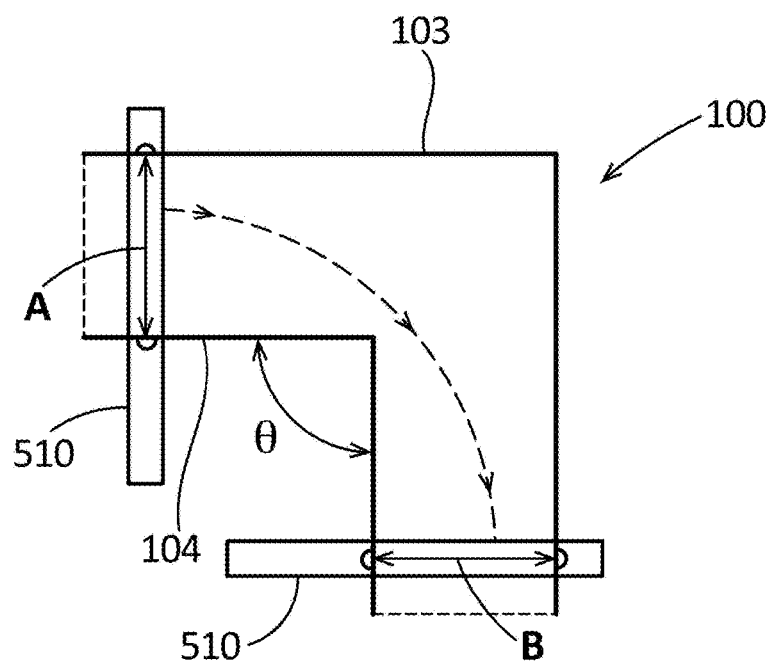

FIG. 19A is a diagram showing a process for taking measurements of a geometric feature defining a generic corner geometry.

Figure 19B:
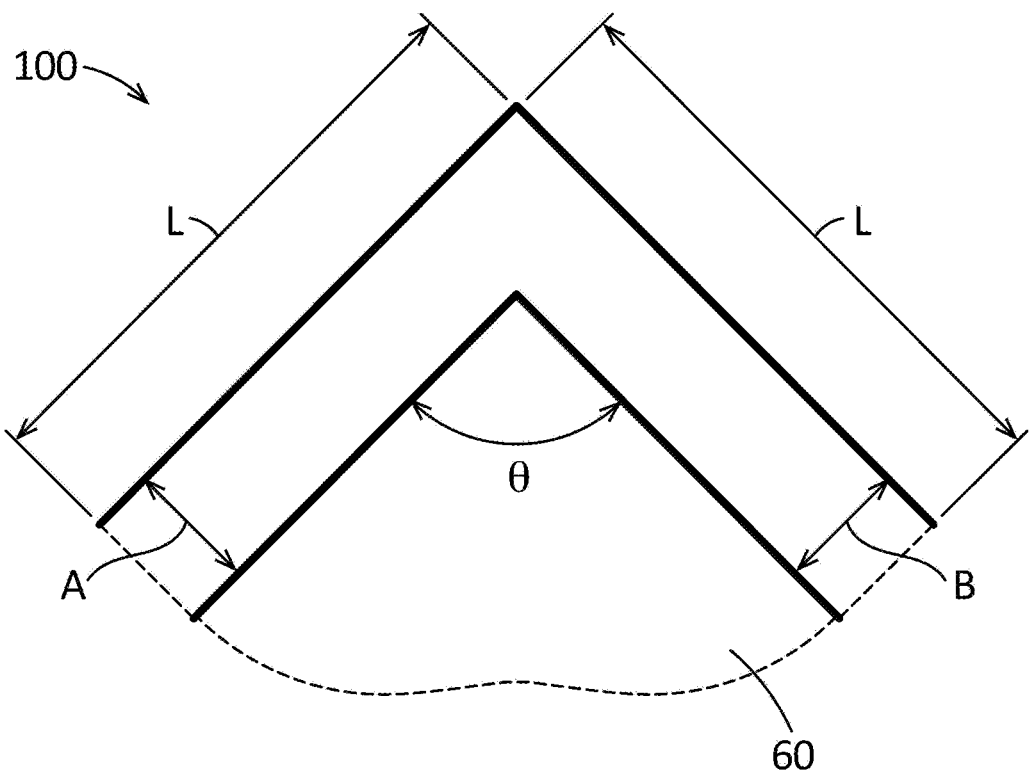

FIG. 19B is a diagram showing inputs in a process for taking measurements of a geometric feature defining an outside corner geometry.

Figure 19C:
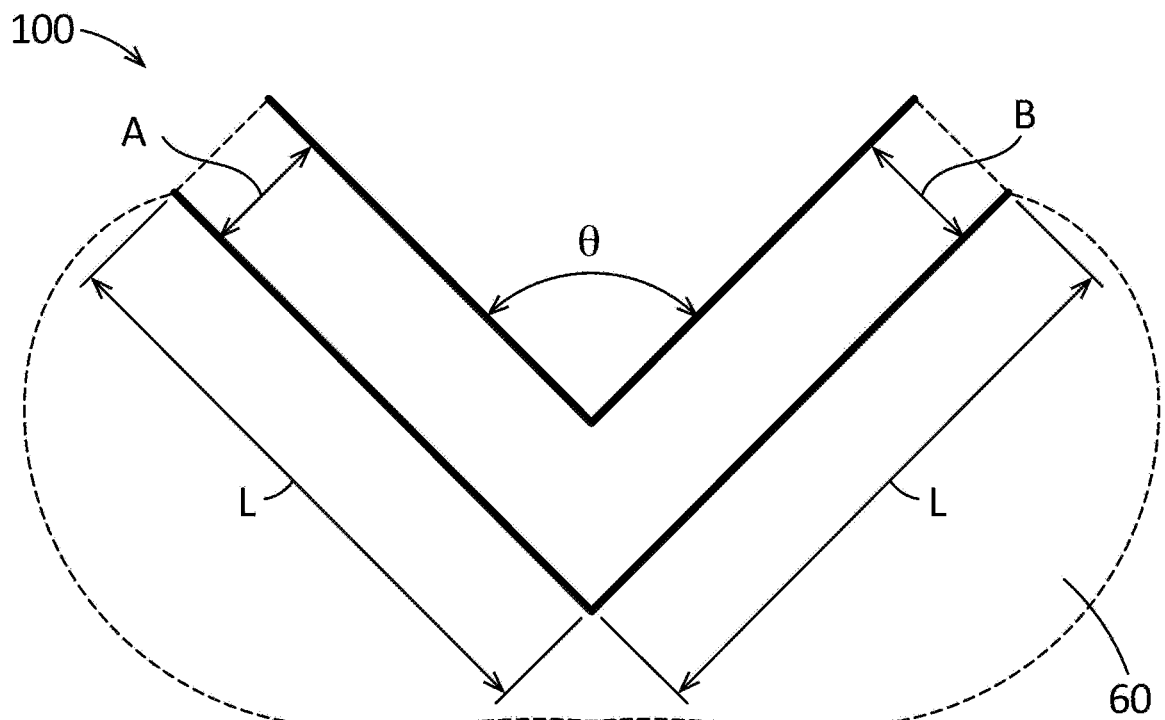

FIG. 19C is a diagram showing inputs in a process for taking measurements of a geometric feature defining an inside corner geometry.

Figure 19D:
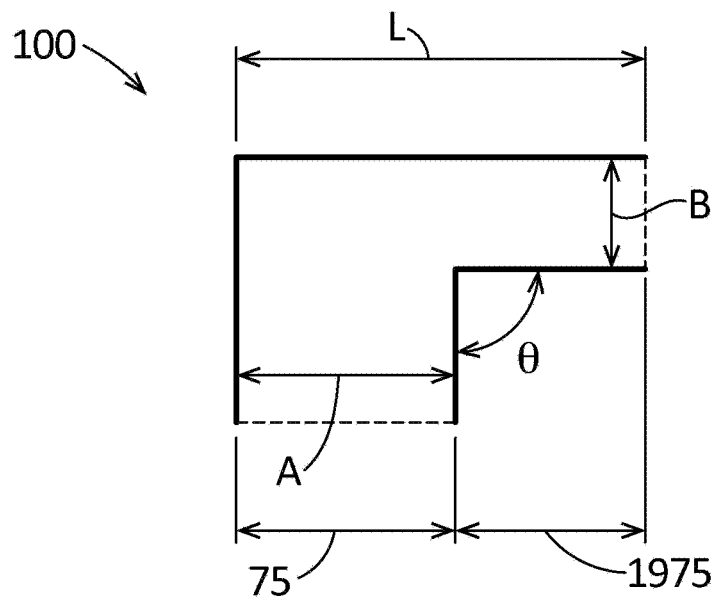

FIG. 19D is a diagram showing inputs in a process for taking measurements of a geometric feature in accordance with another aspect of the current disclosure.

Figure 19E:
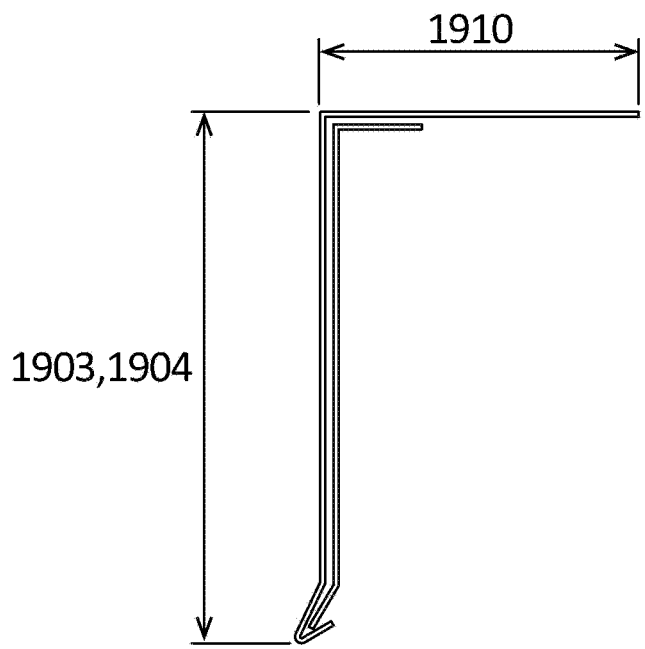

FIG. 19E is a sectional view showing edge metal, drawn as fascia, for covering the geometric feature 100.

Figure 20A:
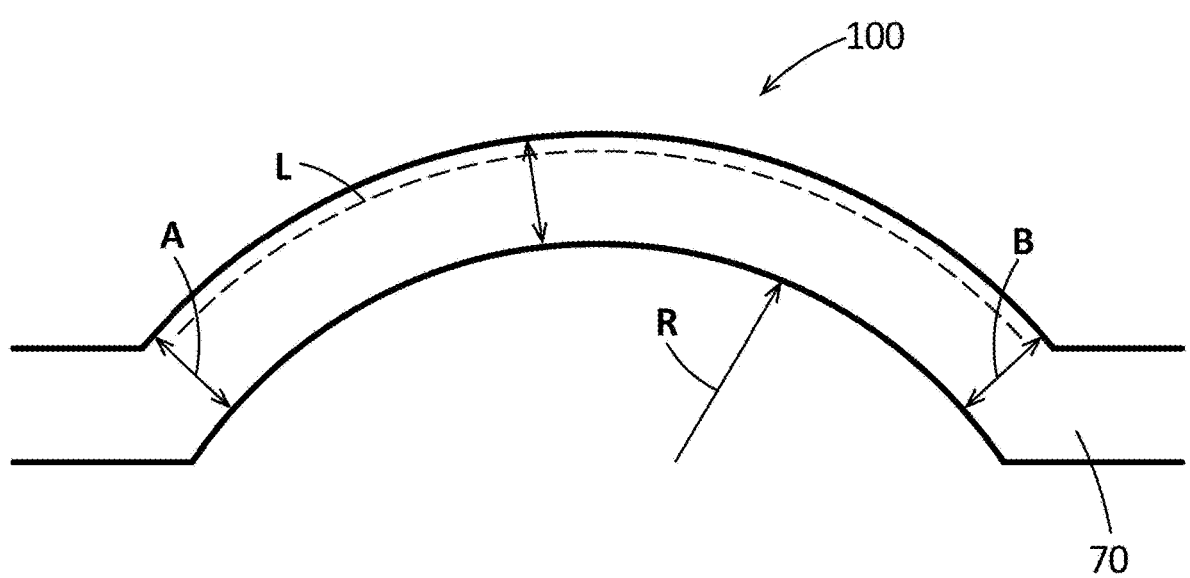

FIGS. 20A and 20B are various views or top plan views of a geometric feature 100 showing also a process for taking measurements of the geometric feature when it defines a radius geometry.

FIG. 20A is a diagram showing a process for taking measurements of a geometric feature defining a radius geometry.

FIG. 20B is a user interface on an app as displayed on a screen of the device and specifically as used for entry and/or display of measurements of the radius geometry.

Figure 21:
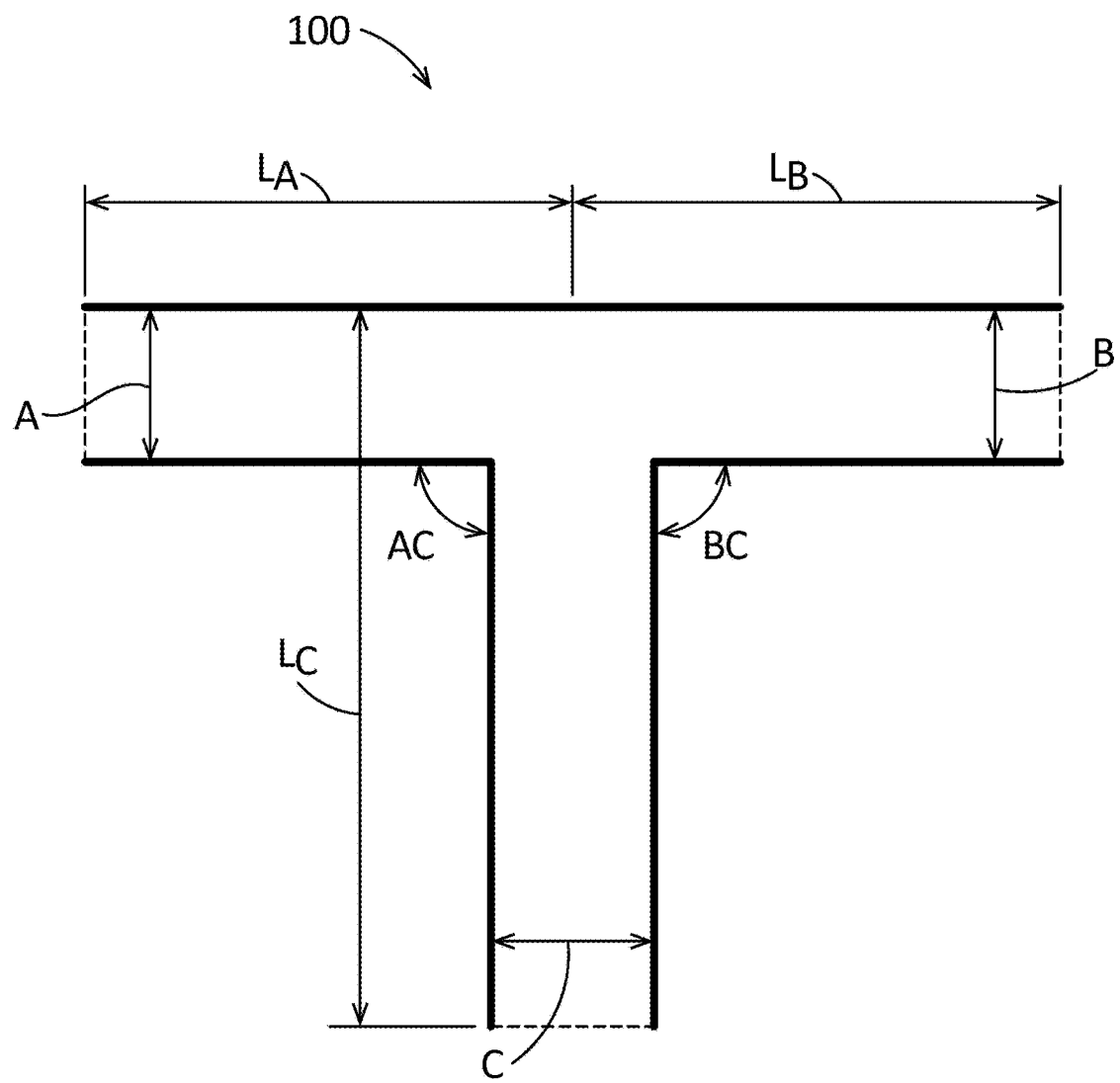

FIG. 21 is a top plan view or diagram of a geometric feature showing also a process for taking measurements of the geometric feature when it defines a tee geometry.

Figure 22A:
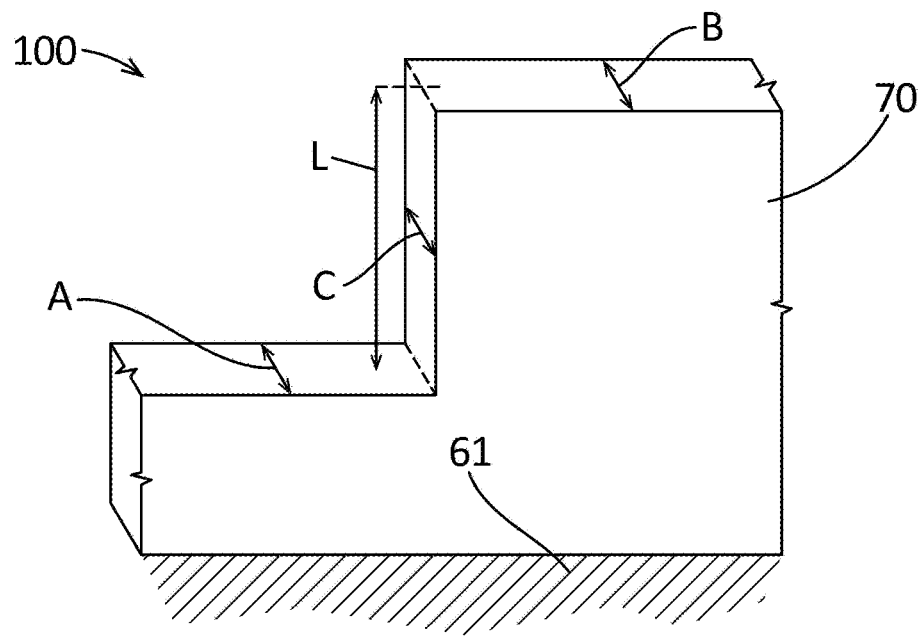
Figure 22B:
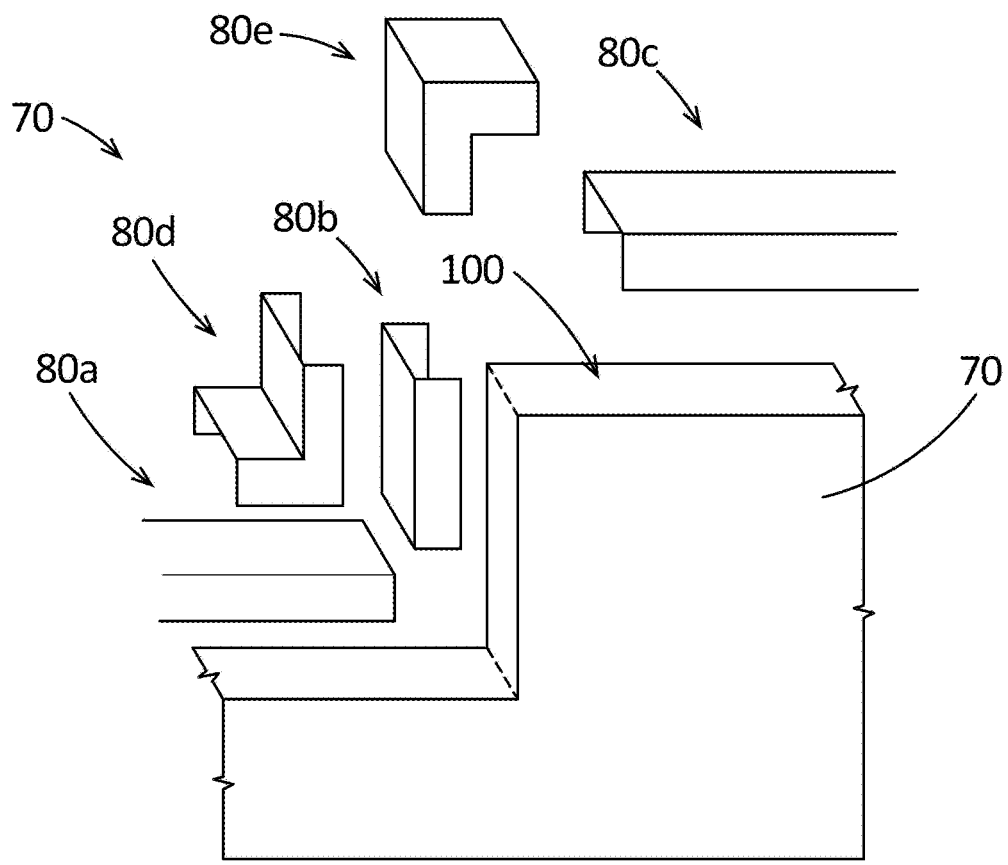

FIGS. 22A and 22B are perspective views of the geometric feature when it defines a vertical wall with a step-change in height.

FIG. 22A is a perspective view showing the measurements needed to define the vertical wall with the step.

FIG. 22B is an exploded perspective view showing the wall and coping components.

FIGS. 23A-23G are various views or top plan views of the geometric feature when it defines a double-miter or step or Z-miter geometry, which in each case below can be oriented either vertically or horizontally, showing also a process for taking measurements of the geometric feature defining a Z-miter geometry.

Figure 23A:
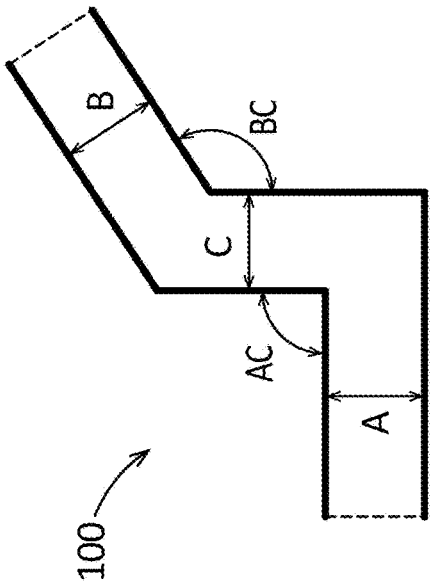

FIG. 23A is a top view of a geometric feature defining a Z-miter geometry showing also a process for taking measurements of the geometry in accordance with one aspect of the current disclosure.

Figure 23B:
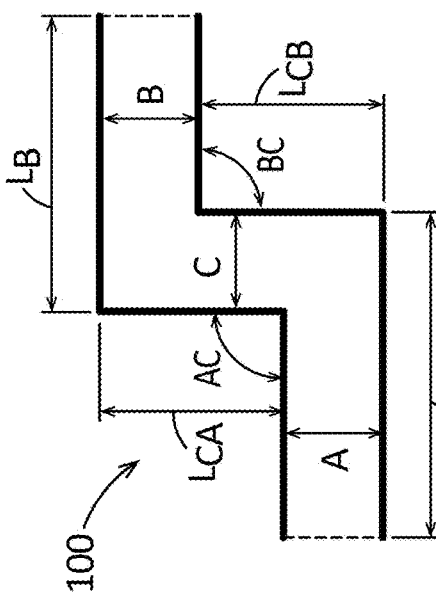

FIG. 23B is a top view of a geometric feature defining a Z-miter geometry showing also a process for taking measurements of the geometry in accordance with another aspect of the current disclosure.

Figure 23C:
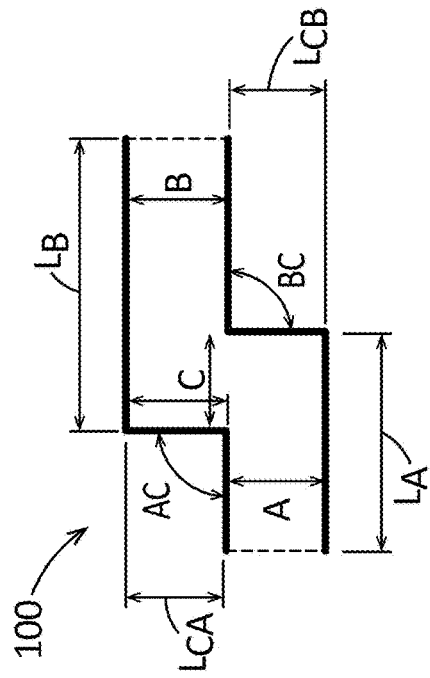

FIG. 23C is a top view of a geometric feature defining a Z-miter geometry showing also a process for taking measurements of the geometry in accordance with another aspect of the current disclosure.

Figure 23D:
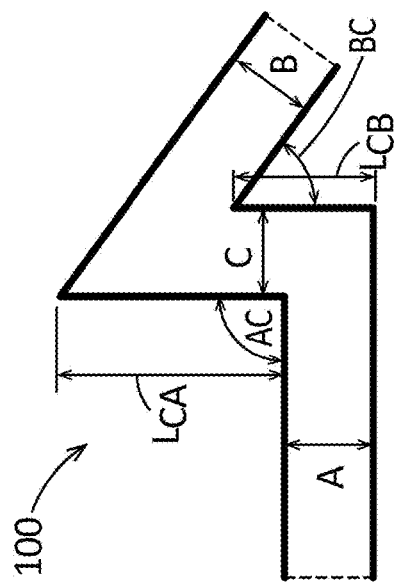

FIG. 23D is a top view of a geometric feature defining a Z-miter geometry showing also a process for taking measurements of the geometry in accordance with another aspect of the current disclosure.

Figure 23E:
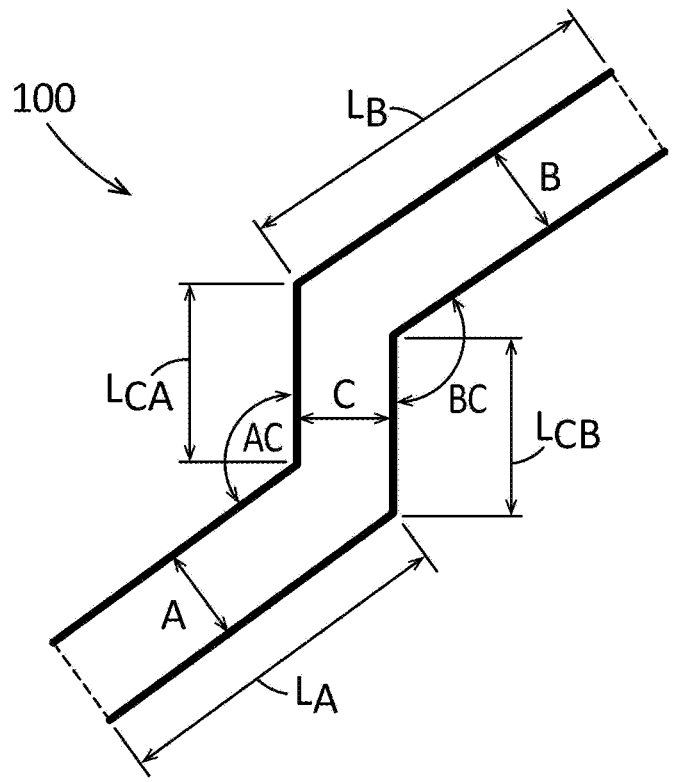

FIG. 23E is a top view of a geometric feature defining a Z-miter geometry showing also a process for taking measurements of the geometry in accordance with another aspect of the current disclosure.

Figure 23F:
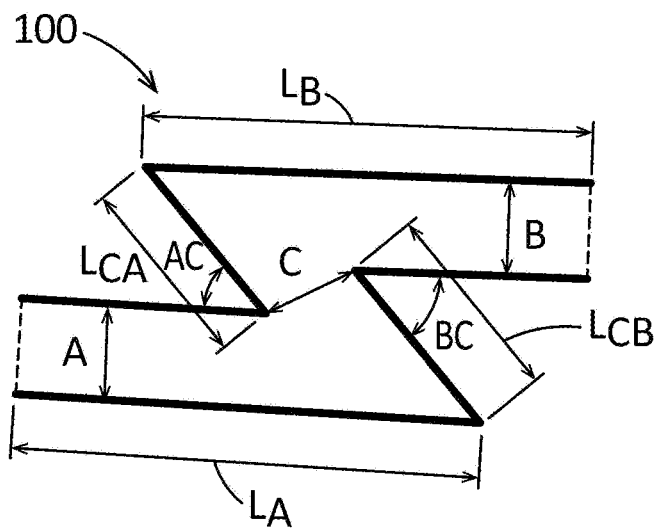

FIG. 23F is a top view of a geometric feature defining a Z-miter geometry showing also a process for taking measurements of the geometry in accordance with another aspect of the current disclosure.

Figure 23G:
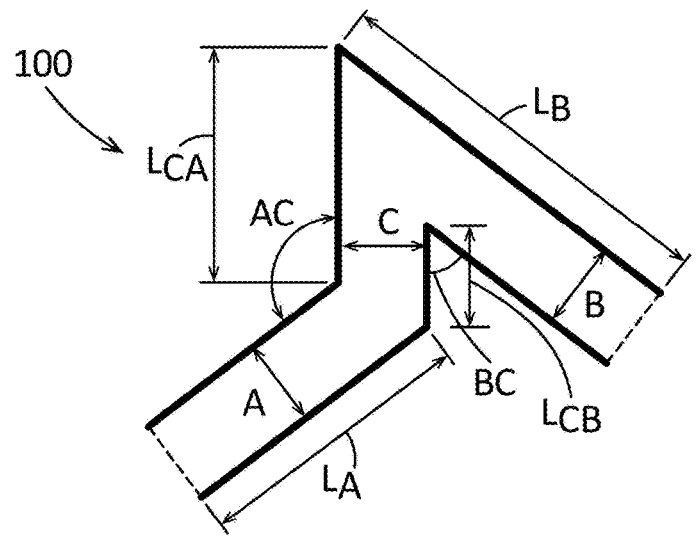

FIG. 23G is a top view of a geometric feature defining a Z-miter geometry showing also a process for taking measurements of the geometry in accordance with another aspect of the current disclosure.

FIGS. 24A-24G are various views or top plan views of the geometric feature when it defines a terminating or end-condition geometry, showing also a process for taking measurements of the geometric feature when it defines the Z-miter geometry.

Figure 24A:
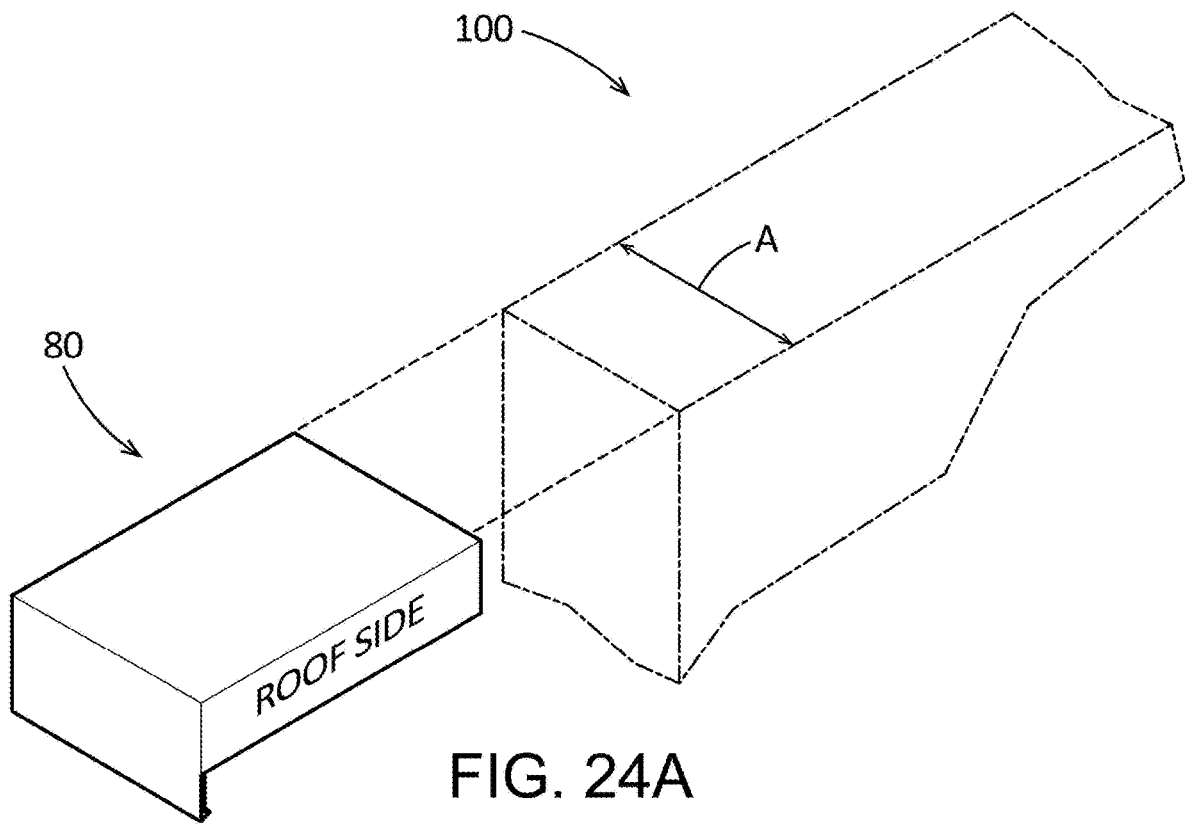

FIG. 24A is a top perspective view of a geometric feature defining an end-condition geometry and, more specifically, an end cap.

Figure 24B:
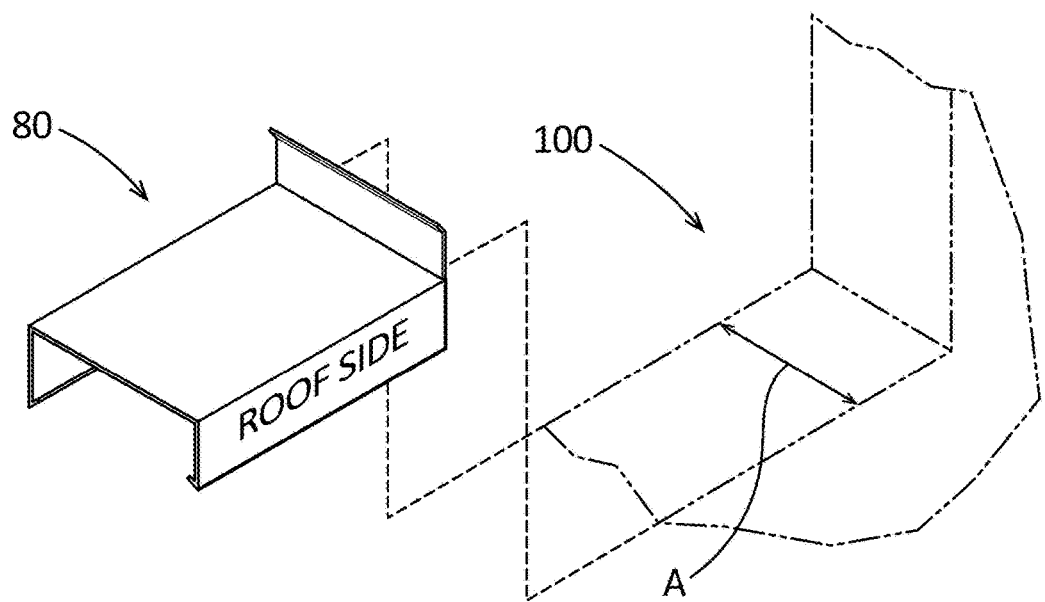

FIG. 24B is a top perspective view of a geometric feature defining an end-condition geometry and, more specifically, an end wall.

Figure 24C:
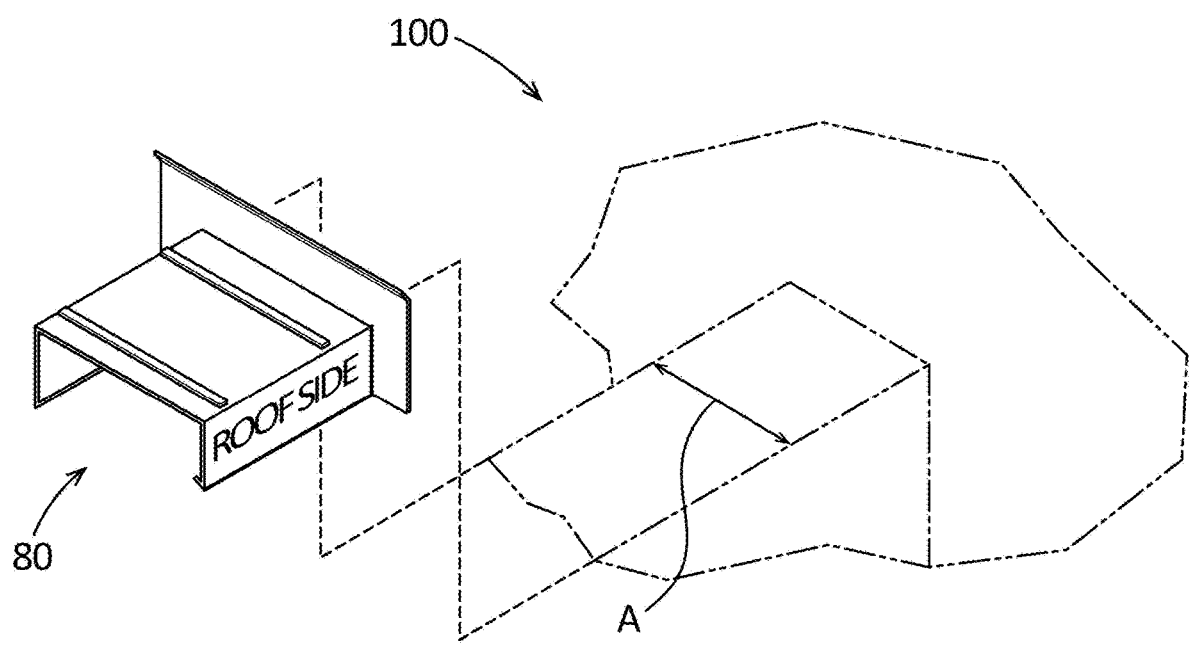

FIG. 24C is a top perspective view of a geometric feature defining an end-condition geometry and, more specifically, an end-wall splice.

Figure 24D:
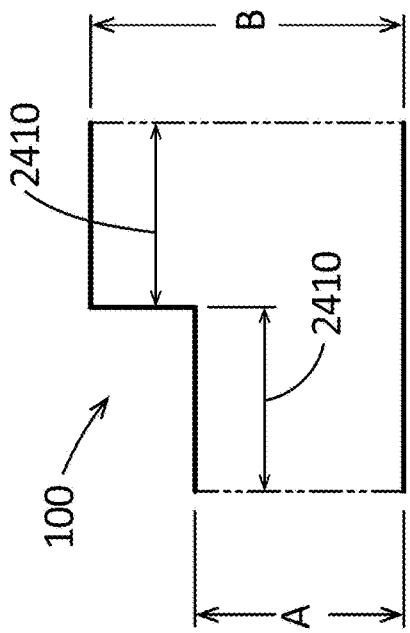

FIG. 24D is a top view of a geometric feature defining a transition geometry and, more specifically, a transition geometry extending between walls defining different wall widths and, more specifically, a left-handed face leg.

Figure 24E:
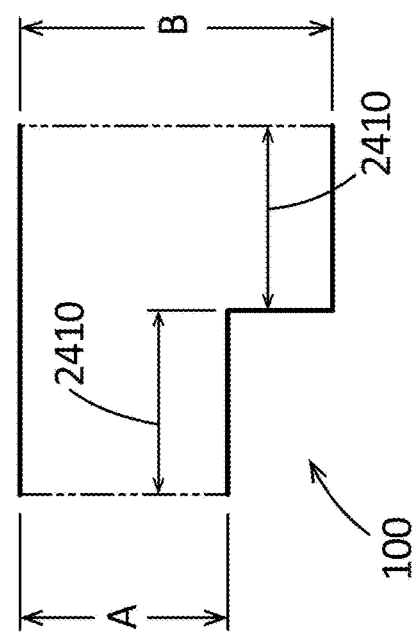

FIG. 24E is a top view of a geometric feature defining a transition geometry and, more specifically, a transition geometry extending between walls defining different wall widths and, more specifically, a right-handed face leg.

Figure 24F:
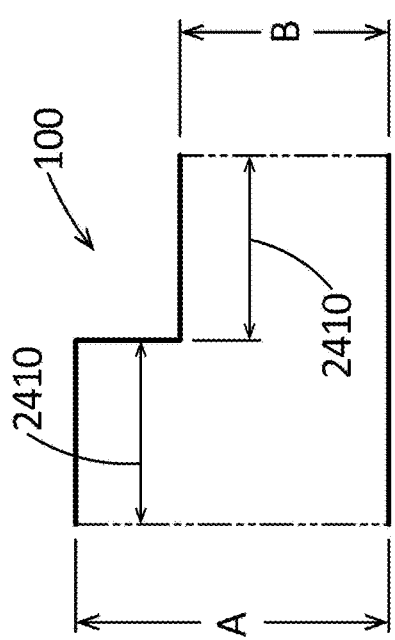

FIG. 24F is a top view of a geometric feature defining a transition geometry and, more specifically, a transition geometry extending between walls defining different wall widths and, more specifically, a left-handed back leg.

Figure 24G:
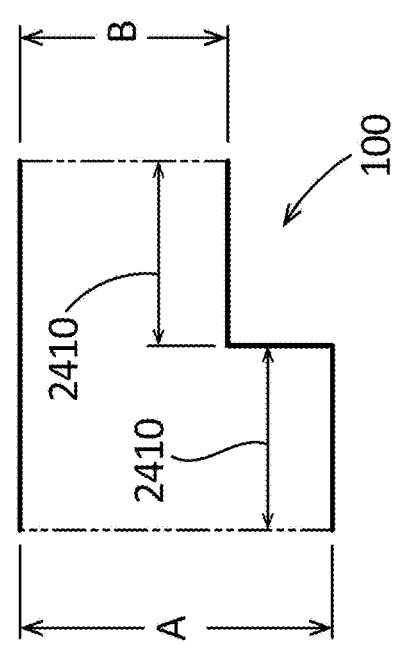

FIG. 24G is a top view of a geometric feature defining a transition geometry and, more specifically, a transition geometry extending between walls defining different wall widths and, more specifically, a right-handed back leg.

Figure 5A:
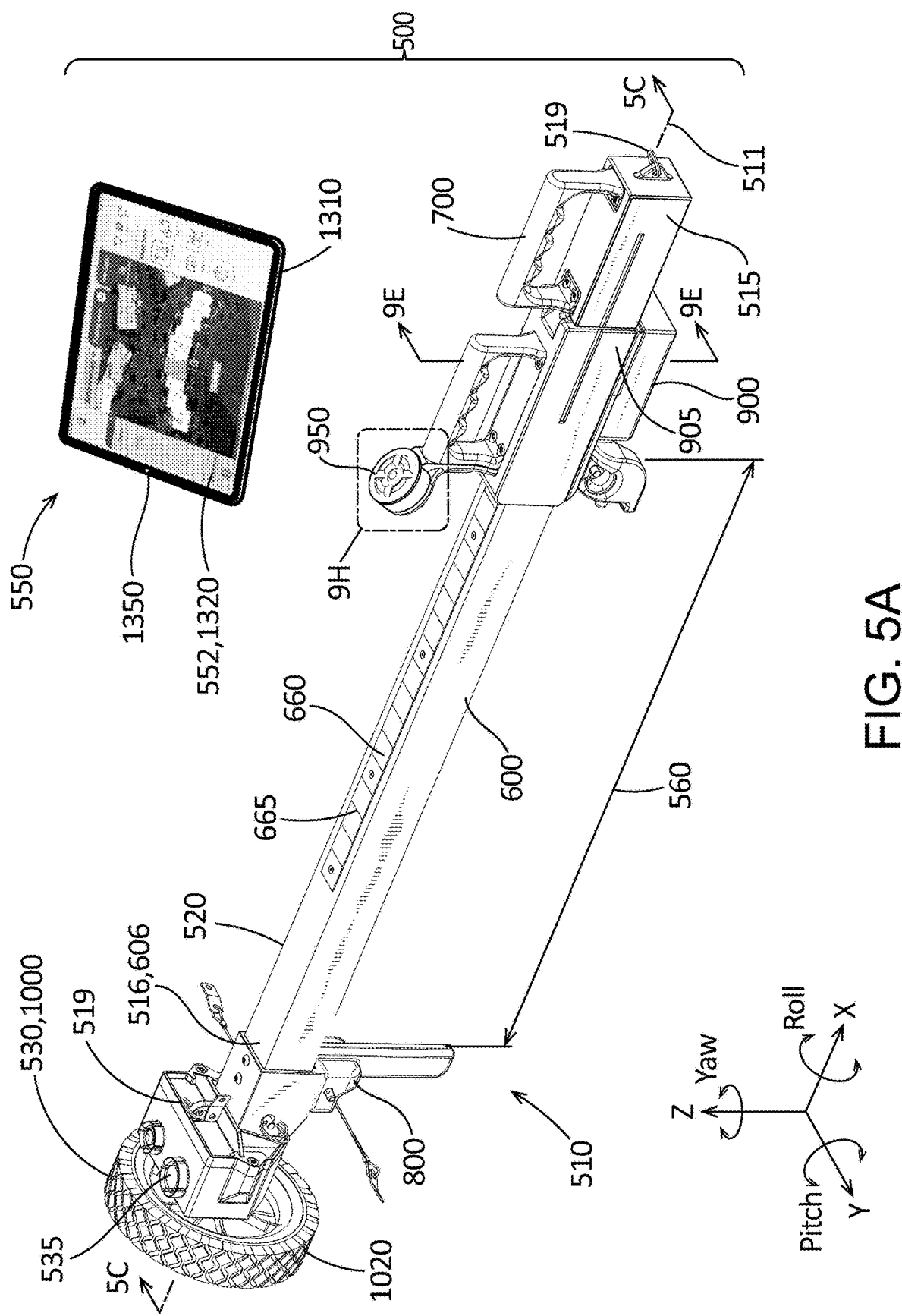
FIGS. 5A-5C are various views of a system comprising a measurement tool and a user device in accordance with one aspect of the current disclosure, the system able to be used to measure a parapet of a roof of a building such as the roof of FIG. 1A.

FIGS. 25A-25D are various flowcharts of a method of using an app on the user device of FIG. 5A.

Figure 25A:
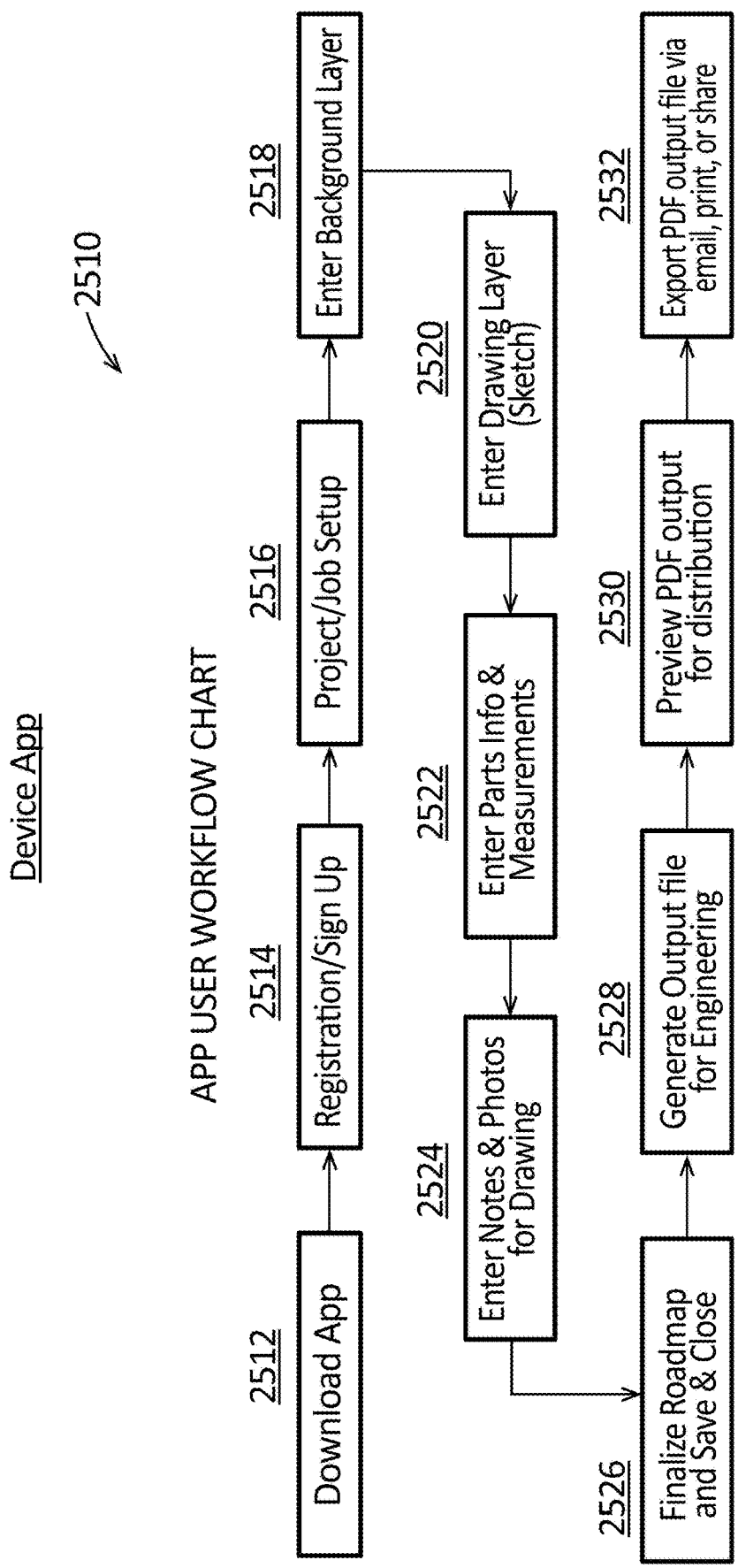

FIG. 25A is a flow chart showing an overall operational workflow or method of using an app on the user device of FIG. 5A.

Figure 25B:
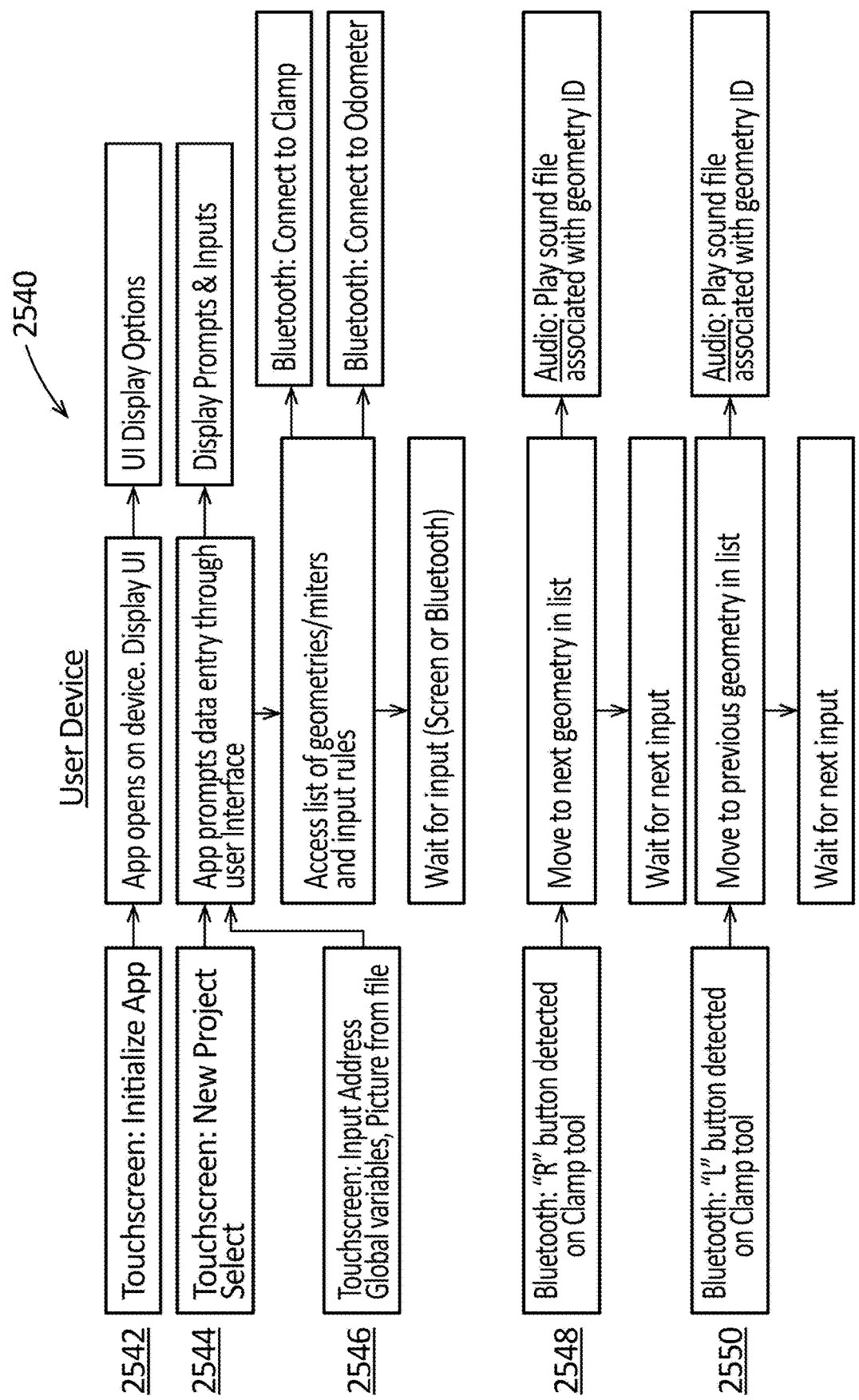

FIG. 25B is a first flow chart showing a first operational workflow or method of using an app on the user device of FIG. 5A.

Figure 25C:
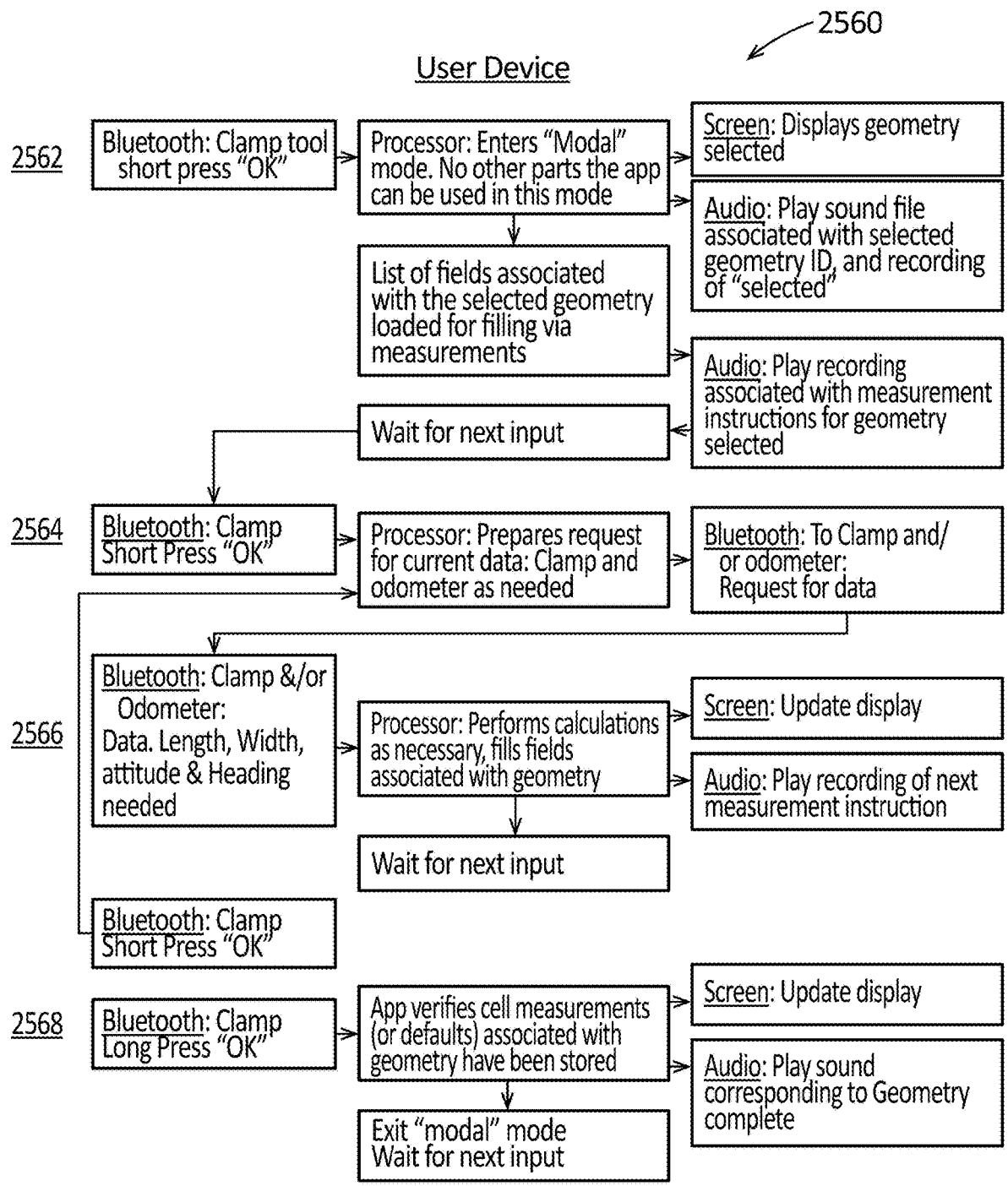

FIG. 25C is a second flow chart showing a second operational workflow or method of using an app on the user device of FIG. 5A.

Figure 25D:
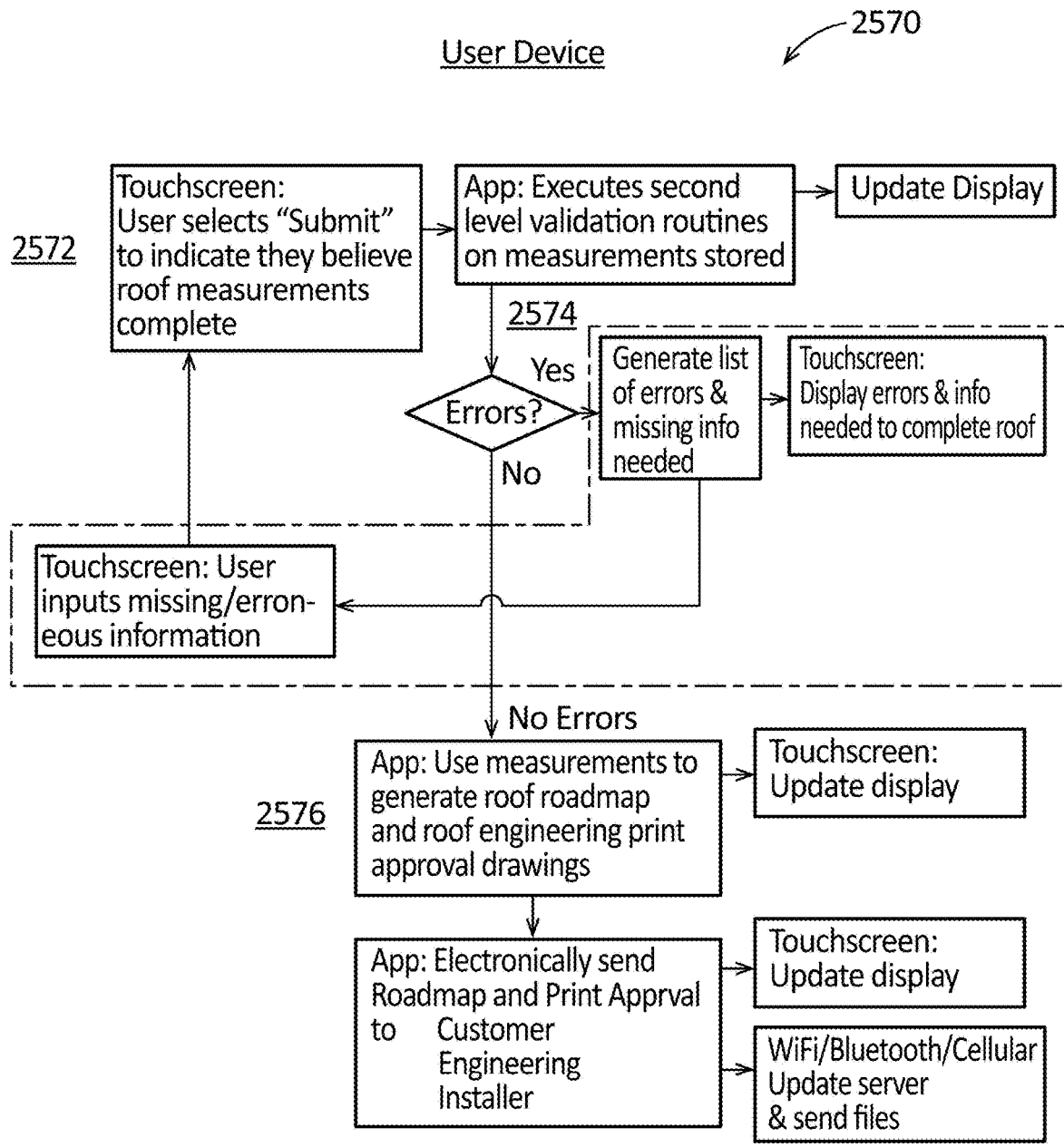

FIG. 25D is a third flow chart showing a third operational workflow or method of using an app on the user device of FIG. 5A.

FIGS. 26-51 are various screen views, in color, of a user interface of a display of the user device of FIG. 5A during use.

Figure 26:
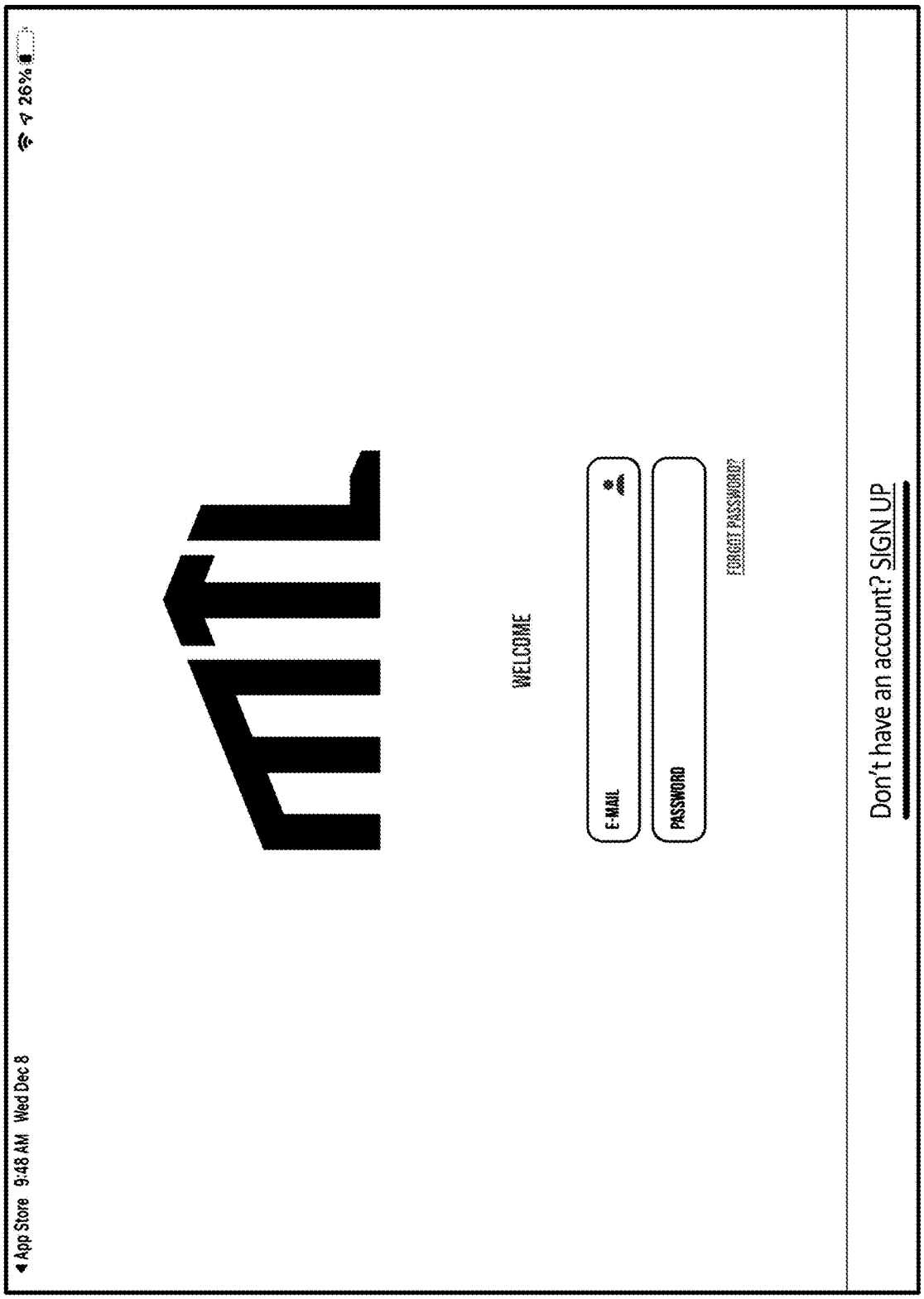

FIG. 26 is a screen view of a user interface of a display of the user device of FIG. 5A during use, the screen view showing a login screen.

Figure 27:
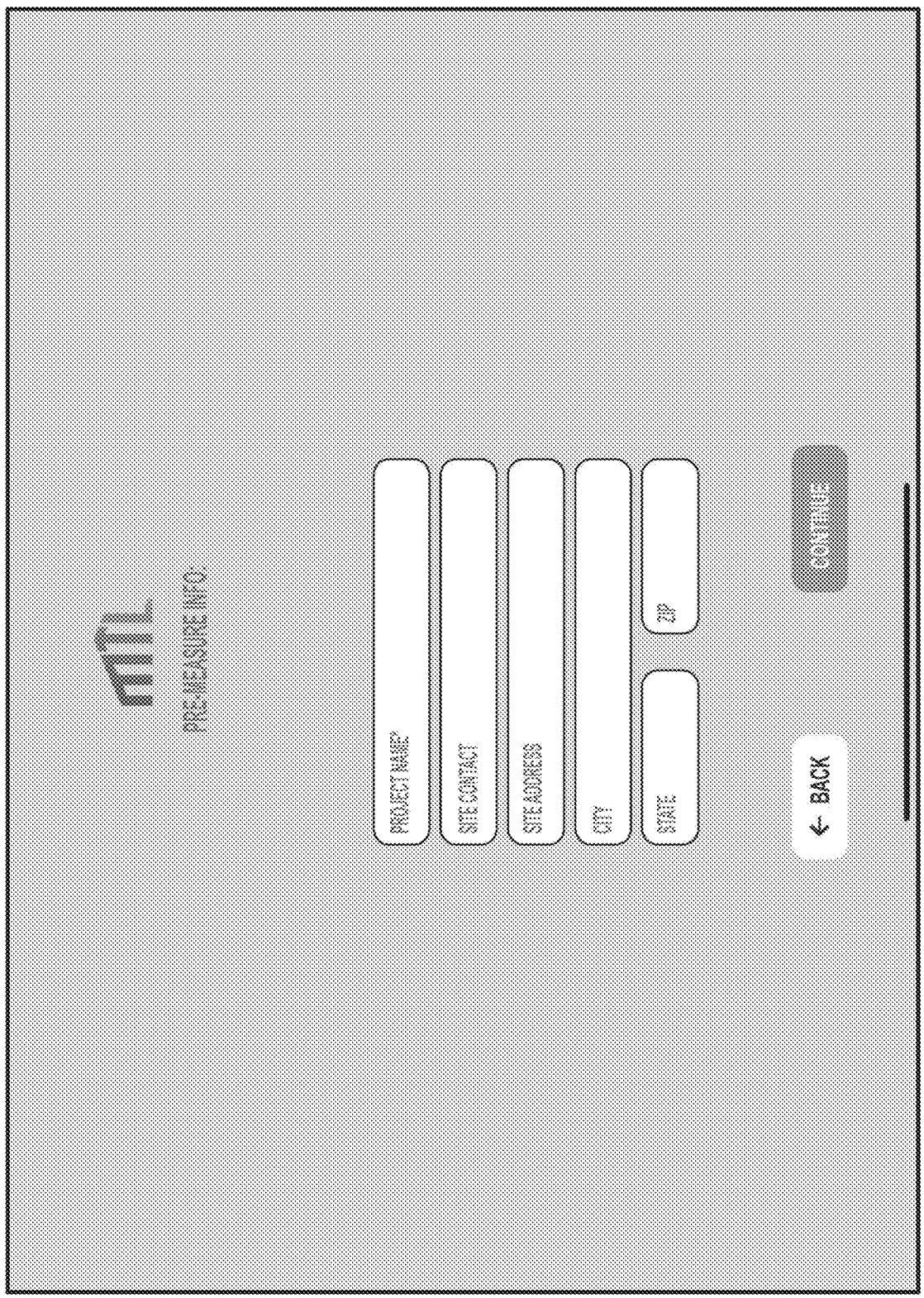

FIG. 27 is a screen view of a user interface of a display of the user device of FIG. 5A during use, the screen view showing a pre-measure or project set-up screen.

Figure 28:
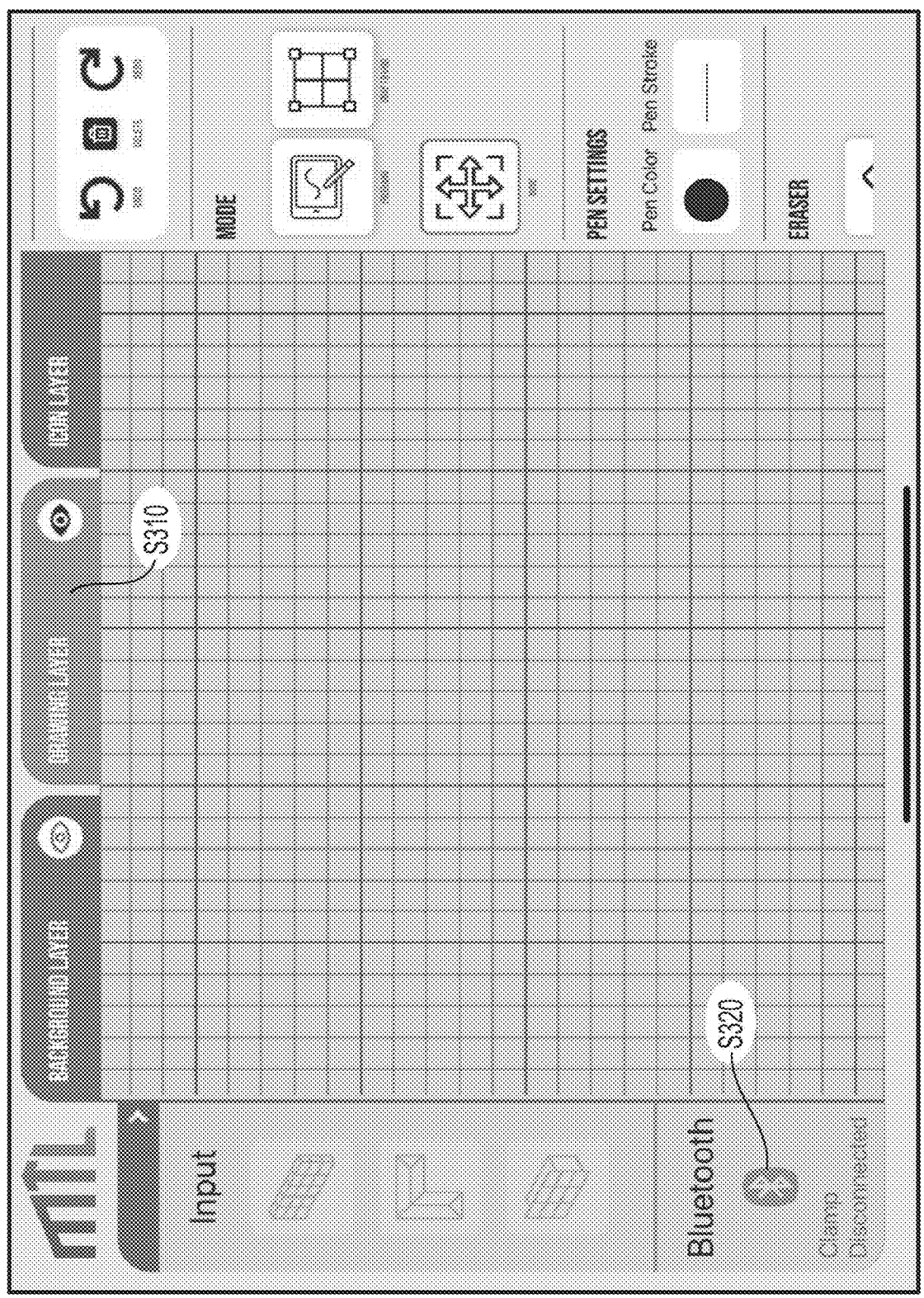

FIG. 28 is a screen view of a user interface of a display of the user device of FIG. 5A during use, the screen view showing a drawing layer of a geometry input screen.

Figure 29:
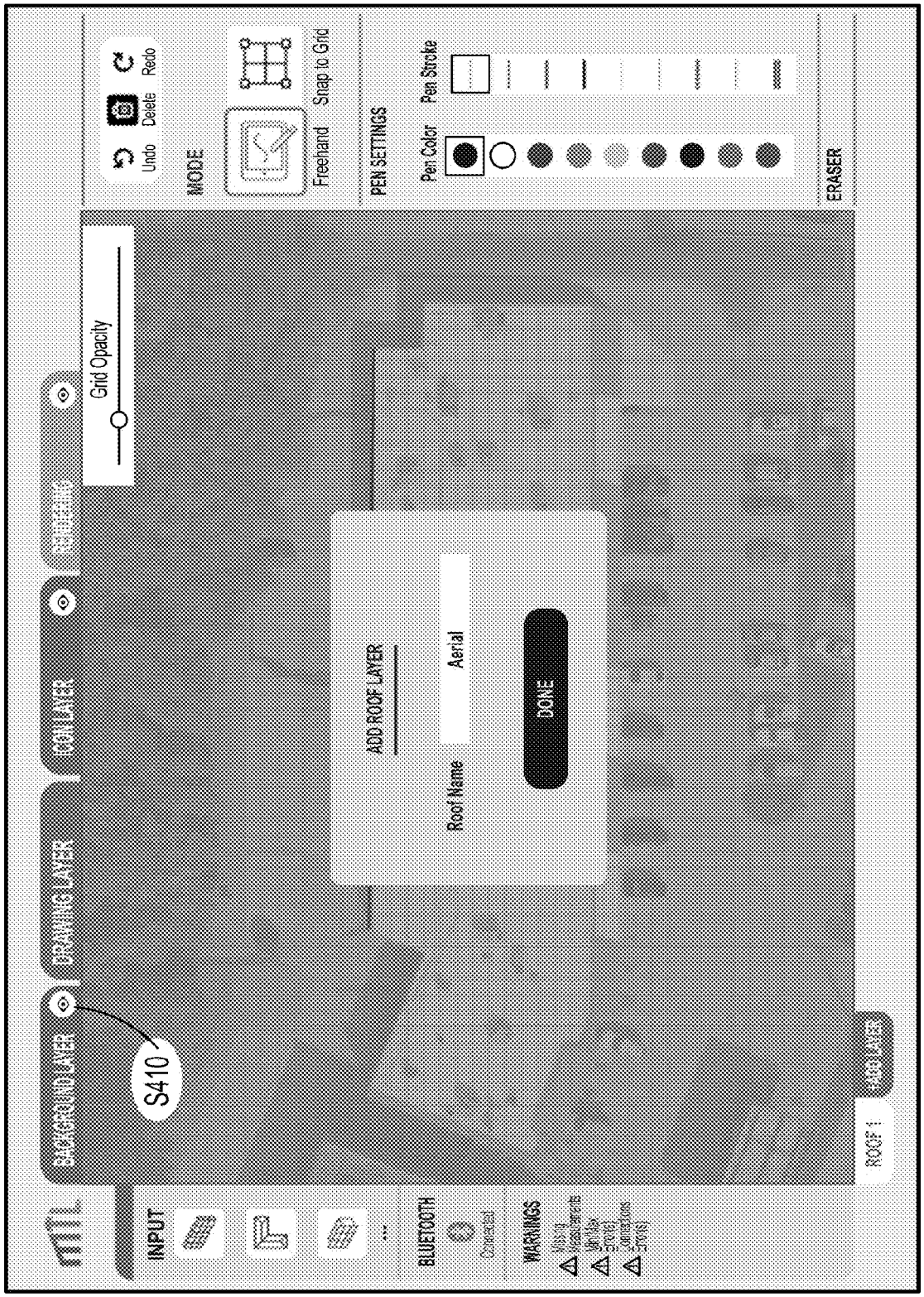

FIG. 29 is a screen view of a user interface of a display of the user device of FIG. 5A during use, the screen view showing the drawing layer and, on top, an image input pop-up window or modal screen for adding an aerial image of a roof or the equivalent and with a background layer of the geometry input screen also active.

Figure 30:
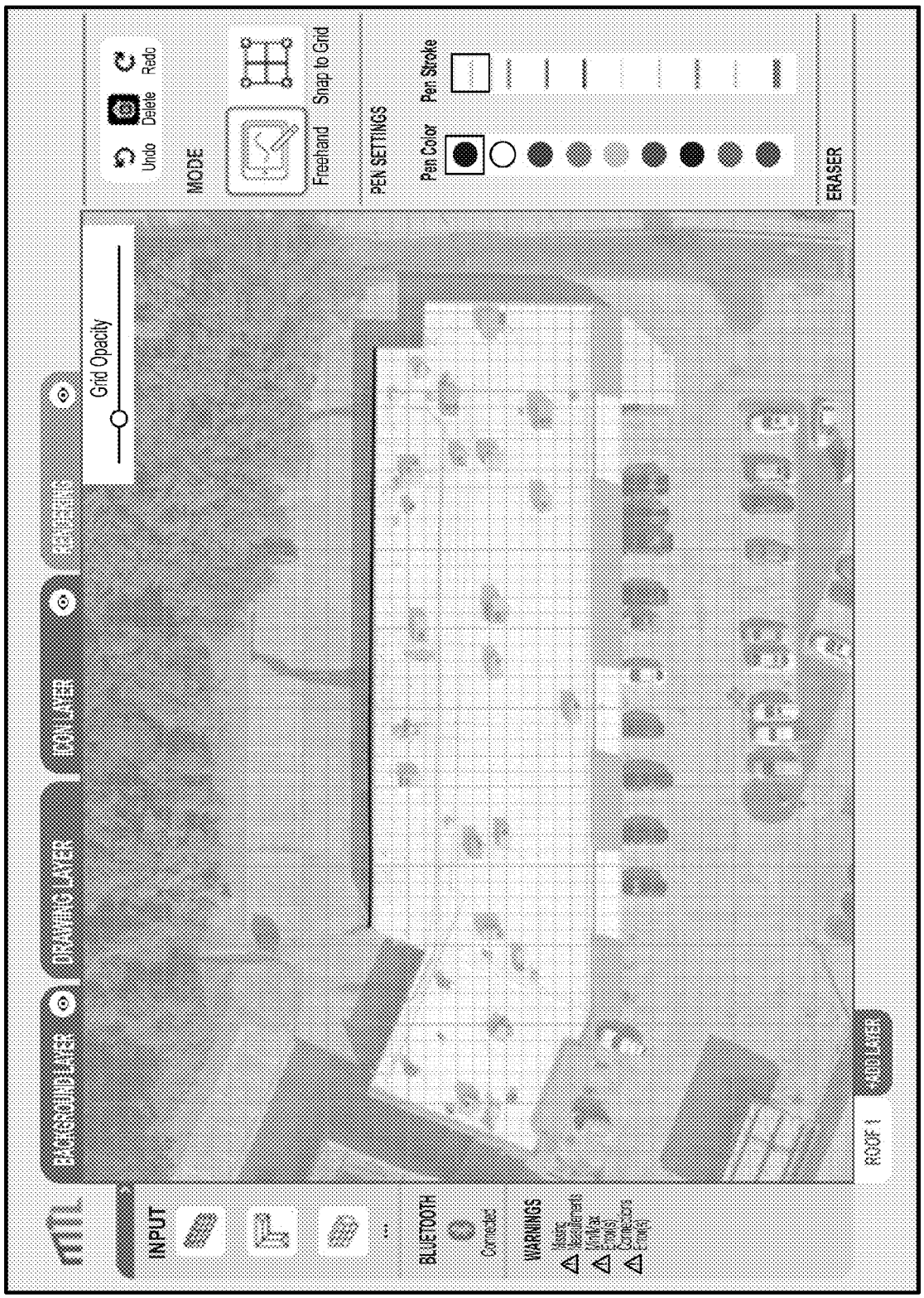

FIG. 30 is a screen view of a user interface of a display of the user device of FIG. 5A during use, the screen view showing, with the background layer of the geometry input screen also active as well as an aerial image of the roof also active, the drawing layer with a first line manually drawn and showing a first length of a parapet wall.

Figure 31:
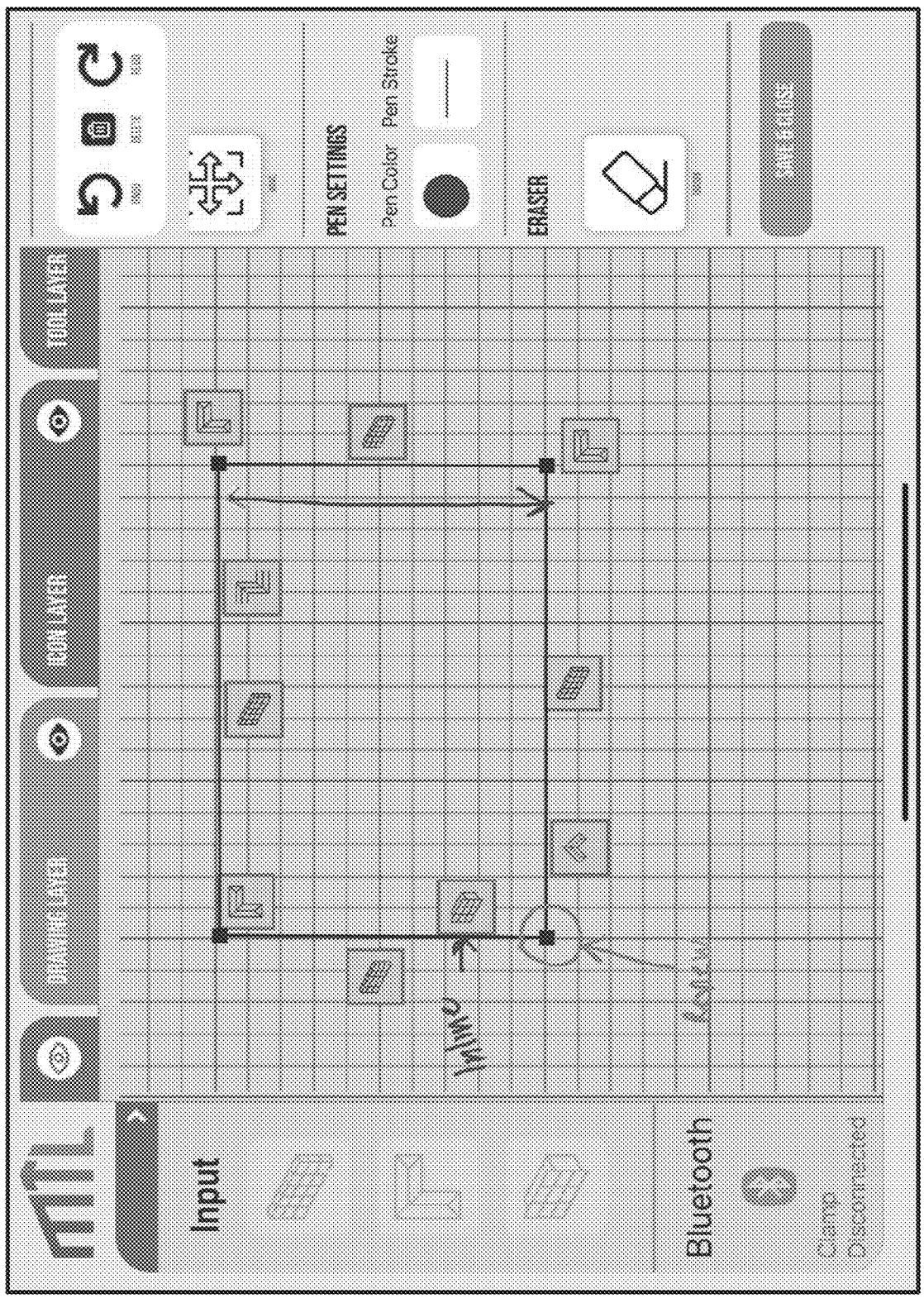

FIG. 31 is a screen view of a user interface of a display of the user device of FIG. 5A during use, the screen view showing the drawing layer of FIG. S3 with lines drawn to represent the layout of a parapet on a roof and with an icon layer of the geometry input screen also active.

Figure 32:
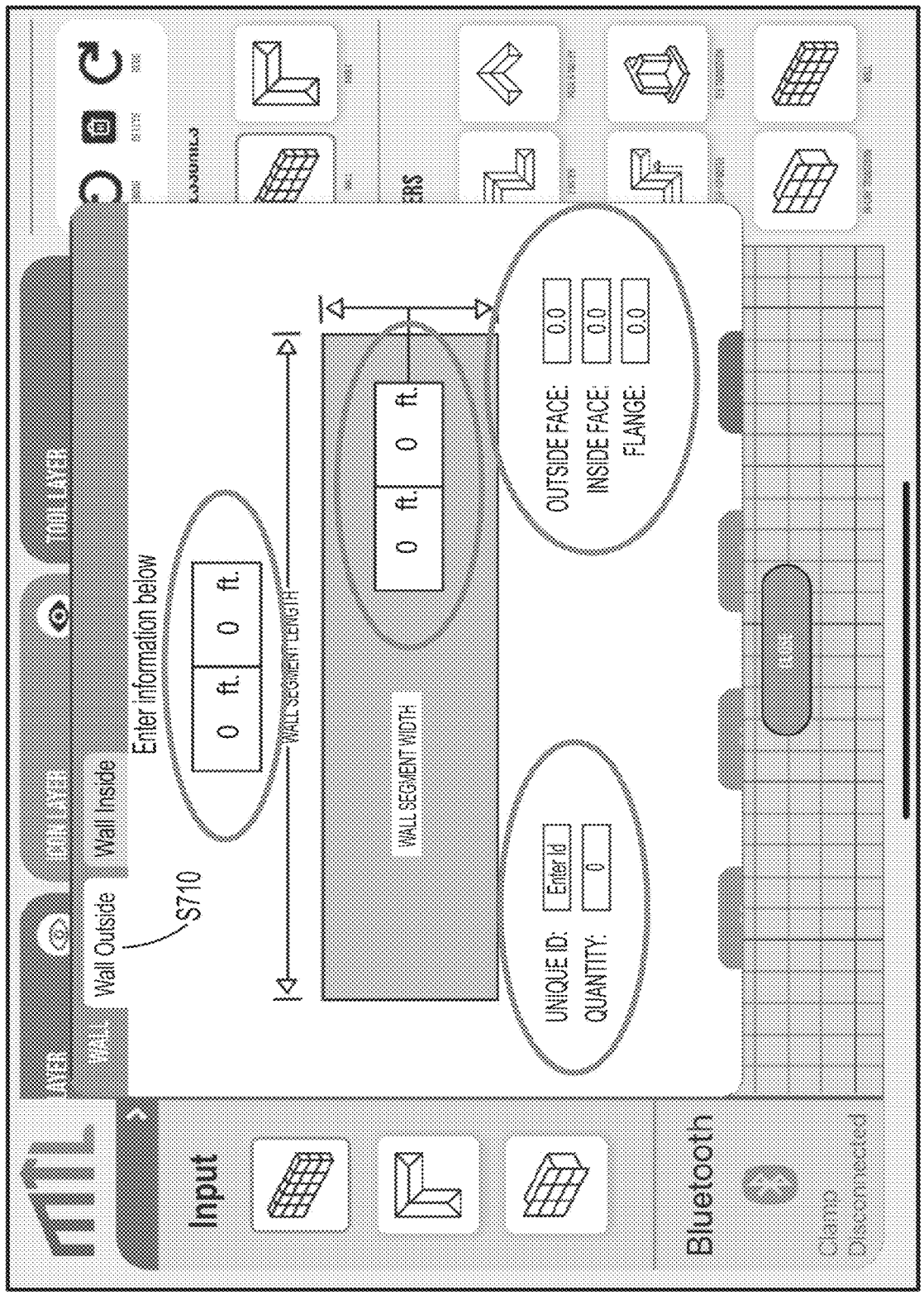

FIG. 32 is a screen view of a user interface of a display of the user device of FIG. 5A during use, the screen view showing the icon layer and, on top, a geometry input pop-up window for input of wall geometry details.

Figure 33:
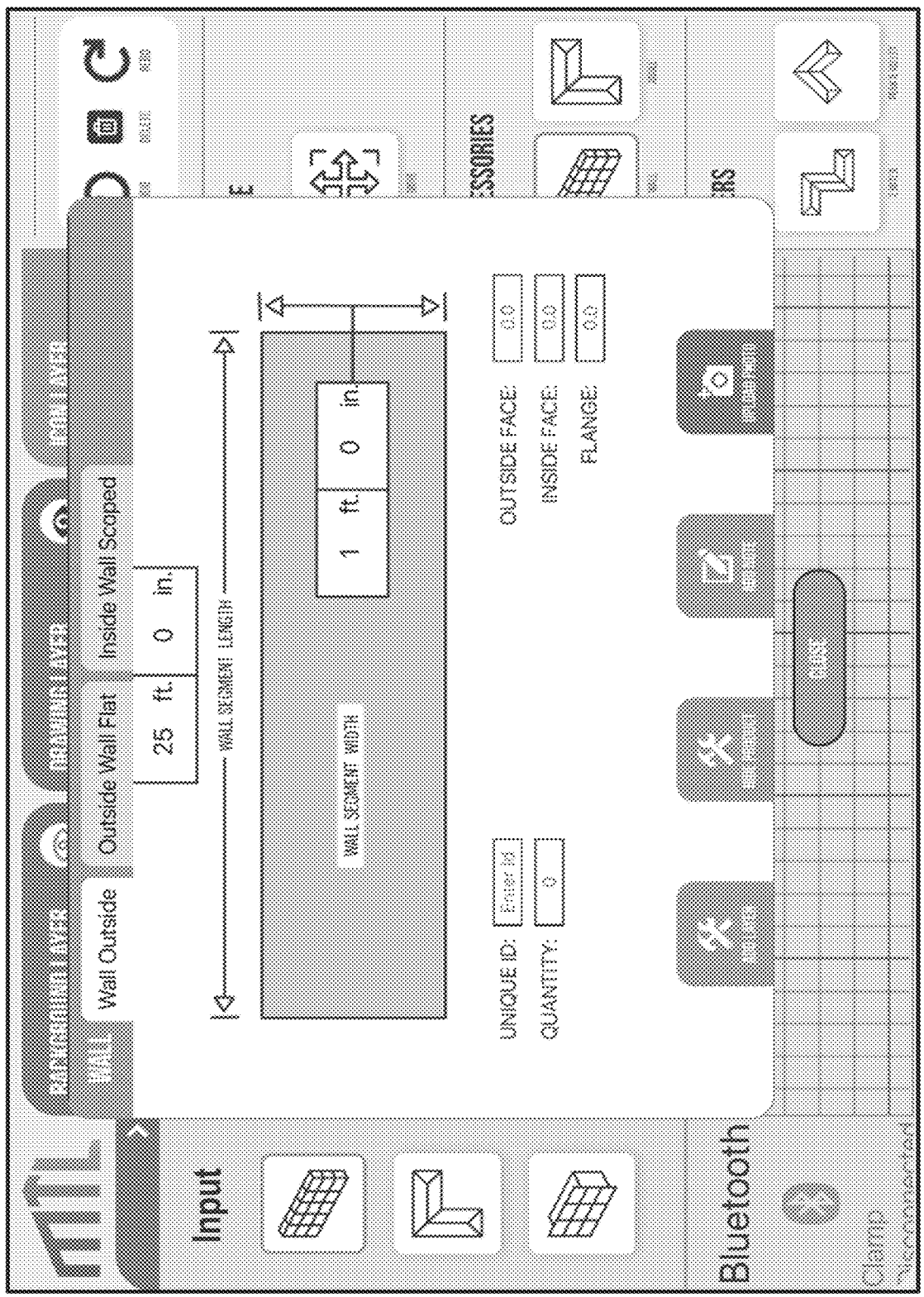

FIG. 33 is a screen view of a user interface of a display of the user device of FIG. 5A during use, the screen view showing the icon layer and, on top, a geometry input pop-up window for input of wall geometry details in accordance with another aspect of the current disclosure.

Figure 34:
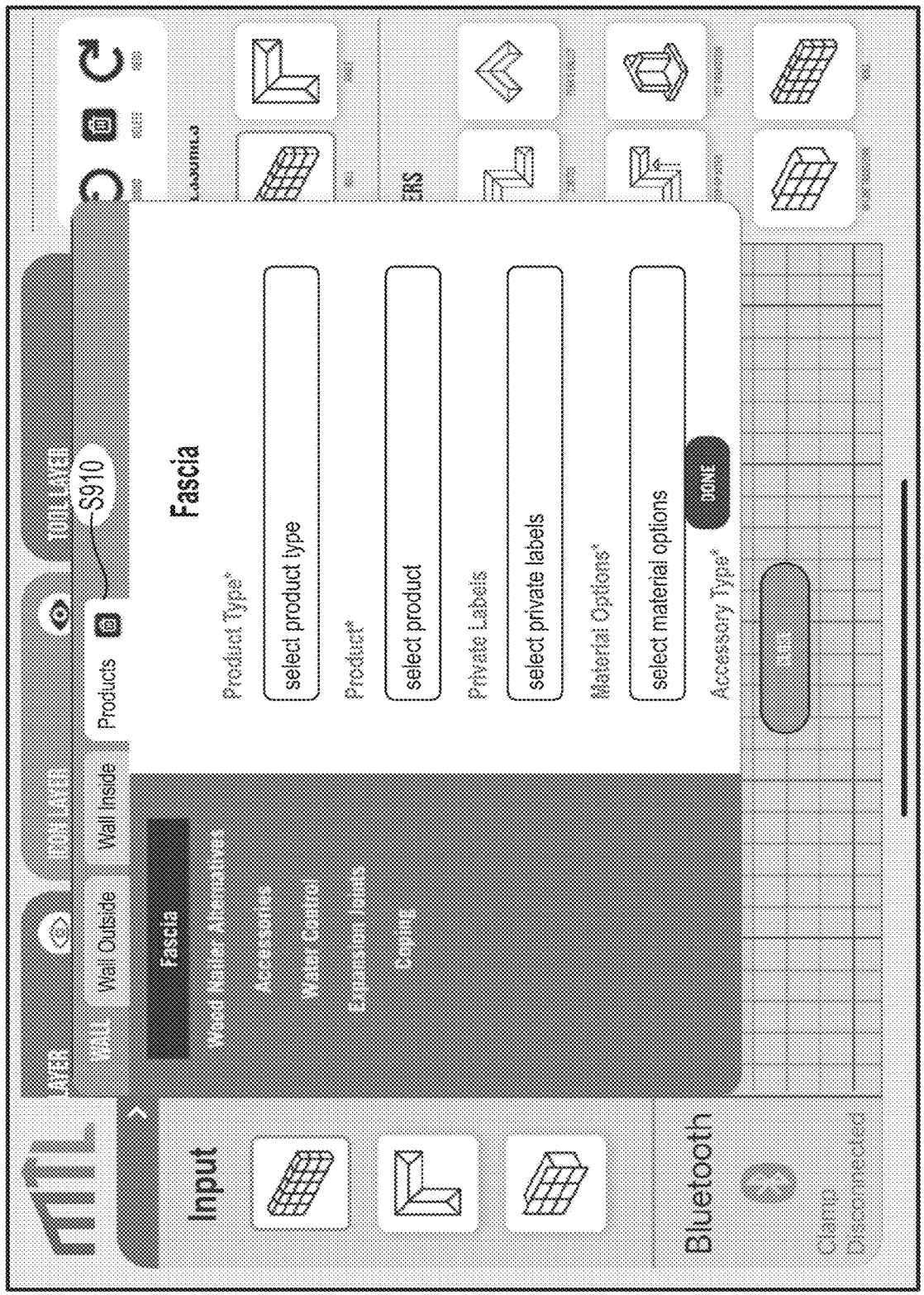

FIG. 34 is a screen view of a user interface of a display of the user device of FIG. 5A during use, the screen view showing the icon layer and, on top, a product selection screen.

Figure 35:
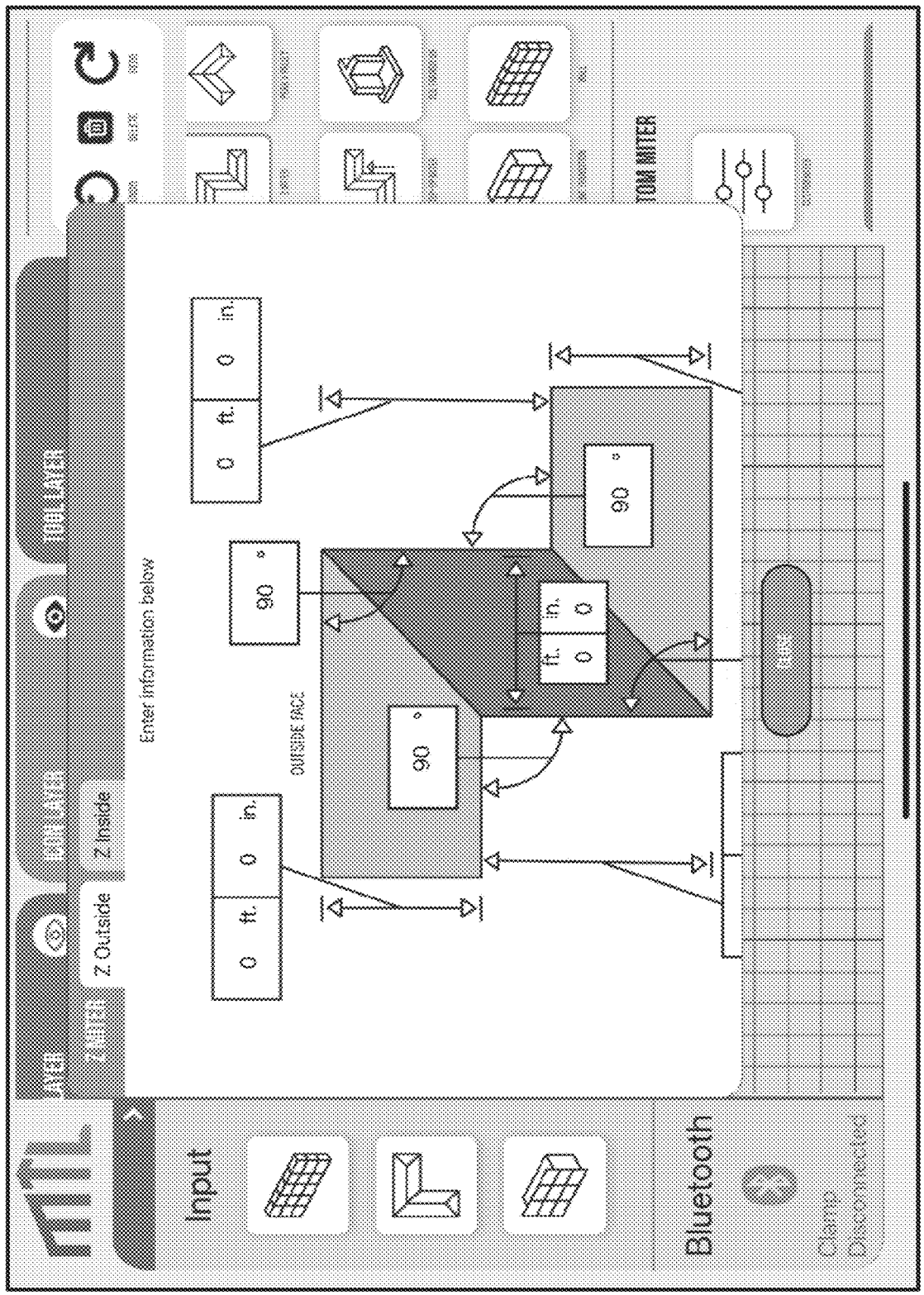

FIG. 35 is a screen view of a user interface of a display of the user device of FIG. 5A during use, the screen view showing the icon layer and, on top, a geometry input pop-up window for input of Z-miter geometry details.

Figure 36:
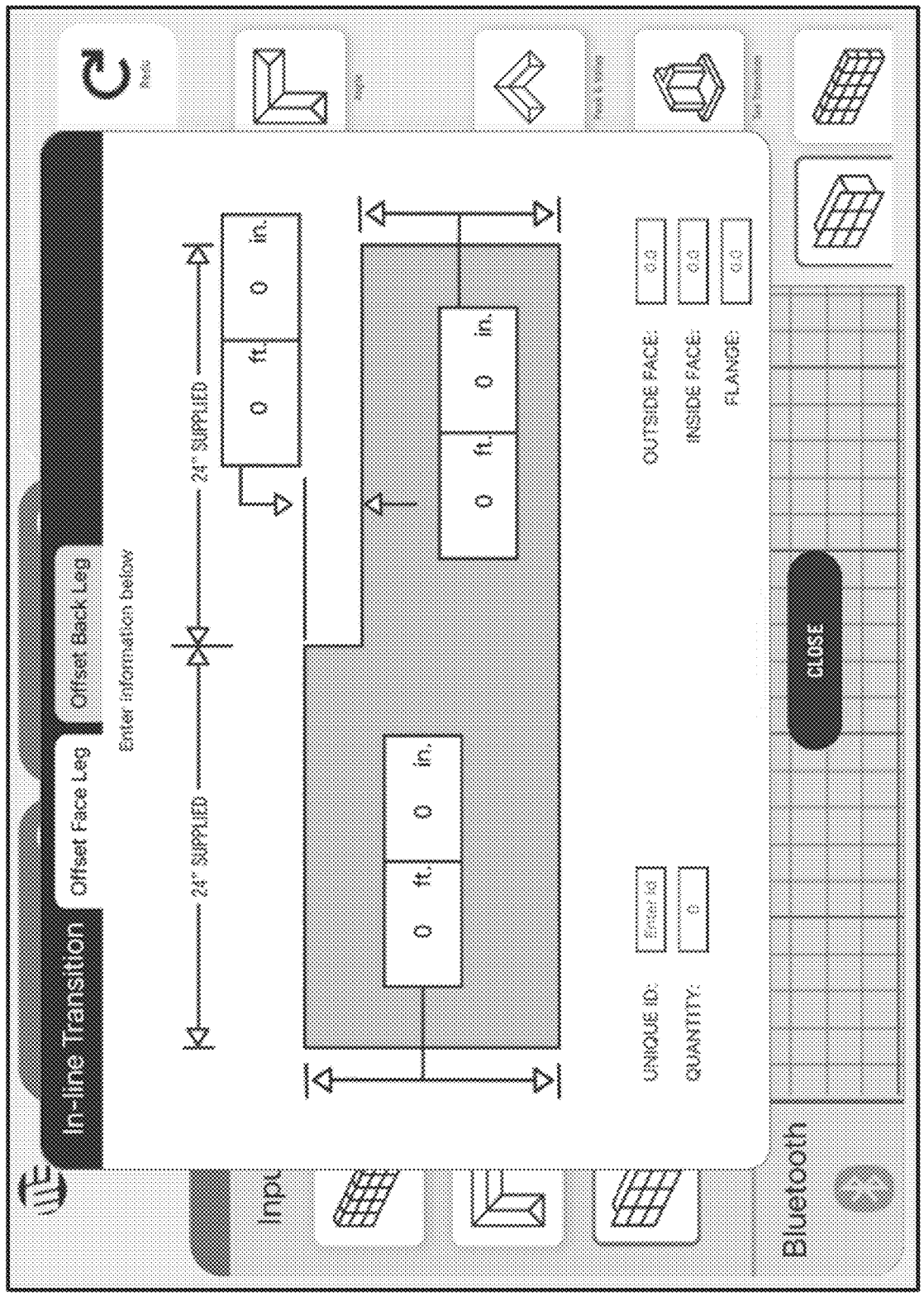

FIG. 36 is a screen view of a user interface of a display of the user device of FIG. 5A during use, the screen view showing the icon layer and, on top, a geometry input pop-up window for input of in-line transition geometry details.

Figure 37:
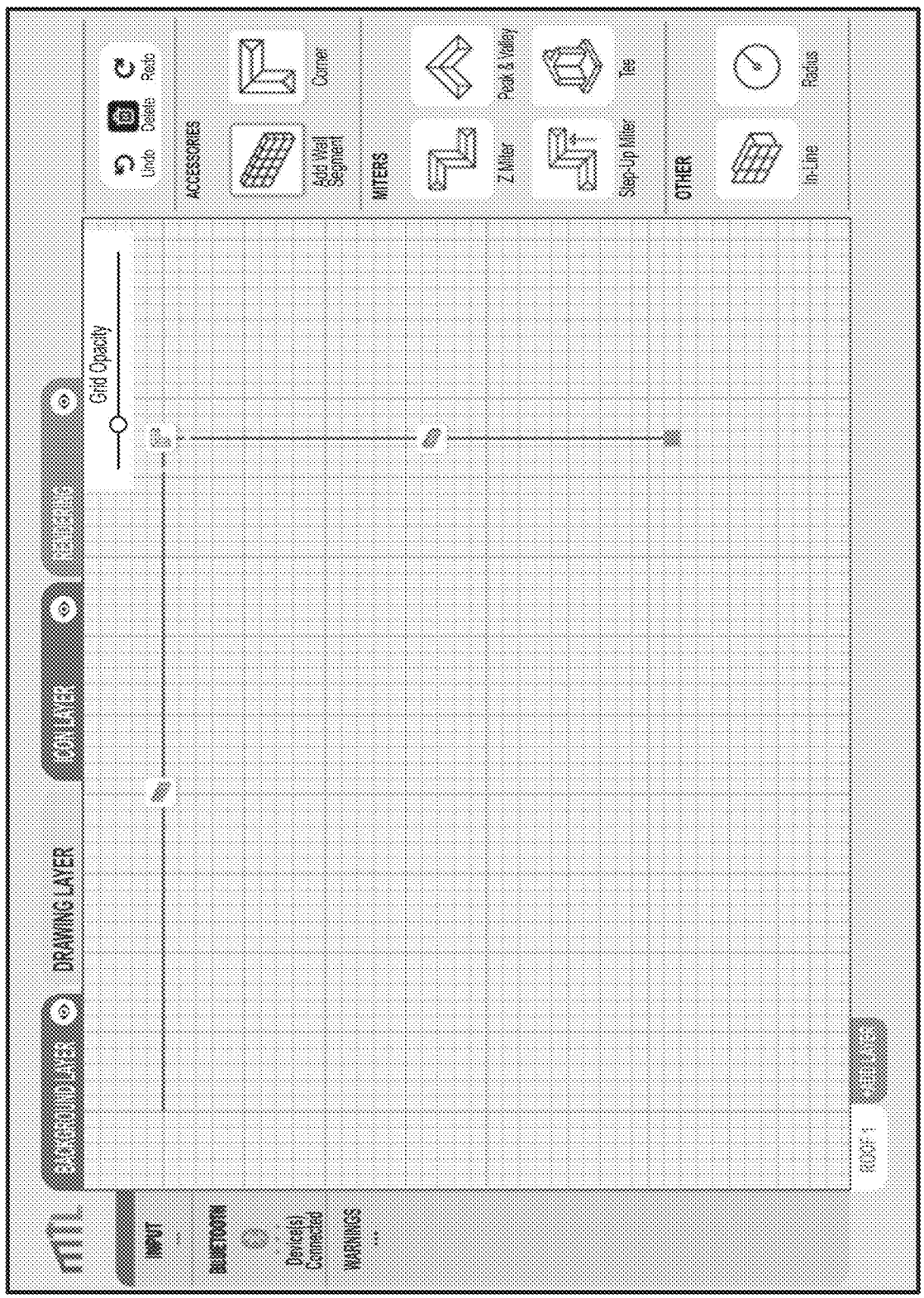

FIG. 37 is a screen view of a user interface of a display of the user device of FIG. 5A during use, the screen view showing, with only a rendering layer active, the drawing layer with a first line manually drawn and showing two sections of a parapet wall and a corner section connecting the two sections.

Figure 38:
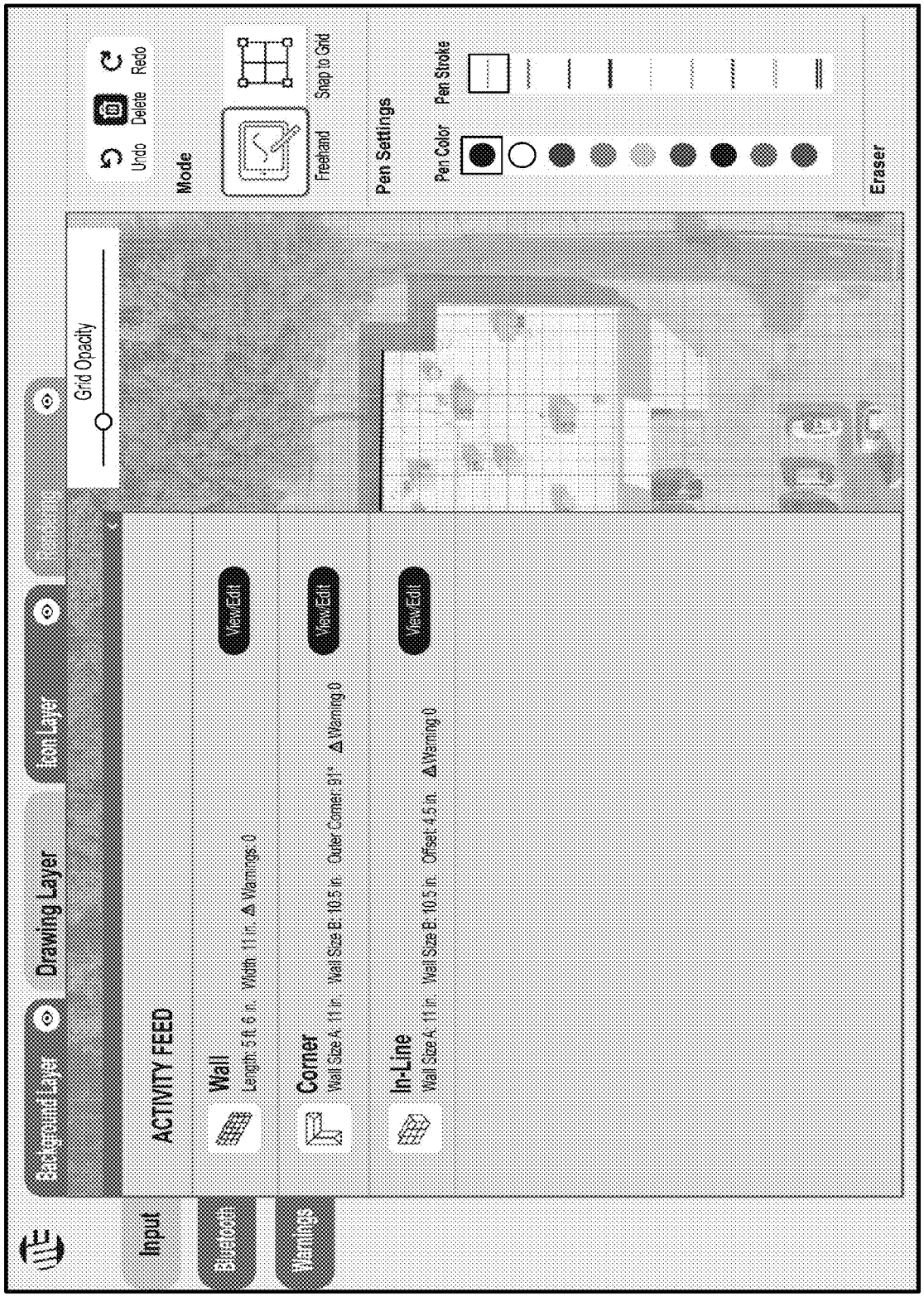

FIG. 38 is a screen view of a user interface of a display of the user device of FIG. 5A during use, the screen view showing the drawing layer and, on top, an activity feed pop-up window showing information on specific geometries and an invitation to view or edit the geometry details.

Figure 39:
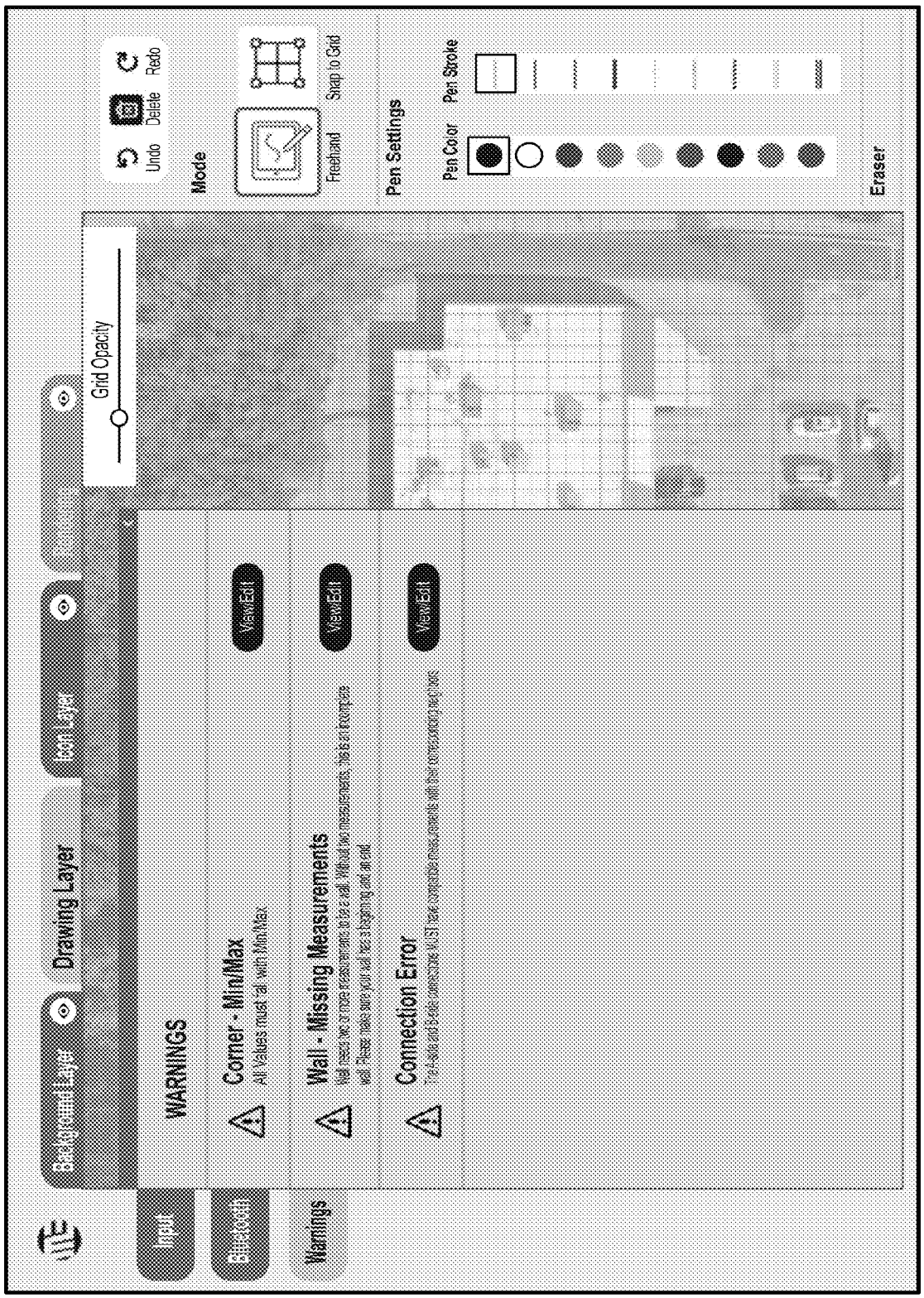

FIG. 39 is a screen view of a user interface of a display of the user device of FIG. 5A during use, the screen view showing the drawing layer and, on top, an activity feed pop-up window showing warnings related to specific geometries and an invitation to view or edit the geometry details.

Figure 40:
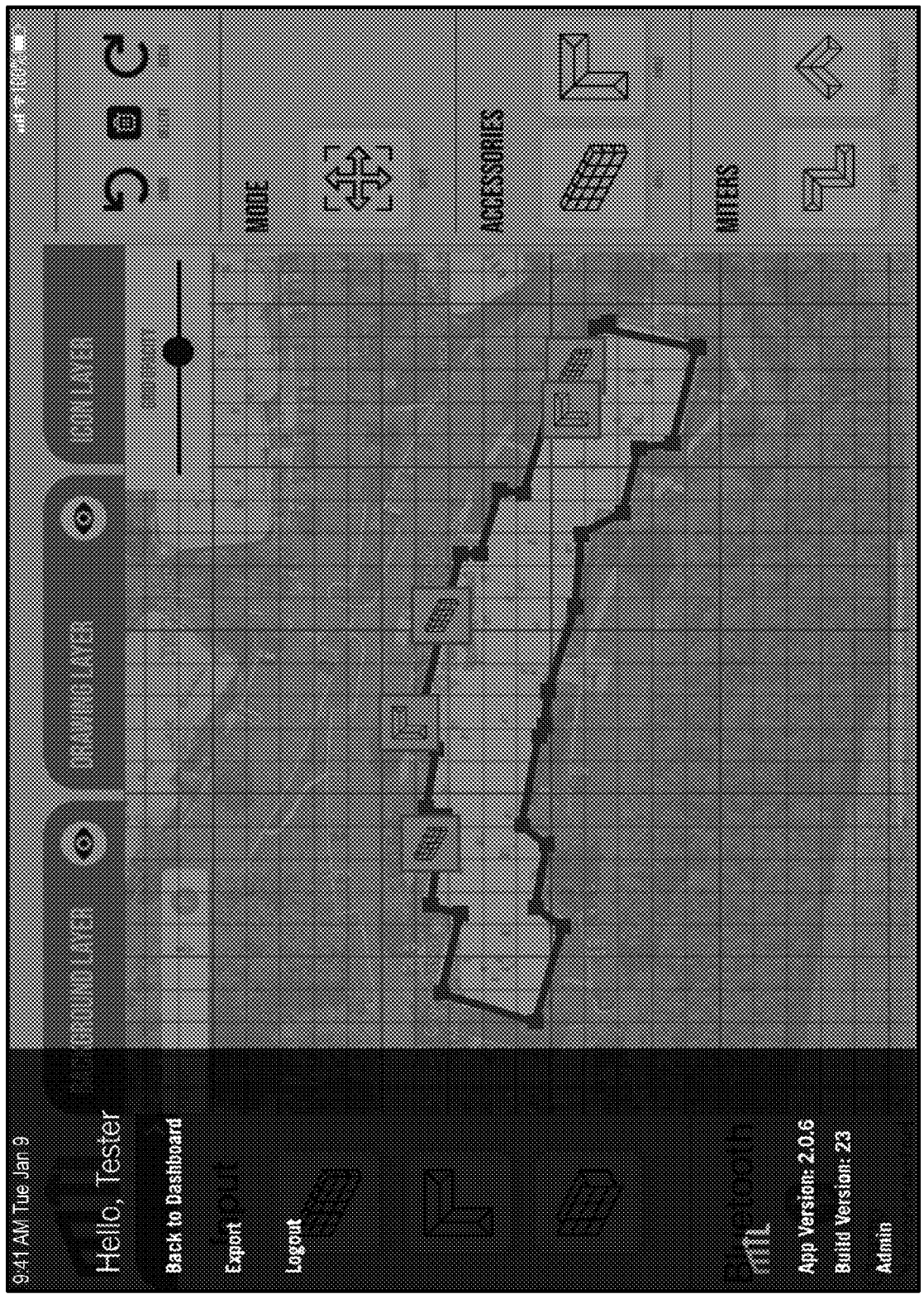

FIG. 40 is a screen view of a user interface of a display of the user device of FIG. 5A during use, the screen view showing export selection screen in accordance with one aspect of the current disclosure.

Figure 41:
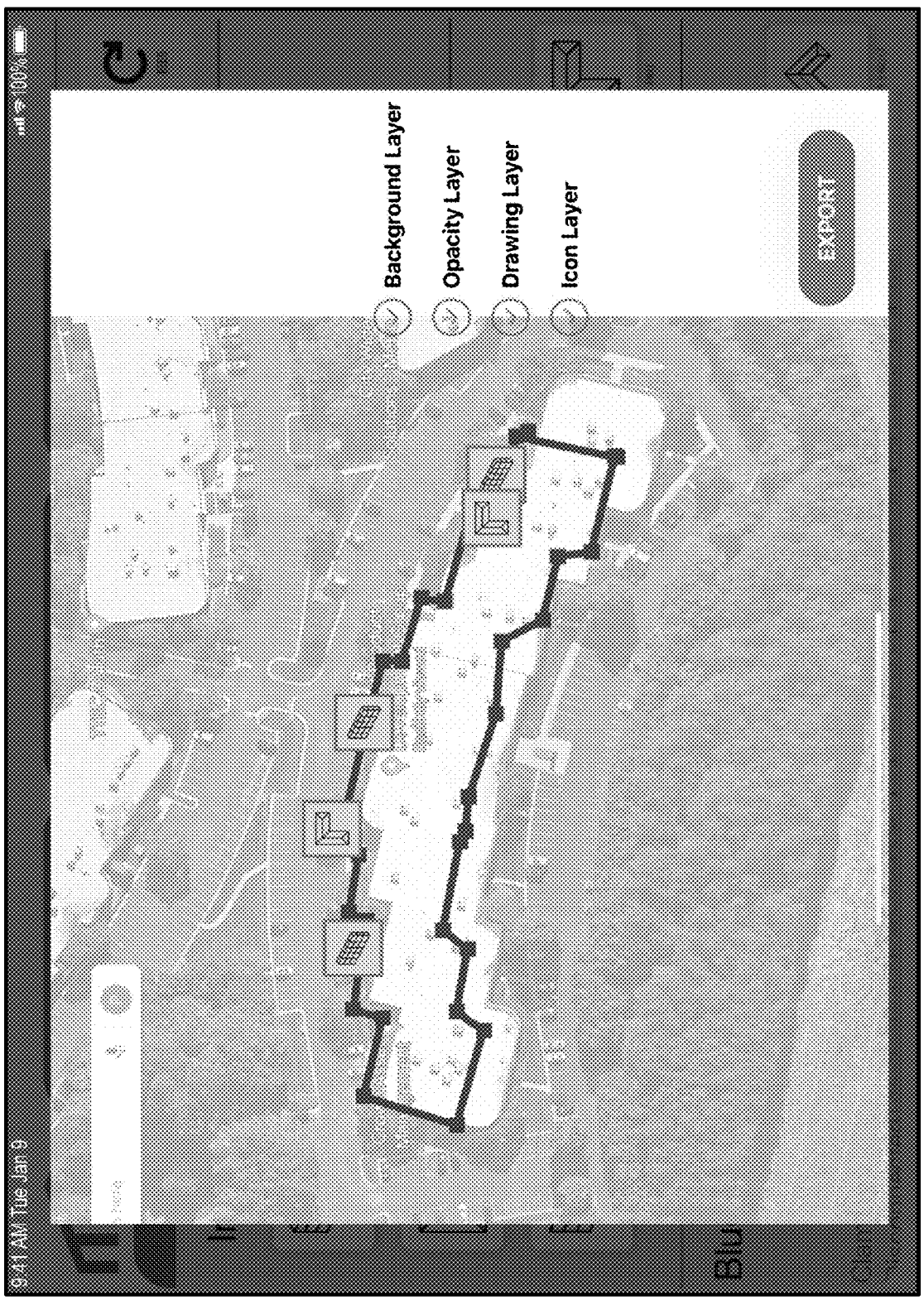

FIG. 41 is a screen view of a user interface of a display of the user device of FIG. 5A during use, the screen view showing export menu screen in accordance with one aspect of the current disclosure.

Figure 42:
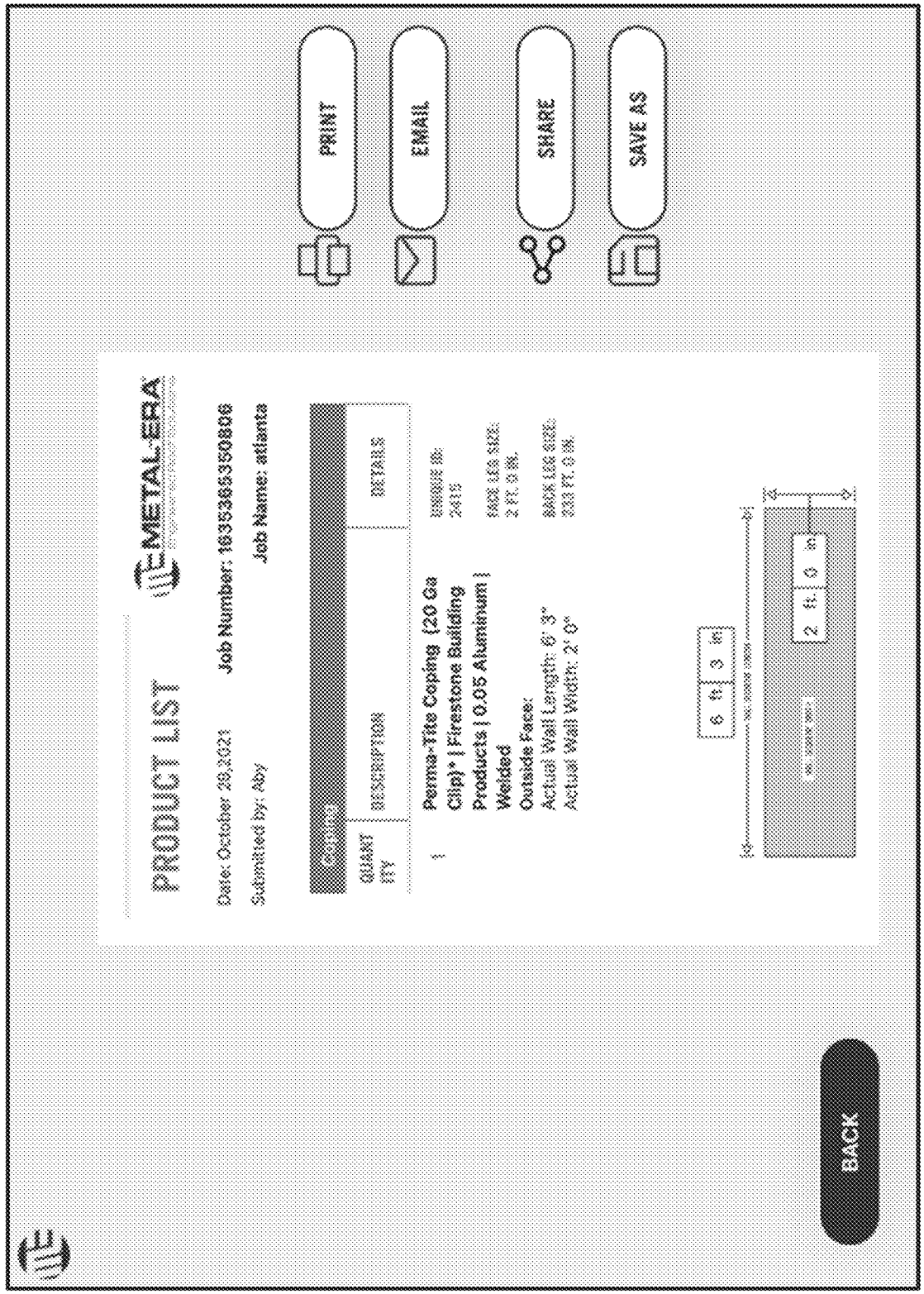

FIG. 42 is a screen view of a user interface of a display of the user device of FIG. 5A during use, the screen view showing a product list output preview and an invitation to share or save same in accordance with one aspect of the current disclosure.

Figure 43:
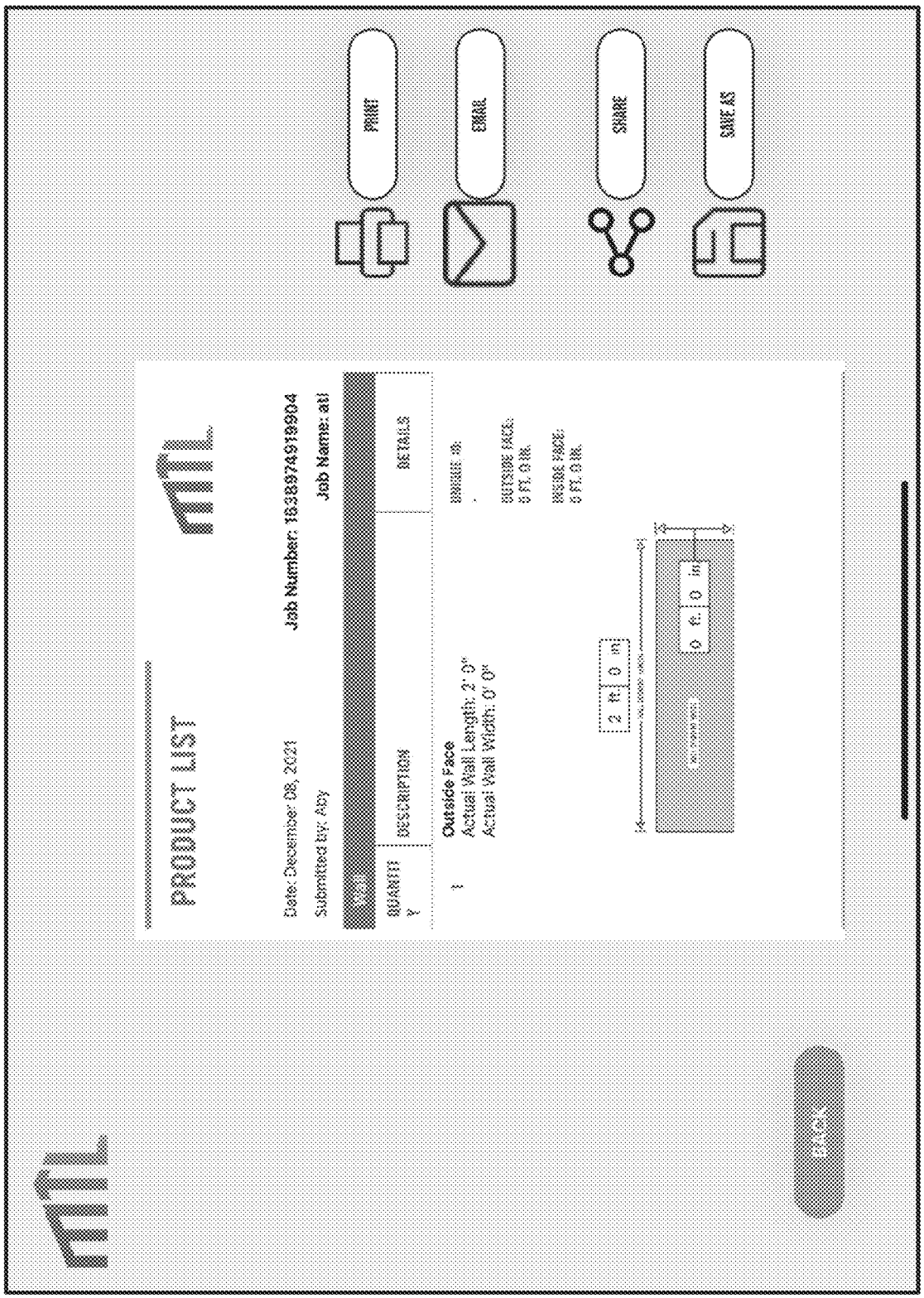

FIG. 43 is a screen view of a user interface of a display of the user device of FIG. 5A during use, the screen view showing a product list output preview and an invitation to share or save same in accordance with another aspect of the current disclosure.

Figure 44:
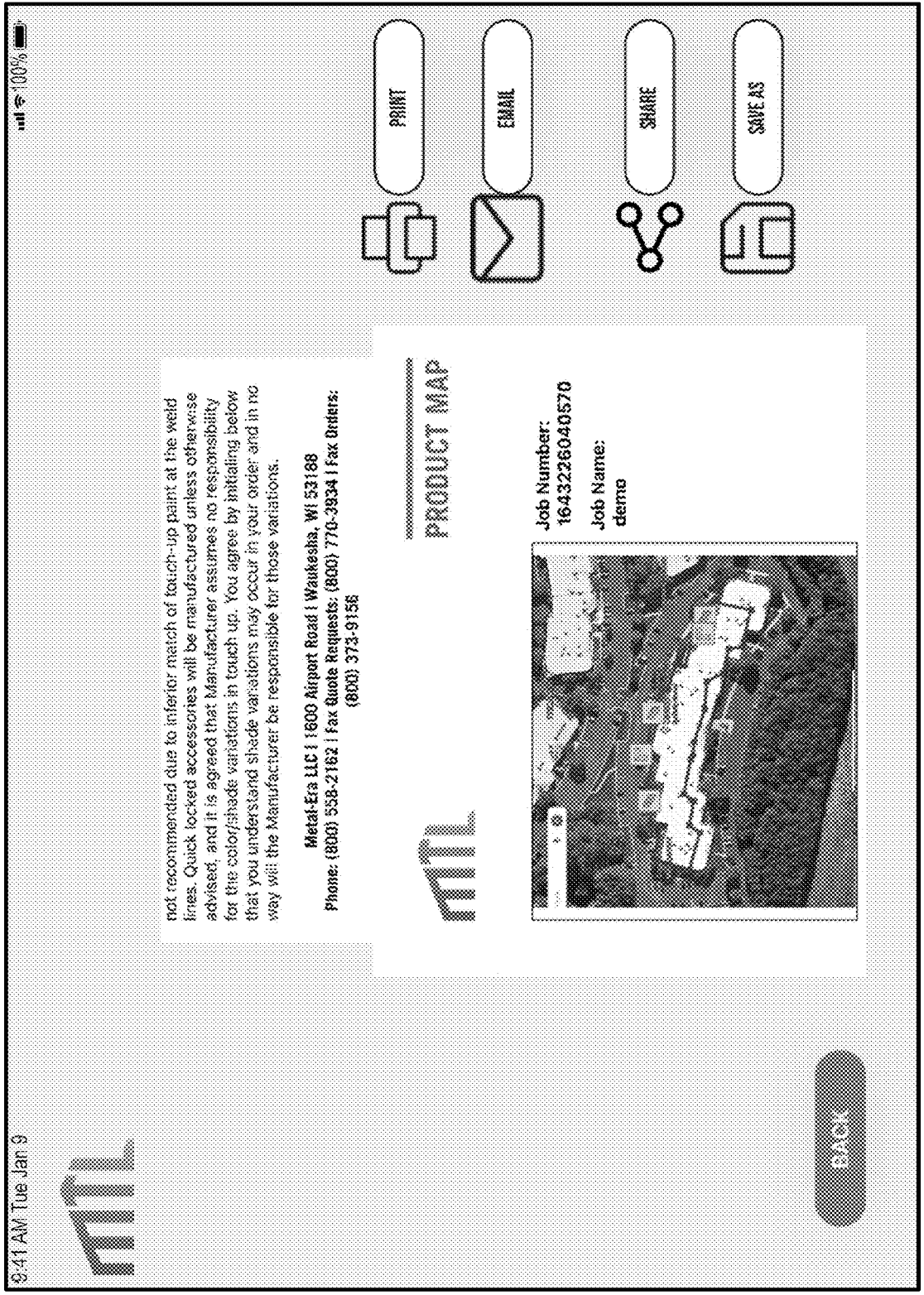

FIG. 44 is a screen view of a user interface of a display of the user device of FIG. 5A during use, the screen view showing a roadmap output preview and an invitation to share or save same in accordance with another aspect of the current disclosure.

Figure 45:
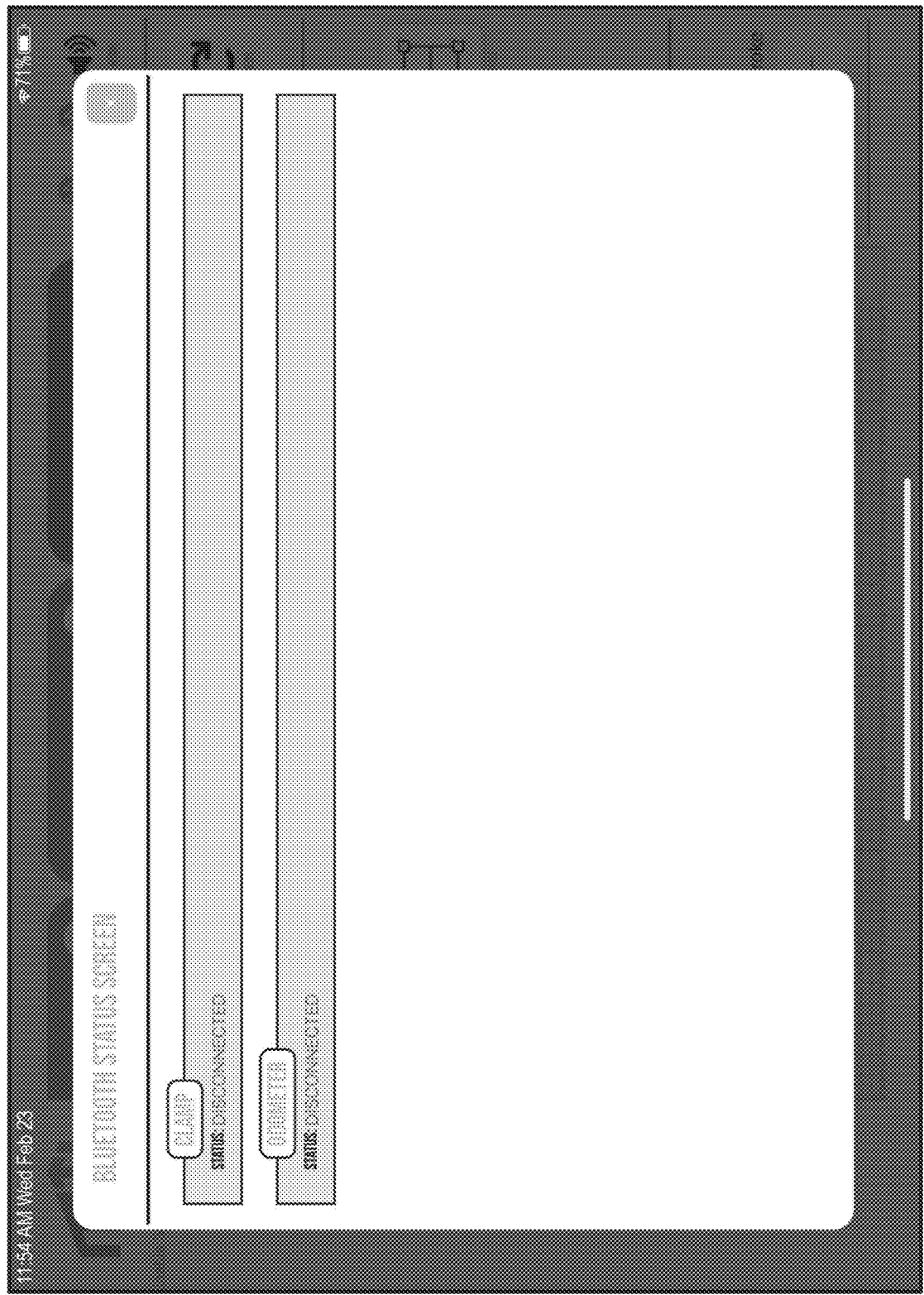

FIG. 45 is a screen view of a user interface of a display of the user device of FIG. 5A during use, the screen view showing a Wireless Connection Status Screen before the measurement tool is connected to the user device.

Figure 46:
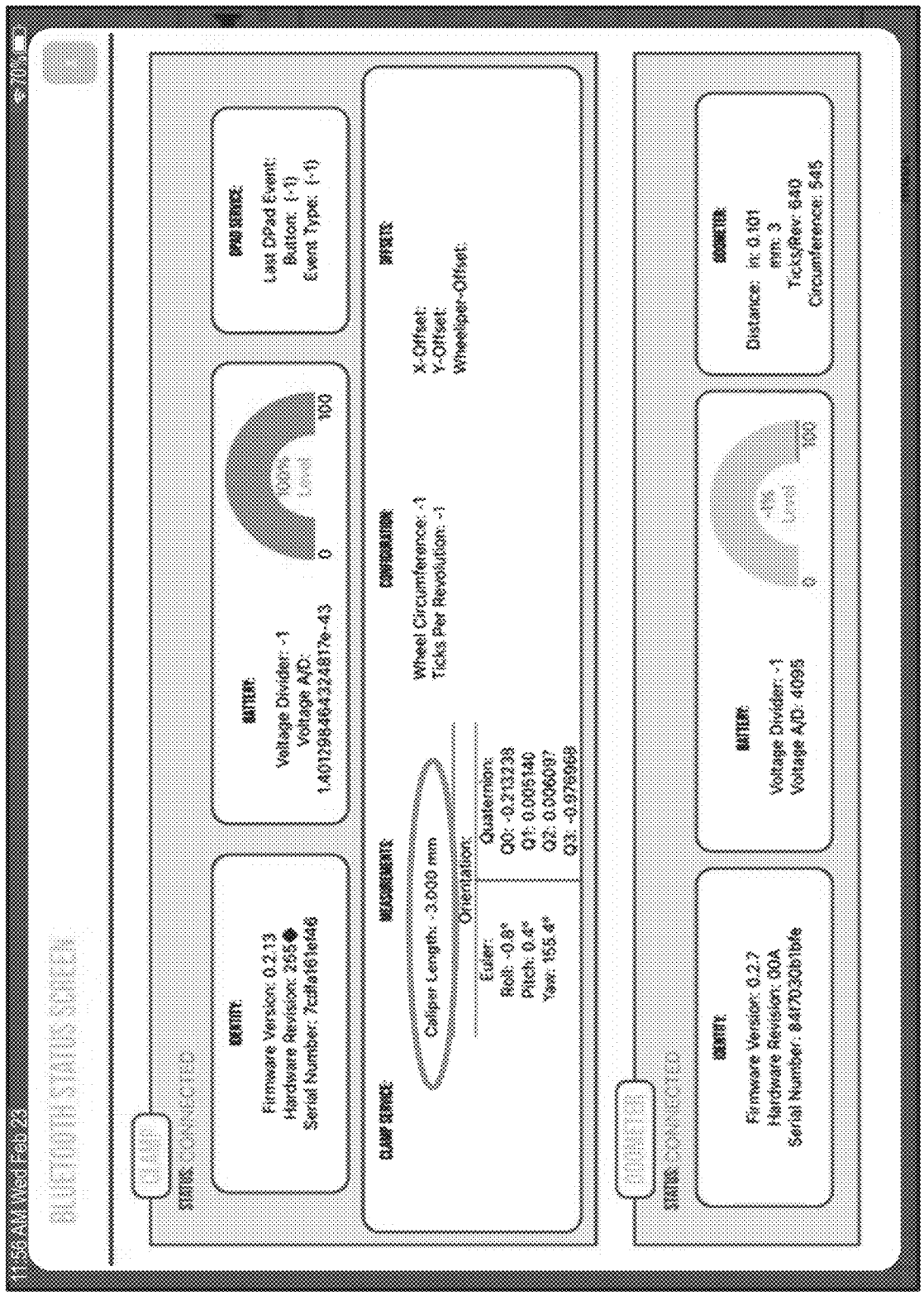

FIG. 46 is a screen view of a user interface of a display of the user device of FIG. 5A during use, the screen view showing a Wireless Connection Status Screen after the measurement tool is connected to the user device but before the measurement tool is zero-ed.

Figure 47:
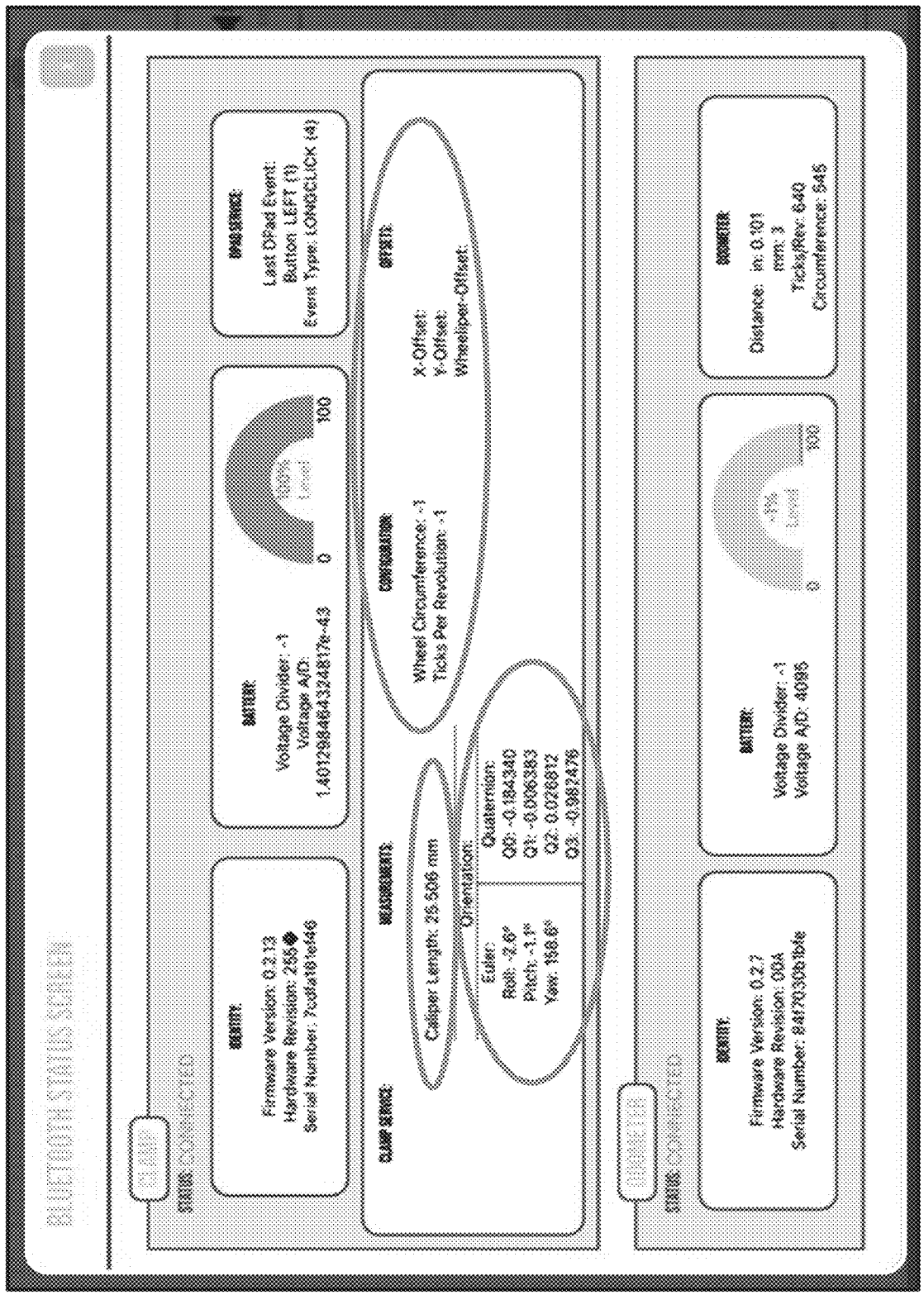

FIG. 47 is a screen view of a user interface of a display of the user device of FIG. 5A during use, the screen view showing a Wireless Connection Status Screen after the measurement tool is connected to the user device and after the measurement tool is zero-ed.

Figure 48:
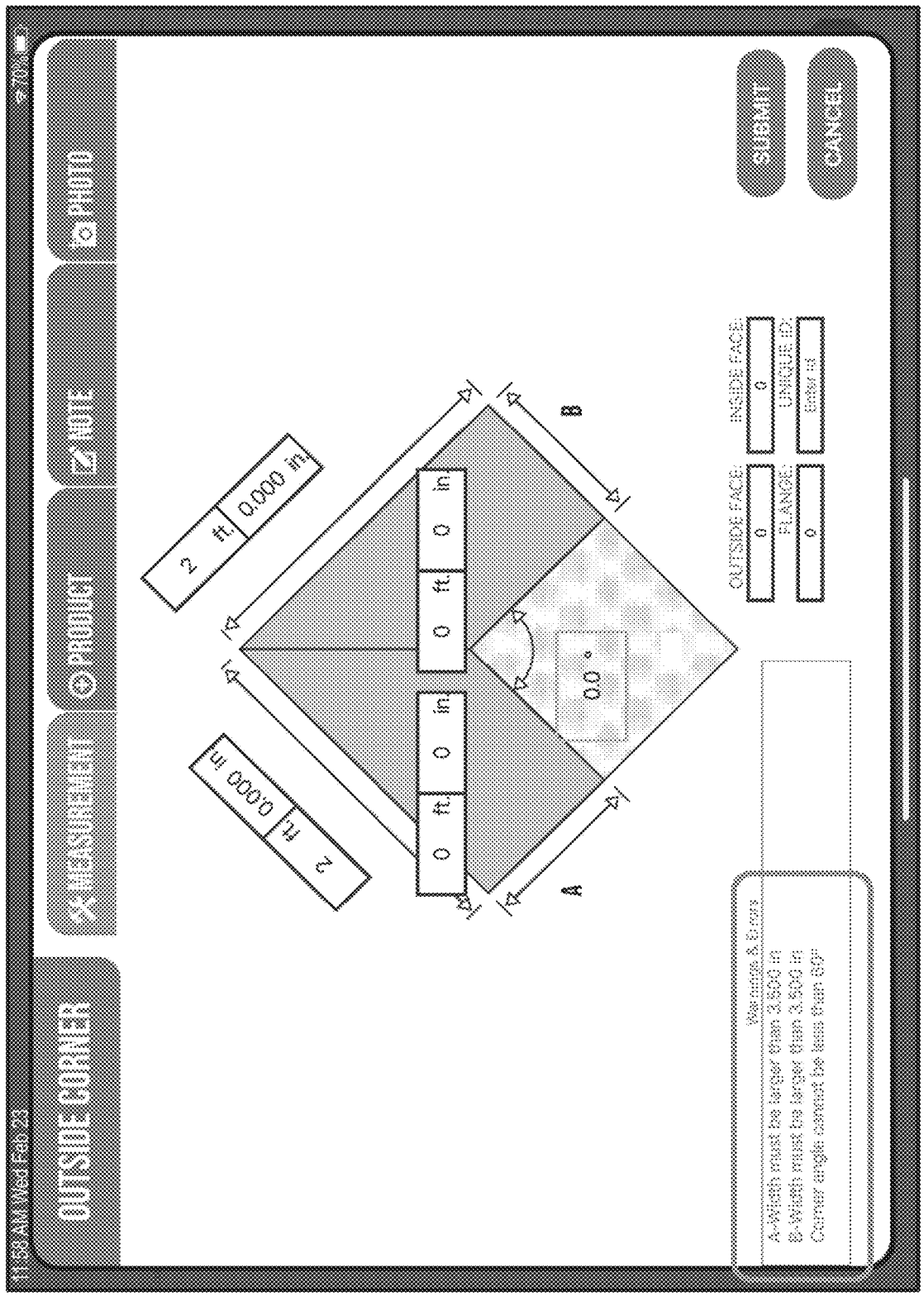

FIG. 48 is a screen view of a user interface of a display of the user device of FIG. 5A during use, the screen view showing a measurement layer, which can correspond to the aforementioned icon layer and a geometry input display for input and error-checking of outside corner geometry details.

Figure 49:
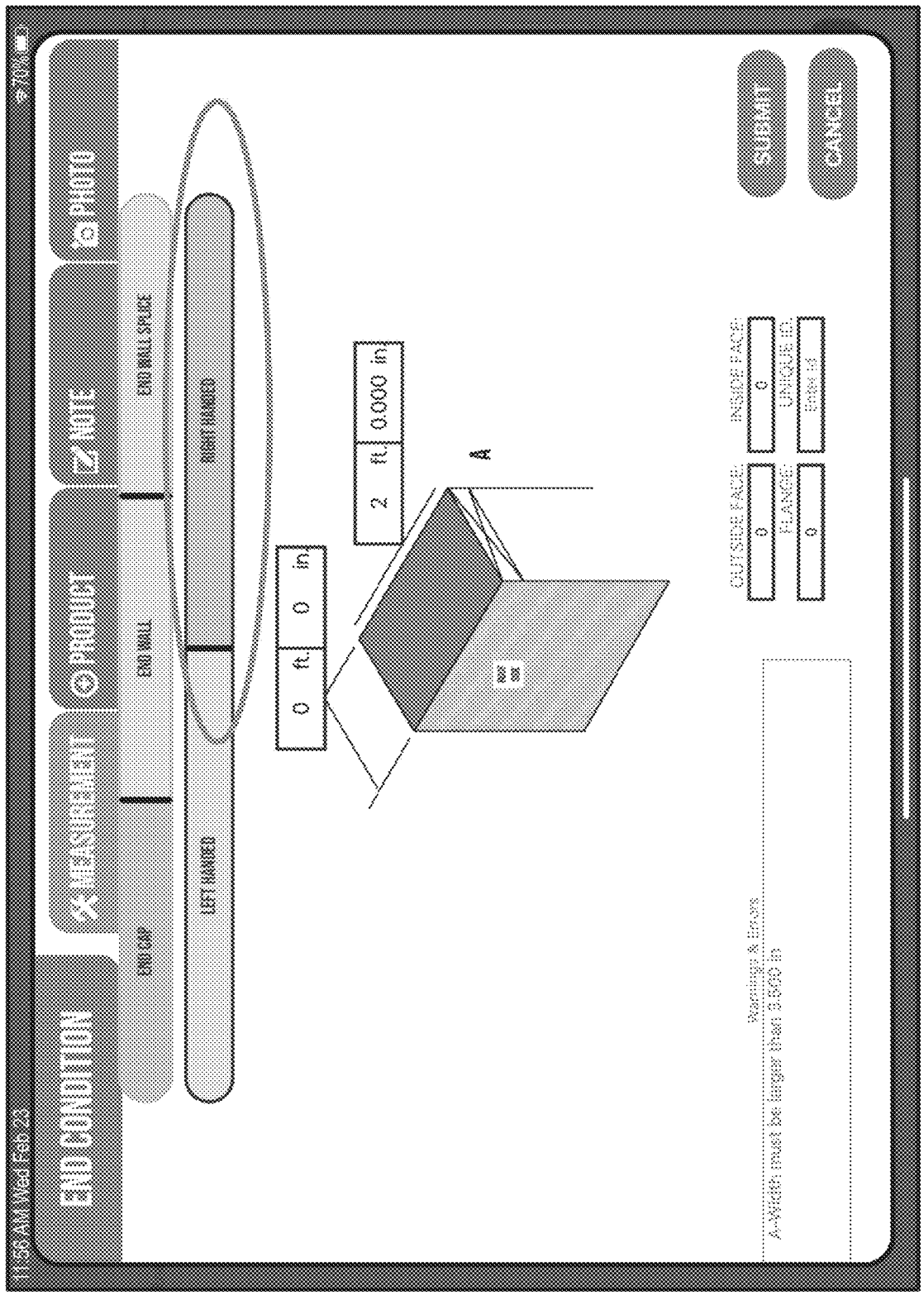

FIG. 49 is a screen view of a user interface of a display of the user device of FIG. 5A during use, the screen view showing a measurement layer and a geometry input display for input and error-checking of end cap geometry details.

Figure 50:
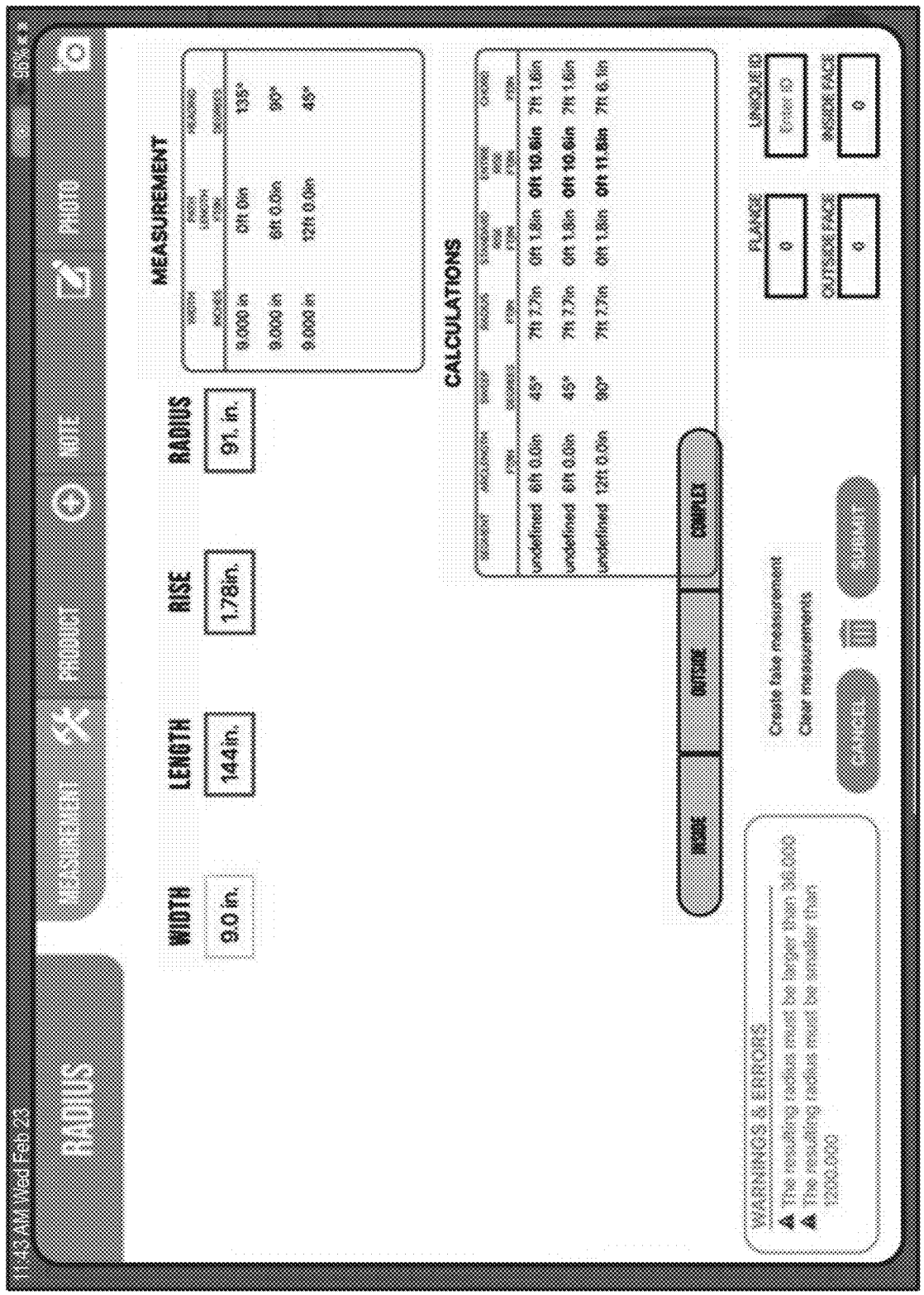

FIG. 50 is a screen view of a user interface of a display of the user device of FIG. 5A during use, the screen view showing a measurement layer and a geometry summary display for reporting and error-checking of radius geometry details.

Figure 51:
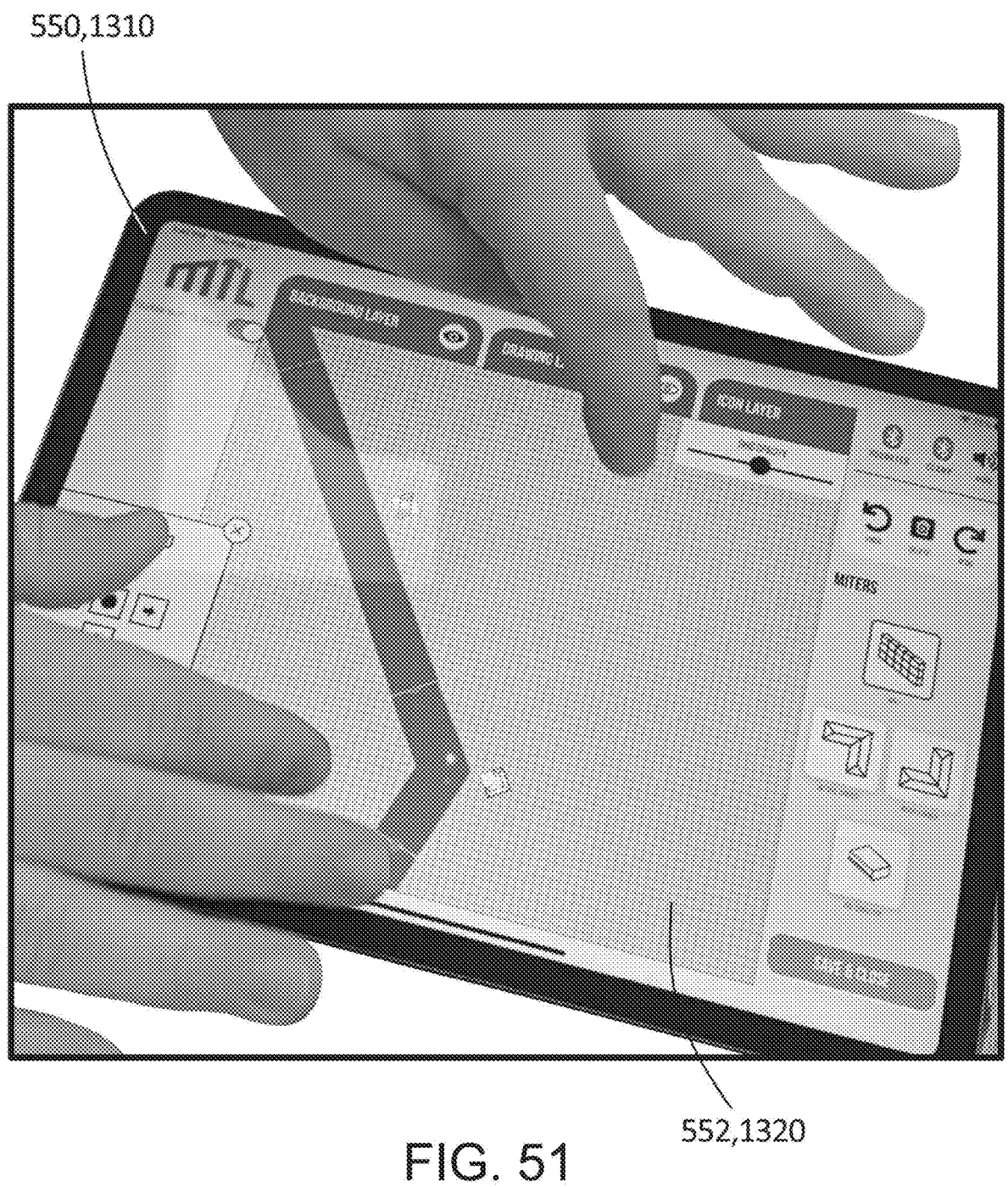

FIG. 51 is a perspective view of a screen of the user device of FIG. 5A being manipulated during use of the app, the screen view also showing a measured wall as rendered on the screen.

DETAILED DESCRIPTION

The present disclosure can be understood more readily by reference to the following detailed description, examples, drawings, and claims, and their previous and following description. However, before the present devices, systems, and/or methods are disclosed and described, it is to be understood that this disclosure is not limited to the specific devices, systems, and/or methods disclosed unless otherwise specified, as such can, of course, vary. It is also to be understood that the terminology used herein is for the purpose of describing particular aspects only and is not intended to be limiting.

The following description is provided as an enabling teaching of the present devices, systems, and/or methods in their best, currently known aspect. To this end, those skilled in the relevant art will recognize and appreciate that many changes can be made to the various aspects described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to a quantity of one of a particular element can comprise two or more such elements unless the context indicates otherwise. In addition, any of the elements described herein can be a first such element, a second such element, and so forth (e.g., a first widget and a second widget, even if only a "widget" is referenced).

Ranges can be expressed herein as from "about" one particular value, and/or to "about" another particular value. When such a range is expressed, another aspect comprises from the one particular value and/or to the other particular value. Similarly, when values are expressed as approximations, by use of the antecedent "about" or "substantially," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance may or may not occur, and that the description comprises instances where said event or circumstance occurs and instances where it does not.

The word "or" as used herein means any one member of a particular list and also comprises any combination of members of that list. The phrase "at least one of A and B" as used herein means "only A, only B, or both A and B"; while the phrase "one of A and B" means "A or B."

As used herein, unless the context clearly dictates otherwise, the term "monolithic" in the description of a component means that the component is formed as a singular component that constitutes a single material without joints or seams.

To simplify the description of various elements disclosed herein, the conventions of "left," "right," "front," "rear," "top," "bottom," "upper," "lower," "inside," "outside,"

"inboard," "outboard," "horizontal," and/or "vertical" may be referenced. Unless stated otherwise, "front" describes that end of a measurement tool or device nearest to a user of the measurement tool or device; "rear" is that end of the measurement tool or device that is opposite or distal the front; "left" is that which is to the left of or facing left from the user and facing towards the front; and "right" is that which is to the right of or facing right from the user and facing towards the front. "Horizontal" or "horizontal orientation" describes that which is in a plane extending from left to right and aligned with the horizon. "Vertical" or "vertical orientation" describes that which is in a plane that is angled at 90 degrees to the horizontal.

The measurement tool or device can also be described using a coordinate axis of X-Y-Z directions shown in FIG. 5A. An X-axis direction can be referred to as a front-rear direction. An upper-lower direction is a Z-axis direction orthogonal to the X-axis direction and to a Y-axis direction. The Y-axis direction is orthogonal to the X-axis direction (left-right direction) and the Z-axis direction (upper-lower direction) and can also be referred to as a left-right direction. A surface of a structural element that is parallel with the front-rear direction and/or having a component in the Y-axis direction can be referred to as a lateral side.

In various aspects, a system of measuring objects in an environment and associated methods, systems, devices, and various apparatuses are disclosed herein. In some aspects, the system can comprise a measurement tool, which can comprise a caliper portion and/or an odometer portion and can be configured to take measurements of an object or a series of objects. In some aspects, the system can comprise an electronic device loaded with an app for receiving, checking, correcting, converting, and/or otherwise using such measurements or measurements separately and/or manually entered into the app.

As disclosed below, the structures and methods disclosed herein are not limited to man-made structures such as buildings or even the construction industry, but the disclosure will initially address such structures.

As a general matter, buildings can be subject to different wind pressures and must be designed to resist the elements. According to the International Building Code, wind design is a part of Chapters 15 and 16. More specifically, ASCE-7 wind speed maps captured therein and available separately from the American Society of Civil Engineers can be utilized to determine which wind speed requirements apply to the associated wind design calculations. Other factors can include building height, building use, and exposure. Considering these factors, third-party testing agencies will typically perform testing (e.g., wind uplift resistance testing) on various membrane attachment systems to confirm how such systems perform.

Among other systems used in the construction of buildings and, more specifically, commercial buildings, edge metal systems and membrane attachment systems are typically tested against industry standards to ensure that they can and will perform as expected and as required. Most membrane attachment systems fall into the following three basic categories: mechanically attached, induction welded, and fully adhered. In each case, edge metal (e.g., coping) that has been tested against industry standards is generally used to hold the entire roofing system intact on a roof. Each system defines a prescribed pattern of either fasteners and plates or else adhesive, which can be spaced out to facilitate a secure connection. For various reasons, it can be advantageous to install a roof under the same conditions (e.g., with the same attachment characteristic) as used during testing that supported the third-party listing of the corresponding system.

Confirming that the installation conditions are equivalent generally requires inspection, which can be accompanied by some of the same challenges associated with manual measuring and reporting of the dimensions of the parapet of the roof. Elements of the membrane attachment systems (e.g., the fastener plates or adhesive) are often invisible or nearly invisible on an outside surface of the roof once roof membrane has been draped over the top. By creating a roadmap of where each fastener has been placed in relation to the insulation boards on the entire roof, conformance can be ensured on each project. This can also apply to adhesives bead widths and bead spacing in a particular pattern. In summary, a more automated method of measurement, such as a system 500 disclosed herein, can removing the guesswork currently inherent in many installation and inspection activities.

While random sections of a membrane attachment system of an installed roof can be tested and are routinely tested in isolation (using, for example, an industry-standard "pull-test"), such testing can cause delays and is not always representative of the entire membrane attachment system.

Figure 1A:
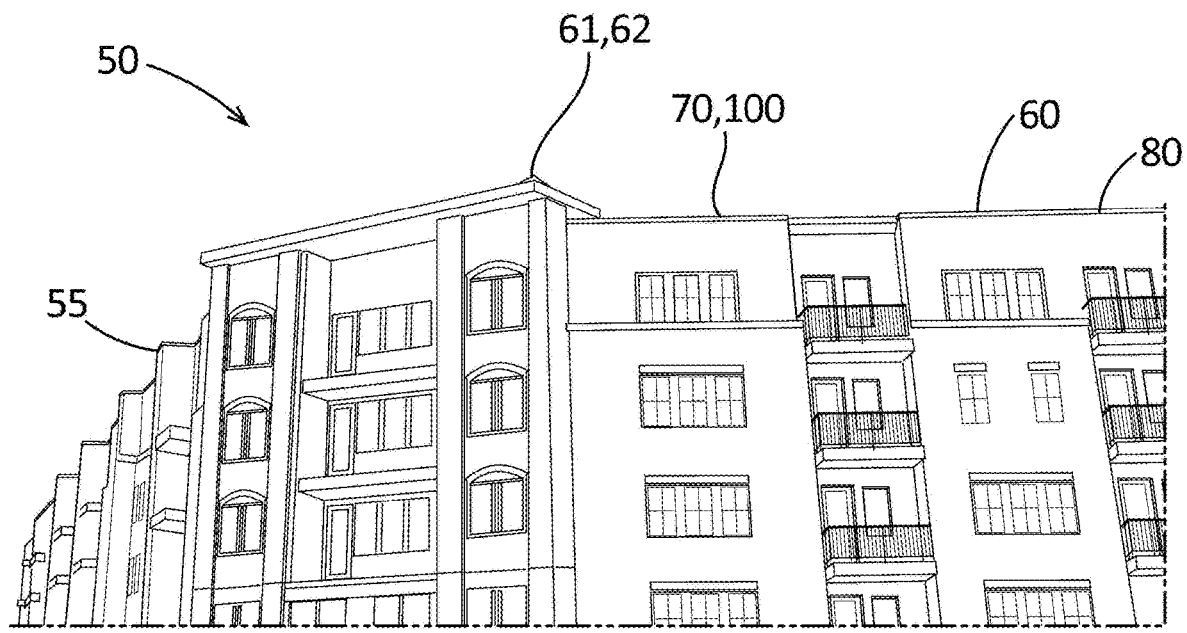
FIGS. 1A-1H are various views of a roof of a building or portions thereof.

FIGS. 1A-1H are various views of a roof 60 of a building 50 or portions thereof in accordance with one aspect of the current disclosure. FIG. 1A specifically is a bottom perspective view of the building 50. The roof 60 can comprise a geometric feature 100, which can form a portion of a parapet 70 and/or other structures. In some aspects, the parapet 70 can be any portion of a perimeter or an interior of the roof 60 defining a raised structure. In some aspects, the geometric features 100 of the building 50 need not define a portion of the roof 60 or the parapet 70 per se. More specifically, for example, the geometric feature 100 can define a divider 55 between portions of a balcony or porch on an apartment or condominium building separated from the roof 60 and/or not functioning as the parapet 70 thereof. The divider 55 can define a top surface proximate to the roof 60 or can define a top surface completely separate from the roof 60. In some aspects, the geometric feature 100 can define a non-building structure (e.g., a wall or other structure that is not a building per se, at least in the traditional sense defining interior spaces and the roof 60). In some aspects, as shown, the building 50 can be an apartment building. In some aspects, the building 50 can be any structure and can be residential or commercial. In some aspects, as shown, the building 50 can be a new structure under construction. In some aspects, the building 50 can be already built and in need of maintenance and/or renovation.

In many aspects, the geometric features 100 can essentially form a wall. As such, in some aspects the parapet 70 comprising the geometric features 100 can facilitate safety by preventing accidental falls of people and/or things over the edge of the roof 60. In some aspects, the geometric features 100 can hide or obscure structures positioned on the roof 60 (e.g., HVAC and/or maintenance equipment). In some aspects, the geometric features 100 can otherwise enhance the appearance of the roof 60 and thereby the building 50 or provide other benefits. In some aspects, as will be described below, any portion of the roof 60 such as, for example and without limitation, the HVAC equipment itself, scuppers, conductor heads, downspouts and internal drains can be located and documented in space and even relayed back to a contractor or building owner for record keeping using systems and/or methods disclosed herein, including a measurement tool 510 (shown in FIG. 5A) and the app configured for use on the user device 550 (shown in FIG. 5A).

As shown, the roof 60 can comprise a roof surface 61, which can be covered by a roof membrane 62, which can be a waterproof barrier configured to protect the roof 60 against water intrusion. As evidenced by the flapping roof membrane 62 at the penthouse over the main entrance, the roof membrane 62 is in some aspects not fully secured with coping 80, at least before construction is complete. The coping 80 can cap the edges of the roof membrane 62 and, in many aspects, the parapet 70 itself or otherwise protect and/or enhance the appearance of the geometric features 100.

Figure 1B:
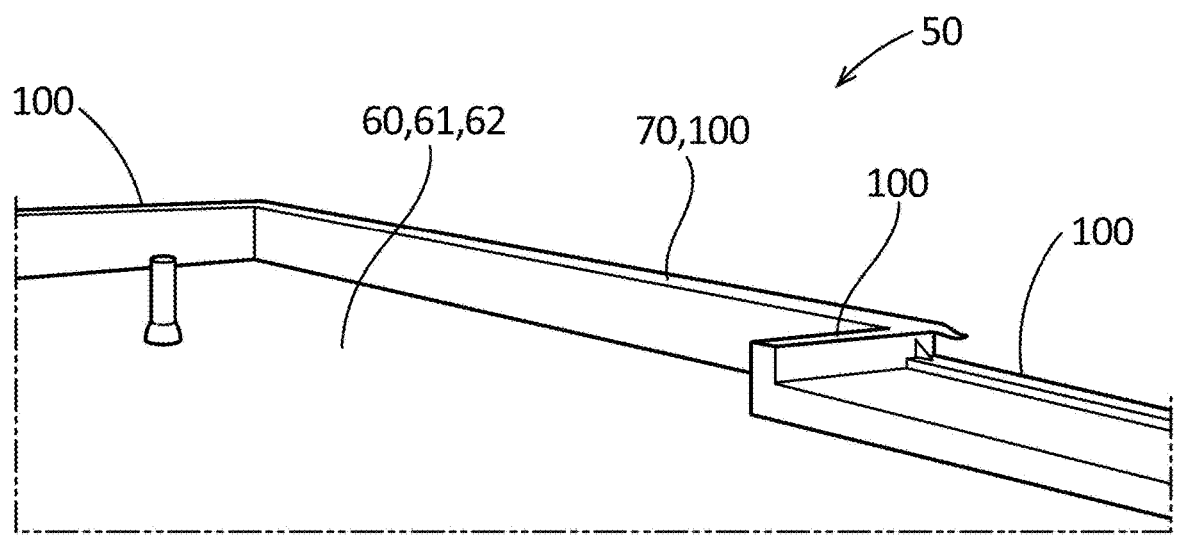

FIG. 1B is a side perspective view of a first portion of the roof 60 of FIG. 1A positioned on a front or street side of the building 50 of FIG. 1A. The portion of the parapet 70 shown is defined on a "street" side of the building 50. As shown, the parapet 70 can define a variety of the geometric features 100, each of which can vary in thickness or width, height, and position and can at the same time intersect or otherwise interact with each other.

Figure 1C:
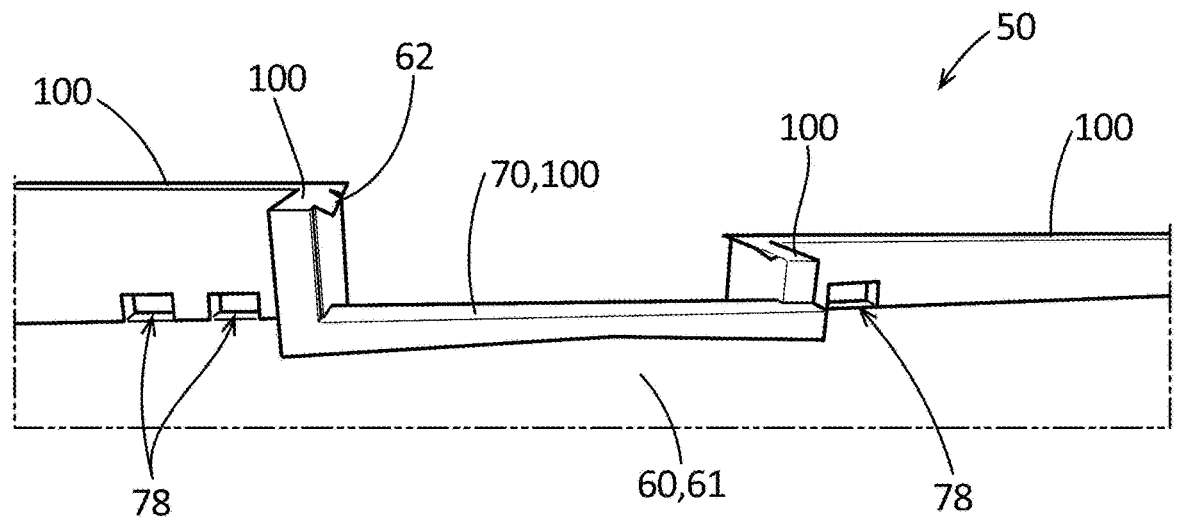

FIG. 1C is a side perspective view of a second portion of the roof 60 of FIG. 1A positioned on a rear side of the building 50 of FIG. 1A. Instead of gutters being attached to an upper edge of the roof 60 or, more specifically, the parapet 70, openings 78 can be defined in the parapets 70 and can allow passage of water to the outside of the building, to be carried to the ground with downspouts or other passageways. The openings 78 can be scuppers. By using the openings 78, for example, the geometric feature 100 at the top of each section of the parapet 70 can be sealed with a membrane 62 and covered with the coping 80 (shown in FIG. 1F).

Figure 1D:
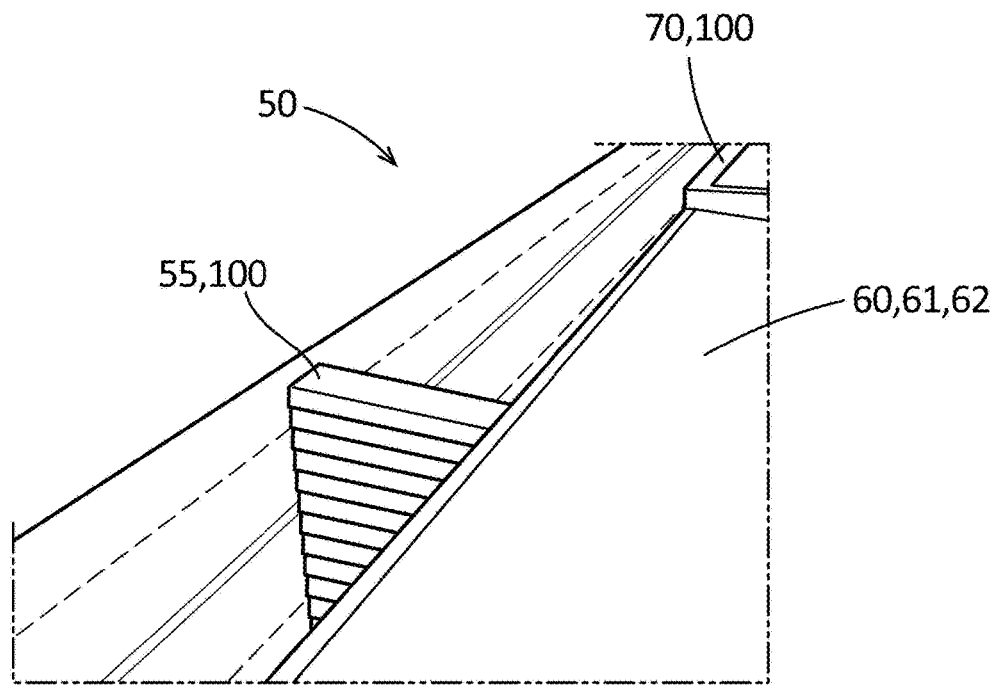

FIG. 1D is a side perspective view of a third portion of the roof 60 of FIG. 1A also positioned, as in FIG. 1B, on a front or street side of the building 50 of FIG. 1A. The aforementioned divider 55, which is not necessarily level with the roof 60 and can separately define its own geometric feature 100, can also be fit with the coping 80 (shown in FIG. 1F) or any building component (e.g., edge metal) such as, for example and without limitation, the structures shown in FIG. 2D.

Figure 1E:
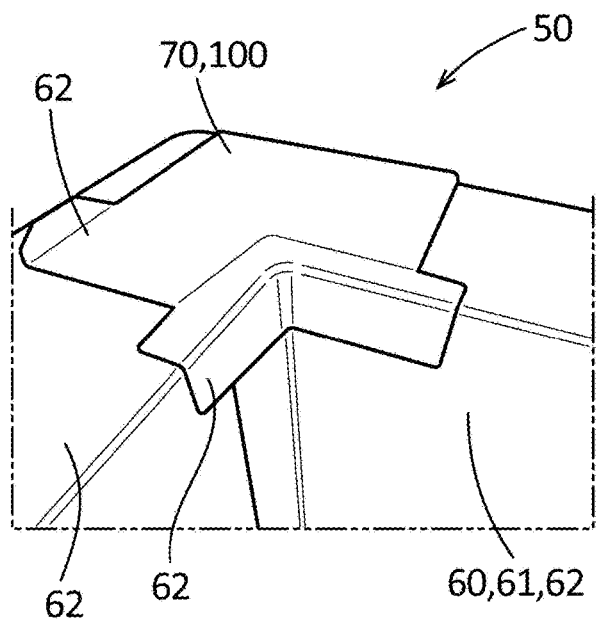

FIG. 1E is a side top perspective view of a corner miter section of the roof 60 of FIG. 1A. The corner section, which can be another geometric feature 100, can like other geometric features 100 be covered with multiple layers of overlapping membrane 62, each of which can be thick enough to later impact the fit of the coping 80 (shown in FIG. 1F). For example and without limitation, a thickness of each layer of the membrane 62 can measure 51 mil, which is 0.051 inches (1.3 mm). Furthermore, such layering and other inconsistencies in a thickness of the membrane can present challenges with accurately measuring the parapet 70 in preparation for the coping 80.

Figure 1F:
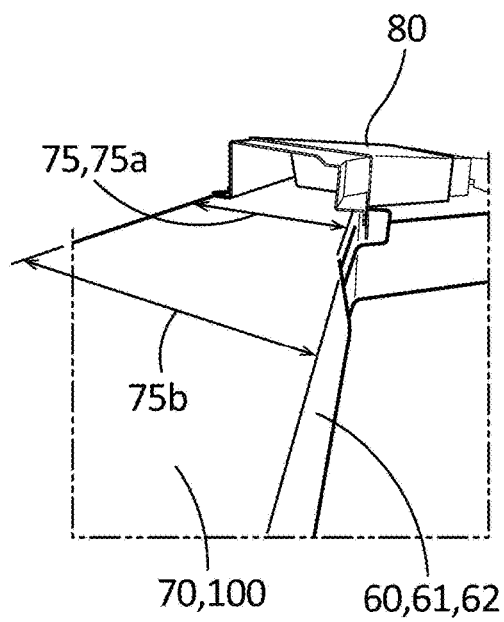

FIG. 1F is a side top perspective view of a wall section of the roof 60 of FIG. 1A. The wall section, which can be another geometric feature 100, can like other geometric features 100 be define a thickness or width 75 that varies over its length. As shown, the wall width 75 can vary, even abruptly, between a wall width 75a and a wall width 75b. Where the wall width 75 varies, it can be desirable to fabricate a section of the coping 80 that can fit over even the portion of the parapet 70 and, more specifically, accommodate the wall width 75 of the geometric feature 100 at its widest.

Figure 1G:
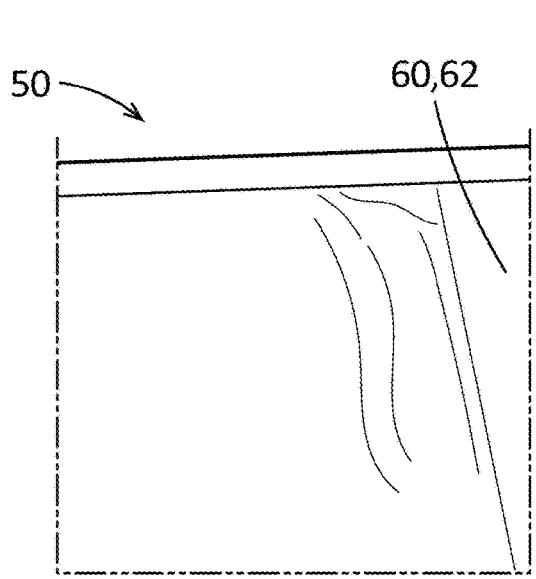

FIG. 1G is a side top perspective view of a flat surface of an edge of the roof 60 of FIG. 1A. As shown, the membrane 62 and, more generally, the roof 60 can define wrinkles and other irregularities, which one needs to consider when measuring a roof 60 but cannot always easily consider.

Figure 1H:
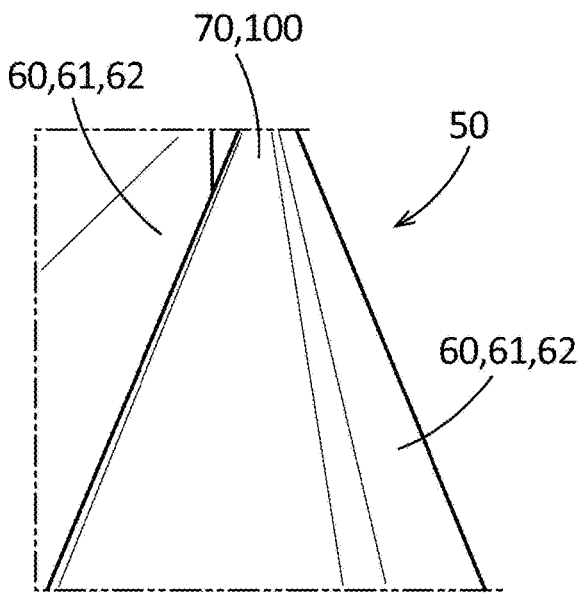

FIG. 1H is a side top perspective view of another wall section of the roof 60 of FIG. 1A showing a membrane 62 covering the wall section and hanging over an outside edge thereof. Again, the new wall section can be another geometric feature 100. As shown, the membrane 62 can be hanging over an edge of the wall section and, more generally, the parapet 70.

FIGS. 1I-1S are views of a membrane attachment system 63 for an adhered roof membrane 62 of the roof 60 of FIG. 1A as well as views of the roof 60 showing other structures positioned thereon. The roof membrane 62 can be secured to or define the roof surface 61 using one of a variety of attachment methods. The attachment method can be selected (e.g., by a building owner) based on various factors including, for example and without limitation, performance and/or insurance requirements. As shown, portions of the membrane 62 can remain loose until held down with the coping 80 (shown in FIG. 2A). In some aspects, as will be described, other features of the roof 60 can be measured and documented. The edge metal components can be and typically are measure-to-fit or MTO.

Figure 1I:
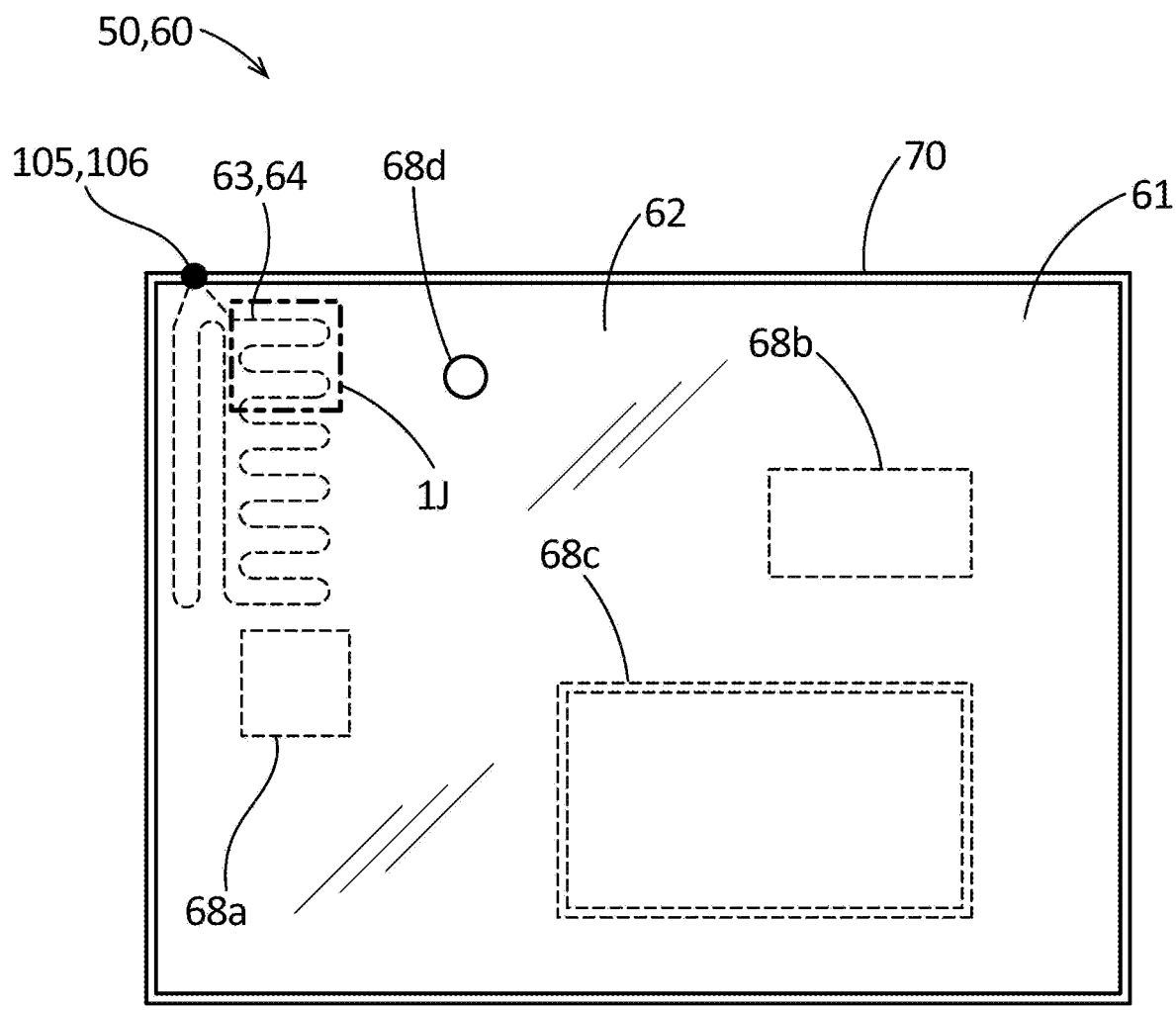
FIGS. 1I-1S are views of a membrane attachment system for an adhered roof membrane of the roof 60 of FIG. 1A in accordance with another aspect of the current disclosure as well as views of the roof showing other structures positioned thereon.

FIG. 1I is a top plan view of the roof 60 of FIG. 1A in accordance with another aspect of the current disclosure showing sizes, locations of other physical characteristics of a membrane attachment system 63 comprising the roof membrane 62 and an adhesive material 64 in accordance with one aspect of the current disclosure. One or more pieces of equipment and/or other structures can be positioned on the roof 60. More specifically, one or more structures 68a,b,c,d and so on can occupy physical space on the roof 60. For example and without limitation, the structure 68a can be an elevator penthouse, the structure 68b can be HVAC equipment, the structure 68c can be an elevated garden, and the structure 68d can be an antenna mast. The structures 68a,b,c,d can themselves be considered additional instances of the geometric features 100 and can be measured to facilitate the protection of the structures 68a,b,c,d and the surrounding roof 60 or the roof surface 61 thereof. As described with respect to a method of measuring physical characteristics of the membrane attachment system 63, a portion of the parapet 70 or other portion of the building 50 can define a starting wall width measurement 105 and an ending wall width measurement 106.

Figure 1J:
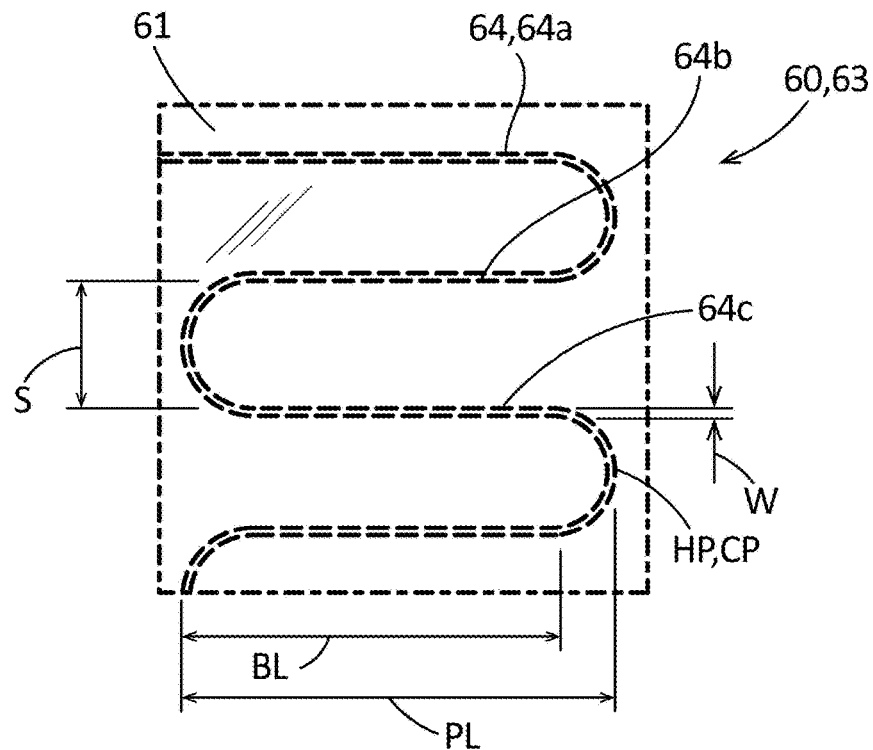

FIG. 1J is a top plan view of the membrane attachment system 63 of FIG. 1I taken from detail 1J. In some aspects, as shown, the roof membrane 62 can be secured to the roof 60 with an adhesive fastening method using the adhesive material 64, which can be applied as a bead. The adhesive material can be a solid suspended in a liquid such as, for example and without limitation, a construction adhesive applied with a caulk gun or other tool. During a curing process, at least some of the liquid of the adhesive material 64 can evaporate as a gas or can otherwise be driven out. More specifically, a plurality of adhesive beads or bead segments 64a,b,c and so on can bond to each of the underlying structure (e.g., an insulation panel 65 shown in FIG. 1P) of the roof 60 and a hidden or bottom or rear side of a portion of the roof membrane 62 defining the roof surface 61 and, at least upon sufficient curing, join the roof membrane 62 to the roof 60. Adjacent bead segments 64a,b,c of the bead segments 64a,b,c can be joined by a hairpin turn or portion HP, which can be a connecting portion CP. When the roof membrane 62 is secured using the adhesive fastening method, a bead width W, a bead segment length BL, a pattern length PL, a bead segment spacing or spacing S (which can be measured in a direction in which adjacent adhesive bead segments of the adjacent adhesive bead segments 64a,b,c are nearest to each other), a location of the adhesive material 64 on the roof 60 relative to an edge of the roof 60 and other structures and/or any other physical dimension or other characteristic or overall pattern of the adhesive bead segments 64a,b,c can affect overall roofing performance and, more specifically, performance of the insulation under the roof membrane 62 and the attachment of the roof membrane 62 itself.

Figure 1K:
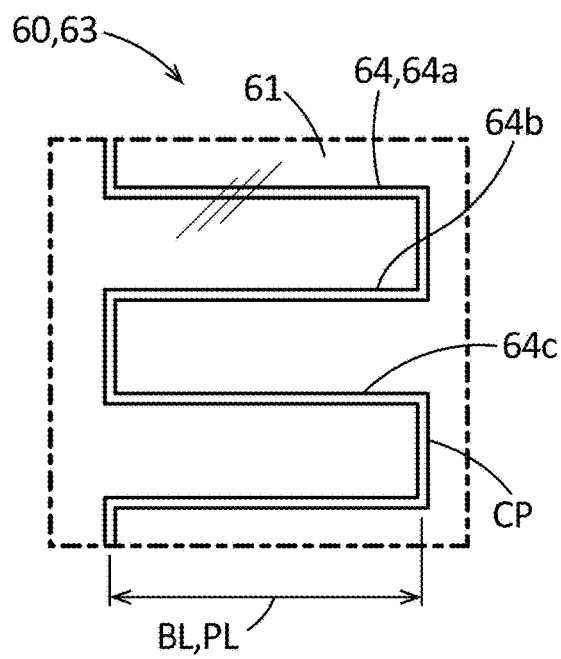

FIG. 1K is a top plan view of the membrane attachment system 63 of FIG. 1I taken from detail 1J in accordance with another aspect of the current disclosure. As shown, the serpentine pattern defined by the adhesive material 64 can have or define squared-off ends. Adjacent bead segments 64a,b,c of the bead segments 64a,b,c can be joined by a connecting portion CP. More specifically, the bead segment length BL can equal the pattern length PL.

Figure 1L:
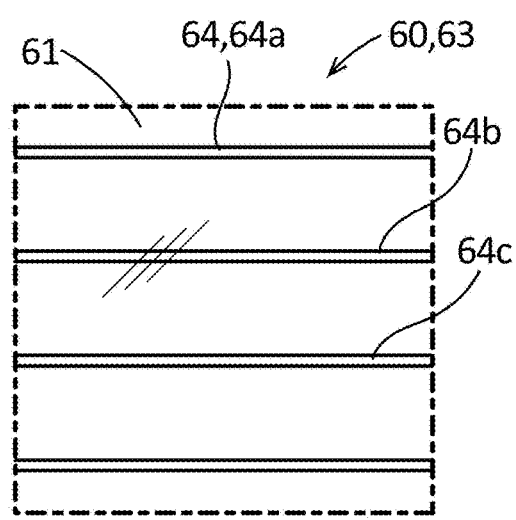

FIG. 1L is a top plan view of the membrane attachment system 63 of FIG. 1I taken from detail 1J in accordance with another aspect of the current disclosure. As shown, the adhesive material 64 can define a continuous ribbon pattern, which need not incorporate the "hairpin" portions HP shown in FIG. 1J or the connecting portions shown in FIG. 1K. More specifically, the adhesive bead segments 64a,b,c can extend a significant distance across the roof 60. In some aspects, physical characteristics of the membrane attachment system 63 can vary across the roof. For example, the spacing S (shown in FIG. 1J) can be smaller and/or the bead width W (shown in FIG. 1J) can be larger in areas of the roof 60 that are most susceptible to wind damage.

Figure 1M:
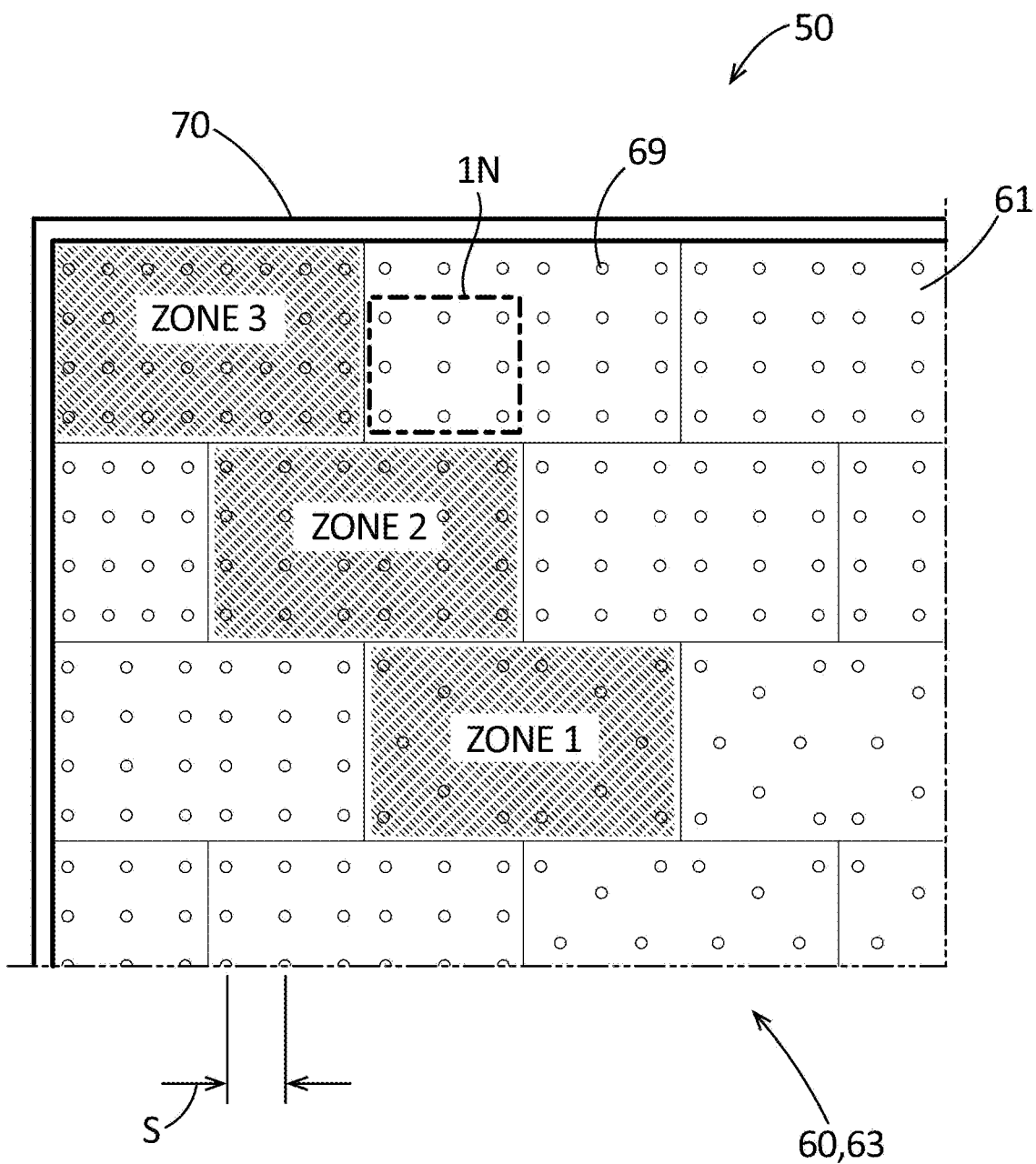

FIG. 1M is a top plan view of a portion of the roof 60 of FIG. 1A in accordance with another aspect of the current disclosure. In some aspects, the physical characteristics of the membrane attachment system 63 can vary across the roof 60 based on some sections of the roof 60 being more or less vulnerable to damage by the elements and especially wind. For example, as shown, the spacing S between fasteners 69 can vary in different zones of the roof 60. For example, in a first zone or Zone 1 of the roof 60, the maximum spacing S can be greater than the maximum spacing S in a second zone or Zone 2 of the roof 60, which can be greater than the maximum spacing S in a third zone or Zone 3 of the roof. In any case, air flow over the parapet 70 and across the roof surface 61 can create wind uplift forces tending to draw the roof membrane away from the underlying structure (e.g., the insulation panels 65). The membrane attachment system 63, including one or more of the components thereof. can counteract such wind uplift forces.

Figure 1N:
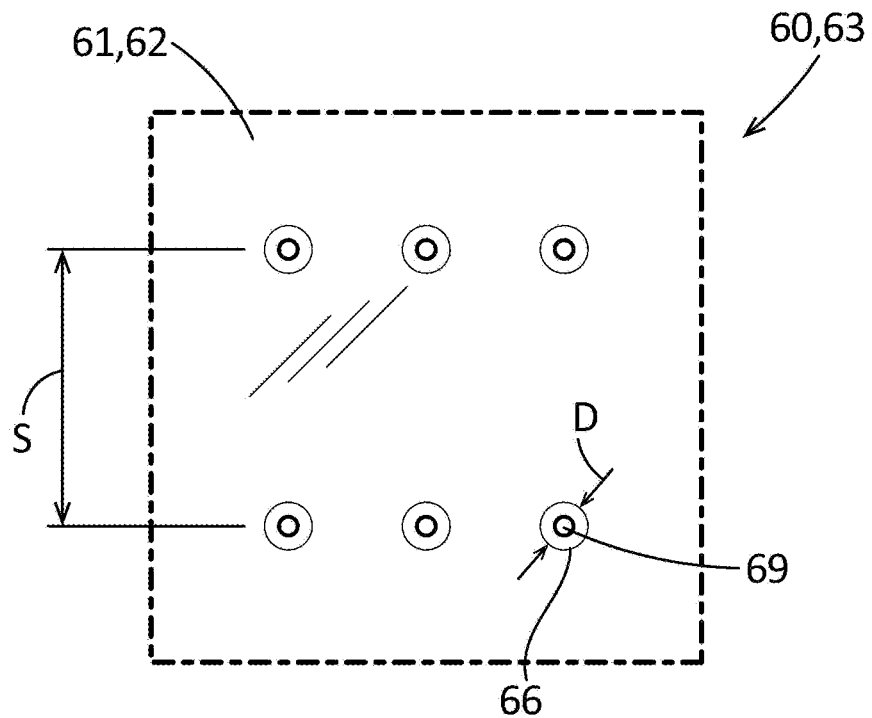

FIG. 1N is a top plan view of the membrane attachment system 63 of FIG. 1M taken from detail 1N in accordance with another aspect of the current disclosure. In some aspects, as shown, the roof membrane 62 can be secured to the roof 60 with a mechanical fastening method using discrete mechanical fasteners such as fasteners 69, a portion of which can be positioned on or against an outside of the roof membrane 62 as shown. As shown, each of a plurality of the fasteners 69 can extend through and/or lockably engage with the roof membrane 62 and into an underlying structure of the roof 60 with a locking feature (e.g., a threaded shaft) and, more generally, can physically or mechanically hold the roof membrane 62 to the underlying structure. In some aspects, one or more of the fasteners 69 can comprise a plate 66, which can be separate from a remaining portion of the fastener 69 and can help secure the roof membrane 62 by increase a surface area of the fastener 69 in contact with the roof membrane 62. When the roof membrane 62 is secured using the mechanical fastening method, a fastener diameter D, a fastener spacing or spacing S (which can be measured in a direction in which adjacent fasteners 69 of the fasteners 69 are nearest to each other), a location of the fastener 69 on the roof 60 relative to an edge of the roof 60 and other structures and/or any other physical dimension or other characteristic or overall pattern of the fasteners 69 can affect overall roofing performance and, more specifically, performance of the insulation under the roof membrane 62 and the attachment of the roof membrane 62 itself.

Figure 1O:
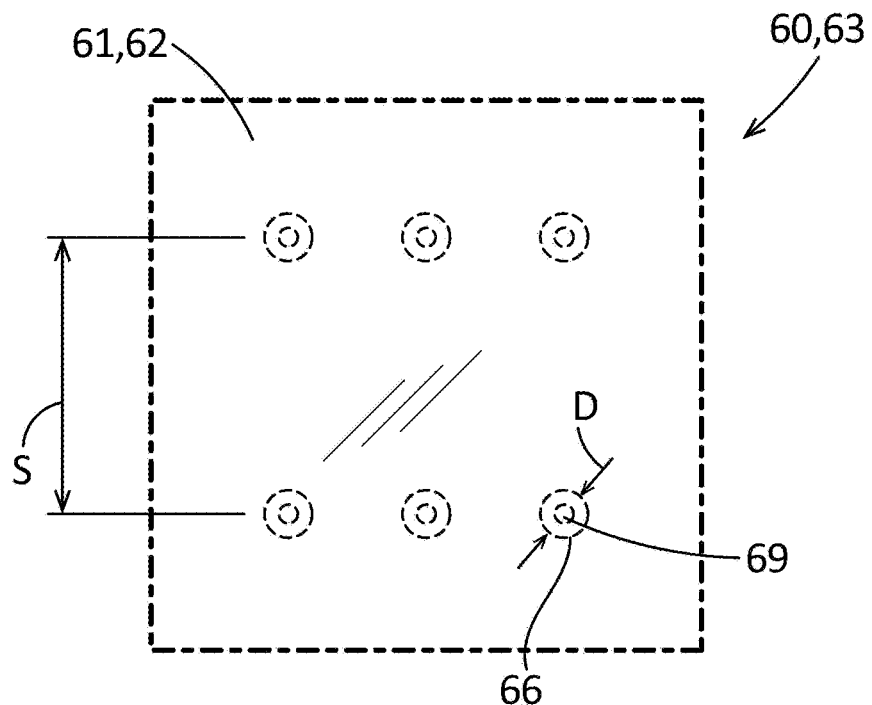

FIG. 1O is a top plan view of a section of the membrane attachment system 63 of FIG. 1M taken from detail 1N in accordance with another aspect of the current disclosure. In some aspects, as shown, the roof membrane 62 can be secured to the roof 60 with an induction welding method using, again, discrete mechanical fasteners such as the fastener 69. As shown, each of a plurality of the fasteners 69 can bond to each of a hidden or bottom or rear side of the roof membrane 62 during an induction heating process that bonds the fastener 69 to the roof membrane 62. While not shown, an adhesive such as, for example and without limitation, a hot-melt adhesive can be positioned between the fasteners 69 and the roof membrane to facilitate a secure and/or sealed connection therebetween. In some aspects, each of the fasteners 69 or another plurality of fasteners can extend into and secure the underlying structure of the roof 60 and, more generally, can join the roof membrane 62 to the roof 60. In some aspects, the plate 66 of one or more of the fasteners 69 can be bonded to the roof membrane 62. When the roof membrane 62 is secured using the inductive welding method, the fastener D (which can be a diameter of the fastener 69 including any plate such as the plate 66), the spacing S, a location of the fasteners 69 (with or without the plates 66) on the roof 60 relative to an edge of the roof 60 and other structures and/or any other physical dimension or other characteristic or overall pattern of the fasteners 69 can affect overall roofing performance and, more specifically, performance of the insulation under the roof membrane 62 and the attachment of the roof membrane 62 itself. Through use of the measuring tool 510 (shown in FIG. 5A), as disclosed herein, the user can document various aspects of this roofing systems including attachment of the membrane and insulation onto a roof map for adequate documentation.

Figure 1P:
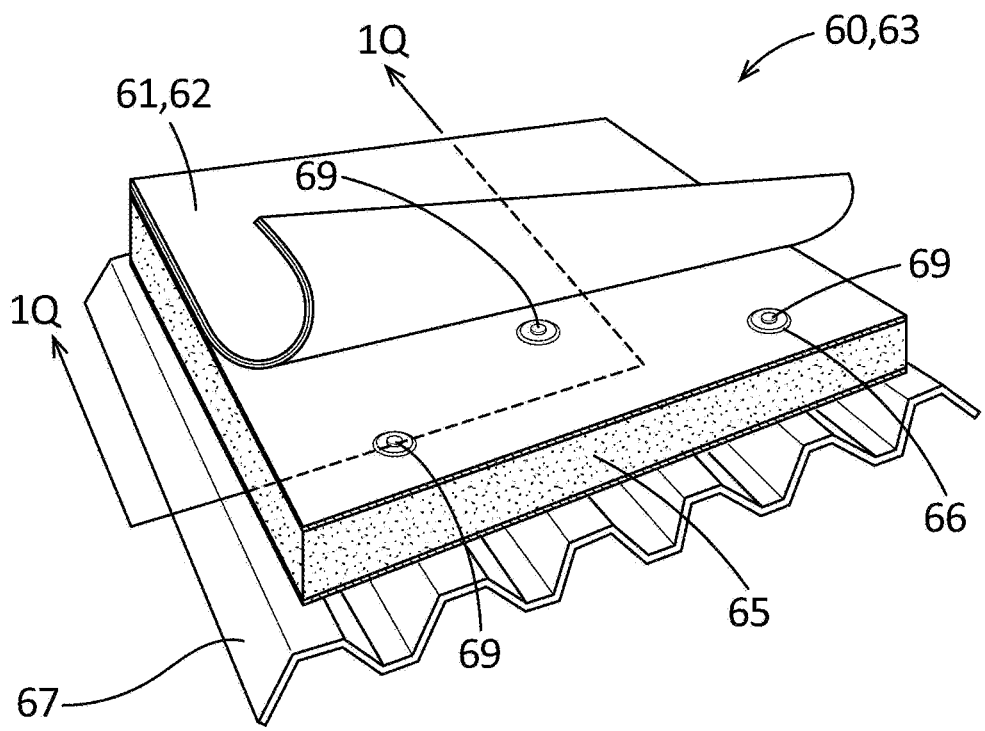
Figure 1Q:
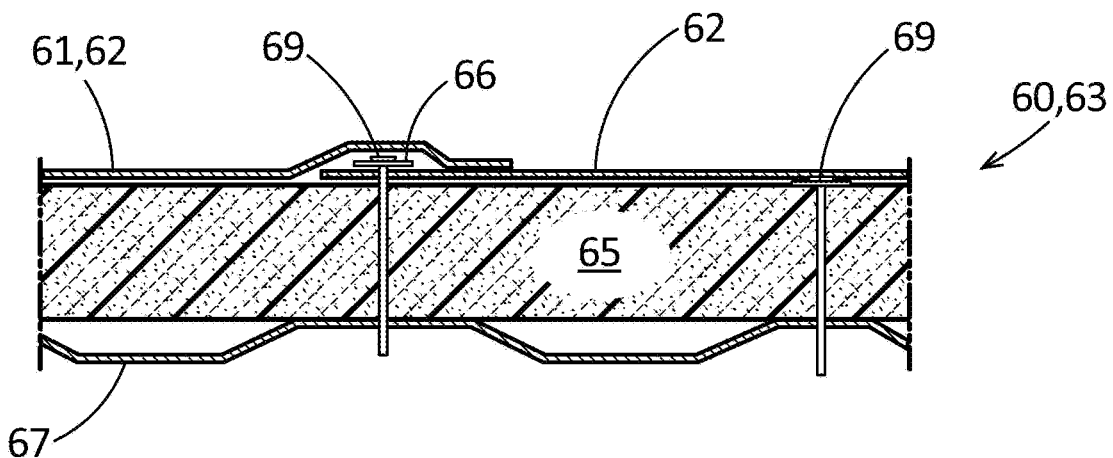

FIG. 1P is a top perspective view of the membrane attachment system 63 of FIG. 1M showing also an underlying structure of the roof 60, and FIG. 1Q is a sectional view of the membrane attachment system 63 of FIG. 1P taken from line 1Q-1Q of FIG. 1P. The roof 60 can comprise a roof deck 67. The roof 60 can comprise the insulation panel 65. In some aspects, at least some of the fasteners 69 can secure only the insulation panel 65 to the underlying structure of the roof 60, e.g., the roof deck 67. In some aspects, at least some of the fasteners 69 can secure both the insulation panel 65 and the roof membrane 62 to the underlying structure.

As such, it can be beneficial to document certain physical characteristics of the membrane attachment system 63 for any one or more of a variety of reasons including construction, maintenance, insurance, liability, or other purposes. Where such documentation does not exist or needs to be verified, it can be beneficial to measure the physical characteristics of the membrane attachment system 63 to ensure that such characteristics match the specification or requirement for any portions of the roof 60 in question.

Figure 1R:
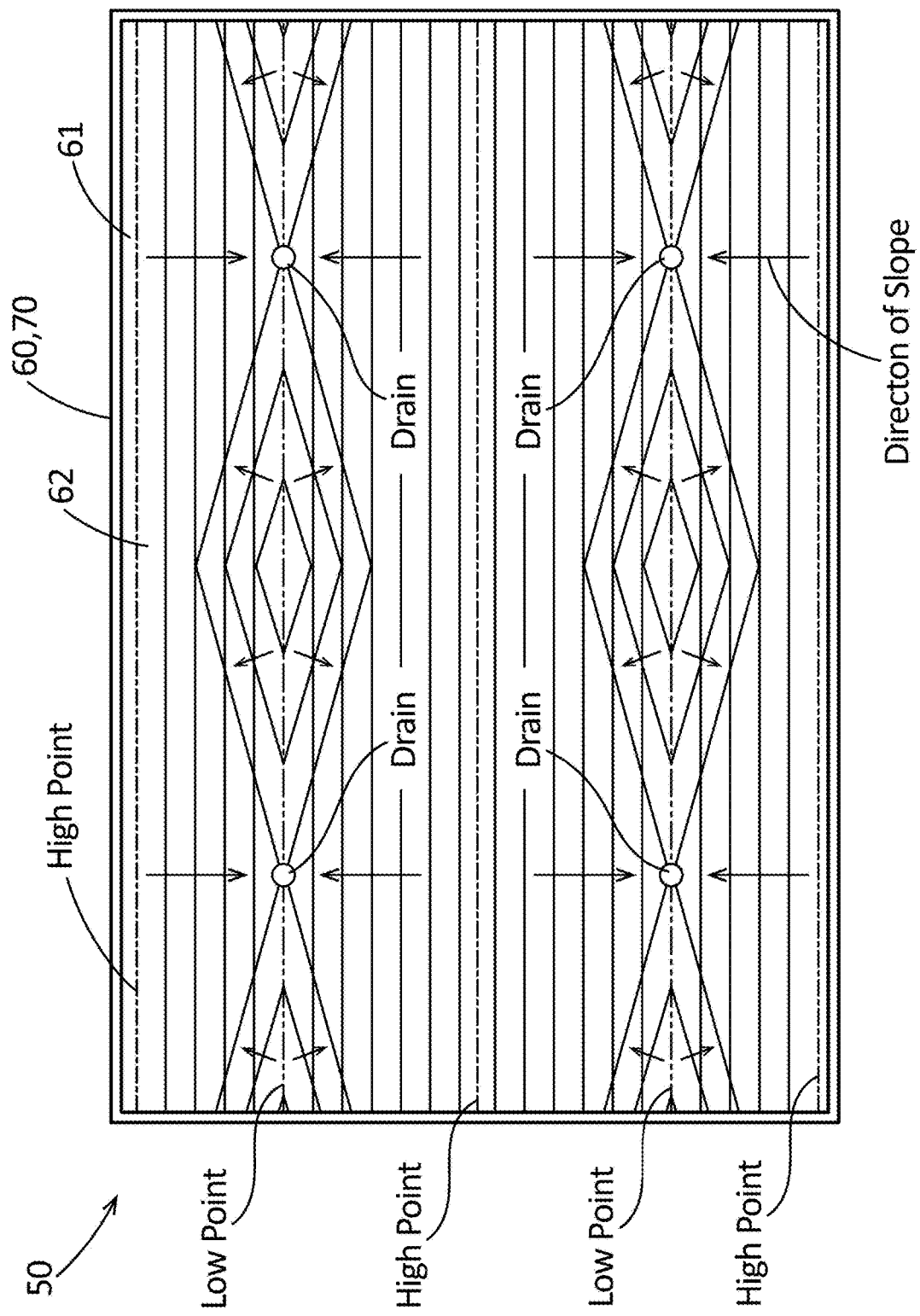

FIG. 1R is a top plan view of the roof 60 of FIG. 1A in accordance with another aspect of the current disclosure showing an insulation drainage plan. Underlying structure such as, for example and without limitation, the roof deck 67 (shown in FIG. 1P) and the insulation panels 65 (shown in FIG. 1P) can be built up so that water collected on the roof 60 (for example, from falling precipitation) runs down sloped areas of the roof membrane 62 from High Points towards Low Points and, ultimately, can be received in and carried elsewhere through Drains defined in the roof surface 61. More specifically, a slope of the roof membrane 62 can be set at a half inch per foot to encourage proper drainage of a liquid such as water and any solids that accompany the liquid. It can be beneficial to document physical characteristics of a slope of the roof surface 61 for any one or more of a variety of reasons including construction, maintenance, insurance, liability, or other purposes. Where such documentation does not exist or needs to be verified, it can be beneficial to measure the physical characteristics of slope of the roof surface 61 to ensure that such characteristics match the specification or requirement for any portions of the roof 60 in question.

Figure 1S:
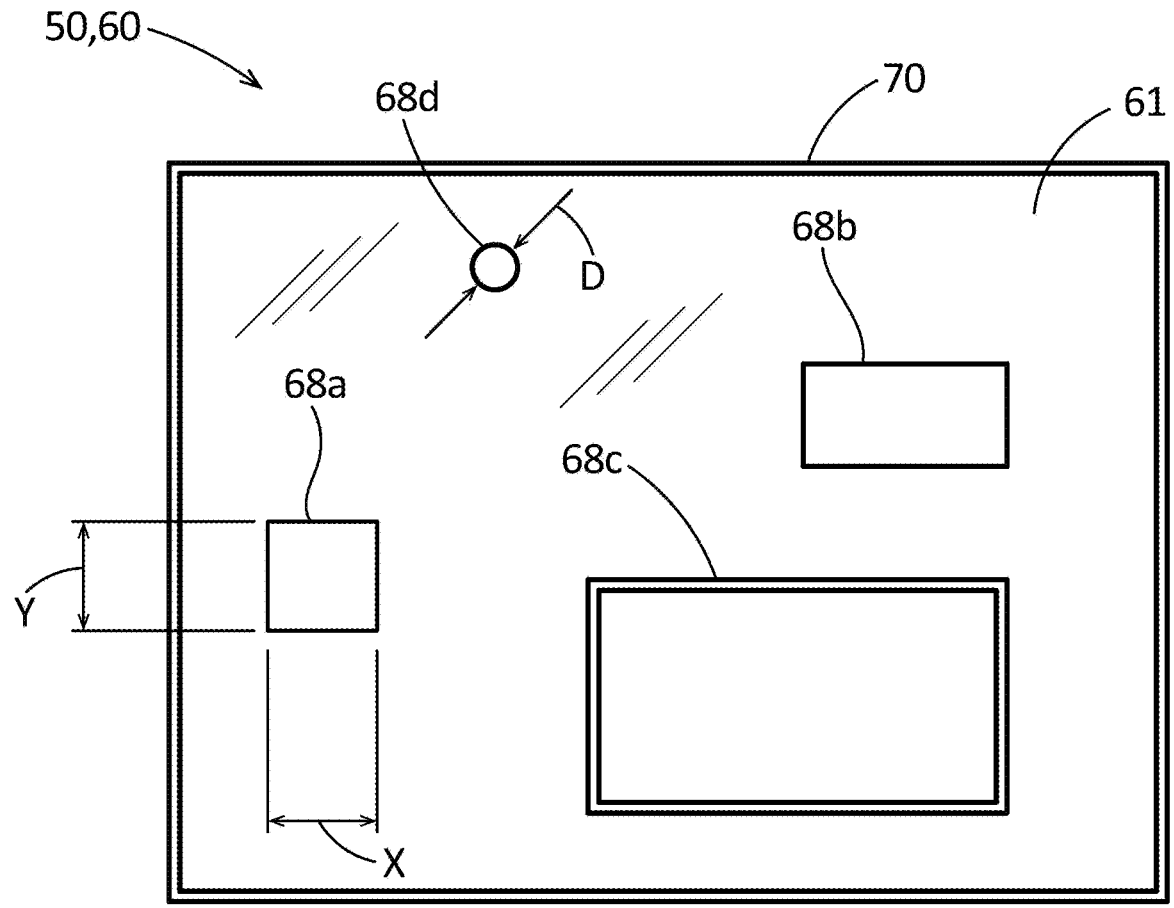

FIG. 1S is a top plan view of the roof 60 of FIG. 1A in accordance with another aspect of the current disclosure showing sizes, locations of other physical characteristics of equipment and other structures positioned on the roof 60. One or more of the structures 68a,b,c,d and so on can occupy physical space on the roof 60. For example and without limitation, the structure 68a can be an elevator penthouse, the structure 68b can be HVAC equipment, the structure 68c can be an elevated garden, and the structure 68d can be an antenna mast. The structures 68a,b,c,d can themselves be considered additional instances of the geometric features 100 and can be measured to facilitate the protection of the structures 68a,b,c,d and the surrounding roof 60 or the roof surface 61 thereof. More specifically, each of the structures 68a,b,c,d can define dimensions such as, for example and without limitation, lengths X and Y or the diameter D. It can be beneficial to document the sizes, locations of other physical characteristics of equipment and other structures positioned on the roof 60 for any one or more of a variety of reasons including construction, maintenance, insurance, liability, or other purposes. Where such documentation does not exist or needs to be verified, it can be beneficial to measure the sizes, locations of other physical characteristics of equipment and other structures positioned on the roof 60 to ensure that such characteristics match the specification or requirement for any portions of the roof 60 in question.

FIGS. 2A-2D are various views of the coping 80 and/or other edge metal installed on sections of sections of the parapet 70 of the roof of a building such as the roof 60 of the building 50 of FIG. 1A. The coping 80 can be used as a durable cap over the membrane 62. The coping 80 can secure the membrane 62 in place. The coping 80 can provide a decorative finish to the parapet 70. The coping 80 can protect the roof against inclement weather such as, for example and without limitation, high winds and/or storms. In some aspects, the street-facing side of the coping 80 can form part of the fascia (aka façade). In some aspects, the coping 80 can be required to interface with separate facia.

Figure 2A:
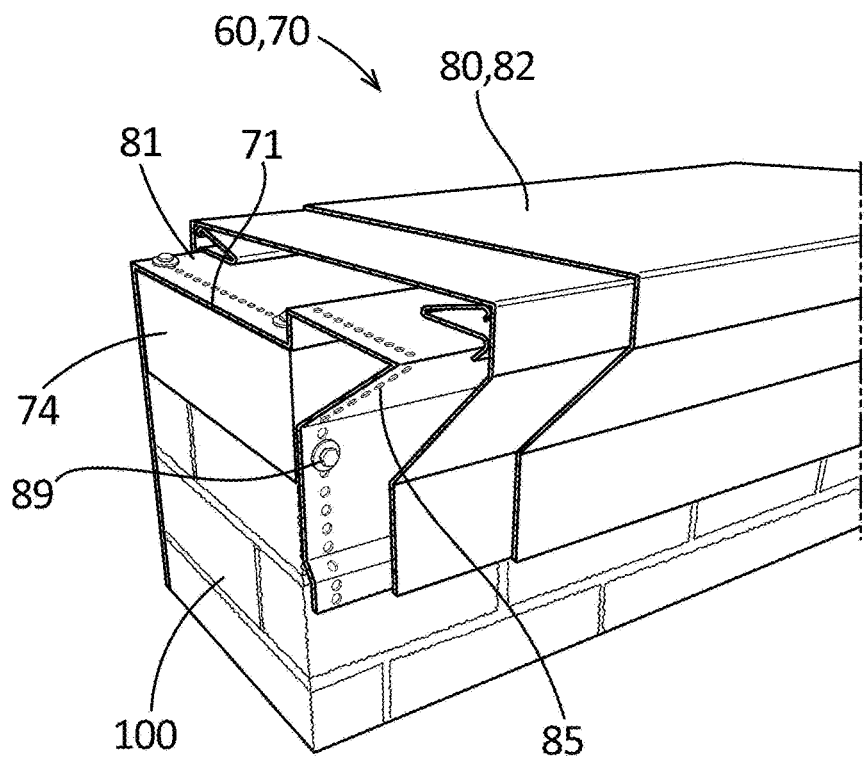
FIGS. 2A-2D are various views of edge metal installed on sections of parapet of a roof of a building such as the roof of FIG. 1A.

FIG. 2A is specifically a side top perspective view of a section of the parapet 70 of the roof 60 showing the coping 80, which can be and typically is manufactured from metal, secured thereto. More specifically, the coping 80 can comprise various members of an understructure 81 and a coping skin 82. The understructure 81 can comprise anchoring clips 85, which can be attached to the parapet 70 with fasteners 89, which can extend through the anchoring clips 85 and into a "nailer" or substrate or support 74. As shown, a section of the coping skin 82 can overlap in a length direction of the parapet 70 and, more specifically, the geometric feature 100. In some aspects, the coping 80 can define a decorative outer edge. The membrane 62 is not shown but it typically nailed to the support 74, which can be made of wood, steel, masonry, or another material and can be fixed to a top surface 71 of the parapet 70.

Figure 2B:
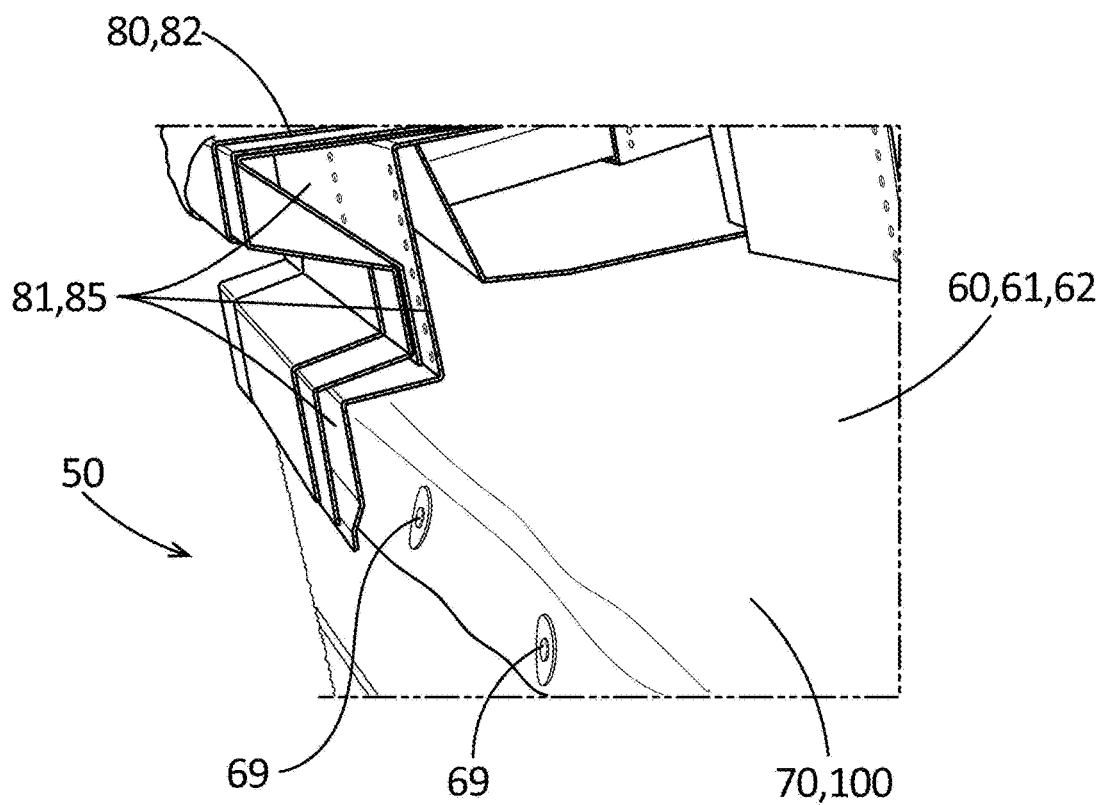

FIG. 2B is a side top perspective view of a section of the parapet 70 of the roof 60 (shown in FIG. 1A) showing the coping 80 secured thereto in accordance with another aspect of the current disclosure. As shown, the coping 80 can be installed over the membrane 62 and can cover the membrane 62. The membrane 62 can be secured to the support 74 (shown in FIG. 2A) with the fasteners 69.

The membrane 62 can be manufactured from any one of several materials including, for example and without limitation, polydimethylsiloxane (PDMS) rubber, polyvinylchloride (PVC), ethylene propylene diene monomer rubber (EPDM), thermoplastic polyolefin (TPO), butyl rubber, nitrile rubber, and styrene butadiene co-polymers. The membrane 62 can form a water-tight barrier over the roof 60. In some aspects, the membrane 62 can comprise any resilient and weatherproof material possessing a moderately low modulus of elasticity.

Figure 2C:
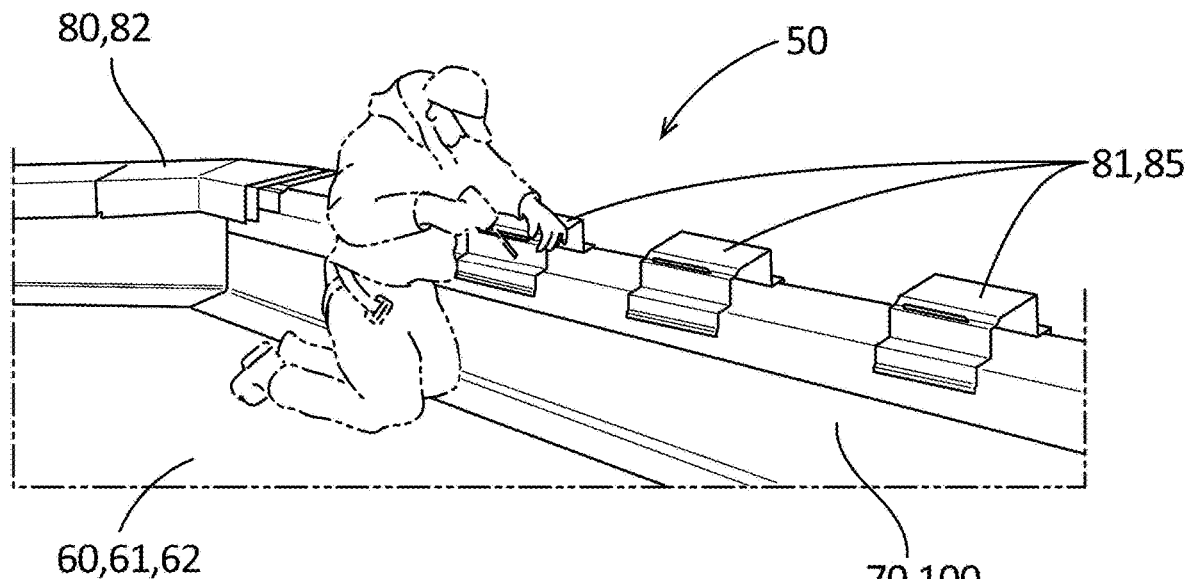

FIG. 2C is a side top perspective view of a section of the parapet 70 of the roof 60 showing the coping 80 secured thereto in accordance with yet another aspect of the current disclosure. The anchoring clips 85 of the understructure 81 can be attached to the parapet 70 and support the coping skin 82 at intervals along the parapet 70. More specifically, the anchoring clips 85 can be spaced apart by a spacing distance. As shown, a technician can install the coping 80.

The coping 80 can be and typically is fabricated on a custom basis, e.g., from powder coated sheet metal, according to measurements taken by a Regional Technical Salesperson or Roof Technology Specialist (RTS) on the site. Some measurements can be more important and, in some aspects, require accuracy to with a fraction of an inch, while other dimensions can be less important. If the more important dimensions are not recorded accurately and the parts (e.g., the coping 80) made to appropriately cover the roof 60, such parts and the roof 60 can be more susceptible to damage by outside forces such as wind and precipitation. The coping 80 and, more specifically, the coping skin 82, can be and typically is fabricated from standard lengths of material. For example, the coping 80 can be formed from 10-foot-long or 12-foot-long sheets of material, and lengths of each section of the coping skin 82 is thus typically 10 feet or 12 feet. In some aspects, the material length can be less than 10 feet and more than 12 feet. In any case, accuracy of wall lengths can be less critical than wall width 75 (shown in FIG. 1F). Depending upon the wall width 75, each sheet of material can yield at least one or two 12-foot lengths of the coping 80, significantly impacting material and production costs. Therefore, the wall width 75 can be more critical than the length.

Figure 2D:
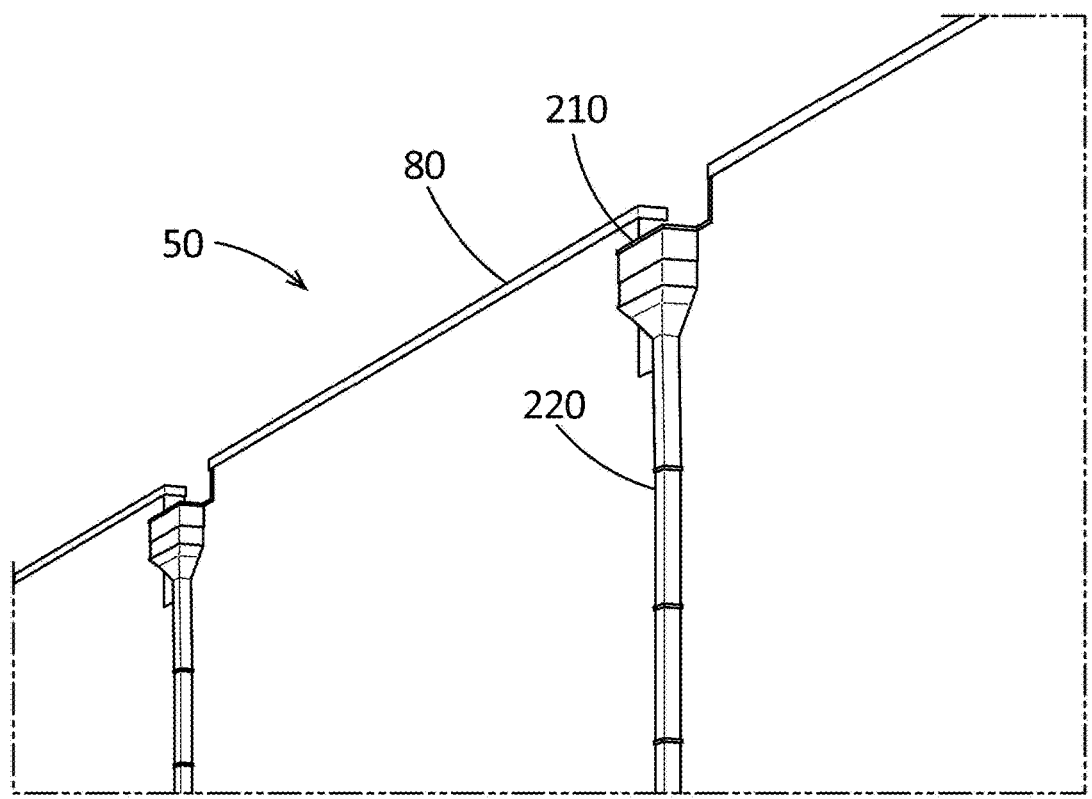

FIG. 2D is a side bottom perspective view of the building 50 showing various other structures, e.g., edge metal and downspouts, secured thereto in accordance with yet another aspect of the current disclosure. The building 50 can comprise other types of edge metal (although, strictly speaking, materials other than metal can be used, and the components need not be limited to those installed on an edge of the building 50). The building 50 can comprise conductor heads or collection boxes 210, which can collect and carry water away from the roof 60. The building 50 can comprise downspouts 220, which can be coupled to the collection boxes 210 and can collect and carry water away from the collection boxes 210. The building 50 can comprise fascia (not shown), which can be vertically oriented panels facing outward on a top edge of the building 50. The building 50 can comprise termination bars (not shown), which can receive an edge of the roof membrane 62 or other panel. Edge metal can be secured to the building 50. Edge metal can be tested in accordance with, for example and without limitation, ANSI/SPRI/FM4435/ES-1 or ANSI/SPRI/GT-1 as stated in the International Building Code.

Figure 3A:
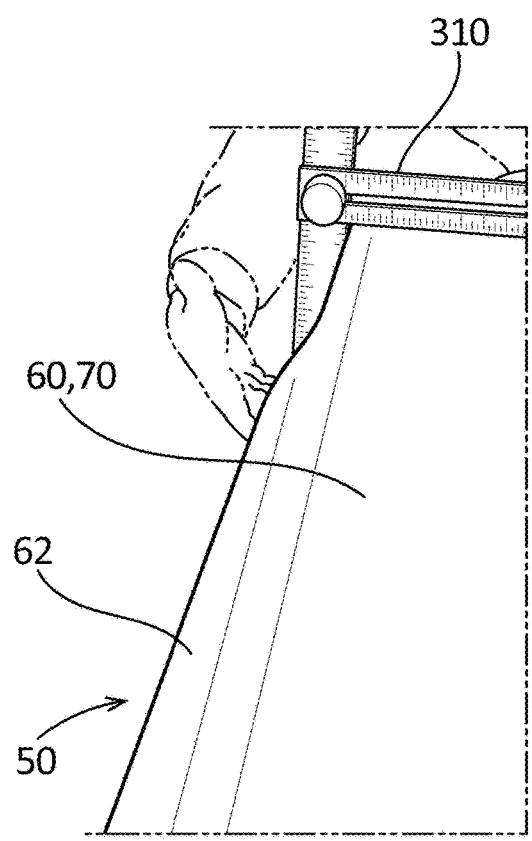
FIGS. 3A-3G are various views of steps in a manual process of taking measurements of a parapet of a roof of a building such as the roof of FIG. 1A.

FIGS. 3A-3G are various views of steps in a manual process of taking measurements of the parapet 70 of the roof of a building such as the roof 60 of the building 50 of FIG. 1A. FIG. 3A is specifically a side perspective view of a section of the parapet 70 of the roof 60 of FIG. 1A showing an unsecured roof membrane 62. A manual distance measurement tool 310 can be used to compress a partially unsecured membrane 62 against outer and inner surfaces of the parapet 70.

Figure 3B:
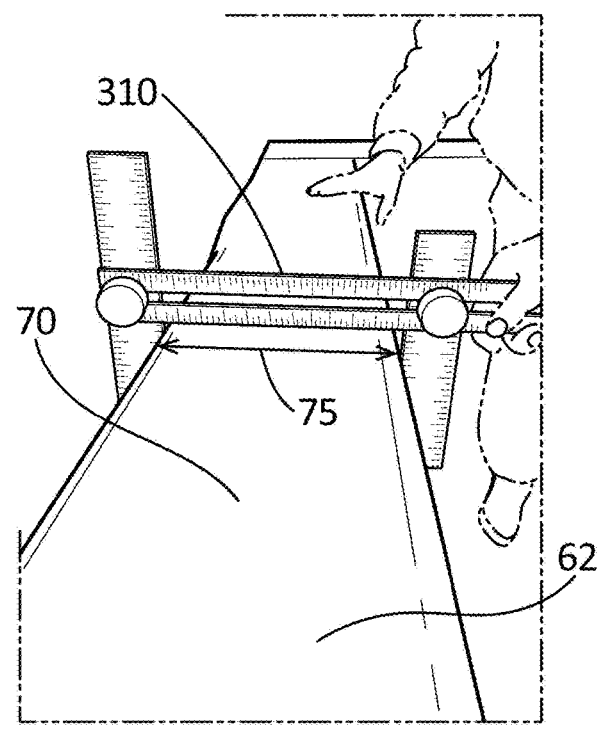

FIG. 3B is a side perspective view of a section of the parapet 70 of the roof 60 of FIG. 1A showing the tool 310 being used to collect a measurement of the wall width 75 while maintaining compression of the membrane 62 against the parapet 70. More than simply taking a single measurement, the individual measuring the roof must generally take many accurate measurements (arguably, every single measurement must be accurate in order to avoid potentially costly rework or worse, e.g., project delays resulting in even greater expense)—under all kinds of weather and building conditions including, for example and without limitation, on a high roof 60 in a strong wind and sleet—and accurately read and record the measurements. The tool 310, however, was not designed for such a requirement and requires good light, good vision, a generally dry environment for taking notes, and pulling off gloves—even in a cold and/or wet weather environment—to take and record the measurements and accompanying notes.

Figure 3C:
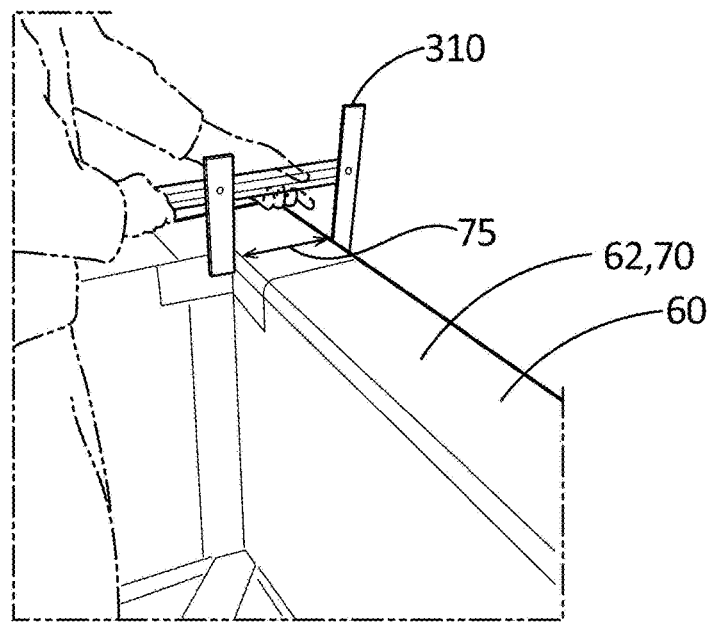

FIG. 3C is a side perspective view of another section of the parapet 70 of the roof 60 of FIG. 1A showing the tool 310 being used to take additional measurements. Again, in addition to taking multiple measurements to ensure capture of a maximum value of the wall width 75, the individual measuring the roof must also accurately take those measurements with the tool 310, record those measurements with pen and pencil or the equivalent, review the measurements, compare the measurements, and judge the sufficiency of the measurements. The individual must stop the flow of work after each measurement to manually write down the measurement. Yet, a mistake or gap in any of these steps that is not manually and timely caught and properly corrected can cause expensive pieces of the coping 80 (shown in FIG. 2A) to be incorrectly made, potentially jeopardizing the cost and/or profitability of the project, project deadlines, and potential for future work from the building owner or custodian and others.

A thickness of the membrane and any objects beneath the membrane generally should be considered when measuring a wall width 75 of sections of the parapet 70. The tool 310 is commonly used to measure the wall width 75, exerting compression to take the slack out of the membrane, then reading the tool 310. The tool 310 can typically then be used to manually confirm of the wall width 75 at each of several remaining areas of a parapet wall to ensure that the thickest section of the wall has been measured. For a given wall section, the thickest or widest cross section of the parapet is measured and recorded. As the membrane is worked into corners through folding, cutting, patching, and other manipulations, multiple thicknesses of the membrane 62 can add to the wall width 75. Engineering can incorporate a safety margin (e.g., a 0.75" safety margin) to the wall widths 75 for such stacked thicknesses of the membrane 62.

Figure 3D:
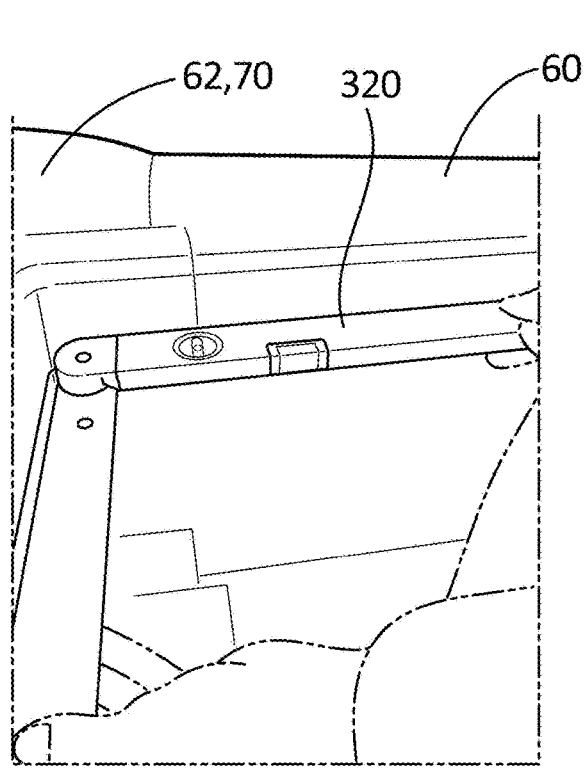

FIG. 3D is a side perspective view of a section of parapet 70 of the roof 60 of FIG. 1A showing a protractor 320 being used to take angle measurements on an inside corner. The protractor 320 can be a digital protractor. More generally, the protractor 320 can be used for inside/internal and outside/external angle measurements of the parapet 70. These measurements can be supplemented by measurements of the wall width 75 (shown in FIG. 3C) of each corner leg being measured using the tool 310. Some corners, intersections, and so forth can be considered custom parts requiring especially accurate measurements for fabrication.

Figure 3E:
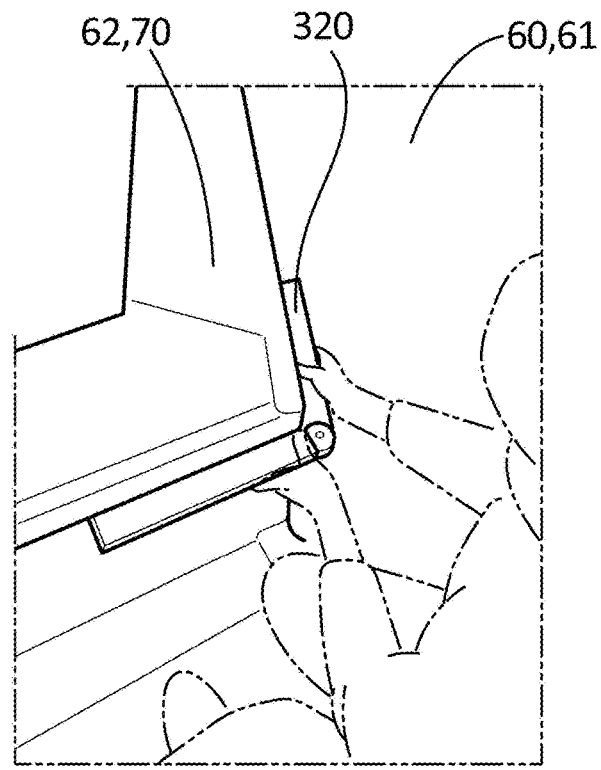

FIG. 3E is a side perspective view of another section of the parapet 70 of the roof 60 of FIG. 1A showing the protractor 320 being used to take an angle measurement of an outside corner. The protractor 320 can also be used to measure angles of various other surfaces of the roof 60 including portions of the roof surface 61 to ensure adequate drainage off the roof 60 and/or into internal plumbing.

Figure 3F:
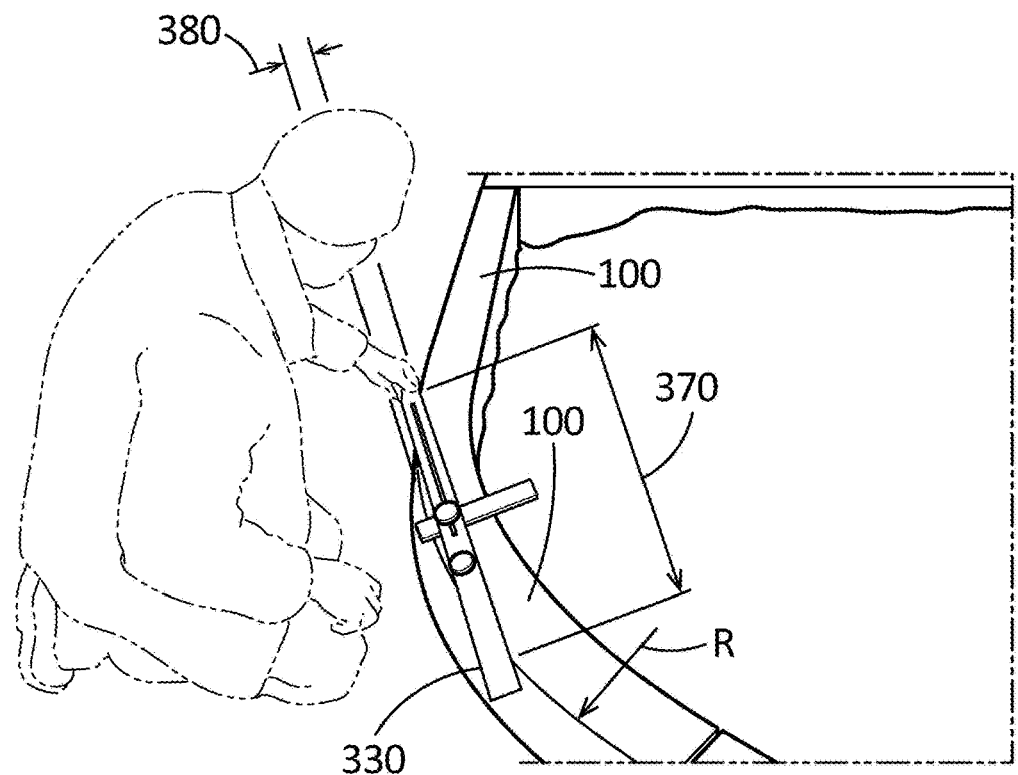

FIG. 3F is a side perspective view of a curved section of structure or geometric feature 100, which need not be on the roof 60 or even the building 50, being manually measured with a measurement tool 330. All curves are typically assumed to be portions of circles. Measurement and specification of curved coping having elliptical, hyperbolic, or other radiused shapes can be approximated using multiple, sequenced portions of circles. The curvature can, in theory, be measured in terms of a rise 380 from a chord 370 of the curve. As shown, a radius R of a curve can be measured using a 3-ft-long chord 370. For example, the 3-foot-long chord 370 can define a 3.25" rise. For very shallow curves, a 12-ft-long chord can be used. Other curves such as, for example and without limitation, ellipsoidal or hyperbolic curves, can be characterized as a combined series of circular curves with various radii.

Figure 3G:
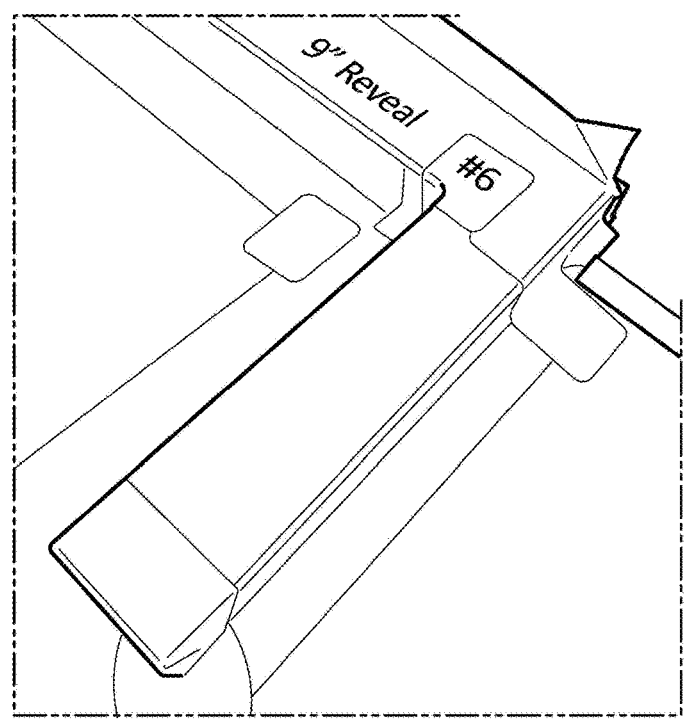

FIG. 3G is a top perspective view of a section of parapet shown marked with notes. The individual measuring the roof, typically an RTS, can mark the liner to help installers understand the roadmap, for example, especially when coming back to the roof 60 with questions and/or further investigation. Such marks and notes can be typical, if not necessary, when a typical manual process is followed for recording and processing measurements.

Copious notes can be and typically are generated in the various steps of a manual process of recording and processing measurements of the parapet 70 of the roof of a building such as the roof 60 of FIG. 1A. The RTS typically picks a spot and begins measuring and working their way around the roof, recording countless measurements, drawing sketches to capture certain details and supplement the dimensions.

The RTS can and typically does generate, by hand, multiple portions of a "roadmap" of the roof 60 during the aforementioned manual process of measuring a roof such as the roof 60. The roadmap is basically a detailed outline of the roof 60 or some physical characteristics describing structures on the roof 60, including all the measurements made as well as transitions from one wall geometry (e.g., geometric feature 100) to another. The roadmap can be provided to the building owner and the installation contractors. The roadmap can also be used by the RTS to generate engineering documents, which can include "print approvals." In some aspects, the engineering documents can be or can comprise engineering drawings used by manufacturing to fabricate roof parts. In some aspects, the engineering documents can spatially locate elements on the roof 60 including but not limited to physical characteristics of the membrane attachment systems 63 (e.g., as shown in FIG. 1I), the shape and, more specifically, the slope of the roof membrane 62 (e.g., as shown in FIG. 1R), and information about the structures 68*a,b,c,d* on the roof 60 (e.g., as shown in FIG. 1S). The RTS typically generates the paper roadmap manually from their notes, which can take three hours or more and involves the aforementioned risks (including, e.g., errors during any step in the measurement process). The roadmap, based on drawings from the architect, can require multiple sheets.

In some aspects, a form can be used to manually transfer roof dimensions from the manual notes taken by the RTS into electronic form. While the electronic form of reporting the data can be beneficial, such a step only builds on and does not replace the manual collection and recording of data.

Figure 4:
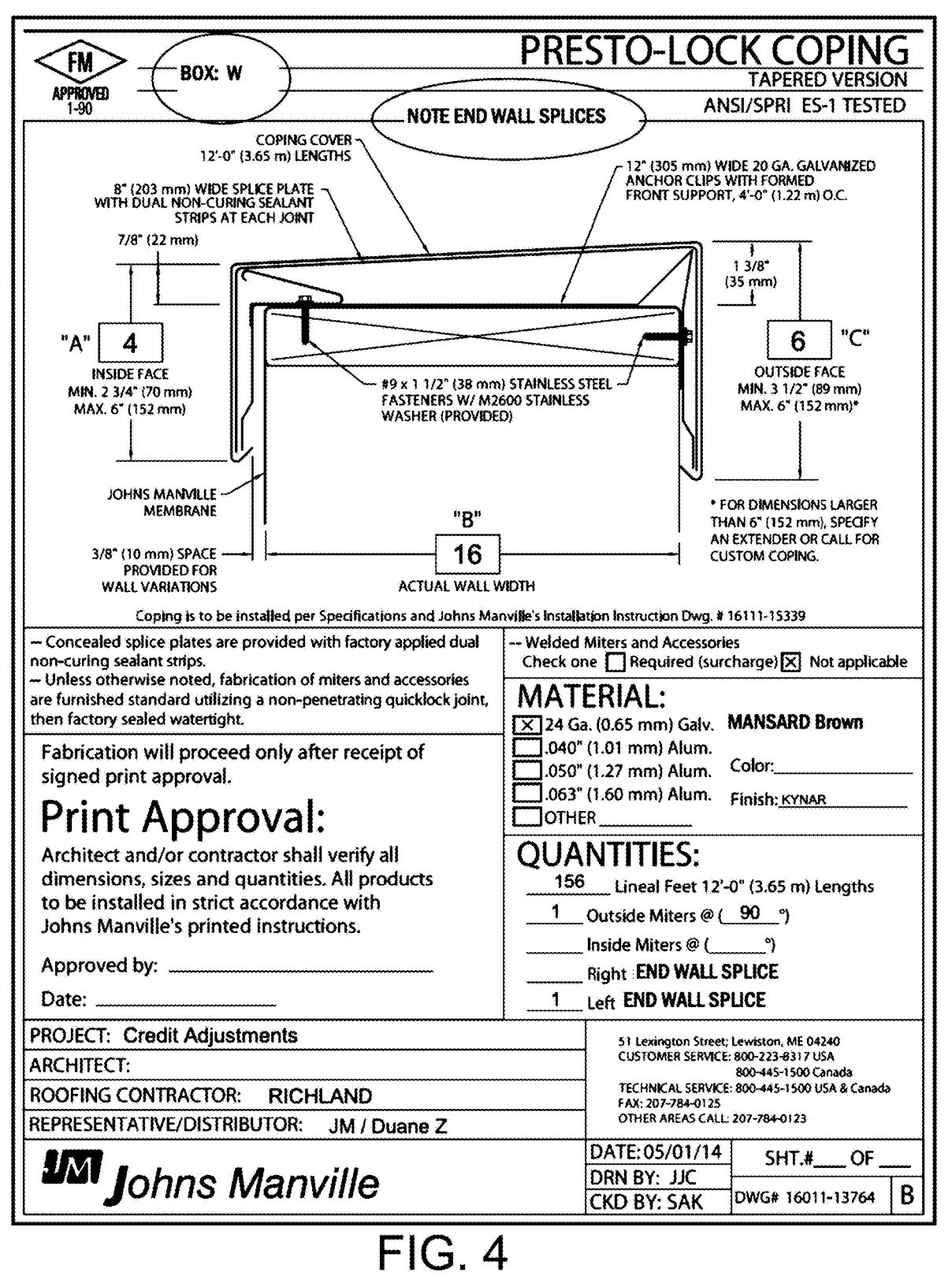

FIG. 4 is an example of an engineering document generated for coping for a particular section of the parapet 70 after roof measurements are manually transferred into electronic form in a manual process of recording and processing measurements of a parapet of a roof of a building such as the roof of FIG. 1A. A stack of these sheets, each describing roof coping geometries and parts, are typically used by a customer service representative to provide a quotation, approved by the customer for installation, and then used by manufacturing to fabricate the parts. Shown is a typical engineering document showing both the coping cover and the underlying structure. Fully manual methods can be more time-consuming, costly, and/or inaccurate. For example, if the edge metal (e.g., the coping 80) does not fit, installers can be faced with ordering new custom pieces or cutting the already fabricated custom pieces with tin snips to make them fit. Nonetheless, similar information can usually at some level be so gathered, however inefficiently, for all fascia and other edge metal, wood nailer alternatives (e.g., fabricated versions of the support 74), water control (e.g., the slope of the roof surface 61), and the membrane attachment systems 63.

A method for manual process of recording and processing measurements using the aforementioned manual tools and preparing the roadmap based on those measurements can comprise the following steps:

1. The RTS (or other individual) sometimes has a plan view of the roof structure. Other times, the RTS can look at Google maps. Absent such a plan view or, more generally, plans of the structure, the RTS can sketch the roof on paper (e.g., grid paper) as they go.
2. The RTS can begin at one arbitrary point on the roof wall and can begin to take measurements. For example, a corner can require checking wall width of both sections of wall (which, along with any other feature of the roof, can be the geometric feature 100) at the corner, slope at the top of the wall (if any), and corner angle measurements inside and outside.
3. Other geometries can require other parameters to be measured, including the height and length of the geometric feature 100, a slope at the top of the geometric feature 100 (if any), any curvature, and maximum wall width 75 of the geometric feature 100. Geometric features can be then located in space with respect to one another or from the edge of the roof.
4. The RTS can record the measurements of that first section or geometric feature 100 onto the plan that they are sketching and can move along to the next connected section of wall.
5. The RTS can make their way around the perimeter wall as they go, recording widths, lengths, corner angles, intersections, etc. of each geometric feature 100.
6. The document generated can be referred to as the "Roadmap." The Roadmap can act as a key for numerous steps in the installation. A copy can be provided to the installing contractor, can be used by the RTS to generate engineering documents, and can be provided to the building owner.
7. The roadmap can be cleaned up and finalized by hand. In some aspects, if available, an architectural plan of the roof can be used as a base for the drawing. Even when architectural drawings are available, physical measurement can still be required to ensure that any subsequent changes to the wall or roof are taken into account before the parts are manufactured. The color codes can help the installing contractor when the fabricated coping sections are delivered.
8. The RTS can then take each wall section and match it to an engineering database of engineering document templates. In some aspects, the RTS can type in dimensions into fillable fields on a pdf.
9. The engineering documents can then be sorted largest to smallest, combined into one pdf, and can be sent to engineering for checking.
10. Engineering can provide a quote, then the RTS can send to the client for approval.
11. The engineering documents can be used for fabrication of parts.

Without any of the new system disclosed herein, the time typically spent can be roughly as follows:

| Task | Hours to Complete |
|---|---|
| Gather information/Review Job/Print-Prep-Schedule Appointment | 1-4 hours |
| Drive to/from Job and Measurement | 6-8 hours |
| Clean up Notes - Make Roadmap - Prepare Engineering Documents | 4-6 hours |
| Get Quote/Miscellaneous Custom Geometries/Engineering Support/Other Miscellaneous Communication | 2-4 hours |

With the systems disclosed herein, it is expected that post-measurement process time can be reduced by 80% (from 6-10 hours currently to 1-2 hours with implementation of the systems disclosed herein).

Figure 5B:
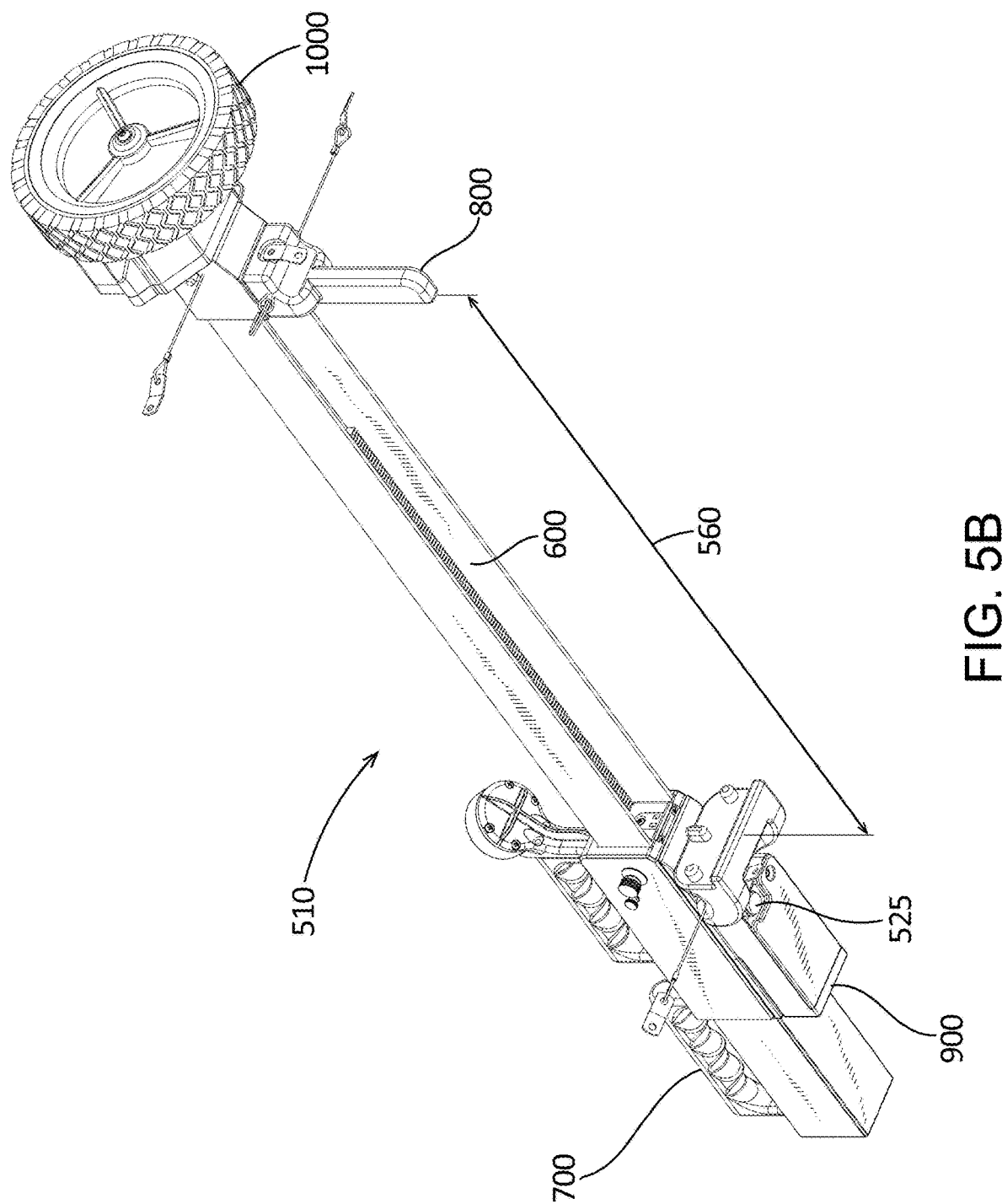
Figure 5C:
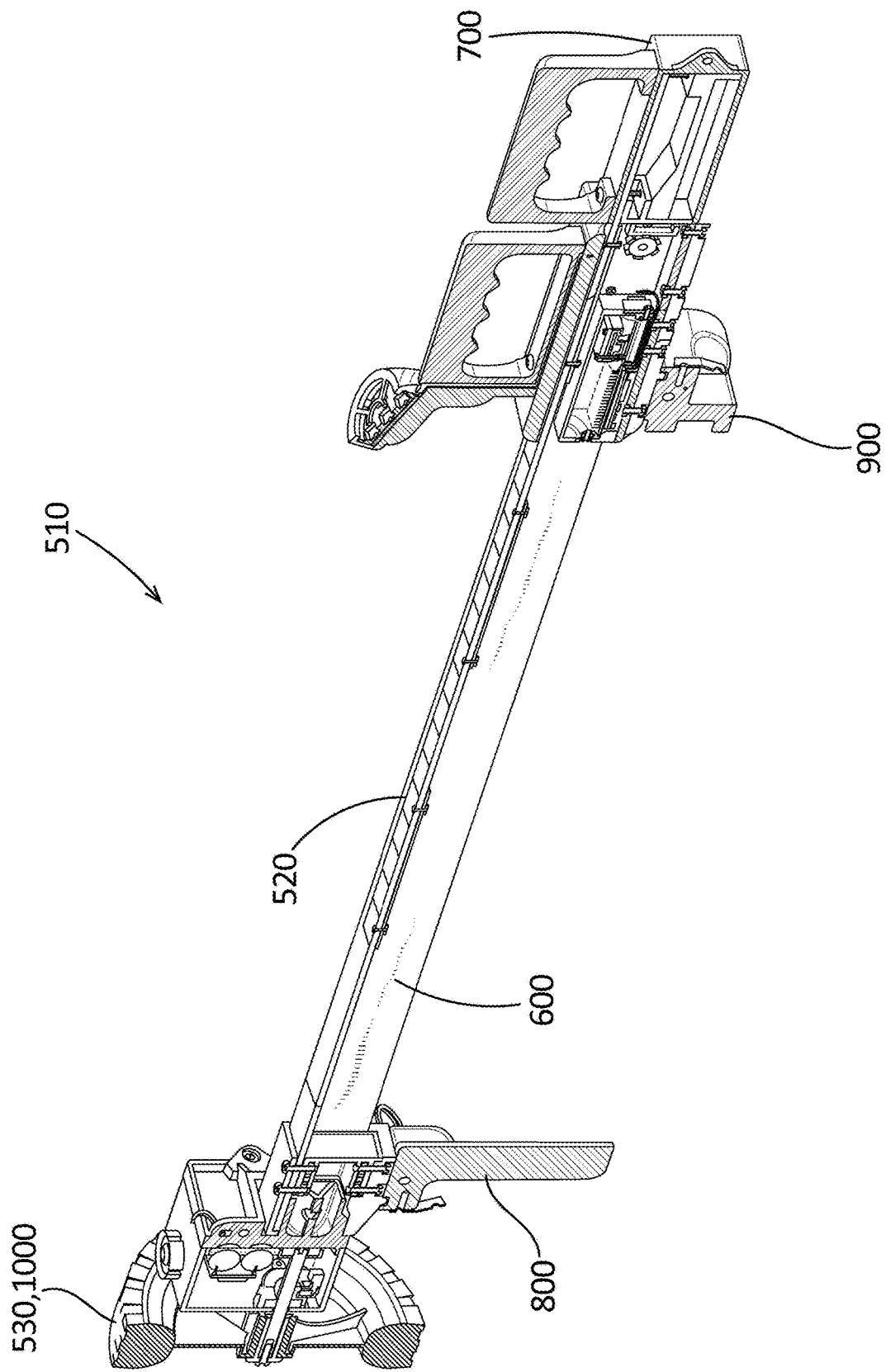

FIGS. 5A-5C are various views of a system 500 comprising the device, measurement device, or measurement tool 510 and the device or user device 550 in accordance with one aspect of the current disclosure. The system 500 can be used to measure, for example and without limitation, the parapet 70 (shown in FIG. 1A) of a roof of a building such as the roof 60 of FIG. 1A. The system 500 can thus be a parapet measurement system or an oriented distance measuring system. FIG. 5A is specifically a top perspective view of the measurement tool 510 and the user device 550 configured for use therewith.

The measurement tool 510 can comprise a rail assembly or rail or bar assembly or bar 600. The measurement tool 510 can comprise an end piece or static handle or handle 700, which can be mounted to the bar assembly 600. The handle 700 can be fixably mounted to the bar assembly 600. More specifically, the static handle 700 can be positioned at or proximate to a front or first end 515 of the measurement tool 510 or a first end 605 (shown in FIG. 6A) of the bar assembly 600. The measurement tool 510 can comprise a static clamp or stationary clamp 800, which can be mounted to the bar assembly 600. More specifically, the stationary clamp 800 can be positioned at or proximate to a rear or second end 516 of the measurement tool 510 or a second end 606 of the bar assembly 600. The measurement tool 510 can comprise a dynamic clamp 900, which can be mounted to the bar assembly 600. More specifically, the dynamic clamp 900 can be configured to move or, more specifically, slide or slideably move between the first end 515 and the second end 516 of the measurement tool 510 or between the first end 605 and the second end 606 of the bar assembly 600. The measurement tool 510 can comprise an odometer 1000, which can be mounted to the bar assembly 600. More specifically, the odometer 1000 can be secured to the second end 516 of the measurement tool 510 or the second end 606 of the bar assembly 600.

The measurement tool 510 and, more specifically, the bar assembly 600 can define an elongated form with a longitudinal dimension or length along a longitudinal axis 511 measuring greater than—or even 4 or 5 times—a transverse or latitudinal dimension or width. Two or more—or even all—of the bar assembly 600, the static handle 700, the stationary clamp 800, the dynamic clamp 900, and the odometer 1000 or an axis thereof (i.e., an axis of each of two or more of the components of the measurement tool 510) can be aligned with each other and/or with the axis 511. A strap (not shown) can be attached to one or more carry or attachment points 519—two attachment points 519 are shown—and can be used to carry, store, or otherwise support the weight of or secure the measurement tool 510.

The measurement tool 510 can comprise various electronic components such as, for example and without limitation, controllers, sensors, and a power supply, one or more of which can be housed inside the measurement tool 510, as shown. In some aspects, one or more electronic components can be housed elsewhere on or separate from the measurement tool 510. For example and without limitation, the electronics otherwise disclosed herein as housed in the dynamic clamp 900 can instead be housed in the static handle 700 or near the stationary clamp 800, or the electronics can be distributed among some combination of the three components. The electronics and power supply can also be housed in a separate container or housing and connected to the measurement tool 510 using cables.

The measurement tool 510 can be operated manually. The measurement tool 510 can be configured to squeeze or compress a floppy or loose portion of the membrane 62 (shown in FIG. 1F) on the parapet 70 (shown in FIG. 1F) to accurately measure the wall width 75 (shown in FIG. 1F) for component (e.g., coping) fabrication or to measure other geometric features 100 (shown in FIG. 1F) for the purpose of preparing other structural components for fabrication. In some aspects, as will be described, the measurement tool 510 can be used to measure the physical characteristics of other aspects of the building 50 (shown in FIG. 1A) including of the membrane attachment systems 63 (shown in FIG. 1I), roof drainage systems (shown in FIG. 1Q), and other structures 68 (shown in FIG. 1R) on the roof 60 (shown in FIG. 1A). More specifically, the measurement tool 510 can be configured to measure a clamp distance or open distance or open dimension 560 between the stationary clamp 800 and the dynamic clamp 900, within which each of the plurality of physical objects (e.g., a plurality of the geometric features 100) to be measured by the measurement tool 510 can be received. In some aspects, a ruler 660 can be secured to—and/or graduations 665 indicating incremental distance defined in—the bar assembly 600 as a secondary or backup method of manually checking the open dimension 560.

An electronic sensor 943 or, more specifically, an electronic Inertial Measurement Unit (IMU) sensor can be built into the measurement tool 510 and can sense roll, pitch, and yaw of the measurement tool 510, which can exemplarily be used for angle and curve and slope measurement. Meanwhile, in some aspects, the odometer 1000 can be configured to measure and record distances traveled by a wheel 1020 thereof (e.g., a length of a geometric feature 100). In some aspects, the odometer 1000 can be removed from a surrounding or remaining or first portion or clamp portion or caliper portion 520 of the measurement tool 510. In such aspects, either the odometer 1000, which can at least partly form a second portion or odometer portion 530 of the measurement tool 510, or the caliper portion 520 of the measurement tool 510 can be used separately from one another. As will be described below, a controller 940 (shown in FIG. 9G) of the dynamic clamp 900 and a controller 1040 (shown in FIG. 10C) of the odometer 1000 can be configured to independently measure and communicate dimensions of the geometric features 100.

The measurement tool 510 can comprise a power button, power switch, or power control 525 (shown in FIG. 5B), which can be configured to power on the caliper portion 520 and, more specifically, the controller 940 and/or other components of the caliper portion 520. Similarly, the measurement tool 510 can comprise a power button, power switch, or power control 535, which can be configured to power on the odometer portion 530 and, more specifically, the controller 1040 and/or other components of the odometer portion 530. Either or both of the power controls 525, 535 can be lit or comprise a light source to indicate its location or to indicate that the corresponding portion of the measurement tool 510 is powered ON. The measurement tool 510 can comprise a user input interface 950, which can facilitate the taking, recording, sending, and other handling of measurements of the geometric features 100.

The user device 550 can be any electronic device able to receive inputs from a user such as the RTS and, in some aspects, inputs directly from the measurement tool 510. For example and without limitation, in some aspects, the user device 550 can be an electronic tablet, which can be configured to run the device app or app disclosure herein. The user device 550 can comprise a body 1310, a screen 552 defining a display 1320, which can be a touchscreen display, and internal circuitry running a device operating system (OS). The user device 550 can further comprise one or more cameras 1350, one of which can be on a front side as shown and one of which can be on a rear side opposite from the screen 552 and can be used to capture images of a structure to be measured, e.g., a portion of the roof 60. For example and without limitation, the electronic tablet can run an iOS operating system from Apple Inc. or on an Android operating system from Google LLC—or on any other user device 550 as desired—and can be used with an app from Metal-Era, LLC to be made available from the App Store or the Google Play store, respectively. More specifically, the app can be stored on a non-transitory computer-readable medium of the user device 550. As will also be described below, the user device 550 can be configured to connect wirelessly to a network, as exemplarily shown in FIG. 14. Furthermore, the user device 550 can be configured to connect wirelessly to the measurement tool 510. Both of the measurement tool 510 and the user device 550 can be Bluetooth® Low Energy (BLE) devices.

FIG. 5B is a bottom perspective view of the measurement tool 510 of FIG. 5A. As shown also in FIG. 5C, the measurement tool 510 is shown with the stationary clamp 800 and the dynamic clamp 900 defining a maximum value of the open dimension 560 therebetween. The minimum open dimension 560 can be zero (i.e., the dynamic clamp 900 can contact the stationary clamp 800). The maximum open dimension 560 can be any desirable length. In some aspects, the maximum open dimension 560 can be 24 inches or less. In some aspects, the maximum open dimension 560 can be 36 inches or less. In some aspects, the maximum open dimension 560 can be 48 inches or less. Meanwhile, a maximum length of the measurement tool 510 can be any desirable length. In some aspects, the maximum length can be 44 inches or less. In some aspects, the maximum length can be 48 inches or less. In some aspects, the maximum length can be 60 inches or less.

FIG. 5C is a sectional perspective view of the measurement tool 510 of FIG. 5A taken from line 5C-5C of FIG. 5A and showing the aforementioned main components of the caliper portion 520 and the odometer portion 530, including the bar assembly 600, static handle 700, the stationary clamp 800, the dynamic clamp 900, and the odometer 1000.

Figure 6A:
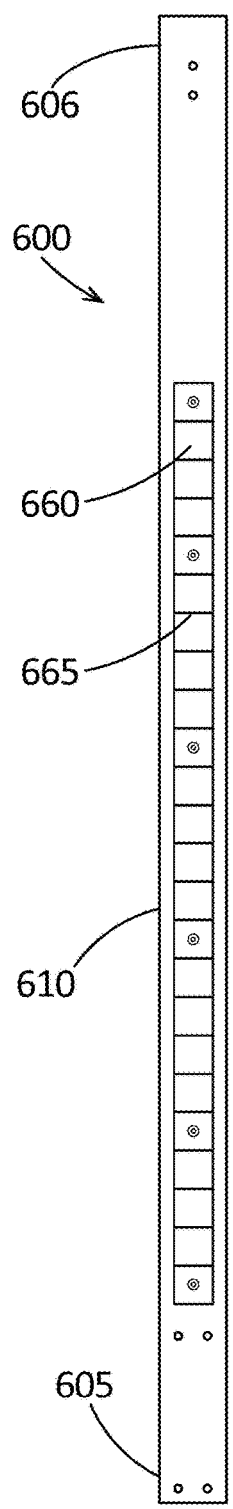
FIGS. 6A-6F are various views of a bar assembly of the measurement tool of FIG. 5A or a portion thereof.

FIGS. 6A-6F are various views of the bar assembly 600 of the measurement tool 510 of FIG. 5A or a portion thereof. FIG. 6A is specifically a top plan view of the bar or bar assembly 600. The bar assembly 600 can comprise a rail or bar body 610, which can be an extrusion having a substantially constant cross-section throughout ("substantially constant" meaning constant except for openings and other variations not affecting the structure's ability to be extruded). More specifically, the bar body 610 can be rigid. In some aspects, the bar body 610 can comprise or can be formed from aluminum. In some aspects, the bar body 610 can comprise or can be formed from any sufficiently rigid material including both metallic and non-metallic materials. The ruler 660 can be secured to or defined in the bar body 610 and, more specifically, a top surface thereof. Again, the bar assembly 600 can define the first end 605 and the second end 606. In some aspects, as shown, the bar body 610 can be monolithic.

Figure 6B:
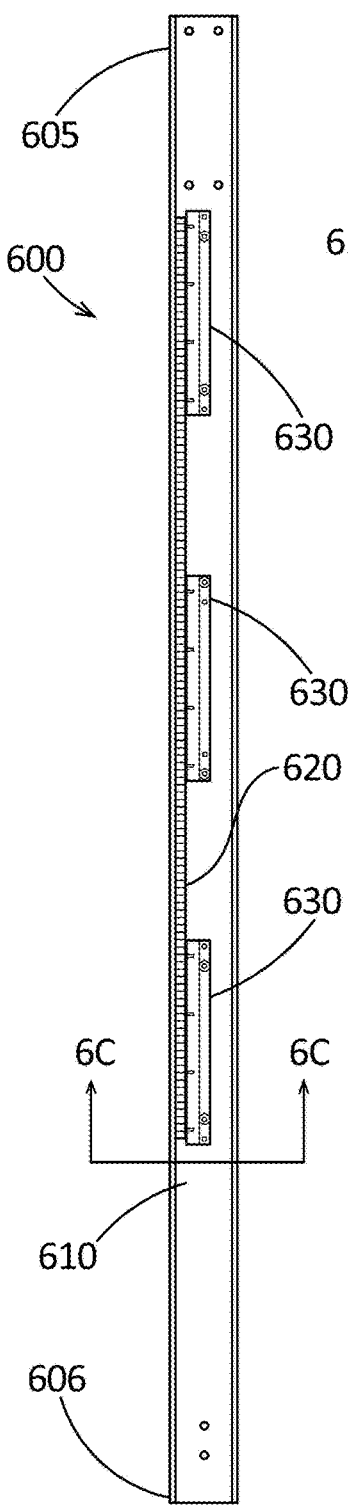

FIG. 6B is a bottom plan view of the bar assembly 600 of FIG. 6A. The bar assembly can comprise a rack 620, which can be configured to engage the dynamic clamp 900 (shown in FIG. 5A). In some aspects, the rack 620 can be monolithic. In other aspects, as shown exemplarily in FIG. 6E, the rack 620 can be comprise multiple parts. One or more retainers 630 can secure or maintain a position of the rack 620 in three directions or along three axes (e.g., along the X, Y, and Z axes) without fasteners extending through a surface of the rack 620 configured to engage the dynamic clamp 900 and potentially interfering with such engagement.

Figure 6C:
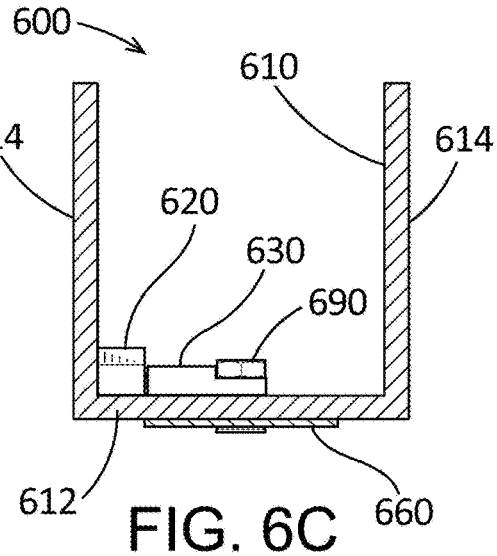

FIG. 6C is a sectional view of the bar assembly 600 of FIG. 6A taken along line 6C-6C of FIG. 6B. In some aspects, as shown, the rack 620 can be secured to the one or more retainer 630 with dowels 670 (shown in FIG. 6E), which can extend, e.g., in a horizontal direction, into holes 628 (shown in FIG. 6F) defined in the rack 620 and matching holes (not shown) defined in the retainers 630, and the one or more retainers 630 can be secured to the bar body 610 with one or more fasteners 690. In some aspects, the fasteners 690 can comprise two mating portions. In other aspects, the fasteners 690 can be configured to install from one direction, e.g., a blind rivet, or monolithic, e.g., a solid rivet. In some aspects, the one or more retainers can define threaded holes, which can be configure to receive the fasteners 690.

The bar body 610 can comprise or can form a U-channel defining a "U" shape. More specifically, the bar body 610 can comprise a base 612 and one or more legs 614, two of which are shown and which can extend from the base 612. More specifically, in some aspects, a height of the legs 614 can be equal to or less than a width of the base 612. In other aspects, the bar body 610 can define another shape, and a sectional modulus thereof can help the bar body 610 to remain straight during normal use of the measurement tool 510 even when loaded such as, for example and without limitation, when the jaws of the dynamic clamp 900 and the stationary clamp 800 are tightly compressed against opposite sides of one of the geometric features 100.

Figure 6D:
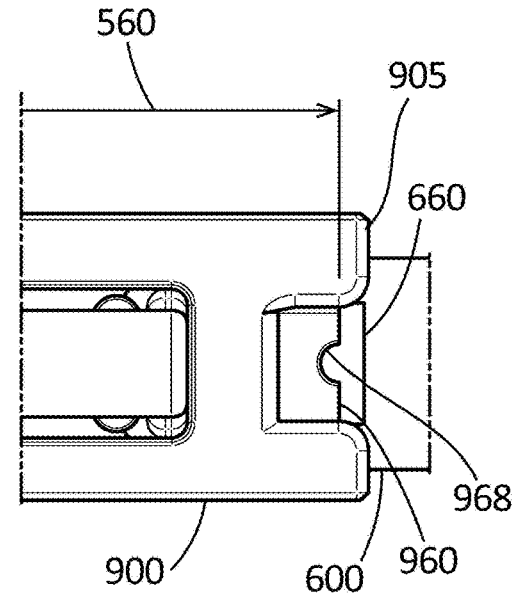

FIG. 6D is a top detail view of the bar assembly 600 of FIG. 6A showing also the dynamic clamp 900 of the measurement tool 510. A manual reading of the open dimension 560 can be made at a first end 905 of the dynamic clamp 900 by reading a position of the measurement datum 960 relative to the graduations 665 (shown in FIG. 6A). A notch or opening 968 can facilitate such reading by providing greater visibility to the ruler 660 and the graduations 665, and in some aspects the measurement datum 960 can be defined by an edge of a portion of the dynamic clamp 900.

Figure 6E:
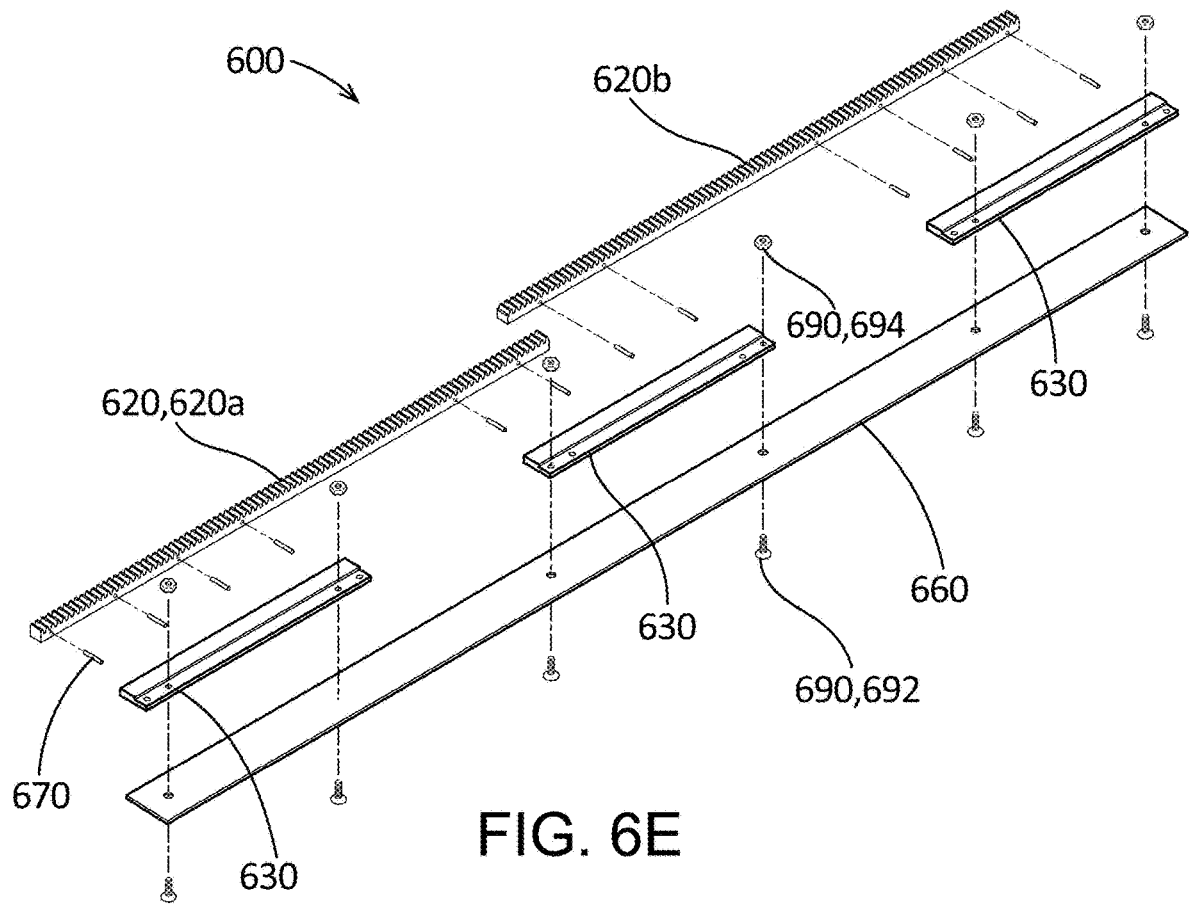

FIG. 6E is an exploded perspective view of the bar assembly 600 of FIG. 6E, with the bar body 610 thereof removed for clarity. The rack 620 can comprise portions 620a,b. As shown, a first portion 692 of the fastener 690 can be a screw and a second portion 694 can be a nut. Each of the first portion 692 and the second portion 694 can define threads. The first portion 692 can extend through a flange of the retainer 630 to secure same.

Figure 6F:
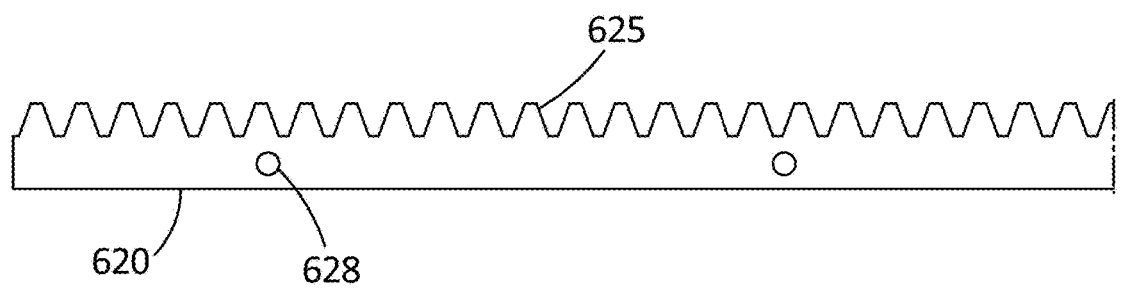

FIG. 6F is a detail side view of a rack 620 of the bar assembly 600 of FIG. 6E. The rack 620 can comprise or define teeth 625, which can be configured to receive a mating part (e.g., a gear 935 shown in FIG. 9D) of the dynamic clamp 900 (shown in FIG. 5A).

Figure 7B:
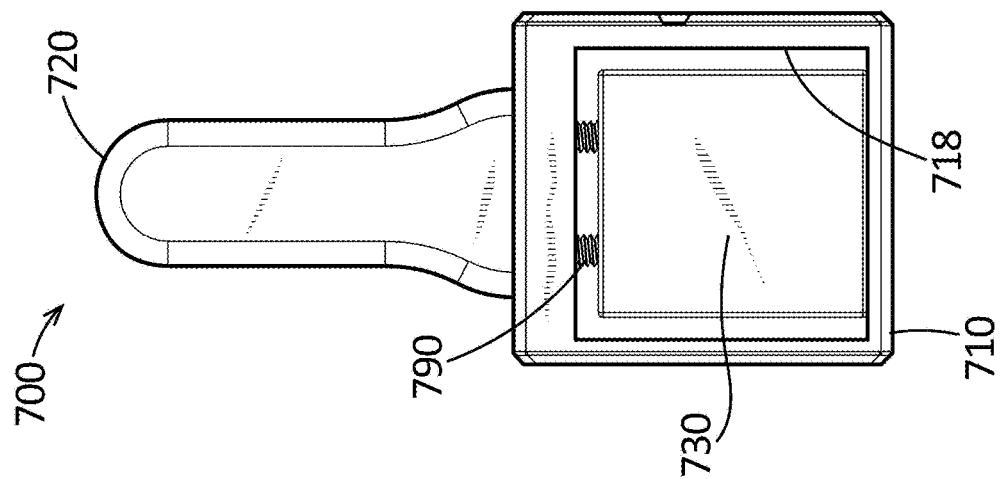
FIGS. 7A-7I are various views of a static handle of the measurement tool of FIG. 5A.
Figure 7A:
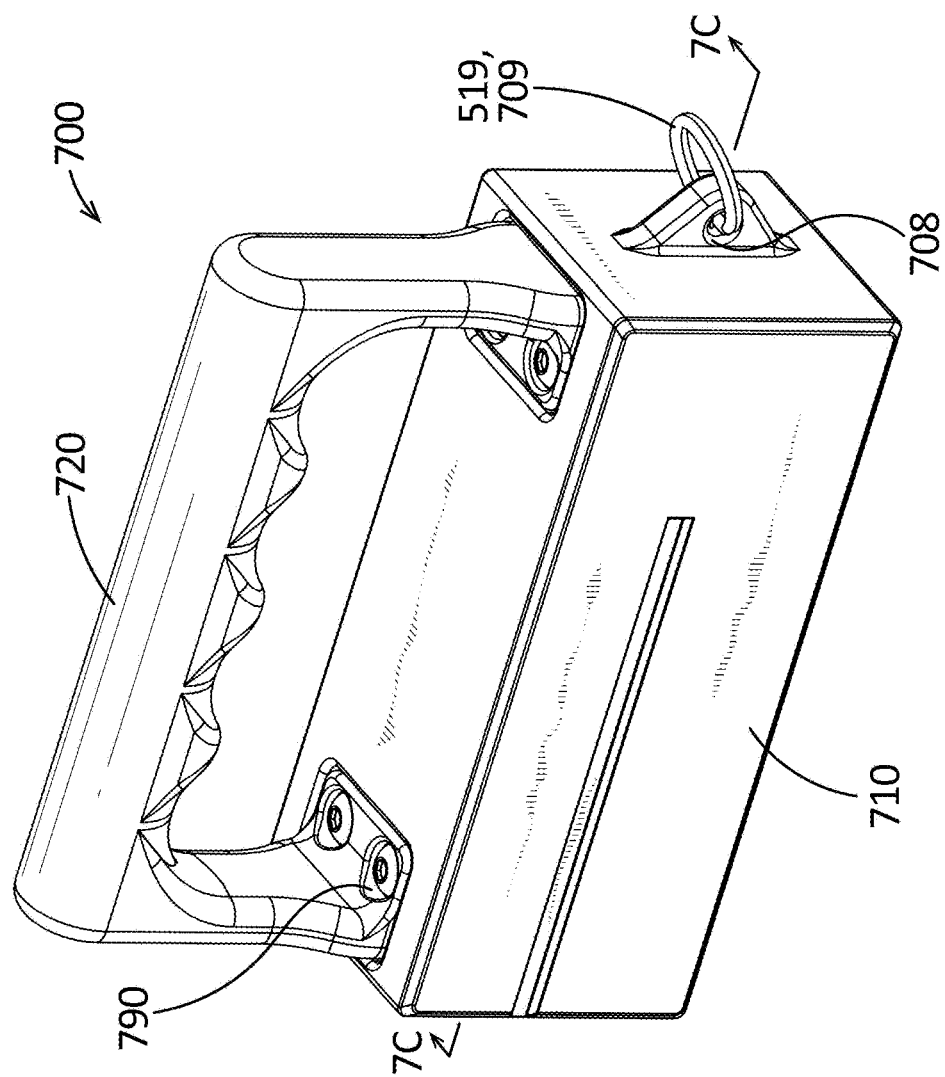

FIGS. 7A-7I are various views of the static handle 700 of the measurement tool 510 of FIG. 5A. FIG. 7A is specifically a top perspective view of the static handle 700 of the measurement tool 510. The static handle 700 can comprise a housing or base 710, which can engage with the bar body 610 (shown in FIG. 6A) and, more generally, the bar assembly 600 (shown in FIG. 6A) of the measurement tool 510. More specifically, the base 710 can receive the bar body 610 (shown in FIG. 6A) within a cavity (e.g., an end opening 718 shown in FIG. 7B) of the base 710. The static handle 700 can comprise a handle grip 720, which can be secured to and extend from the base 710. More specifically, the handle grip 720 can be secured to the base 710 with fasteners 790. In some aspects, the fasteners 790 can secure the static handle 700 to the bar body 610 of the bar assembly 600. The static handle 700 and, more specifically, one of the base 710 and the handle grip 720 can define a mounting hole 708, which can be sized and otherwise configured to receive an attachment fastener 709 at one of the attachment points 519. The attachment fastener 709 can be any fastener including the ring shown, which can optionally receive or be connected to a strap for carrying, storing, or otherwise supporting the measurement tool 510.

FIG. 7B is an end view of the static handle 700 of FIG. 7A. The static handle 700 can further comprise a plug 730. Each of portions of the base 710 and the plug 730 can be rectangular in cross-section. The base 710 and, in some aspects, the plug 730 can define the end opening 718, which can be sized to receive the bar body 610 and, more generally, the bar assembly 600.

Figure 7C:
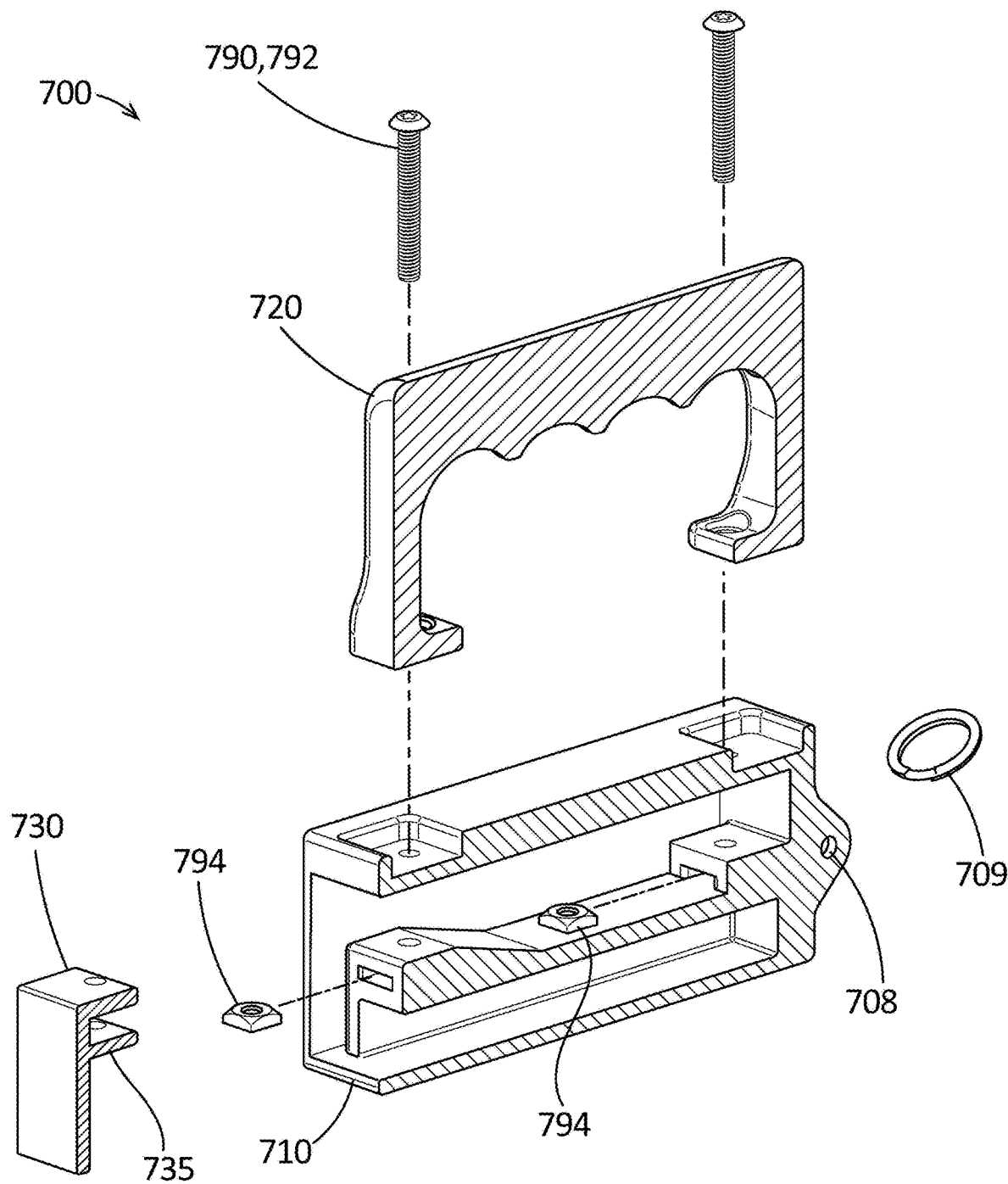

FIG. 7C is an exploded perspective sectional view of the static handle 700 of FIG. 7A taken along line 7C-7C of FIG. 7A. As shown, each of the fasteners 790 can comprise a bolt or first portion 792 and a nut or second portion 794, the latter of which can be embedded and retained inside a portion of the base 710 and can receive the bolt 792. The plug 730 can comprise one or more protrusions or flanges 735, which can be received within the base 710 and can receive one or more of the fasteners 790 therethrough. Flanges of the handle grip 720 can be received with a cavity or recess defined in the base 710. The nuts 794 can also be received within a cavity or recess defined in the base 710. As shown, the handle grip 720 can be a suitcase-style grip, in which a hand of a user is able to extend through and around the handle grip 720.

Figures 7D, 7E, 7F, 7G:
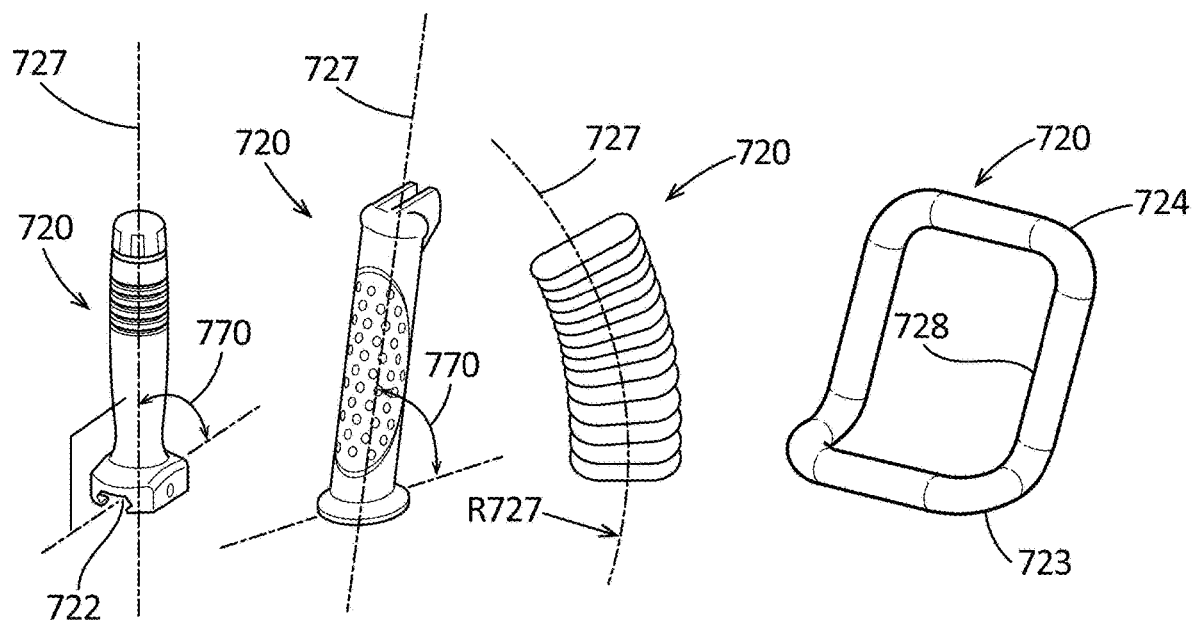

FIGS. 7D-7G are perspective views of the handle grip 720 of the static handle 700 (shown in FIG. 5A) in accordance with several other aspects of the current disclosure. As shown in FIG. 7D, the handle grip 720 of the static handle 700 can be a vertical handle grip. More specifically, an axis or direction of extension 727 of the handle grip 720 can be angled at an angle 770 of 90 degrees with respect to the base 710 (shown in FIG. 7A) of the static handle or with respect to the axis 511 (shown in FIG. 5A) of the measurement tool 510 (shown in FIG. 5A). As also shown, the handle grip 720 can define a slot 722, which can be configured to receive and lockably engage a portion of the base 710.

As shown in FIG. 7E, the handle grip 720 of the static handle 700 (shown in FIG. 5A) can be an angled handle grip. More specifically, the angle 770 can be less than 90 degrees.

As shown in FIG. 7F, the handle grip 720 of the static handle 700 (shown in FIG. 5A) can be a pistol-style grip. More specifically, the axis or direction of extension 727 of the handle grip 720 can be curved and, more specifically, can define a radius R727.

As shown in FIG. 7G, the handle grip 720 of the static handle 700 (shown in FIG. 5A) can be a chainsaw-style handle grip. More specifically, the axis or direction of extension 727 of the handle grip 720 can define an open or, or shown, a closed loop, which can define an opening 728 for passage of at least some of a hand of a user. A second portion 724 of the handle grip 720 can be angled with respect to a first portion 723.

Figures 7H, 7I:
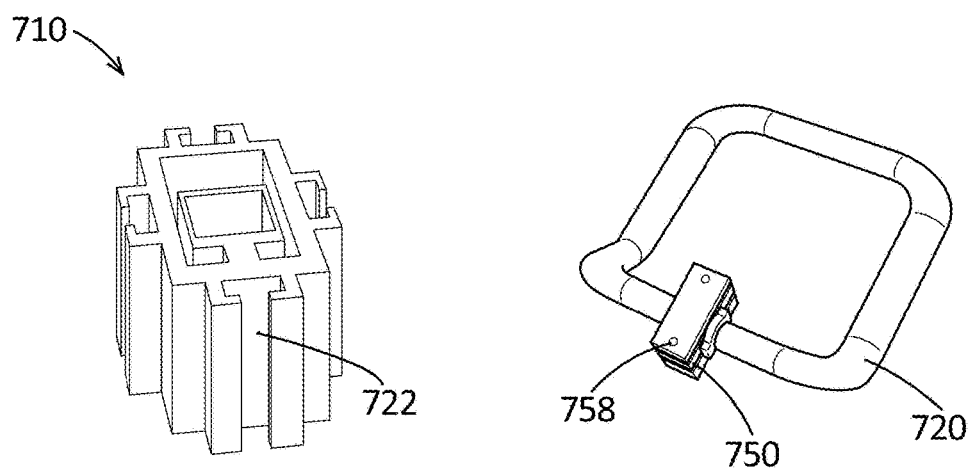

FIG. 7H is a perspective view of the base 710 of the static handle 700 (shown in FIG. 5A) in accordance with another aspect of the current disclosure. The base 710 can define the slot 722, which can be configured to receive and lockably engage a portion of the handle grip 720 (exemplarily shown in FIGS. 7A-7G).

FIG. 7I is a perspective view of the handle grip 720 of a static handle 700 (shown in FIG. 5A), which can comprise a handle adapter 750 in accordance with another aspect of the current disclosure. In some aspects, the handle adapter 750 can define one or more mounting holes 758, which can be used to secure the handle grip 720 to the base 710 (shown in FIG. 7A) with the fasteners 790 (shown in FIG. 7A). In some aspects, the handle adapter 750 can be received within the slot 722 of the base 710 (shown in FIG. 7H). In some aspects, the handle adapter 750 can define the slot 722 or can be otherwise secured to the base 710.

Figure 8C:
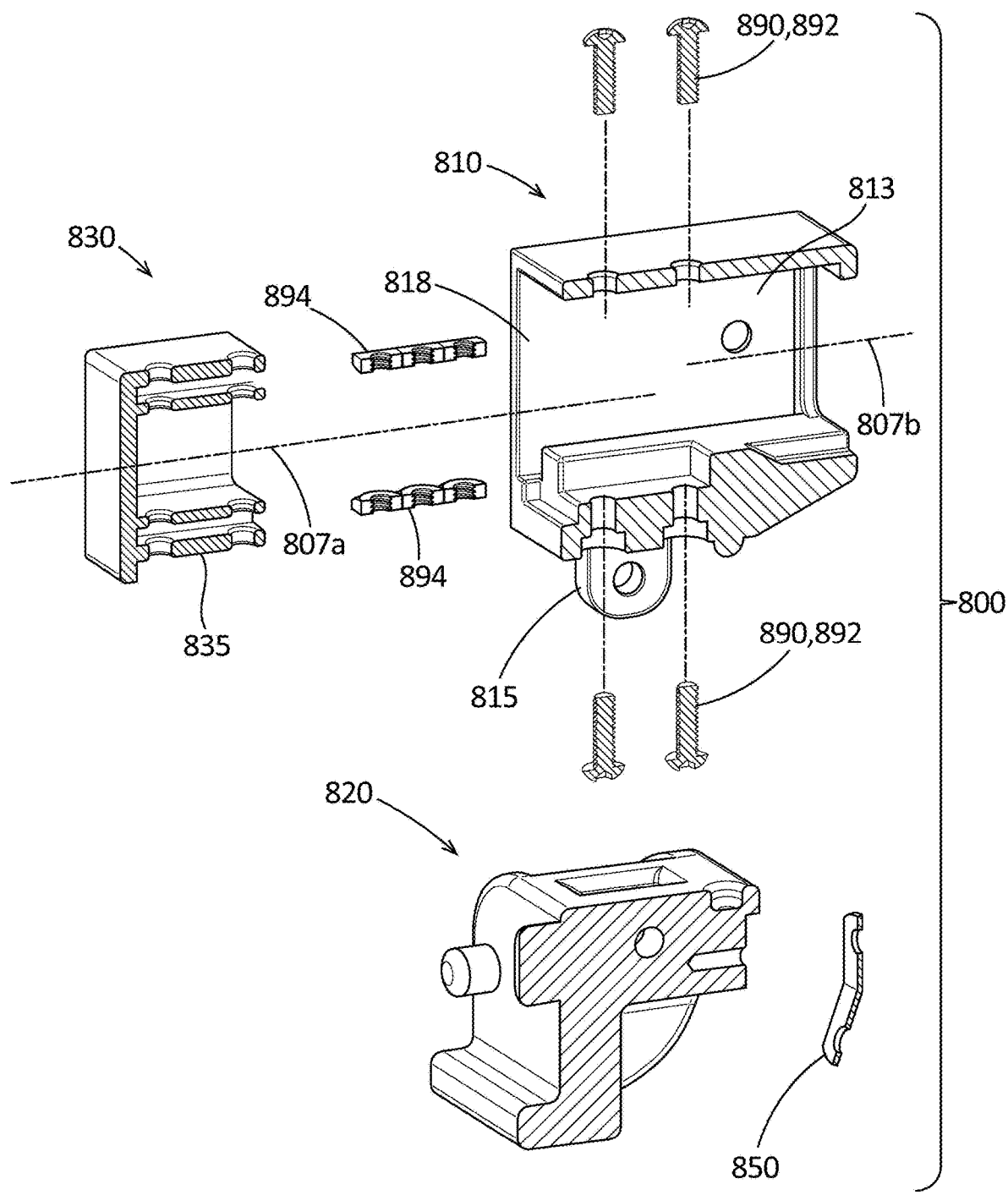

FIGS. 8A-8J are various views of the stationary clamp 800 of the measurement tool 510 of FIG. 5A. FIG. 8A is specifically a front top perspective view of the stationary clamp 800 of the measurement tool 510 in accordance with one aspect of the current disclosure. The stationary clamp 800 can define a front end or first end 805 and a rear end or second end 806. The stationary clamp 800 can comprise a clamp base or base 810, which can engage with the bar body 610 (shown in FIG. 6A) and, more generally, the bar assembly 600 (shown in FIG. 6A) of the measurement tool 510. More specifically, the base 810 can receive the bar body 610 (shown in FIG. 6A) within an end opening or cavity 818 of the base 810. The base 810 can be secured to the bar body 610 with one or more fasteners 890, each of which can comprise a first portion 892 (shown in FIG. 8C) and a second portion 894 (shown in FIG. 8C). Each of the first portion 892 and the second portion 894 can define a threaded portion and can be configured to engage with each other and with at least the base 810. The stationary clamp 800 can comprise a plug 830. The base 810 and, more specifically, the cavity 818 and a cavity 813, which can be defined in respective ends 805,806, can define axes 807a,b, which can be aligned with or, in some aspects, at least parallel to the axis 511 (shown in FIG. 5A) of the measurement tool 510 (shown in FIG. 5A) upon assembly thereof.

The stationary clamp 800 can comprise a clamp prong or jaw 820, which can be secured to the base 810 with a fastener 809. The fastener 809 can be removable without tools. For example and without limitation, the fastener 809 can comprise a pin and a ball detent (not shown) for securing the pin within one or more mounting holes 828 (shown in FIG. 8B) defined in the jaw 820 and one or more mounting holes defined in the base 810. The fastener 809 can comprise a lanyard 840 and a strap or connector 850 for securing the fastener 809 to the base 810 or another portion of the measurement tool 510. The jaw 820 can comprise a mounting portion 821 and a contact portion 822 extending from the mounting portion 821. An orientation or extension direction 827 or a surface of a front end 825 of the jaw 820 can be angled with respect to the axis 807. More specifically, the extension direction 827 can be angled at 90 degrees with respect to the axis 807. The jaw 820 can be configured to contact an object to be measured. More specifically, as shown, the front end 825 can extend from a surrounding portion of the jaw 820 and can be configured to contact the object to be measured.

FIG. 8B is a rear top perspective view of the stationary clamp 800 of FIG. 5A. The base 810 can define one or more mounting holes 808 for receipt of a fastener 1009 (shown in FIG. 10A). On the second end 806, the base 810 can define the cavity 813 for receipt of a protrusion 1013 (shown in FIG. 10A) of a housing 1010 (shown in FIG. 10A) of the odometer 1000 (shown in FIG. 10A). The cavity 813 can comprise an orientation groove 814, which can help ensure a correct orientation of the odometer 1000 during assembly with the base 810 such that only one orientation is possible.

FIG. 8C is an exploded side perspective sectional view of the stationary clamp 800 of FIG. 8A comprising the jaw 820 in accordance with another aspect of the current disclosure. The plug 830 can comprise one or more protrusions or flanges 835, which can be received within the base 810 and can receive one or more of the fasteners 890 therethrough. The plug 830 can seal or close the cavity 818 in an assembled condition of the measurement tool 510 (shown in FIG. 5A). One of the base 810 and the jaw 820 can comprise one or more tabs 815, which can be received within the other of the base 810 and the jaw 820. As shown, the base 810 can comprise a pair of the tabs 815 (the second tab 815 shown in FIG. 8D).

Figure 8E:
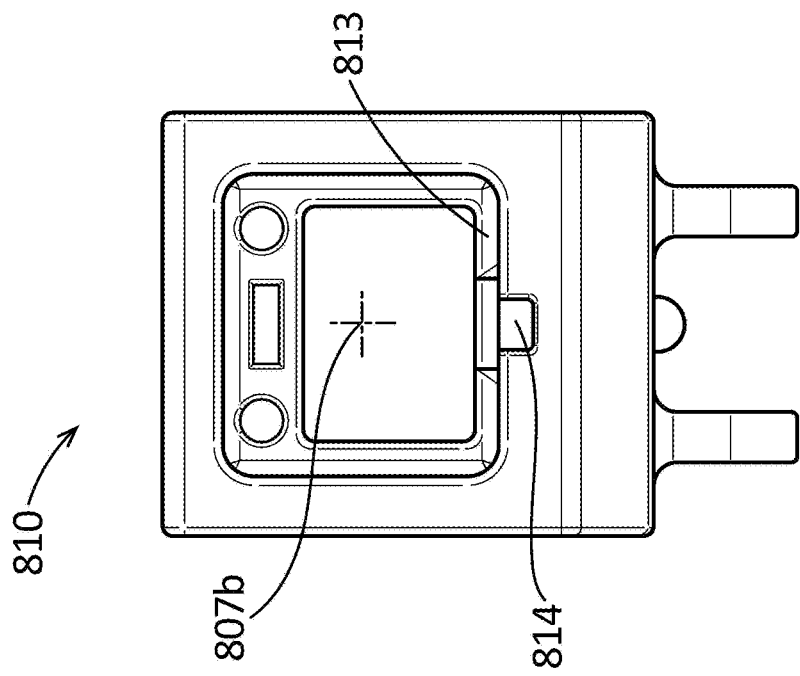
Figure 8D:
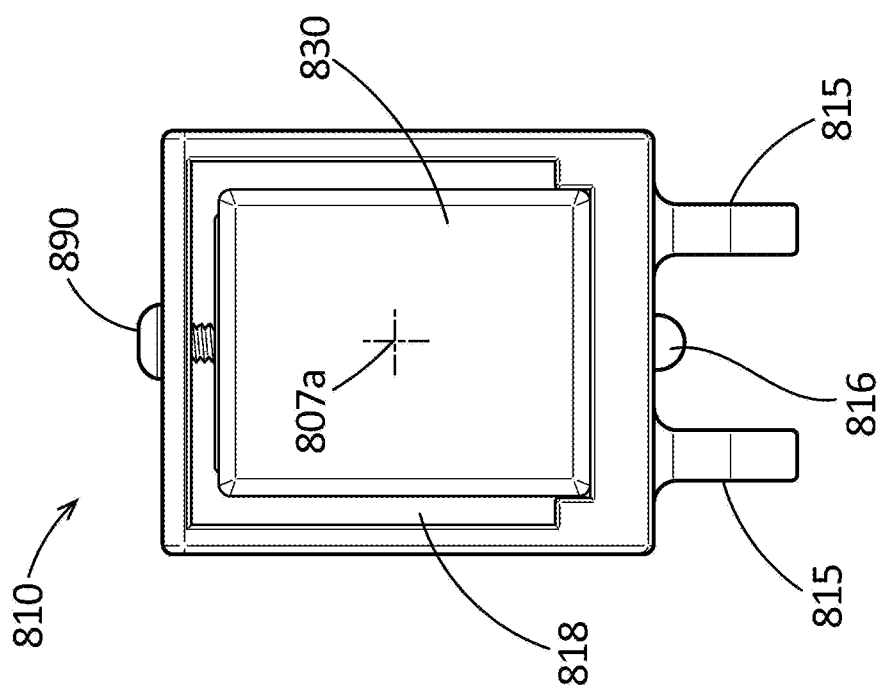

FIG. 8D is a front end view of the base 810 of the stationary clamp 800 of FIG. 8A. Each of portions of the base 810 and the plug 830 can be rectangular in cross-section. On the first end 805, the base 810 and, in some aspects, the plug 830 can define the cavity 818, which can be sized to receive the bar body 610 (shown in FIG. 6A) and, more generally, the bar assembly 600 (shown in FIG. 6A). One of the base 810 and the jaw 820 can comprise one or more protrusions 816, which can be rounded and can further fix a position of the jaw 820 with respect to the base 810. As shown, the base 810 can define the protrusion 816.

FIG. 8E is a rear end view of the base 810 of the stationary clamp 800 of FIG. 8A. As shown, the cavity 813 can be rectangular in cross-section and can define rounded or radiused corners.

Figure 8H:
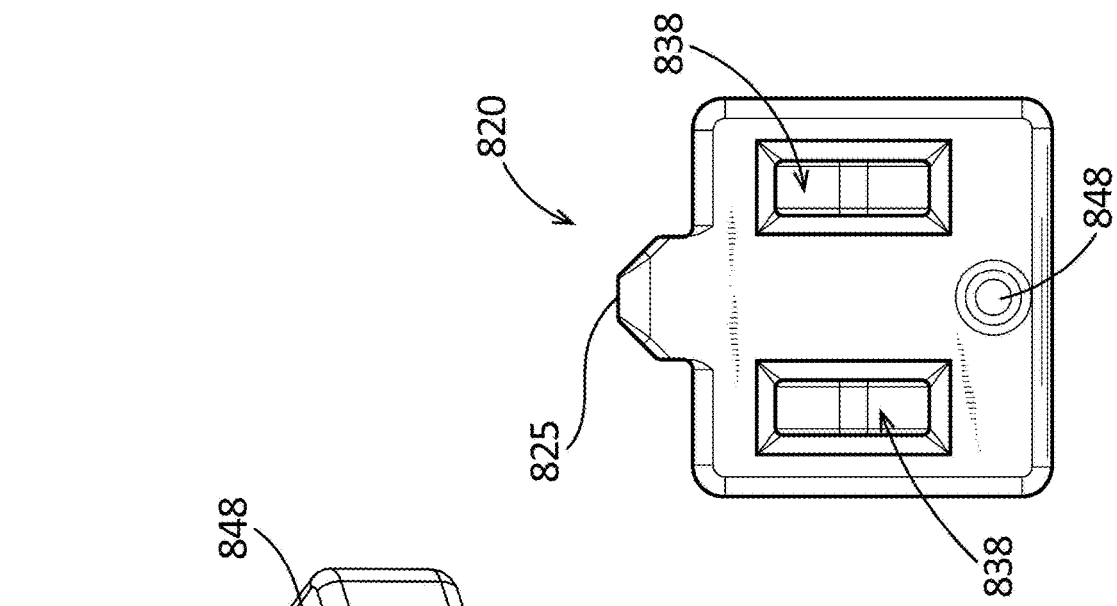
Figure 8G:
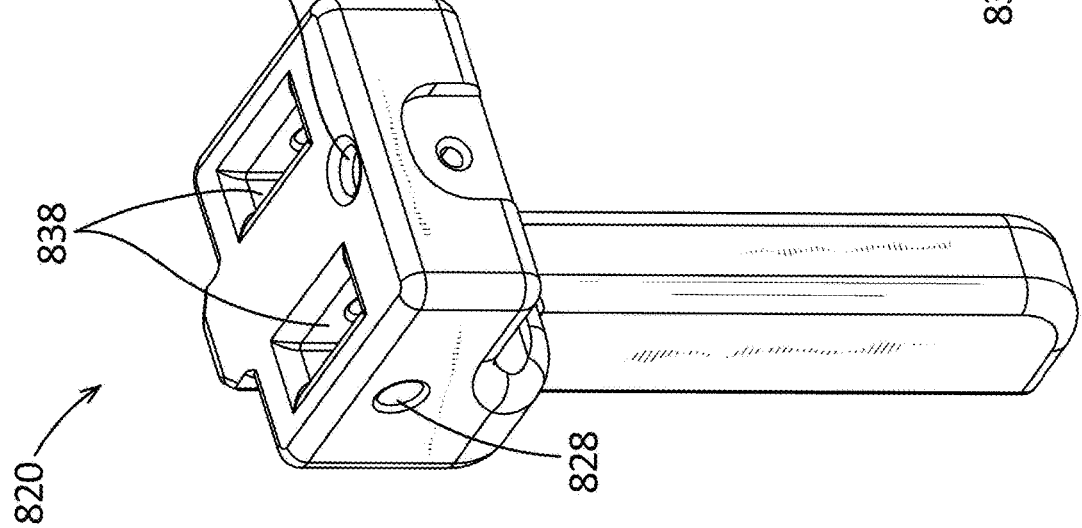
Figure 8F:
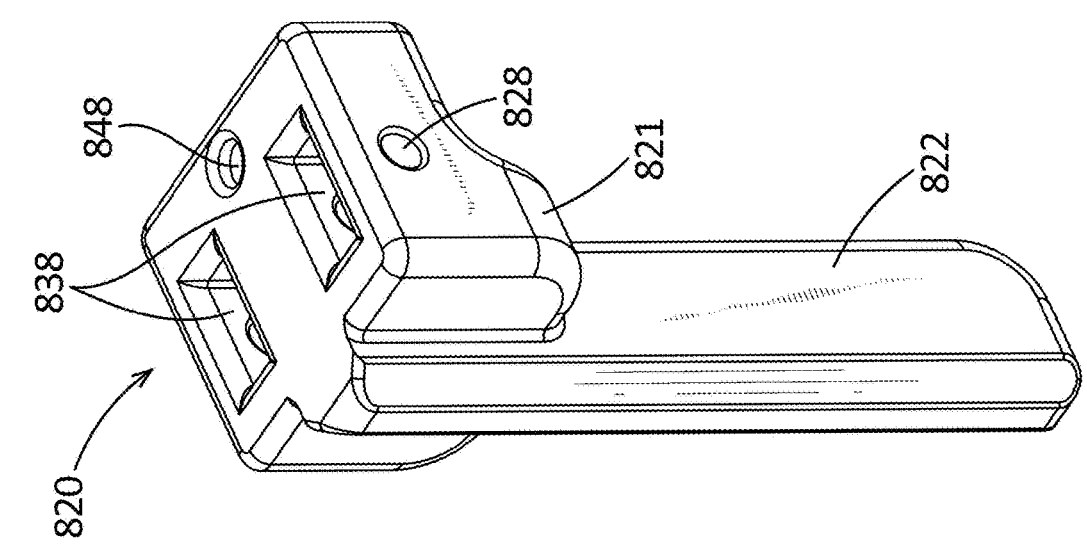

FIG. 8F is a front end perspective view and FIG. 8G is a rear end perspective view of the jaw 820 of the stationary clamp 800 of FIG. 8A. In some aspects, as shown, the jaw 820 can define one or more cavities 838 for receipt of the tabs 815 and a cavity 848 for receipt of the protrusion 816 of the base 810.

FIG. 8H is a top view of the jaw of FIG. 8A. As shown, a frontmost portion of the front end 825 of the jaw 820 can define a thin edge in a left-to-right direction such that the jaw 820 can contact an interior surface of a radiused geometric feature 100 and the jaw 820 remain flush or flat with the surface, thus ensuring an accurate measurement by the measurement tool 510 (shown in FIG. 5A). In some aspects, the front end 825 of the jaw 820 can be rounded.

Figure 8J:
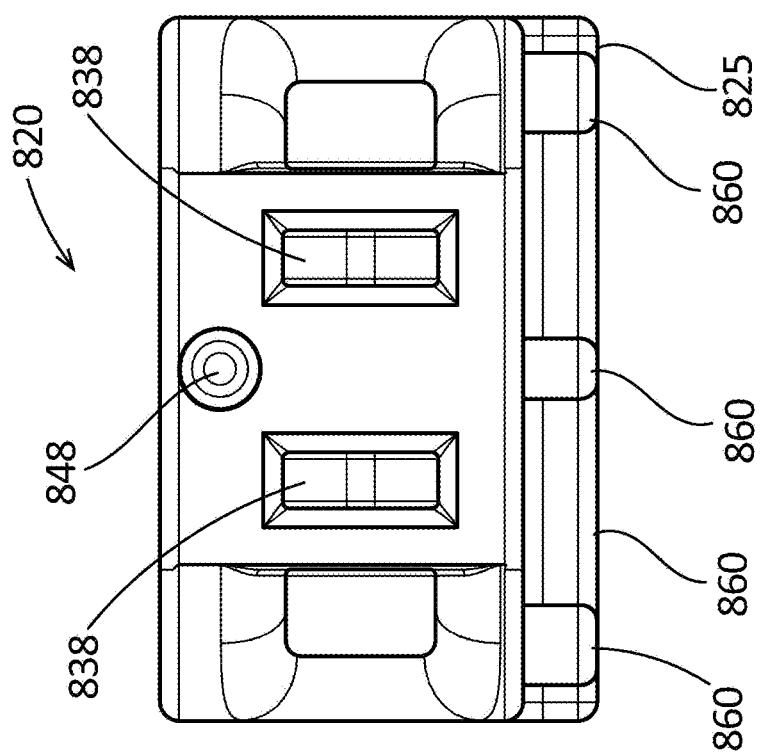
Figure 8I:
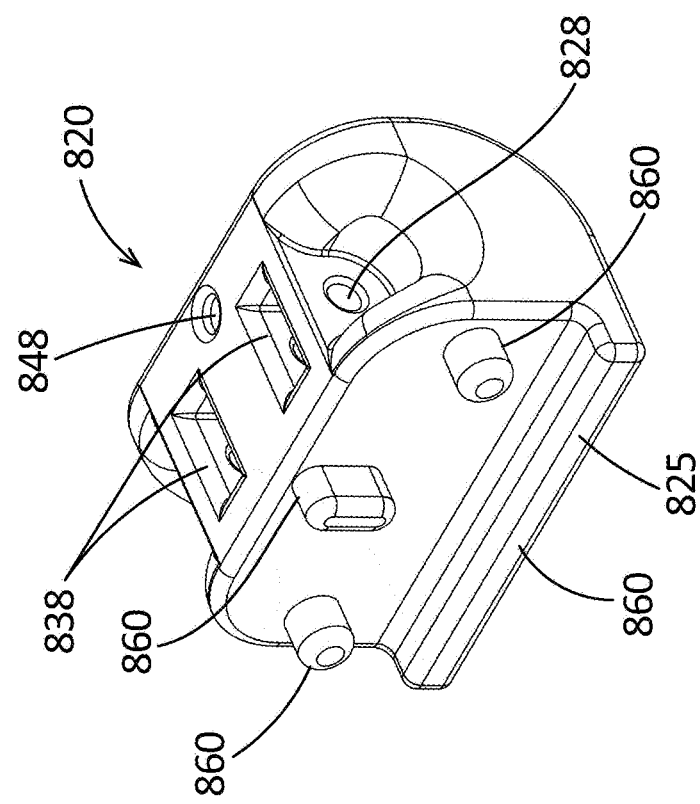

FIG. 8I is a front end perspective view and FIG. 8J is a top view of the jaw 820 of FIG. 8C. The clamp prongs can be customized for different geometric features 100 (shown in FIG. 1A) and user preferences during use. For example, clamp prongs or protrusions 860 of the jaw 820 can define frontmost portions of the front end 825 of the jaw 820, which can be offset from each other and, as shown in FIG. 8J, can be defined in the same plane such that the jaw 820 can be placed in contact with a surface of the geometric feature 100 (shown in FIG. 1B) without the jaw 820 tending to rock or rotate with respect to the geometric feature 100. One or more of the protrusions 860 can be a rounded protrusion as shown in a pair of the protrusions 860, a lip as shown in the lowermost protrusion 860, or an elongated protrusion as shown in the uppermost protrusion 860. The protrusions 860 or another geometry can effectively reduce a contact surface area of the jaw 820 (i.e., a surface of the jaw 820 in contact with a surface being measured) and can thereby reduce a clamping force that a user need apply to press any flapping membrane 62 (shown in FIG. 1F) or other loose portion of a structure into its proper final position before and during measurement capture. Because the user-applied force is distributed across the smaller contact surface area, the effective clamping force or pressure can be higher—sometimes many times (e.g., two or more times) higher—than the force applied by the user. As such, a contact surface area of the front end 825 can be smaller than a cross-sectional area of a portion of the jaw 820 that is offset from the front end 825 and that is taken in a plane that is parallel to the front end 825.

Figure 9A:
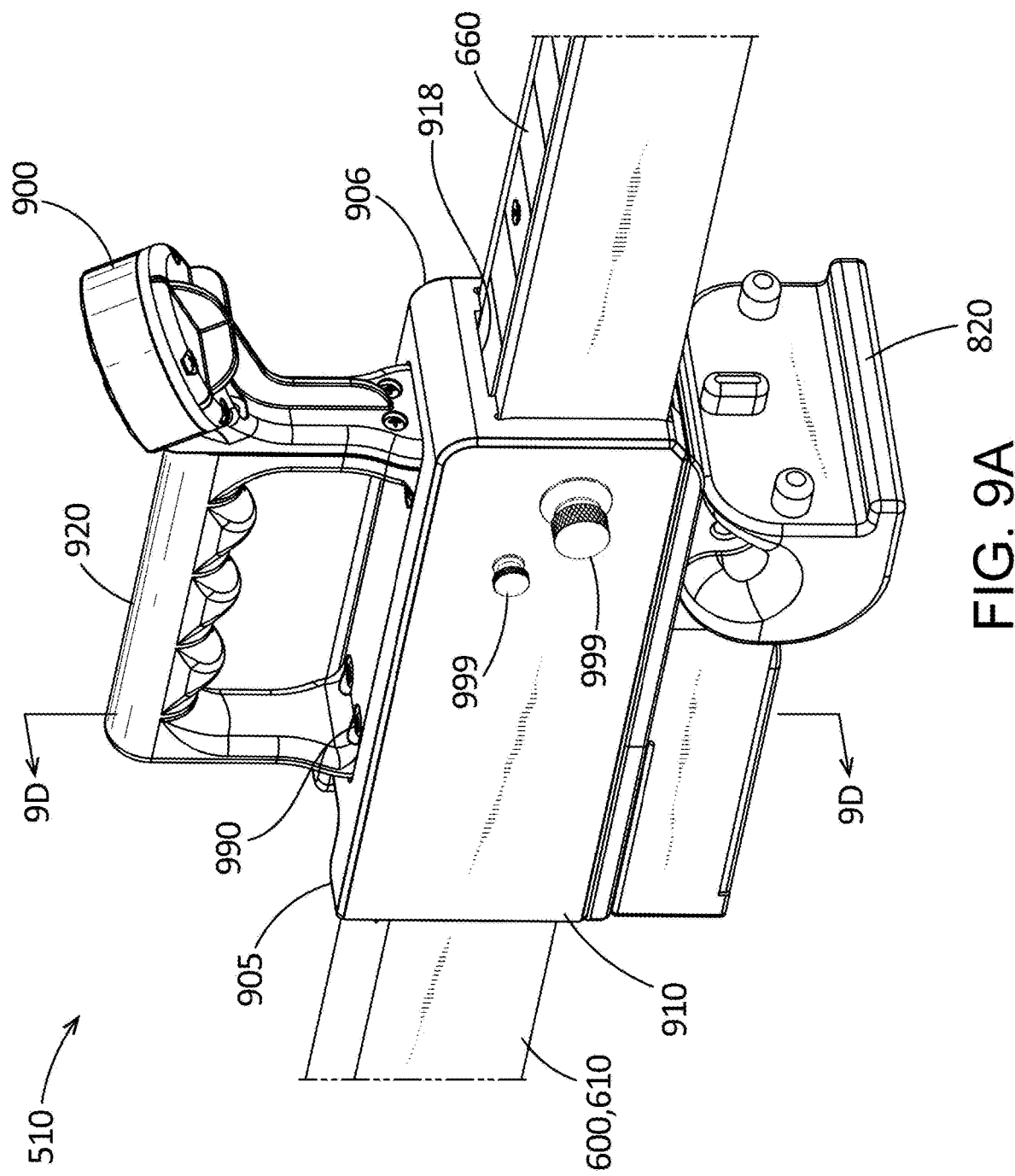
FIGS. 9A-9H are various views of a dynamic clamp of the measurement tool of FIG. 5A.
Figure 9C:
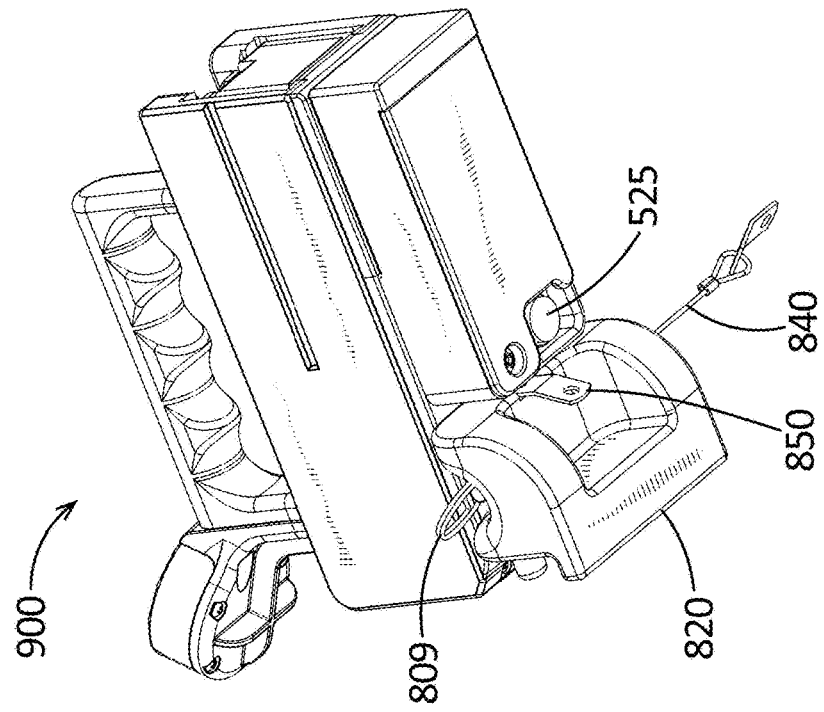
Figure 9B:
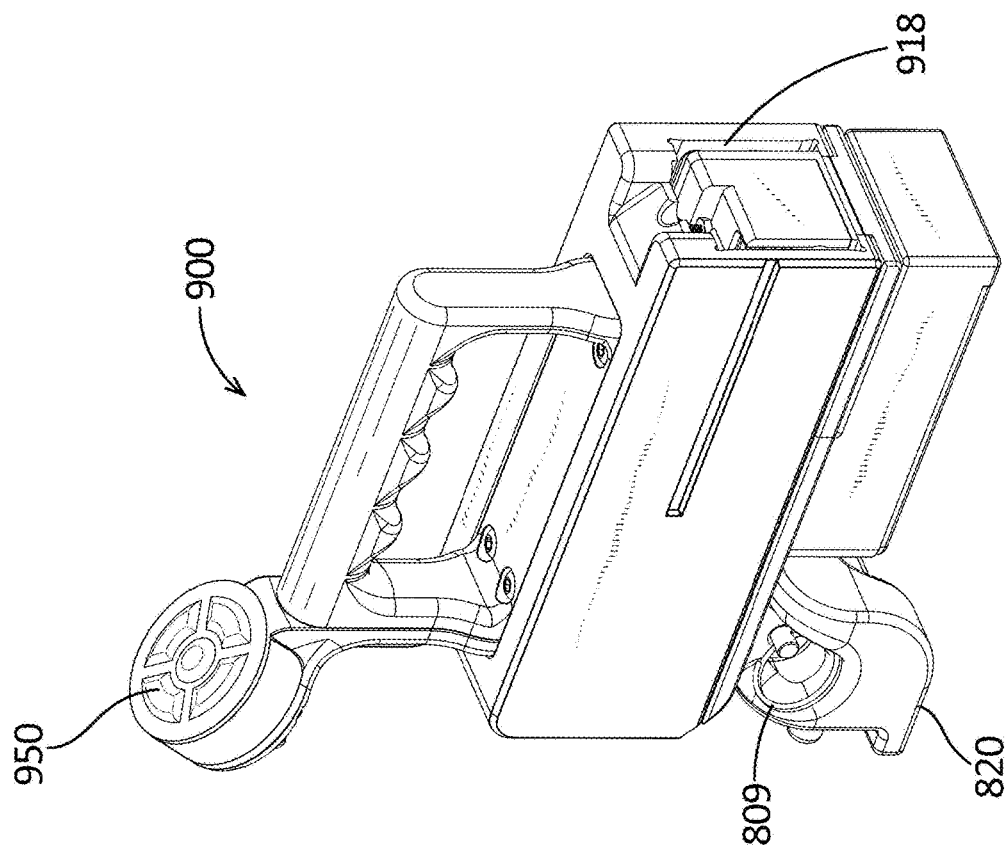

FIGS. 9A-9H are various views of the dynamic clamp 900 of the measurement tool 510 of FIG. 5A. FIG. 9A is specifically a rear perspective view of the dynamic clamp 900 assembled to the bar assembly 600 of the measurement tool 510, and FIG. 9B is a front top perspective view and FIG. 9C is a front bottom perspective view of the dynamic clamp 900 by itself. The dynamic clamp 900 can comprise a housing or base 910, which can engage with the bar body 610 and, more generally, the bar assembly 600 of the measurement tool 510. More specifically, the base 910 can receive the bar body 610 within a cavity 918 of the base 910.

The dynamic clamp 900 can comprise a handle grip 920, which can be secured to and extend from the base 910. In some aspects, the handle grip 920 can comprise one or more features of the handle grip 720 (shown in FIG. 7A) of the static handle 700 (shown in FIG. 7A). In some aspects, a structure of the handle grip 920 can be identical to a structure of the handle grip 720. The handle grip 920 can be secured to the base 910 with fasteners 990. The dynamic clamp 900 can comprise one or more locking fasteners 999, which can lock a position of the dynamic clamp 900 with respect to the bar body 610 as a user may desire. More specifically, as shown, each locking fastener 999 can comprise a thumbscrew for securing a position of the dynamic clamp 900 quickly and without tools. The locking fastener 999 can rely on friction to secure a position of the dynamic clamp 900 with respect to the bar assembly 600. More specifically, the locking fastener 999 can rely on friction between a surface of the locking fastener 999 and a surface of the bar body 610 to secure the position of the dynamic clamp 900.

The dynamic clamp 900 can comprise the jaw 820, which can be secured to the base 910 with the fastener 809 (shown in FIG. 9B). Again, the fastener 809 can comprise the lanyard 840 (shown in FIG. 9C) and the connector 850 (shown in FIG. 8A and, as incorporated into the dynamic clamp 900, FIG. 9B) for securing the fastener 809 to the base 910 or another portion of the measurement tool 510. Again, the jaw 820 as a whole can be interchangeable, including without tools as shown, which can allow the replacement with and use of the jaw 820 having a particular shape and configuration that is most appropriate for the geometric feature 100 to be measured. The dynamic clamp 900 can define the first end 905 and a second end 906, which can be distal from the first end 905.

As shown in FIG. 9B, the measurement tool 510 and, more specifically, the user input interface 950 can comprise a plurality of buttons or control surfaces in a cross configuration called the "D-Pad". The user input interface 950 can allow the user to control the app by pushing buttons or control surfaces, which can cause the app to take some action according to the context of the app. This is different from many other systems in which the app controls the tool or other device as is the case with, for example and without limitation, a remote-control vehicle controllable by an app or a remote HVAC thermostat controllable by an app.

Figure 9D:
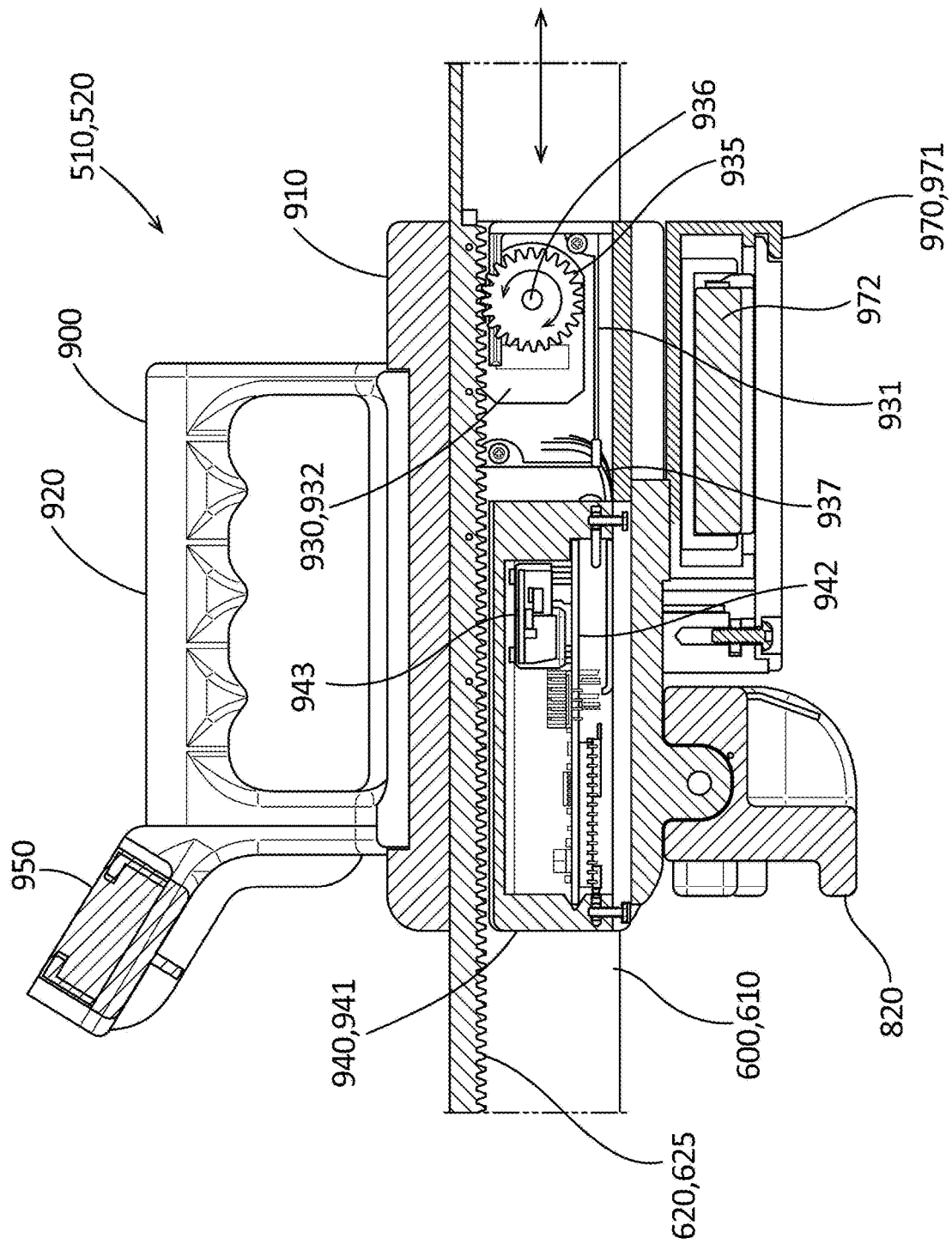

FIG. 9D is a side sectional view of the dynamic clamp 900 of FIG. 9A taken along line 9D-9D of FIG. 9A. The dynamic clamp 900 can comprise a first sensor or distance sensor or sensor 930, which can measure movement of the dynamic clamp 900 and thereby the wall width 75 (shown in FIG. 1F) of the parapet 70 (shown in FIG. 1F). More specifically, the sensor 930 can be configured to sense translation of the dynamic clamp with respect to the bar assembly 600. More specifically, the sensor 930 can be or can comprise an encoder 932. As shown, the rack 620 and, more specifically, the teeth 625 thereof can engage the sensor 930 and, more directly, the gear 935 and an axle or shaft 936 of the sensor 930. The encoder 932 of the sensor 930 can be positioned inside a housing 931 and, more generally, inside the base 910 of the dynamic clamp 900. The encoder 932, which can be a rotary encoder, can measure fine changes in an angular position of—and thus can detect rotation of—the shaft 936. Movement of the dynamic clamp 900 with respect to the bar assembly 600 and the rack 620 thereof can therefore cause rotation of the gear 935 and the shaft 936 received within the gear 935, and such rotation can be sensed by the encoder 932. A harness 937 can place the sensor 930 in electrical communication with a printed circuit board (PCB) 942 of the controller 940 of the dynamic clamp 900. The encoder 932 can be an incremental rotary encoder connected to the gear 935 with the shaft 936. As described elsewhere herein, the gear 935 can ride along a gear rack down the length of the body, e.g., the bar assembly 600, of the measurement tool 510, which can create a large caliper assembly able to measure the wall width 75 of the various geometric elements 100 of the parapet 70 and can do so with sub-millimeter accuracy. The dynamic clamp 900 can expose these measurements via BLE Attributes, which the app as loaded onto the user device 550 can poll whenever the app needs the data.

The controller 940 can comprise a housing 941 and the PCB 942 and can, more generally, be positioned inside the base 910 of the dynamic clamp 900. The dynamic clamp 900 and, more specifically, the PCB 942 can comprise the sensor 943, which can be a second sensor or orientation sensor. More specifically, the orientation sensor 943 can be or can comprise an inertial measurement unit (IMU), which can measure an orientation of the measurement tool 510. More specifically, the orientation sensor 943 can sense roll, pitch, and yaw (all shown in FIG. 5A) of the measurement tool 510 for measurement of angles and curved sections of the parapet 70 and, more generally, any of the geometric features 100 (shown in FIG. 1B). More specifically, in combination with data from the caliper portion 520 of the measurement tool 510, data from the orientation sensor 943 can help fix a position and orientation of each of the measured surfaces of the geometric feature 100 (shown in FIG. 1B) in three-dimensional space. The orientation sensor 943 can be, for example, model MTi-630 from Xsens North America Inc. of El Segundo, California. In some aspects, the orientation sensor 943 can be good enough or, more specifically, sensitive enough to not be affected by noise. In some aspects, the orientation sensor 943 can be configured to reject or filter soft iron effects or hard iron effects or both soft iron effects and hard iron effects. In some aspects, the orientation sensor or code contained therein can comprise a fusion algorithm. In some aspects, the orientation sensor 943 can be encapsulated—either by the housing 941 being sealed or by the orientation sensor 943 being sealed against intrusion by moisture or other substances even separate from assembly into the housing 941. In some aspects, the ingression protection (IP) rating of individual components of the measurement tool 510 or the measurement tool 510 overall can be at least IP64.

More specifically, the orientation sensor 943 can be or can comprise a 9-axis IMU, which can provide the attitude and heading information in the form of both Euler {Roll, Pitch, Yaw} and Quaternion outputs. The Euler output gives human-readable values in degrees, while the Quaternions can be used for precise scaler angle calculations. More specifically, the orientation sensor 943 can comprise a 3-axis accelerometer, a 3-axis magnometer or magnetometer, and a 3-axis gyroscope. The accelerometer can sense movement of the tool 510, the magnetometer can measure magnetic field forces in the vicinity of the tool 510 and help lock on to magnetic North, and the gyroscope can help stabilize readings, even near large iron and other metal structures which might interfere with its operation. More specifically, the orientation sensor 943 can be brought within close proximity to large ferrous objects without any shift in yaw readings of the orientation sensor 943.

Operation of the orientation sensor 943 and, more generally, the caliper portion 520 and the measurement tool 510 requires no GPS (global positioning system) technology. In some aspects, however, the orientation sensor 943 can interact with GPS functionality provided elsewhere in the caliper portion 520, the measurement tool 510, or the system 500. In some aspects, the measurement tool 510 or any portion thereof can comprise a GPS chip or transmitter for identifying a location of the measurement tool 510 or a portion thereof.

The dynamic clamp 900 can comprise a power supply unit 970, which can comprise one or more batteries 972 and can be positioned inside a housing 971. More specifically, the one or more batteries 972 can comprise a lithium-ion battery, which can be configured to produce an 8 VDC output power source. In some aspects, the housing 971 can further function as a cover for the base 910 of the dynamic clamp 900. In some aspects, the housing 971 can be assembled to a bottom of the base 910.

Figure 9E:
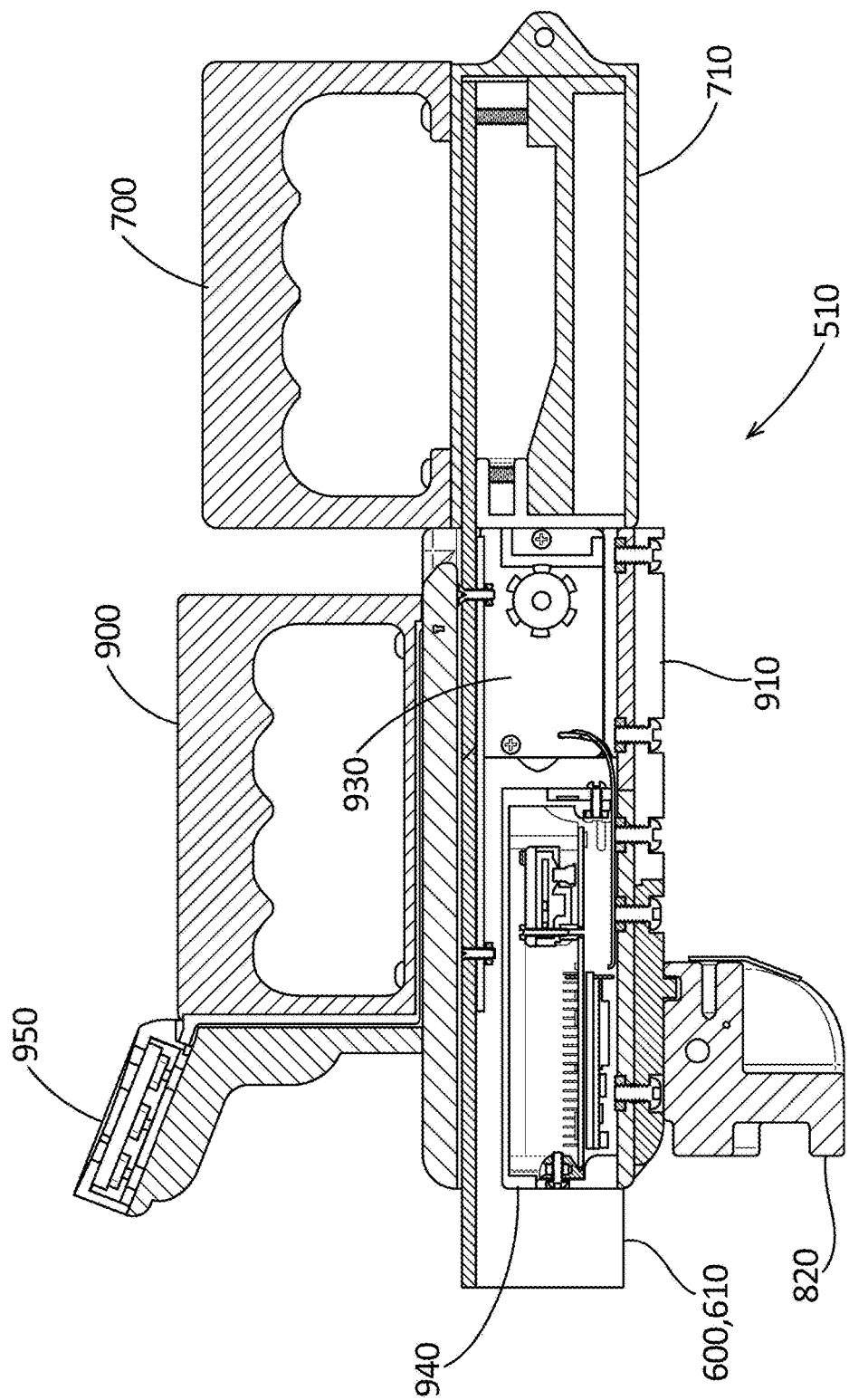

FIG. 9E is a side sectional view of the dynamic clamp 900 of FIG. 9A taken along line 9E-9E of FIG. 5A with the static handle 700 and the dynamic clamp 900 of the measurement tool 510 assembled to the bar assembly 600. More specifically, the dynamic clamp 900 can be in contact with the static handle 700 of FIG. 7A and the jaws 820 of the dynamic clamp 900 and the stationary clamp 800 of FIG. 8A not be in contact with each other (i.e., the jaws 820 of the stationary clamp 800 and the dynamic clamp 900 can be open) in accordance with another aspect of the current disclosure. In some aspects, as shown, the power supply unit 970 (shown in FIG. 9D) and the housing 971 (shown in FIG. 9D) need not be assembled to the bottom of the base 910 and can be assembled elsewhere to the base 910.

Figure 9F:
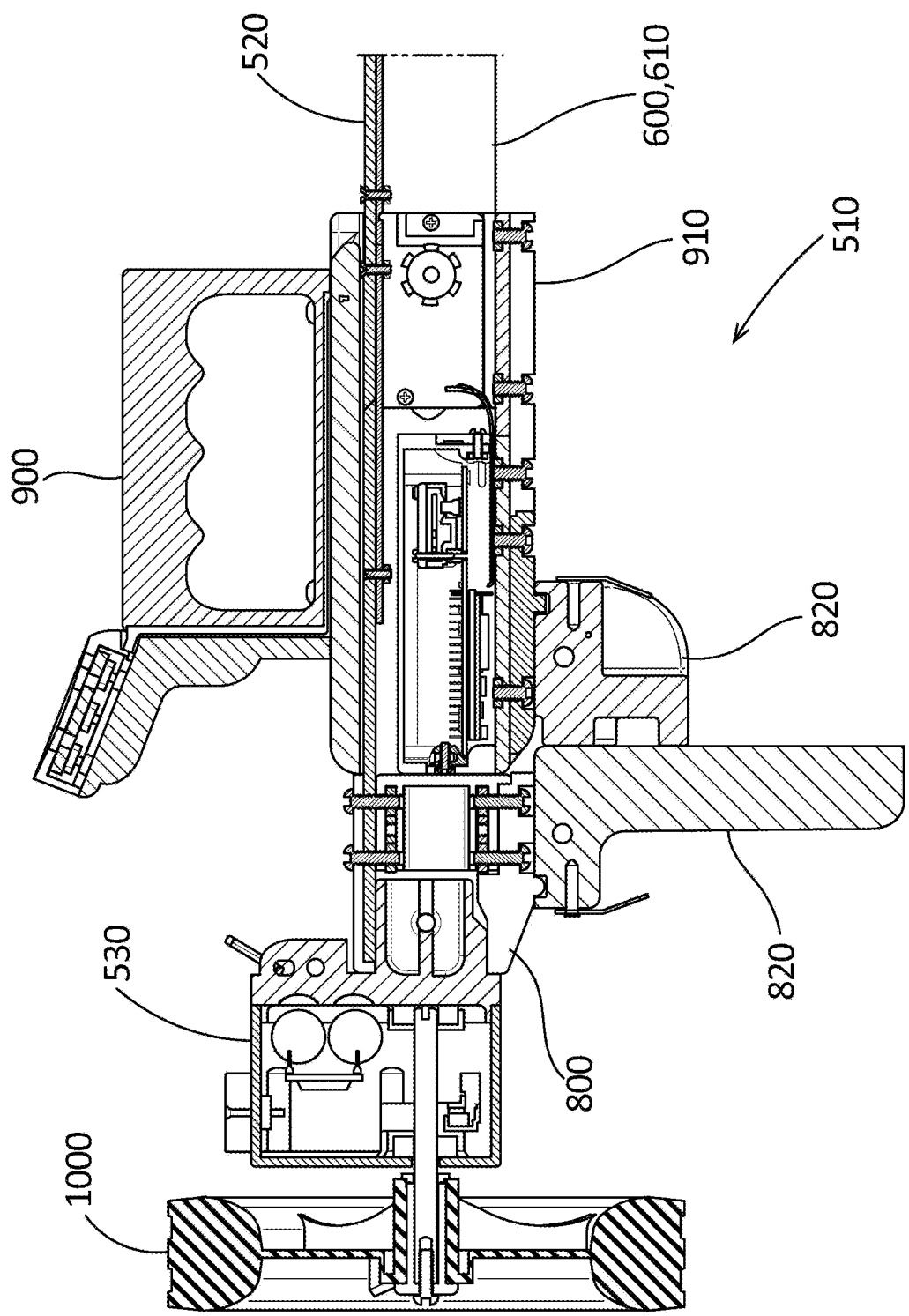

FIG. 9F is a side sectional view of the dynamic clamp 900 of FIG. 9E taken along line 9E-9E of FIG. 5A with the dynamic clamp 900 of the measurement tool 510 in contact with the stationary clamp 800 of FIG. 8A (i.e., the jaws 820 of the measurement tool 510 are closed). As shown, a portion of the odometer portion 530 or, more specifically, the odometer 1000 can be received within the caliper portion 520 of the measurement tool 510 and, more specifically within the stationary clamp 800 thereof. In other aspects, the jaws 820 of the measurement tool 510 can define a gap (not shown) between the jaws 820 when fully "closed" such as, for example and without limitation, one inch. Such a minimum gap can be defined between the jaws 820 when the jaws 820 or the separate clamps 800,900 are closest to each other.

Figure 9G:
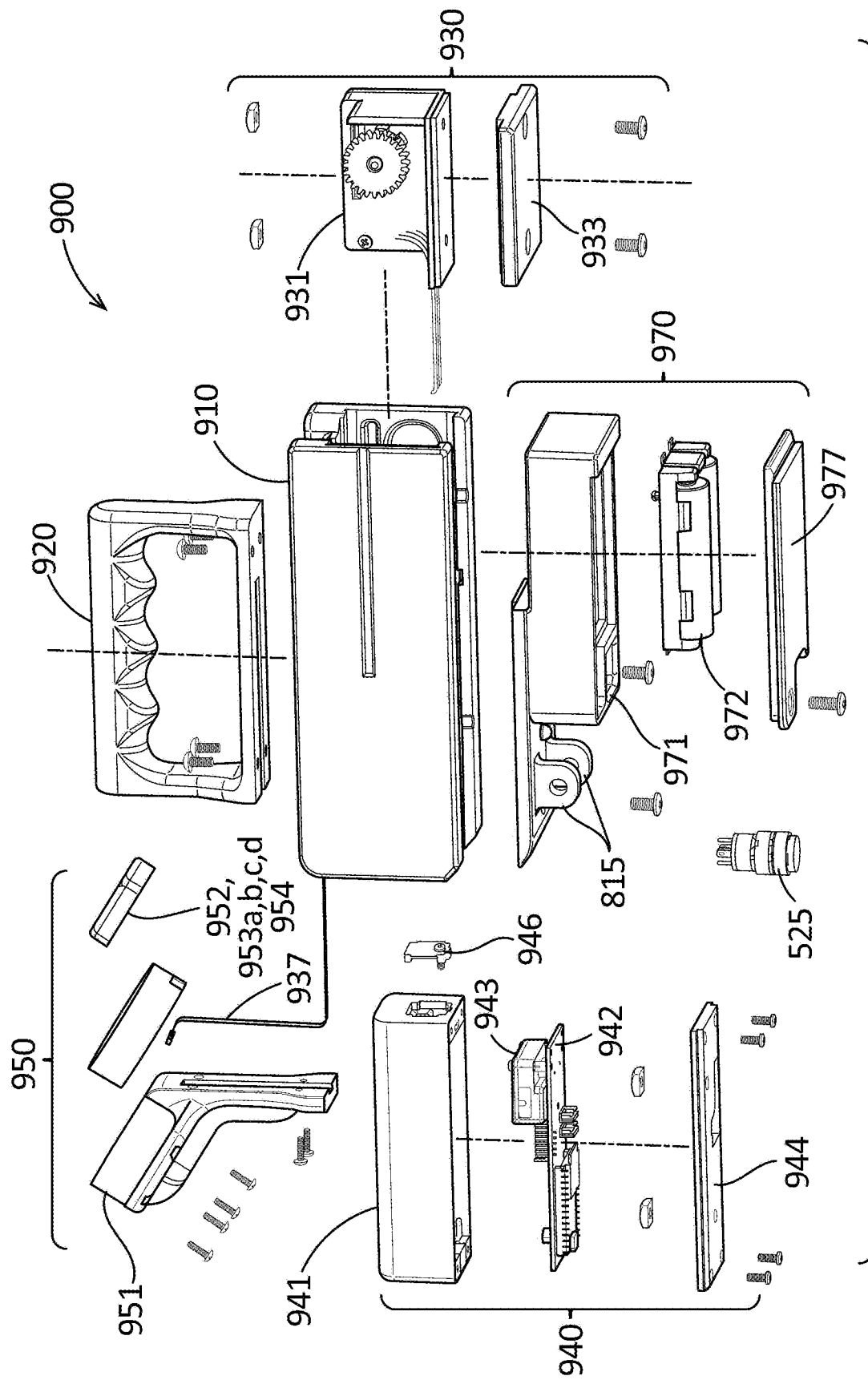

FIG. 9G is a side bottom exploded view of the dynamic clamp 900 of FIG. 9A. As shown, each of the handle grip 920, the sensor 930, the controller 940, the user input interface 950, and the power supply unit 970 can be housed within or fixed to the body 910 of the dynamic clamp 900. Fasteners can be used to enclose each component or assembly against water intrusion. In some aspects, as noted previously, the dynamic clamp 900 and one or more other components or assemblies of the measurement tool 510 can be rated against water intrusion with at least an IP64 rating. One or more of a cover 933 can be configured to seal against the housing 931. One or more of covers 944 and 946 can be configured to seal against the housing 941. One or more of a housing 951 and accompanying components can be configured to seal around the control surface 952 and, more specifically, the control surfaces 954 and 953a,b,c,d. One or more of a cover 977 can be configured to seal against the housing 971. The housing 971 itself, which can be configured to seal against the body 910, can facilitate sealing of each subassembly of the measurement tool 510 and the measurement tool 510 overall against water intrusion. As shown, the housing 971 can also comprise the one or more mounting tabs 815, which can be received within one of the jaws 820 of the stationary clamp 800 and the dynamic clamp 900.

Figure 9H:
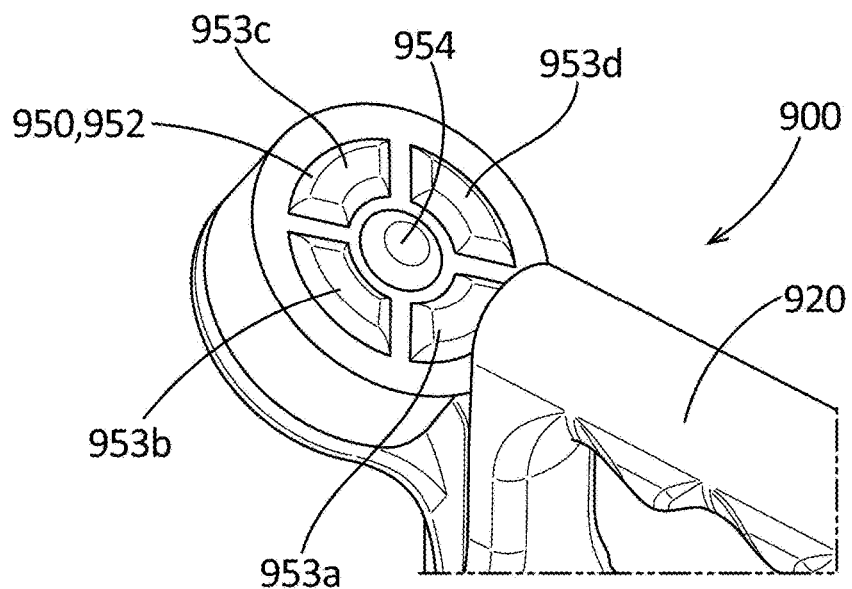

FIG. 9H is a front top detail perspective view of the dynamic clamp 900 of FIG. 9A showing the user input interface 950 taken from detail 9H of FIG. 5A. In some aspects, the user input interface 950 can comprise a directional pad—or D-Pad, for short. The user input interface 950 can comprise one or more control surfaces 952, which can be configured to control a remote device such as the user device 550. More specifically, for example, the user input interface 950 can comprise a set of four control surfaces 953a,b,c,d, which can be arranged in a circular pattern about a central control surface 954. Each of the control surfaces 953a,b,c,d and the control surface 954 can be secured to a printed circuit board 1152 (shown in FIG. 11L) of the user input interface 950. The control surfaces 953a,b,c,d can be used by the user to navigate menus and toggle through and/or select options in an app installed on the user device 550, for example, even without viewing a display 1320 (shown in FIG. 13A) of the user device 550 due to the use of other, non-visual forms of feedback (e.g., aural or audible feedback). Each of the control surfaces 953a,b,c,d and the control surface 954 can be large enough to be able to consistently manipulate—without hitting the wrong control surface 952—with heavy insulated gloves of the type that a user would be expected to wear on a roof in cold temperatures and/or high wind. More specifically, the user can press any of the aforementioned control surfaces with a thumb, including when still gripping the handle grip 920 such as when the measurement tool 510 is held as shown in FIG. 16B. In some aspects, the dynamic clamp 900 can comprise a trigger such as, for example and without limitation, the kind used to operate a power tool or fire a pistol. A wire harness 957 can place the user input interface 950 in electrical communication with the controller 940.

Figure 10A:
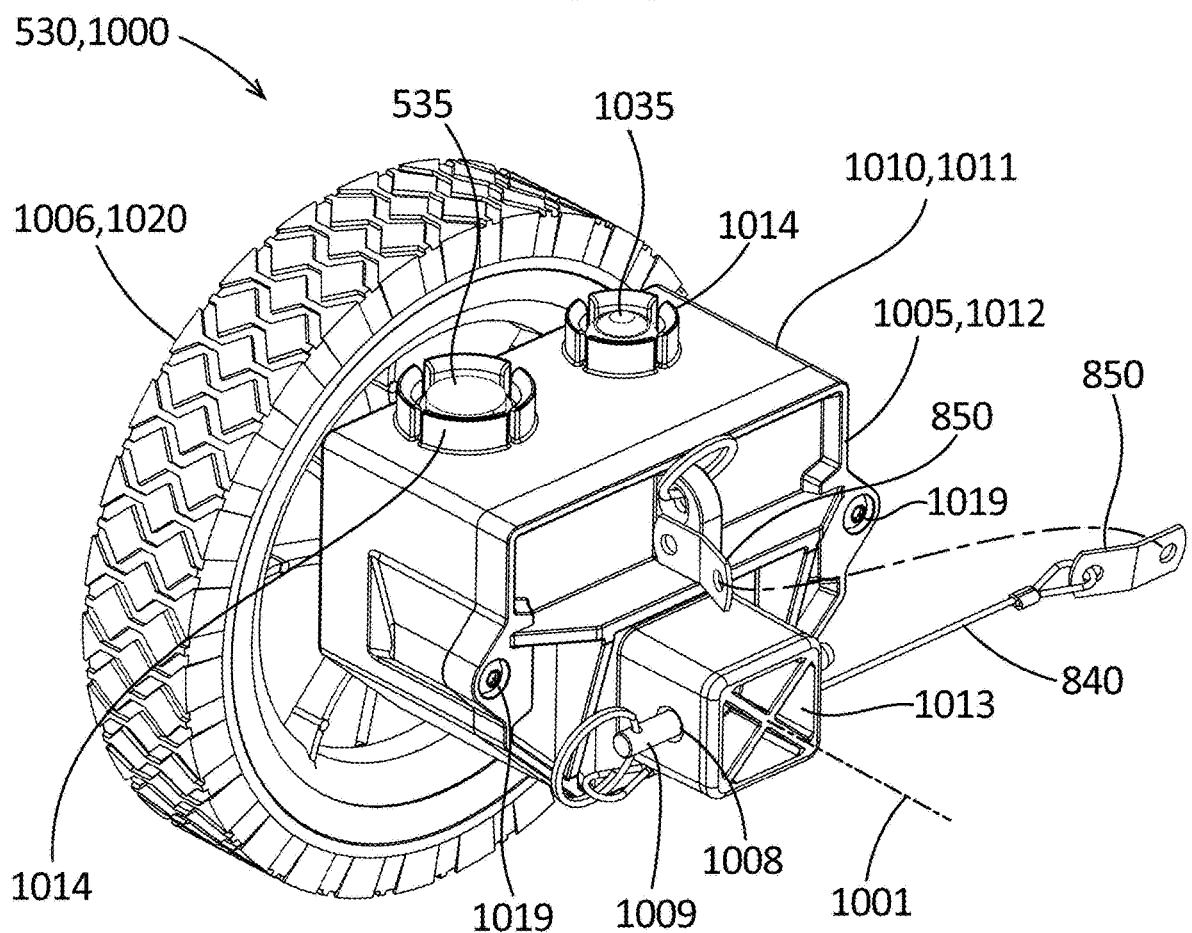
FIGS. 10A-10F are various views of the odometer of the measurement tool of FIG. 5A.

FIGS. 10A-10F are various views of the odometer 1000 and, more generally, the caliper portion 520 of the measurement tool 510 of FIG. 5A. FIG. 10A is specifically a front top perspective view of the odometer 1000 of the measurement tool 510. The odometer 1000 can comprise a housing 1010, which can comprise a base 1011 and a cover 1012. The cover 1012 can be secured—and sealably so—to the base 1011 with fasteners 1019. The odometer 1000 can define a first end 1005 and a second end 1006, which can be distal from the first end 1005. The odometer 1000 can comprise the wheel 1020, which can be coupled to the housing 1010 and can be configured to rotate with respect to the housing 1010 during use. As shown, the odometer 1000 can be detachable from the caliper portion 520 of the measurement tool 510.

The protrusion 1013 can extend from the housing 1010 and, more specifically, the cover 1012 and the first end 1005. The protrusion 1013 can extend along an axis 1001. The protrusion 1013 can be sized or otherwise configured to be received within a mating portion of the measurement tool 510 and, more specifically, the bar body 610 (shown in FIG. 5A). A fastener 1009, which can match a description of the fastener 809 (shown in FIG. 8A), can extend through a hole 1008 defined in the protrusion 1013. When the protrusion is also inserted into the caliper portion 520 of the measurement tool 510 and, more specifically, the stationary clamp 800 (shown in FIG. 5A), the fastener 1009 can secure the odometer 1000 to the caliper portion 520. The fastener 1009 can comprise the connector 850, which can be attached to a pin of the fastener 1009 with the lanyard 840 and can be attached to the housing 1010 as shown by another instance of the connector 850 in a condition showing the strap assembled to the housing 1010. Where used, the connector 850 can removably secure the fastener 809 to a surrounding portion of the measurement tool 510 via the lanyard 840, even when disengaged from the jaw 820, to prevent misplacement of the fastener 809. As will be described below, the odometer 1000 can be fastened to other structures or accessories.

The odometer 1000 can comprise one or more input devices for operating the odometer 1000. Each of the input devices can be a button or control surface. The odometer 1000 can comprise the power control 535, which can be configured to power on the odometer 1000. The odometer 1000 can comprise a reset or zero control 1035, which can be or define a button or other control surface and can be configured to re-initialize or "zero" the odometer 1000 to a "zero" distance reading. In some aspects, either or both of the power control 535 and the zero control 1035 can be positioned on a top end of the housing 1010. In some aspects, either of the power control 535 and the zero control 1035 can be positioned elsewhere on the housing 1010 or away from the housing. In some aspects, the powering and zeroing functions can be incorporated into an app on the user device 550 (shown in FIG. 5A). The housing 1010 can define a barrier 1014 around each of the power control 525 and the zero control 1035. More specifically, the barrier 1014 can protect each of the power control 525 and the zero control 1035 from unintended operation and/or damage when, for example, the odometer 1000 or, more specifically, the housing 1010 rests against or impacts or is impacted by some object that is larger than a finger of a user. The housing 1010 can, more generally, define any shape as desired and appropriate for enclosing the components positioned therein.

Figure 10B:
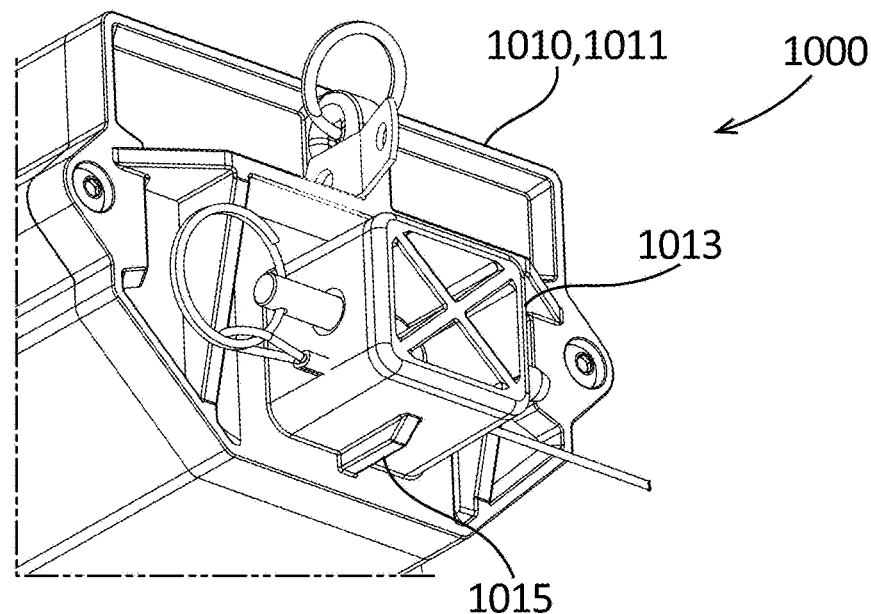

FIG. 10B is a front bottom perspective view of a front end (e.g., the first end 1005) of the odometer 1000 of FIG. 10A. A bottom side—or any side—of the protrusion 1013 of the housing 1010 can define a rib or key 1015, which can extend from the protrusion 1013 or can be defined as a recess in the protrusion 1013. Incorporation of the key 1015 can result in the user being able to orient the odometer 1000 with respect to the caliper portion and, more specifically, the stationary clamp 800 in only the correct orientation permitting full engagement of the key 1015 with a complementary portion defined on or in the caliper portion (e.g., the orientation groove 814, shown in FIG. 8B and defined in the cavity 813 of the stationary clamp 800).

Figure 10C:
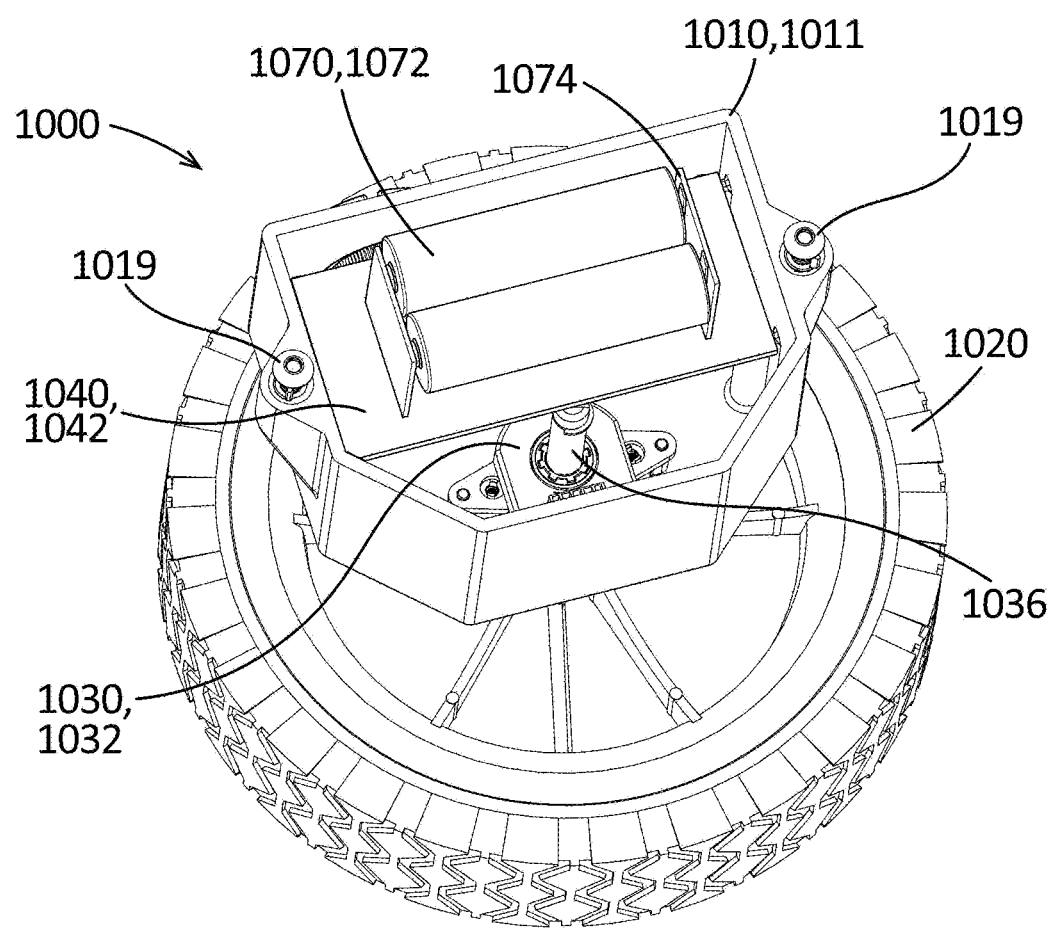

FIG. 10C is a front bottom perspective view of the odometer 1000 of FIG. 10A with the cover 1012 of the housing 1010 removed. As shown, the housing 1010 can be sized to receive the controller 1040, which can be powered by one or more batteries 1072 of a power supply module 1070. The controller 1040, meanwhile, can comprise a printed circuit board (PCB) 1042. The power supply module 1070, which can comprise a battery mount 1074, can be secured directly to the PCB 1042 and can be configured to receive the batteries 1072 and can be configured to power the odometer 1000. The housing 1010 can be sized to receive a sensor 1030. The shaft 1036 can extend through and be fixed to each of the wheel 1020 and the sensor 1030. The sensor 1030 can be in communication with the controller 1040.

The sensor 1030 can comprise an encoder 1032. The encoder 1032, which can be a rotary encoder, can measure fine changes in an angular position of—and thus can detect rotation of—the shaft 1036. More specifically, the encoder 1032 can thereby measure rotation of the wheel 1020 and the controller 1040 can thereby calculate a distance travelled by the wheel 1020 based on a relationship between a multiple of a circumference of the wheel 1020 and a distance travelled by a radially outermost surface of the wheel 1020. The wheel 1020 can be made to traverse and thereby measure a dimension (e.g., a length dimension) of a geometric feature 100 (shown in FIG. 1B) of the parapet 70 (shown in FIG. 1B).

Either or both of rotary encoder hardware (e.g., the number of ticks/revolution) and control firmware (e.g., the wheel circumference) can be updated for varying levels of precision and so that different wheels 1020 can be used, as desired. As disclosed herein, sub-millimeter precision can be achieved on measurements with the odometer 1000. More specifically, as exemplarily set, a distance of 0.873 mm travelled by the odometer 1000 can corresponding to one tick of the encoder 1032.

Figure 10D:
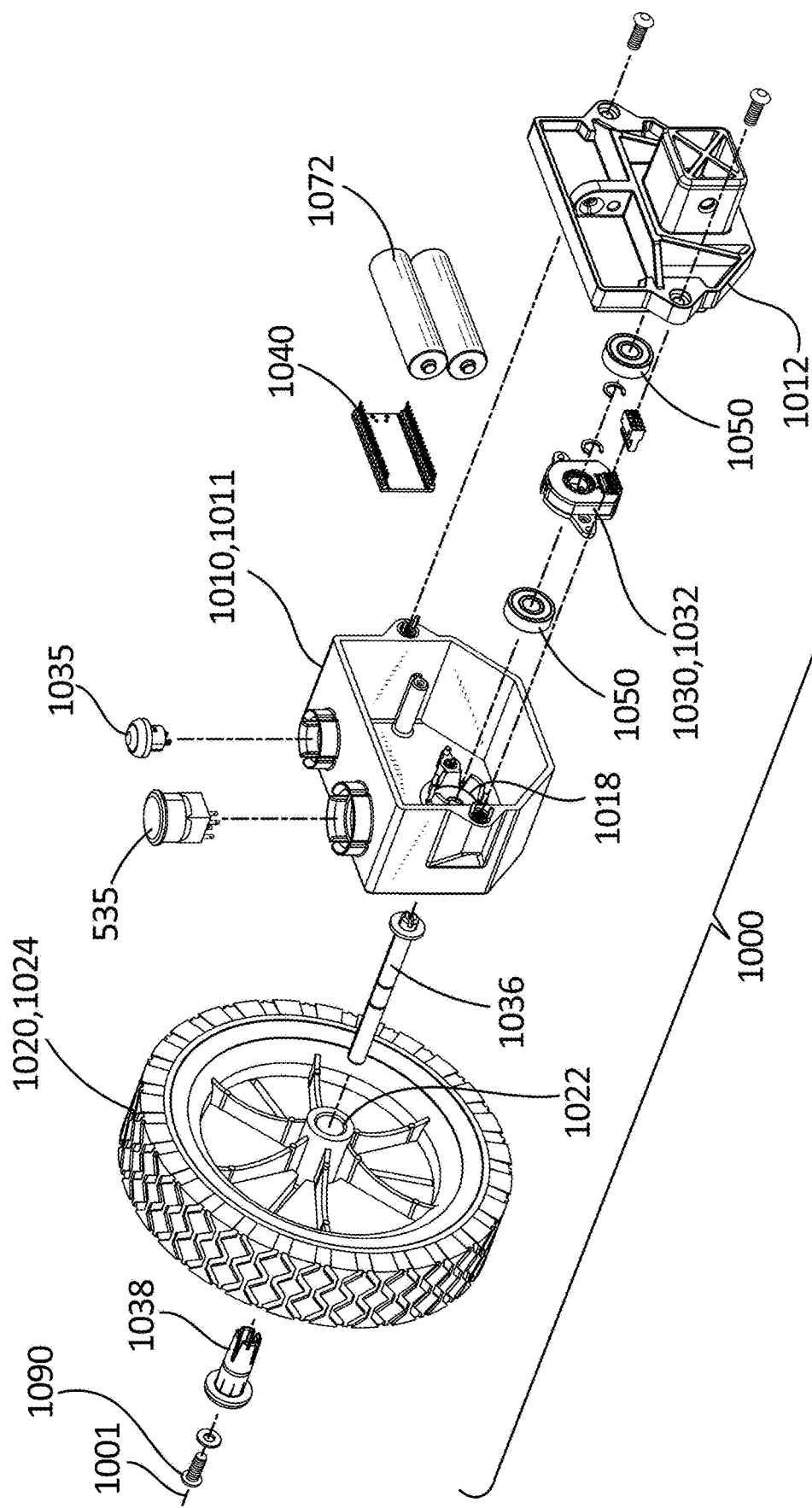

FIG. 10D is a front top exploded perspective view of the odometer 1000 of FIG. 10A. The wheel 1020 can comprise a hub 1022 and a rim or tread 1024 assembled to the hub 1022. The tread 1024 can define a textured surface and/or an anti-slip material on a radially outermost surface thereof. The shaft 1036 can be aligned with and extend through a hole defined in the hub. More specifically, the shaft 1036 can extend through a bearing or bushing 1038, which can be received within the hub 1022 and can be positioned between the hub 1022 and the shaft 1036. The wheel 1020 can be secured to the shaft 1036 and an axial position of each at least partly fixed with respect to each other with a fastener 1090, which can include a bolt and, in some aspects, the washer shown.

The shaft 1036 can be received within a bore defined in the housing 1010 and, more specifically, the base 1011. The shaft 1036 can be received within one or more bearings 1050. As shown, one of the bearings 1050 can be received and secured inside a seat or cradle 1018 formed in the base 1011 and another of the bearings 1050 can be received and secured inside an opposing seat or cradle (not shown), which can be formed in the cover 1012. The controller 1040, shown for clarity without the printed circuit board 1042 shown in FIG. 10B, can comprise the semiconductor chip shown. Again, the odometer 1000 can comprise the power supply module 1070 (shown in FIG. 10C), which can comprise the battery mount 1074 (shown in FIG. 10C).

Figure 10E:
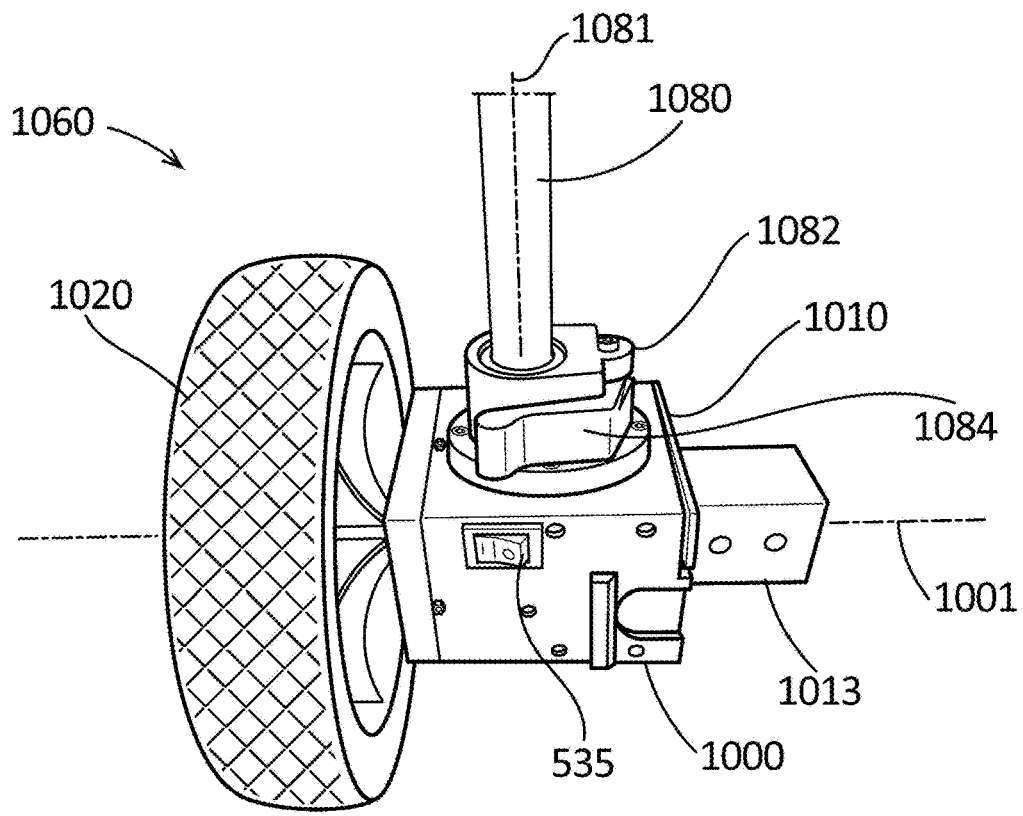

FIG. 10E is a side perspective view of an assembly 1060 comprising the odometer 1000 of FIG. 10A and a handle 1080 attached thereto in accordance with another aspect of the current disclosure. In some aspects, the handle 1080 can be held within and extend from a fastener 1082, which can be secured to the housing 1010 of the odometer 1000. The fastener 1082 can be configured to engage and disengage with the handle 1080, e.g., by friction, without a separate tool other than a hand of the user. More specifically, the fastener 1082 can comprise a quick-release member 1084, which can be a cam, a quick-release pin, or other fastener that is removable by hand and without a separate tool. As shown, the quick-release member 1084 can define a cam and can be configured to rotate toward or away from the handle 1080 to engage or disengage from the handle 1080. In some aspects, the handle 1080 can be held within and extend directly from the housing 1010 without the fastener 1082. In some aspects, the handle 1080 can define an elongated rod. In some aspects, the handle 1080 can be telescoping to facilitate good ergonomics and/or compact storage or for other reasons. An extension axis or direction 1081 of the handle 1080 can be angled with respect to or, more specifically, orthogonal to the axis 1001 of the odometer 1000 and, more specifically, the wheel 1020. In some aspects, the extension direction 1081 of the handle 1080 can be parallel to or even aligned with the axis 1001. In some aspects, the handle 1080 can be secured to the protrusion 1013 by, for example, being received within or about the protrusion 1013.

Figure 10F:
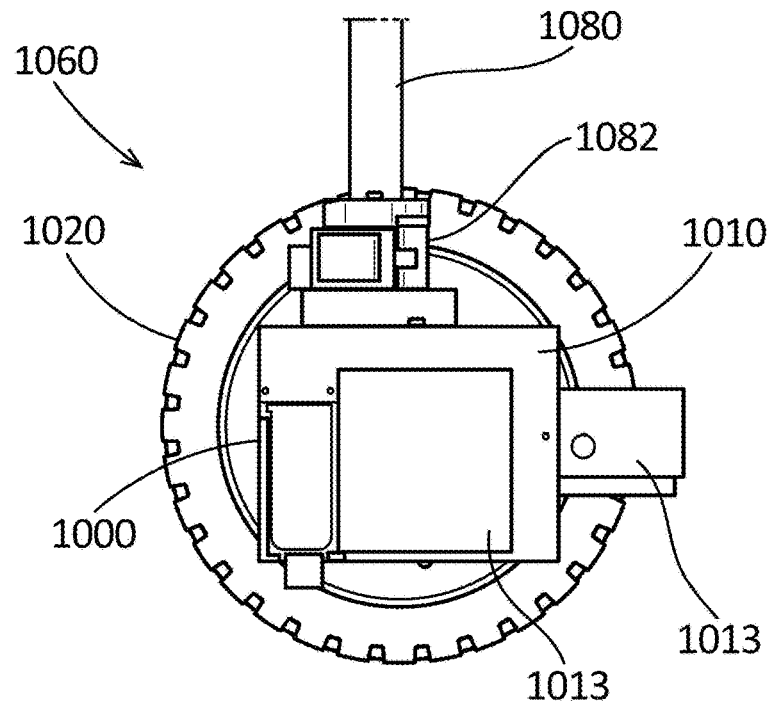

FIG. 10F is a front perspective view of the assembly 1600 of FIG. 10E. As shown, the housing 1010 can define more than one protrusion 1013. In some aspects, the handle 1080 can be attached to either one of the protrusions 1013 or to another portion of the housing 1010 or, more generally, the odometer 1000.

Figures 11A, 11B, 11C:
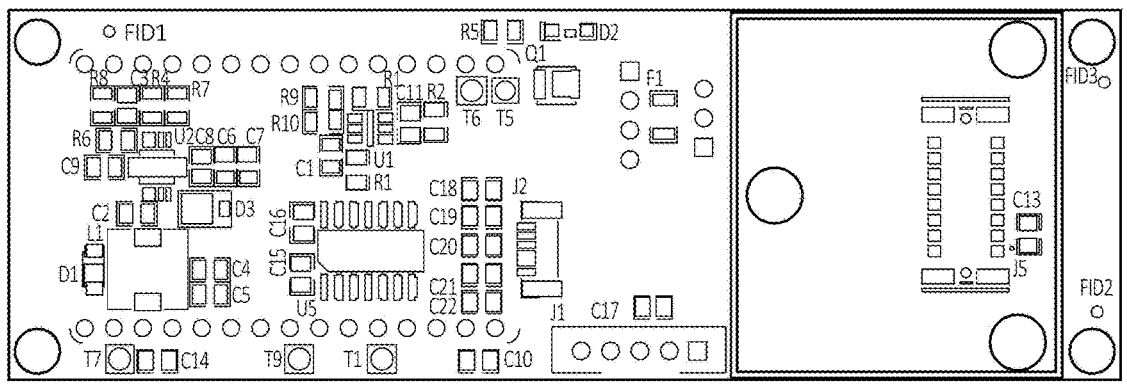
FIGS. 11A-11P are various views of electrical components of the dynamic clamp of FIG. 9A and/or electrical schematic diagrams of the dynamic clamp of FIG. 9A.
FIG. 11B is a bottom view of the printed circuit board of FIG. 9A.
FIG. 11C is an electrical schematic diagram showing inputs and outputs of the dynamic clamp of FIG. 9A.
Figure 11D:
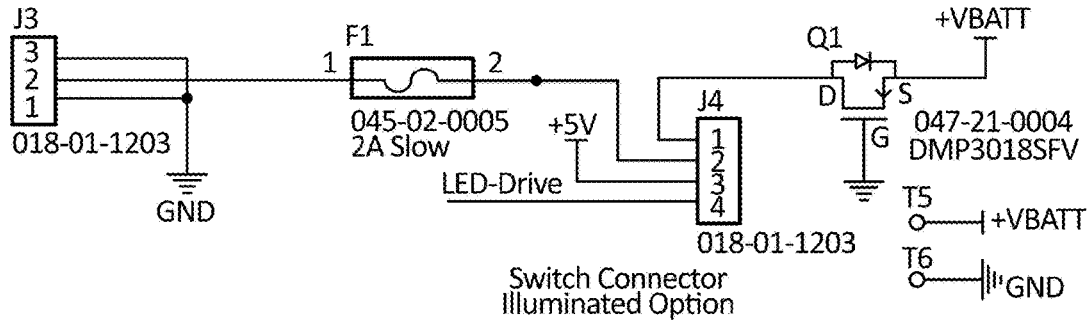
FIG. 11D is an electrical schematic diagram showing a power supply circuit of the dynamic clamp of FIG. 9A.
Figure 11E:
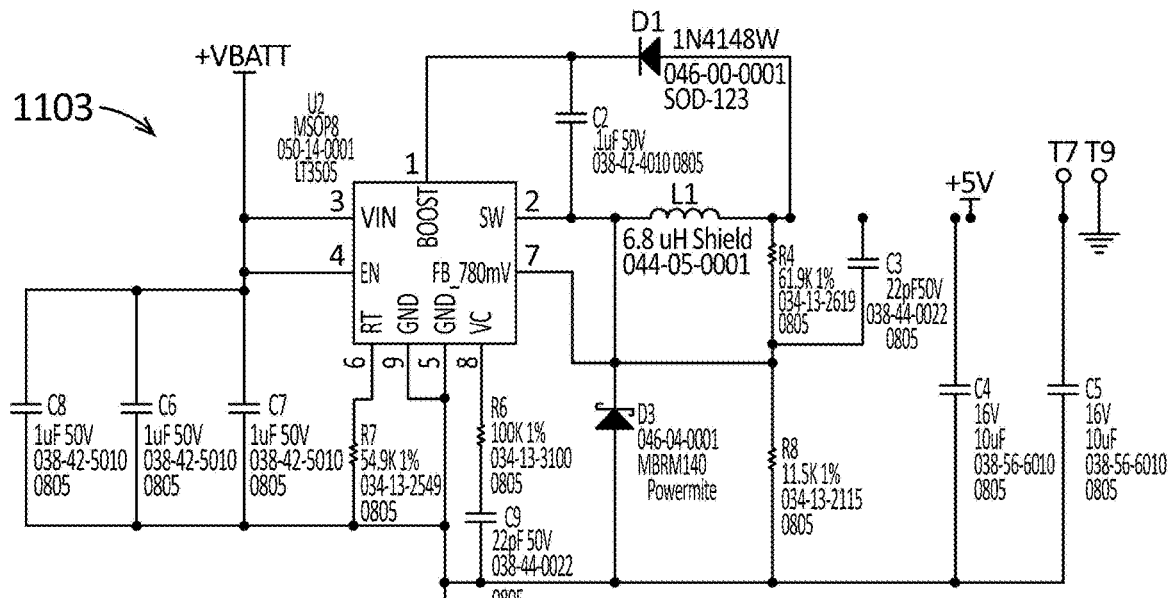
FIG. 11E is an electrical schematic diagram showing a buck converter or step-down converter of the dynamic clamp of FIG. 9A.
Figure 11F:
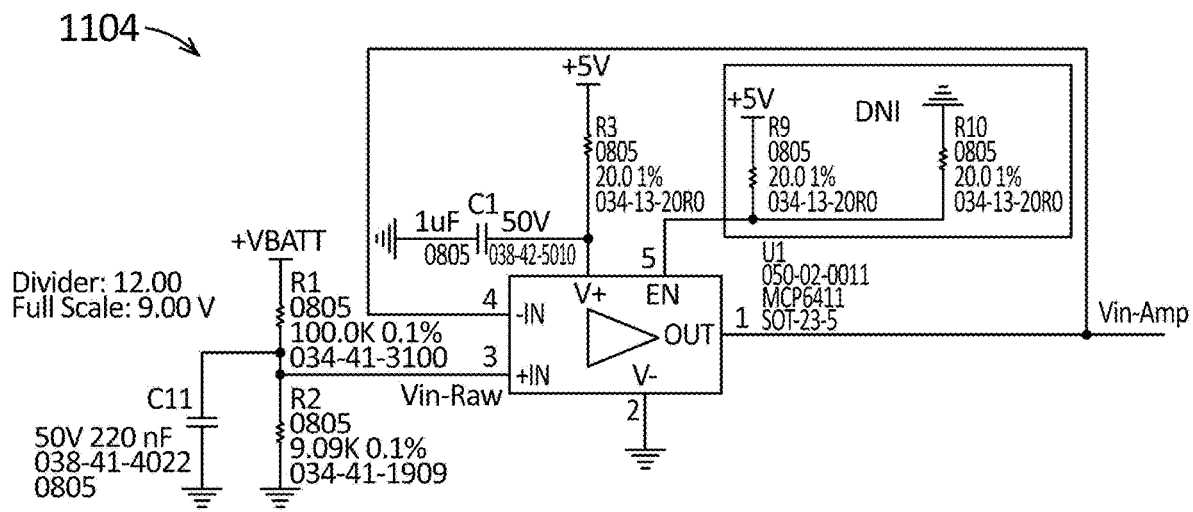
FIG. 11F is an electrical schematic diagram showing a voltage measurement circuit of the dynamic clamp of FIG. 9A.
Figure 11G:
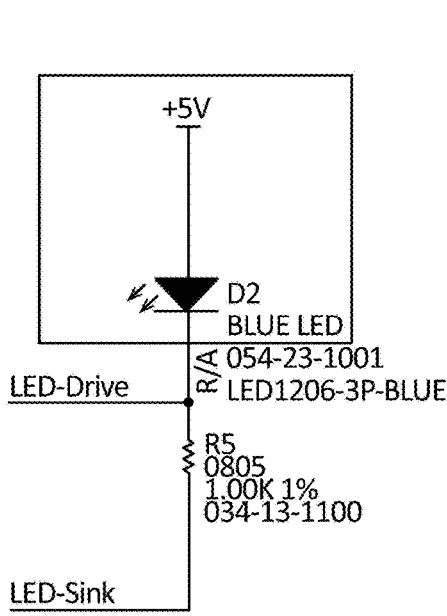
FIG. 11G is an electrical schematic diagram showing switch illumination circuit of the dynamic clamp of FIG. 9A.
Figure 11H:
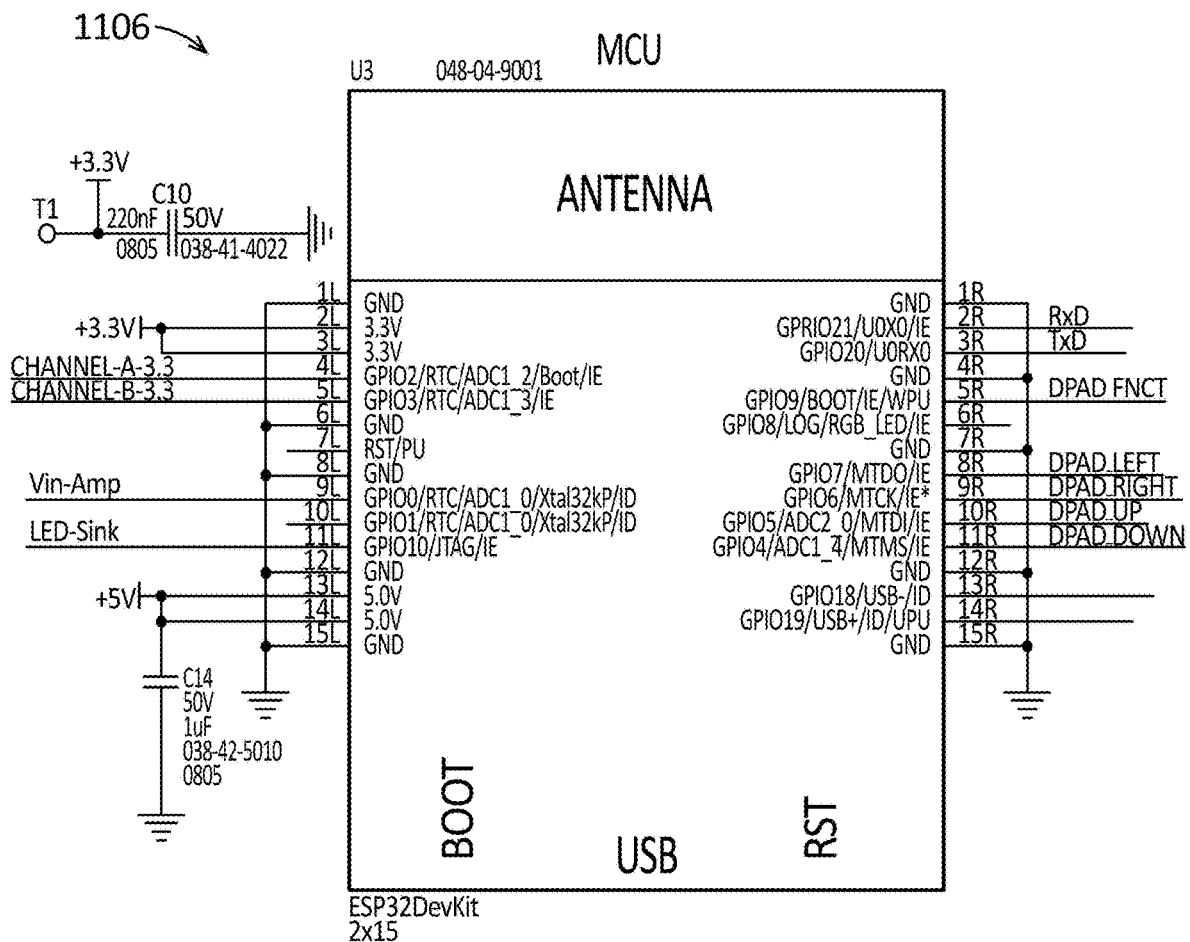
FIG. 11H is an electrical schematic diagram showing a microcontroller circuit of the dynamic clamp of FIG. 9A.
Figure 11I:
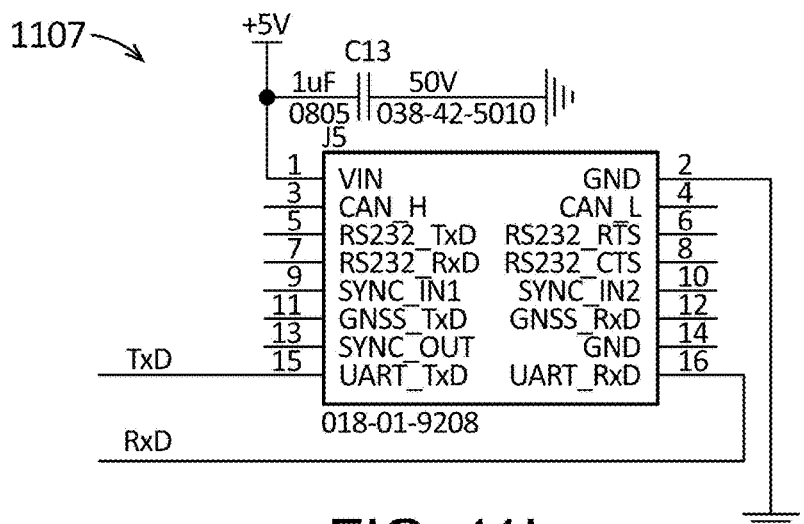
FIG. 11I is an electrical schematic diagram showing an IMU connector circuit of the dynamic clamp of FIG. 9A.
Figure 11J:
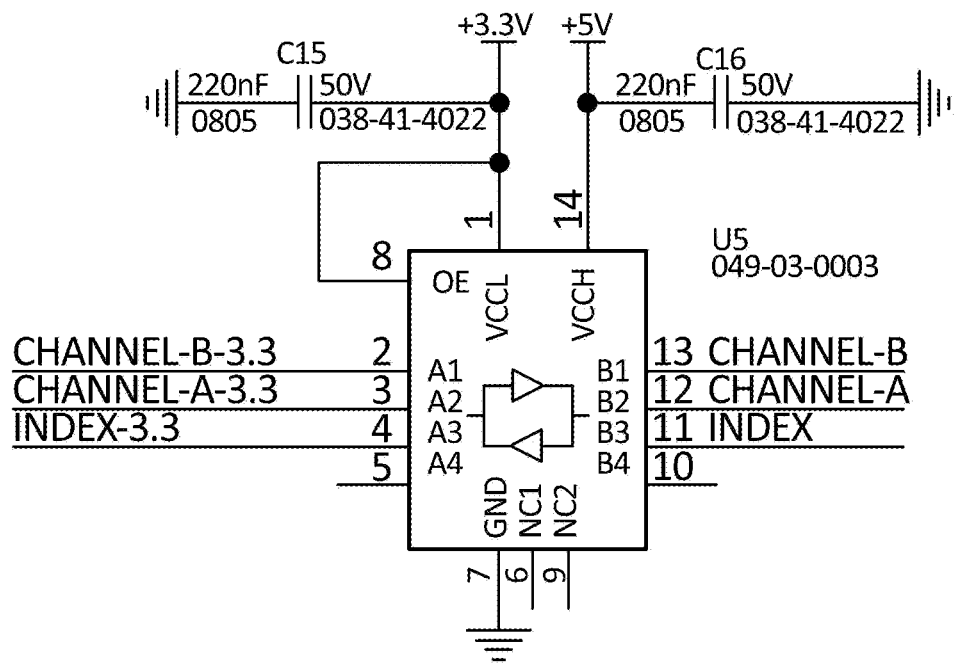
FIG. 11J is an electrical schematic diagram showing a level shifter circuit of the dynamic clamp of FIG. 9A.
Figure 11K:
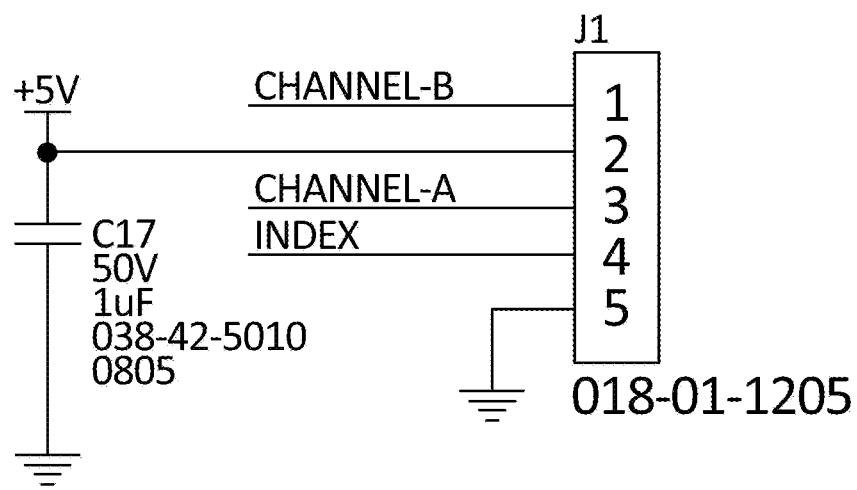
FIG. 11K is an electrical schematic diagram showing an encoder connector circuit of the dynamic clamp of FIG. 9A.
Figure 11L:
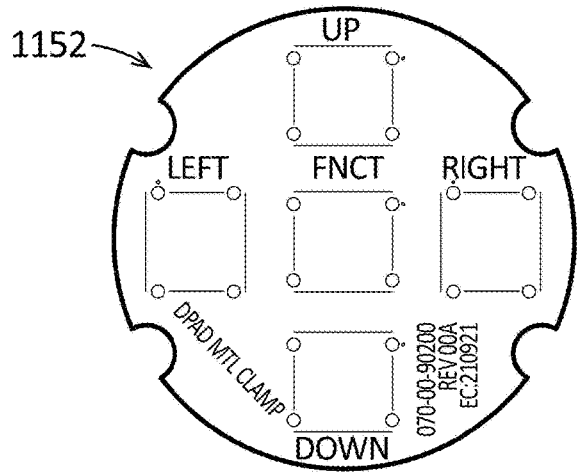
FIG. 11L is a top view of a printed circuit board of the user input interface of FIG. 9H.
Figure 11M:
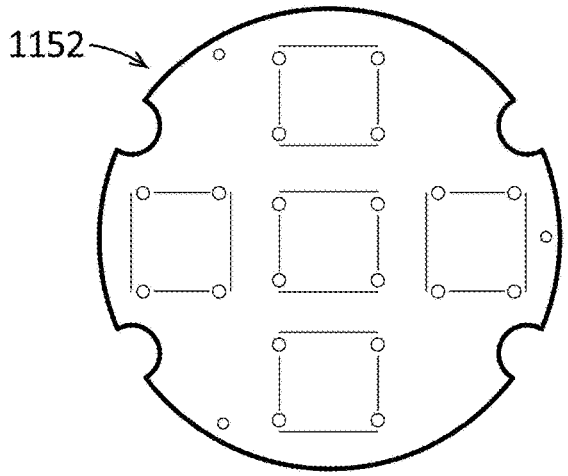
FIG. 11M is a bottom view of the printed circuit board of FIG. 9H.
Figure 11N:
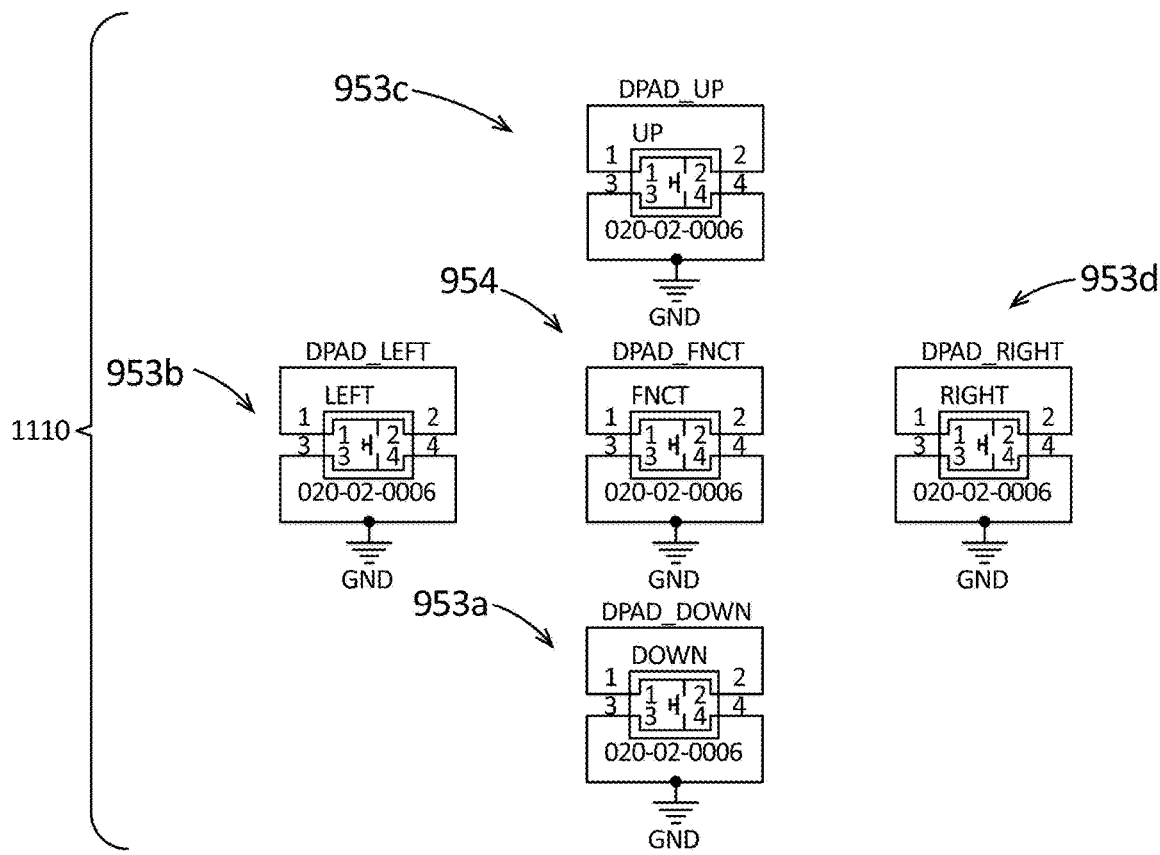
FIG. 11N is an electrical schematic diagram showing switch circuits of the user input interface of FIG. 9H.
Figure 11O:
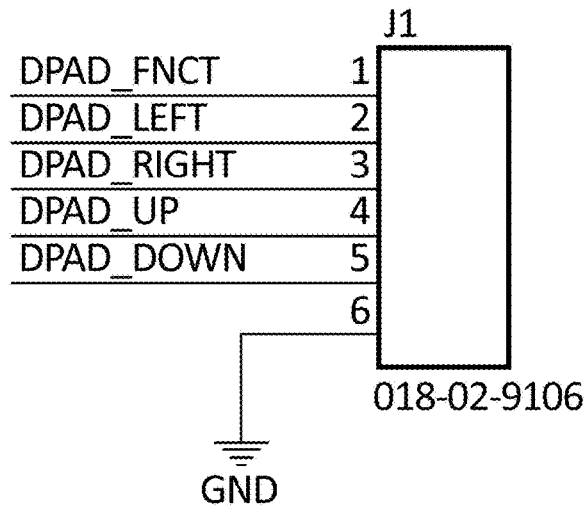
FIG. 11O is an electrical schematic diagram showing a connector circuit for the user input interface of FIG. 9H in accordance with one aspect of the current disclosure.
Figure 11P:
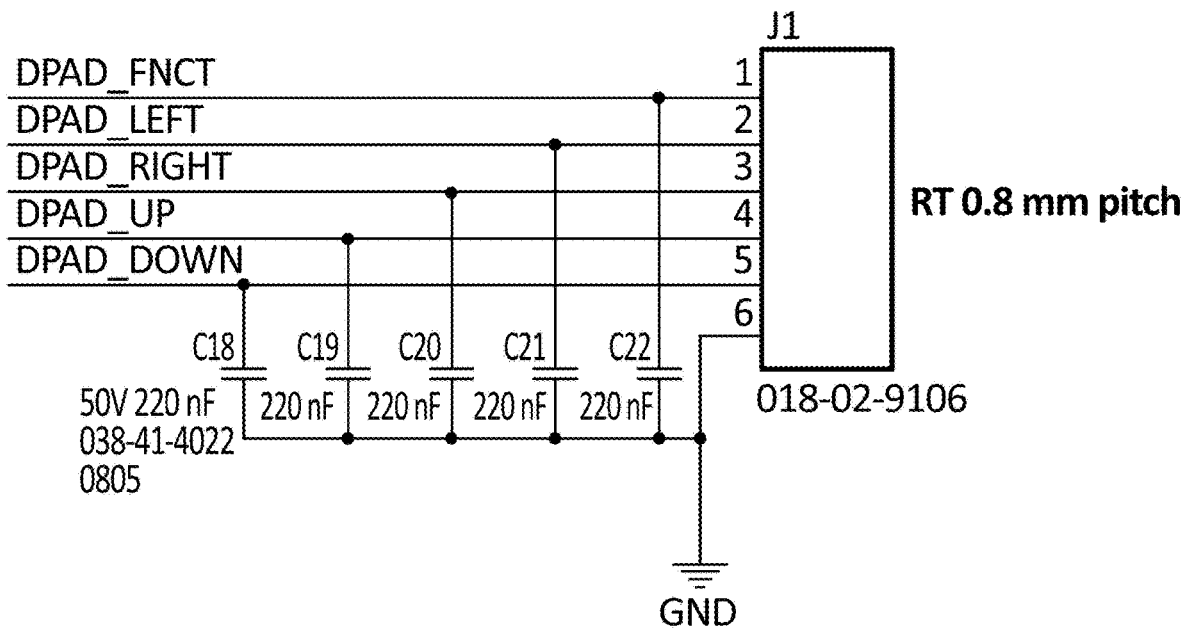

FIGS. 11A-11P are various views of electrical components of the dynamic clamp 900 of FIG. 9A and/or electrical schematic diagrams of the dynamic clamp 900 of FIG. 9A. FIG. 11A is specifically a top view and FIG. 11B is a bottom view of the printed circuit board (PCB) 942 of the controller 940 (shown in FIG. 9D) of the dynamic clamp 900.

FIG. 11C is an electrical schematic diagram 1101 showing inputs and outputs of the dynamic clamp 900 of FIG. 9A. Specifically, the inputs of the dynamic clamp 900 can comprise a wireless input signal (e.g., via a Bluetooth® protocol), input from a power control 525 (e.g., ON/OFF), an input from the orientation sensor 943, an input from the user input interface 950, and an input from the distance sensor 930. The outputs of the dynamic clamp 900 can comprise a wireless output signal (e.g., via a Bluetooth® protocol) and a power ON lamp (e.g., using LED technology).

FIG. 11D is an electrical schematic diagram showing a power supply circuit 1102 for the power supply unit 970 (shown in FIG. 9G) of the dynamic clamp 900 of FIG. 9A.

FIG. 11E is an electrical schematic diagram showing a buck converter or step-down converter circuit 1103 of the dynamic clamp 900 of FIG. 9A, which can be incorporated into the PCB 942 (shown in FIG. 11A) and in other portions of the tool 510, especially those comprising a controller. As shown, the buck converter circuit 1103 and any other buck converter disclosed herein can step the voltage of the affected circuit from 8V, which can be the output of the power supply, down to 5V. Note that where used throughout the figures, a measure of capacitance in uF generally means μF or microFarads but can be shown in uF for simplicity.

FIG. 11F is an electrical schematic diagram showing a voltage measurement circuit 1104 of the dynamic clamp 900 of FIG. 9A, which can be incorporated into the PCB 942 (shown in FIG. 11A).

FIG. 11G is an electrical schematic diagram showing switch illumination circuit 1105 of the dynamic clamp 900 of FIG. 9A, which can be incorporated into the PCB 942 (shown in FIG. 11A).

FIG. 11H is an electrical schematic diagram showing a microcontroller circuit 1106 of the dynamic clamp 900 of FIG. 9A, which can be incorporated into the PCB 942 (shown in FIG. 11A). The microcontroller circuit 1106 can comprise a microcontroller unit (MCU).

FIG. 11I is an electrical schematic diagram showing an IMU connector circuit 1107 of the dynamic clamp 900 of FIG. 9A, which can be incorporated into the PCB 942 (shown in FIG. 11A).

FIG. 11J is an electrical schematic diagram showing a level shifter circuit 1108 of the dynamic clamp 900 of FIG. 9A, which can be incorporated into the PCB 942 (shown in FIG. 11A). As shown, the level shifter circuit 1108 and any other level shifter disclosed herein can "shift" or change the voltage of the affected circuit from 3V to 5V.

FIG. 11K is an electrical schematic diagram showing an encoder connector circuit 1109 of the dynamic clamp 900 of FIG. 9A, which can be incorporated into the PCB 942 (shown in FIG. 11A).

FIG. 11L is a top view and FIG. 11M is a bottom view of the printed circuit board 1152 of the user input interface 950 of FIG. 9H.

FIG. 11N is an electrical schematic diagram 1110 showing switch circuits of the user input interface 950 of FIG. 9H, each of which can correspond to the control surfaces 953a, b,c,d and the control surface 954 as shown.

FIG. 11O is an electrical schematic diagram showing a connector circuit 1111 for the user input interface 950 of FIG. 9H in accordance with one aspect of the current disclosure.

FIG. 11P is an electrical schematic diagram showing the connector circuit 1111 for the user input interface 950 of FIG. 9H in accordance with another aspect of the current disclosure.

Figure 12A:
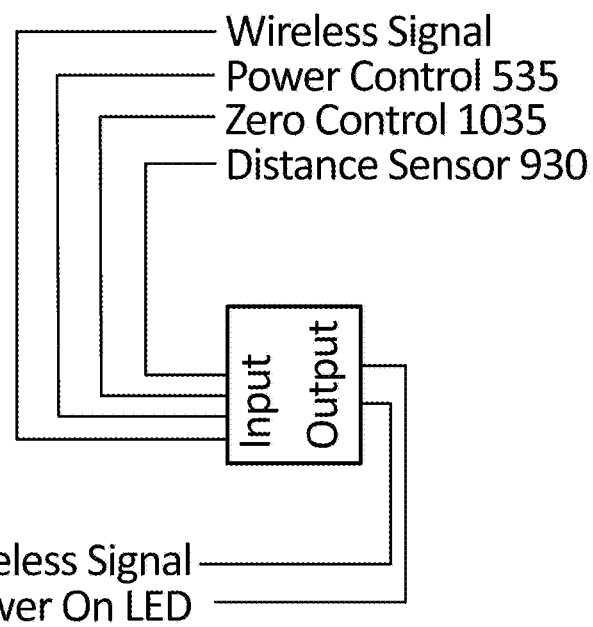

FIGS. 12A-12F are various views of electrical components of the odometer 1000 of FIG. 10A and/or electrical schematic diagrams of the odometer 1000 of FIG. 10A. FIG. 12A is an electrical schematic diagram 1201 showing inputs and outputs of the odometer 1000 of FIG. 10A. Specifically, the inputs of the odometer 1000 can comprise a wireless input signal (e.g., via a Bluetooth® protocol), input from a power control 535 (e.g., ON/OFF), an input from a zero control 1035, and an input from the distance sensor 1030. The outputs of the dynamic clamp 900 can comprise a wireless output signal (e.g., via a Bluetooth® protocol) and a power ON lamp (e.g., using LED technology).

FIG. 12B is an electrical schematic diagram showing a power supply circuit 1202 for a power supply module 1070 of the odometer 1000 of FIG. 10A.

FIG. 12C is an electrical schematic diagram showing a user switch circuit 1203 of the odometer 1000 of FIG. 10A and, more specifically, the power control 535 of the odometer 1000. In some aspects, when the power control 535 is to be illuminated, the user switch circuit can comprise additional two inputs for a lamp and a total of four inputs (as shown in the "Switch Connector Illuminated Option" in FIG. 11D for the power control 525 shown in FIG. 9C).

FIG. 12D is an electrical schematic diagram showing an encoder circuit 1204 of the odometer 1000 of FIG. 10A.

Figure 12E:
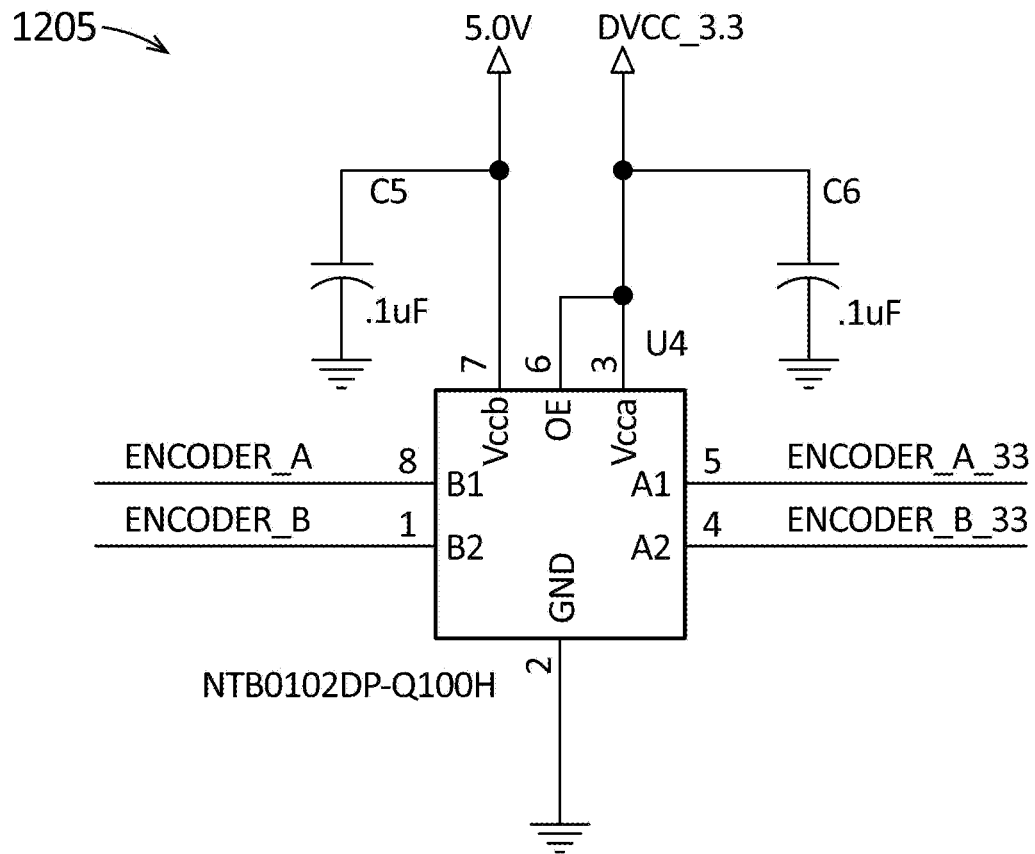

FIG. 12E is an electrical schematic diagram showing a level shifter circuit 1205 of the odometer 1000 of FIG. 10A.

Figure 12F:
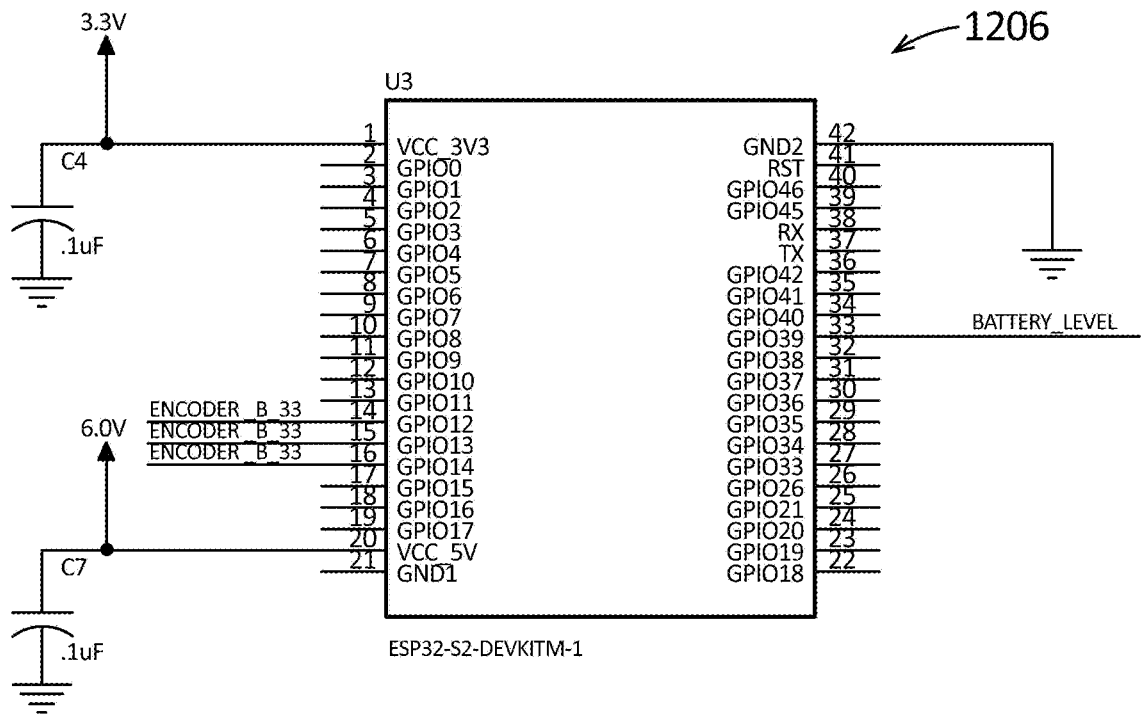

FIG. 12F is an electrical schematic diagram showing a microcontroller circuit 1206 of the odometer 1000 of FIG. 10A.

Figure 12G:
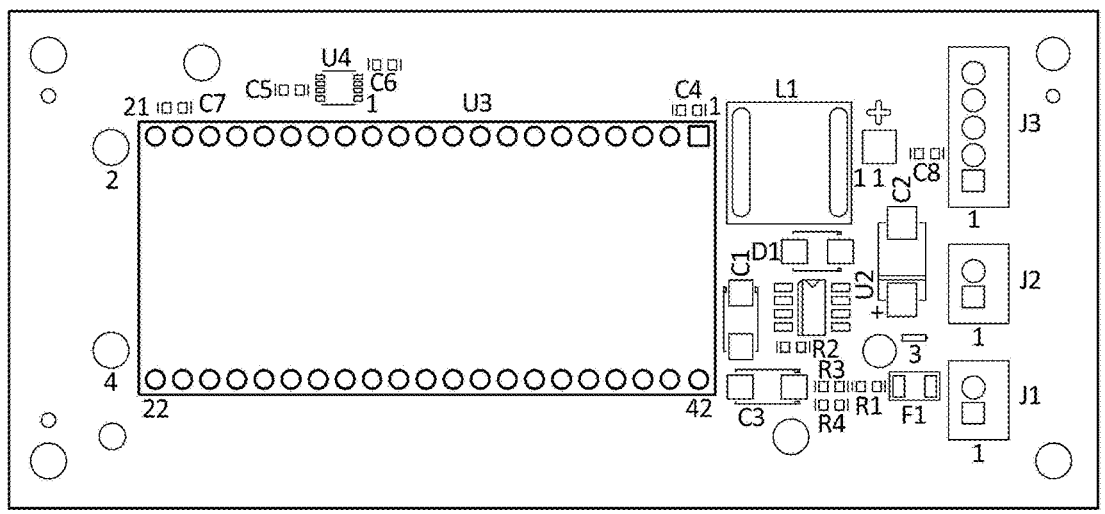
Figure 12H:
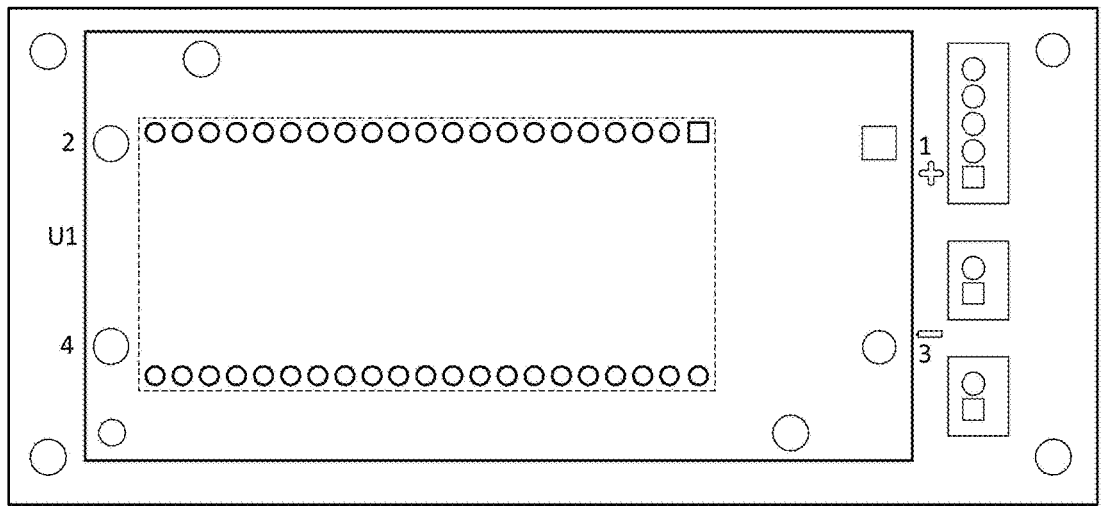

FIG. 12G is a top view and FIG. 12H is a bottom view of the printed circuit board 1042 of the controller 1040 of the odometer 1000 of FIG. 10A.

FIGS. 13A-13C are various views of the user device 550 of FIG. 5A. FIG. 13A is a side perspective view of a mount 1360 for the user device 550 of FIG. 13A showing the mount 1360 attached to an arm of a user. In some aspects, the user device 550 can be secured elsewhere on a body of the user. FIG. 13B is a detail side perspective view of the mount 1360 of FIG. 13A taken from detail 13B of FIG. 13A. The mount 1360 can comprise a case 1362 configured to receive the user device 550 therein and a strap 1364 for securing the case to the user. In some aspects, the strap 1364 can be secured to the user using a hook-and-loop-style fastener. In some aspects, another style of fastener such as, for example and without limitation, a two-piece buckle at two ends of a strap can be used. By securing the user device 550 to another portion of the body, the user can keep both hands free for the purpose holding the measurement tool 510 and yet can still refer to the user device 501 when the need arises. The user is shown as holding onto two static handles 700 that are connected with the bar body 610, but instead the user can hold onto the measurement tool 510 as it is described elsewhere herein.

FIG. 13C is a schematic 1301 showing inputs and outputs of the user device 550 of FIG. 13A. Specifically, the inputs of the user device 550 can comprise a wireless input signal (e.g., via a Bluetooth® protocol) and a touchscreen (e.g., the display 1320 shown in FIG. 13B). The outputs of the user device 550 can comprise a wireless output signal (e.g., via a Bluetooth® protocol), the touchscreen, headphones and/or a speaker, and a separate wireless output signal (e.g., via a WiFi network).

Figure 14:
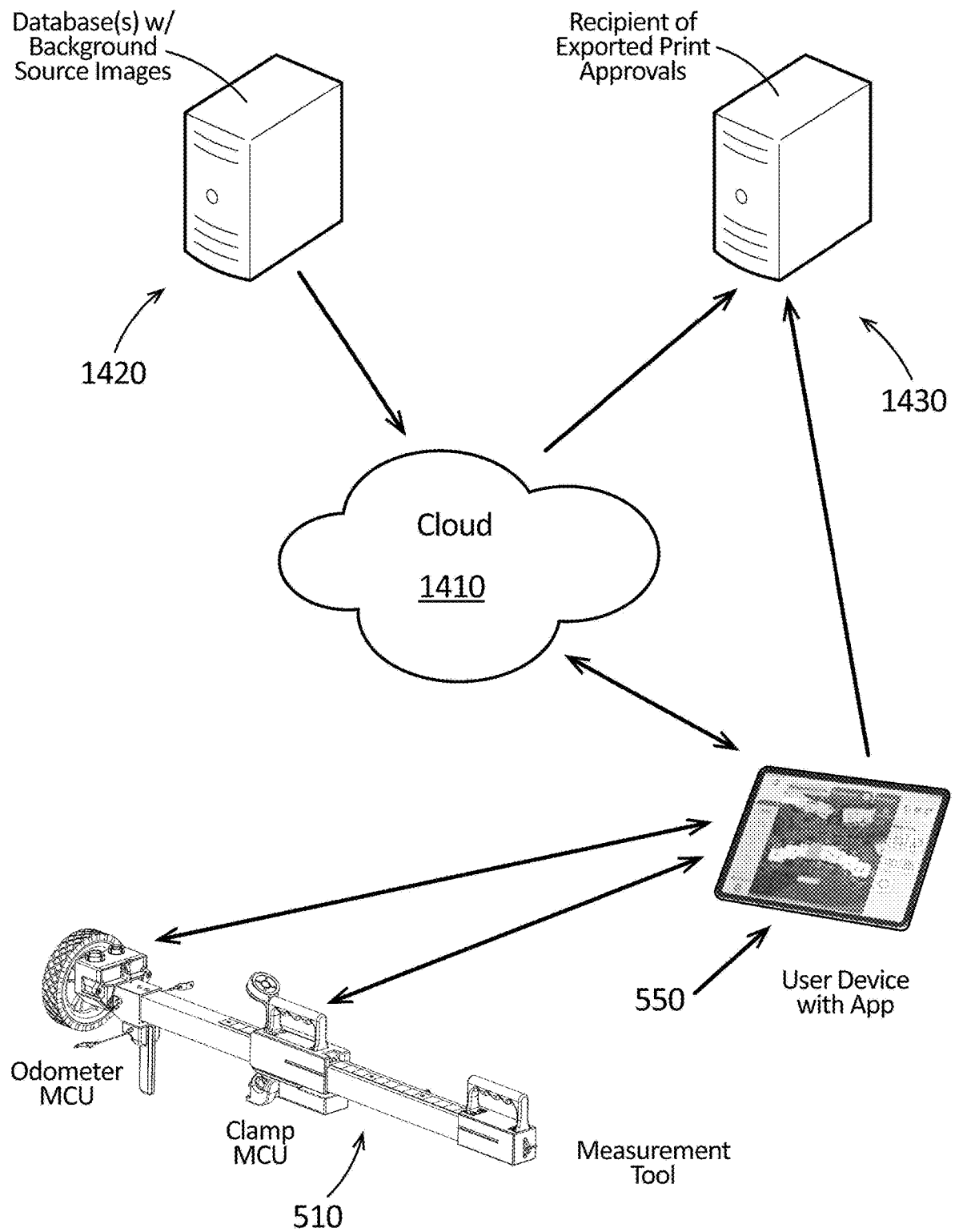
FIG. 14 is a network diagram showing interconnections between the measurement tool and the user device of FIG. 5A and other components of a network.

FIG. 14 is a network diagram showing interconnections between the measurement tool 510 and the user device 550 of FIG. 5A and other components of a network using one or both of the measurement tool 510 and the user device 550. As will be described in greater detail below, the measurement tool 510 can send or transmit signals, data, and/or instructions to—or receive signals, data, and/or instructions from—the user device 550, and vice versa. More specifically, for example, the user can press a control surface on the measurement tool 510 to send a signal to initiate a series of measurements of one of the geometric features 100 (shown in FIG. 1B). The user can likewise press a control surface (e.g., one of the control surfaces 952 shown in FIG. 9H) on the measurement tool 510 to complete the series of measurements. In the opposite direction, the measurement tool 510 can receive instructions from the user device 550 to send measurement data requested by the user device 550 to the user device 550. The user device 550, meanwhile, can send signals, data, and/or instructions to—or receive signals, data, and/or instructions from a cloud network or cloud 1410, and vice versa. As indicated above, this transmission of data can be via a Wi-Fi signal and network. The user device 550, for example, can download an app from the cloud 1410 or download a reference image of a rooftop from a database 1420. Meanwhile, the measurement tool 510 can request information (e.g., product information such as, for example and without limitation, a particular coping or other edge metal product and/or a particular material, finish, or thickness thereof) from the app, the app can seek that information from the cloud 1410 or from the user, the cloud 1410 or the user can communicate that information back to the app. The user device 550 also can, upon collection of measurement data from the measurement tool 510, send an email or other communication comprising completed engineering documents for the geometric features 100 via the cloud to a recipient 1430 using email. The user device 550 can also send data directly to the recipient 1430 using a private network or short-range wireless communications technology such as, for example and without limitation, Bluetooth® technology.

Figure 15A:
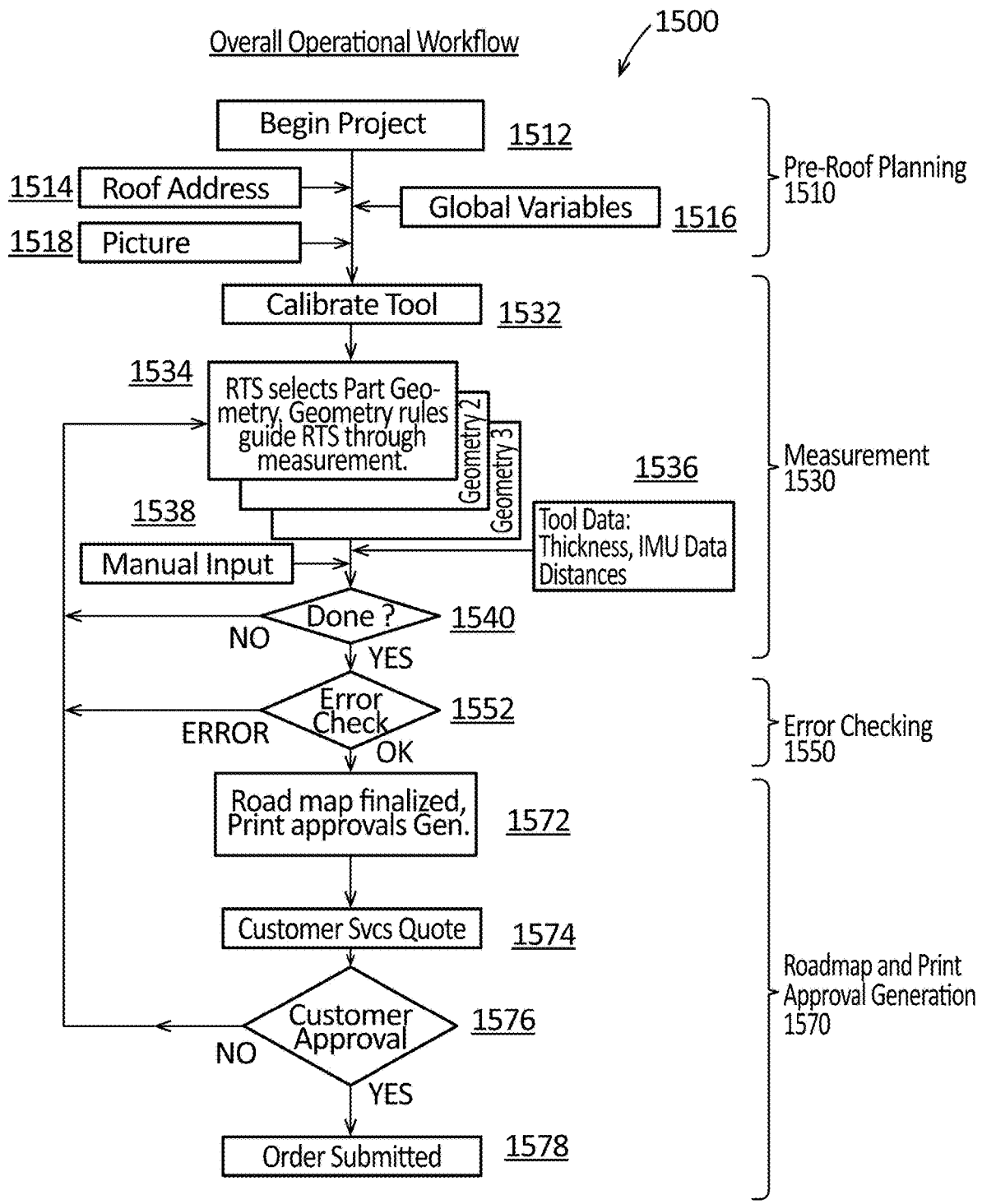
FIGS. 15A and 15B are various views of an operational workflow or method of using the system of FIG. 5A.
Figure 15B:
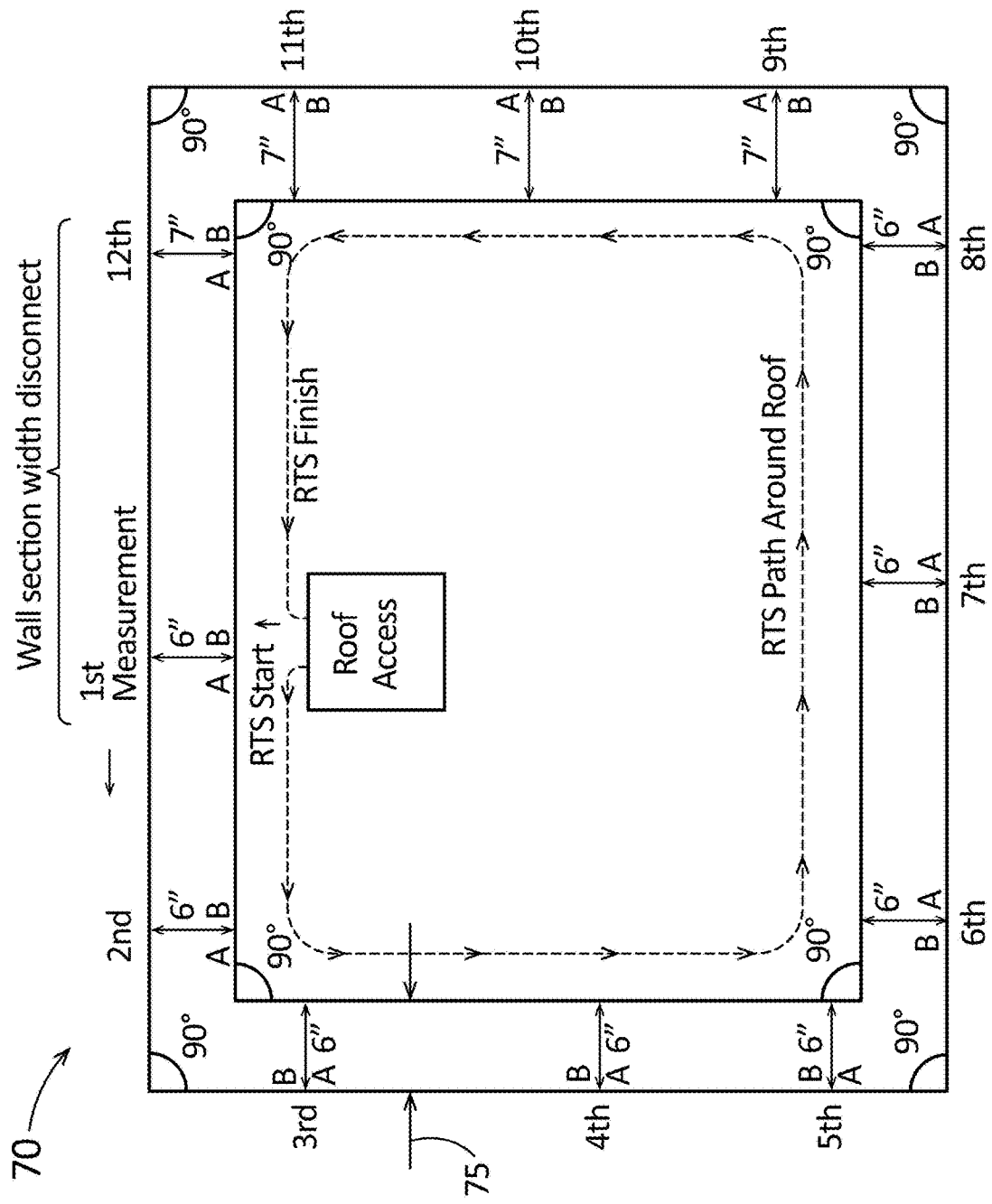

FIGS. 15A and 15B are various views of a flow chart 1500 showing an operational workflow or method of using the system 500 of FIG. 5A. FIG. 15A is specifically the flow chart 1500 showing an overall operational workflow or method of using the system 500. A method of using the system 500 can comprise a first stage 1510, which can comprise pre-roof planning. The method can comprise a second stage 1530, which can comprise measurement of the roof 60 (shown in FIG. 1A), e.g., with the measurement tool 510 (shown in FIG. 5A). The method can comprise a third stage 1550, which can comprise error checking of the measurements collected in the second stage 1530 and, as needed, repeating at least a portion of the second stage 1530. The method can comprise a fourth stage 1570, which can comprise generating a formal roadmap, which can be a digital roadmap created on the app on the user device 550, of some portion of the roof 60 and engineering documents for each of the geometric features 100 formed thereby. Unless otherwise specified, the steps below can be performed by a user of the system 500.

The first stage 1510 (i.e., pre-roof planning) can comprise any one or more of the following steps, including exemplary steps 1512 through 1518:

- A step (not shown) can comprise downloading the app onto the user device 550 (shown in FIG. 5A).
- A step (an interface for which is shown in FIG. 26) can comprise logging into the app on the user device.
- The step 1512 can comprise beginning a new project (e.g., of measuring the roof 60) in the app.
- A step 1514 can comprise entering information about the new project (e.g., a roof address) in the app.
- A step 1516 can comprise entering or setting in the app one or more global variables (e.g., a style, a color, a private label branding, and/or a thickness of the coping or other structural element for which measurements are being taken), options for which can in some aspects be built into the app. In some aspects, the global variables can be fixed.
- The step 1518 can comprise downloading and storing in a background layer a reference image of the roof 60 (e.g., a blueprint or drawing image, a satellite or other picture such as available from Google Earth, an aerial photograph, or a sketch of the roof 60 to be measured).

The second stage 1530 (i.e., measurement) can comprise any one or more of the following steps, including exemplary steps 1532 through 1540:

- The step 1532 can comprise calibrating the tool. In some aspects, the step 1532 can comprise pushing the LEFT and RIGHT control surfaces on the user input interface 950 (e.g., the D-Pad) and holding them down for a predetermined amount of time, e.g., 3 seconds. In some aspects, the step 1532 can comprise closing and then opening the clamps, i.e., the stationary clamp 800 and the dynamic clamp 900, to calibrate or "zero" the caliper portion 520 of the measurement tool 510. In some aspects, the step 1532 can comprise the caliper portion 520 automatically zero-ing itself upon supply of power to the caliper portion 520 and/or indicating same on a separate screen in the app. In some aspects, the step 1532 can comprise pushing the "zero" control 1035 on the odometer 1000 to calibrate the odometer portion 530 of the measurement tool 510.
- A step 1534 can comprise selecting in the app a particular type of part geometry (e.g., a wall, a corner, custom geometry, or another geometric feature 100). In some aspects, the step 1534 can comprise selecting the type of part geometry on a touch screen, e.g., the display 1320 (shown in FIG. 13B), of the user device 550. In some aspects, the step 1534 can comprise using the measurement tool 510 to toggle between menus on the app while listening to verbal, i.e., aural, feedback from the app and without necessarily viewing the display 1320.
- A step (not shown) can comprise the app automatically loading various default parameters upon selection of a particular type of part geometry.
- A step (not shown) can comprise the app automatically identifying for the user and requesting from the user only the required or invited measurement actions with the measurement tool 510 upon selection of a particular type of part geometry.
- A step (not shown) can comprise the app receiving raw measurements from the user.
- A step (not shown) can comprise the app automatically loading the required information for the part geometry based on receipt of raw measurements from the user.
- A step 1536 can comprise measuring a dimension of the selected geometric feature 100 (e.g., one or more wall widths 75, as shown in FIG. 1F, of a portion of the parapet 70, as shown in FIG. 1F, and one or more lengths of the portion). In some aspects, the step 1536 can comprise following commands on the display 1320 of the user device 550. In some aspects, the step 1536 can comprise following aural commands voiced by the user device 550. The step 1536 can comprise the measurement tool 510 automatically sensing, collecting, and communicating various data, including from one or more of the sensors 930,943.
- A step 1538 can comprise manually entering in the app dimensions and other information about the geometric feature 100. In some aspects, all of the measurements can be entered manually through the app and none entered through the measurement tool 510. As such, the tool 510 can be bypassed and the app used by itself without the tool 510.
- The step 1540 can comprise determining whether all portions of the parapet 70 to be measured have been measured. If the answer is "yes," the second stage 1530 can be considered complete, and the user can move to the third stage 1550 (i.e., error checking). If the answer is "no," the user can repeat the second stage 1530 starting with step 1534 for each geometric feature 100 desired to be measured. The user can take measurements of each connected geometric feature 100 in succession and in a single direction. More specifically, contiguous roof wall sections can be measured in a clockwise or a counterclockwise sequence. In some aspects, for example, the user can move in a clockwise direction around the roof 60 (shown in FIG. 1B) to measure each section of the parapet 70 (shown in FIG. 1B). In other aspects, as shown in FIG. 15B, the user can move in a counterclockwise direction around the roof 60 to take the measurements.
- A step (not shown) can comprise the user indicating with the measurement tool 510 that a measurement is ready by hitting the central control surface on the D-Pad.
- A step (not shown) can comprise the user completing the measurements for a particular geometric feature 100 by holding down the central control surface on the D-Pad for a predetermined, minimum amount of time (e.g., as exemplarily disclosed elsewhere herein) to indicate to the app such completion.

The third stage 1550 (i.e., error checking) can comprise any one or more of the following steps, including exemplary step 1552:

- The step 1552 can comprise error checking a set of dimensions received from the user and determining whether any errors exist. If the answer is "no" or "okay" or the equivalent, the third stage 1550 can be considered complete, and the user can move to the fourth stage 1570 (i.e., roadmap and engineering document generation). If the answer is "yes" or "error" or the equivalent, the user can repeat the second stage 1530 starting with step 1534 for the geometric feature 100 in question, following the instructions of the app.

A step (not shown, but can be part of the step 1552) can comprise checking all "A" and "B" connectivity for logical sense (e.g., the "B" dimension of a wall geometry connected to a corner geometry can be required to match the "A" dimension of the corner geometry). Widths can also be checked to ensure that wall and corner copings fit together.

A step (not shown, but can be part of the step 1552) can comprise checking any other incompatibility or inconsistency or discrepancy that surfaces after application of one or more of the geometric or geometry rules or definitions or app settings, including those disclosed herein.

The third stage 1550 can make use of a "hot edge" concept coined by the inventors. Following this concept, the app on the user device 550 can build a virtual structure (i.e., the roadmap shown in FIG. 44) in a virtual space with the measurements collected from the measurement tool 510 and/or the user through manual entry. The idea is that lengths of wall are connected, and in order to check for continuity across all of the geometric features 100, all one need to know is the relationship between the measured points. (Note that where walls are not connected, a new "hot edge" can be started.) Here, the user can select a particular type of geometry (e.g., a wall) and then take measurements before moving to the next geometry. Hence, a series of geometries an together form the parapet wall in virtual space, and the selected "geometries" (e.g., a wall, a corner, and a tee) and their associated characteristics can fill in the gaps between where the physical measurements are taken and even where they are not taken. In some aspects, for example, the app can build reasonable assumptions or preset dimensions into the design for cost or manufacturability considerations. Based on the hot edge concept, the app can provide several helpful checks for the user. For example, the app can warn the user when the measurements do not make sense and additional or new measurements are needed.

Switching from FIG. 15A, FIG. 15B is a diagram showing error-checking of measurements taken in the error-checking stage of the flow chart 1500 of FIG. 15A. As shown, for example, all "A" and "B" connectivity and wall widths for a parapet 70 can be checked for logical sense. As noted in the diagram (marked with "Wall section width disconnect" where the B measurement of 7" for one geometry can be flagged as not matching, within a desired tolerance, the A and/or B measurements of an adjacent geometry, particularly if such geometry is considered by the user to be a wall geometry with matching A and B dimensions), the wall widths 75 at ends of a supposedly standard "wall" section do not match, and the user can be given an opportunity to recharacterize the geometry or otherwise resolve the disconnect. Adjacent geometric features 100 can share a common measurement location (e.g., the end of a wall section and the beginning of an adjacent miter section), for example, but for one or more reasons the measurements taken at the common measurement location can differ. In some aspects, the user can resolve the disconnect by re-taking measurements. More specifically, the user can do this without erasing the original data (as the app can distinguish between the two sets of data and use the better set), without determining the exact physical location of the error and without returning to a specific location of the parapet. The user can instead simply take more measurements in the vicinity of the geometric features 100 resulting in the error. In some aspects, the user can enter as a custom geometry a wall that tapers over its length or otherwise deviates from the chosen geometry (e.g., wall geometry). As indicated elsewhere herein, as a standard path, a user can move around the roof in a clockwise direction and not a counterclockwise direction as shown. In some aspects, the edge metal product can accommodate—and the app can allow for—an increased tolerance between coincident A and B measurements or between A and B measurements within a particular geometry.

In some aspects, as noted elsewhere herein, the user can take some measurements using the measurement tool 510 and can manually enter other measurements. In some aspects, the user can choose to enter all measurements manually. In such aspects, whether the measurement tool 510 is used for all, some, or no measurements, the "hot edge" approach need not be defeated and error-checking can still be performed.

Returning to FIG. 15A, the fourth stage 1570 (i.e., roadmap and engineering document generation) can comprise any one or more of the following steps, including exemplary steps 1572 through 1578:

The step 1572 can comprise finalizing and generating the roadmap and generating the engineering documents. The step 1572 can comprise exporting the data from inside the app. The step 1572 can comprise sending the roadmap and engineering documents. In some aspects, the roadmap can contain all of the basic information needed for reference by installers of the parts, including the location of sections and parts for installation. In some aspects, the roadmap can contain the dimensional characteristics of the roof 60, e.g., details surrounding tapered insulation and membrane securement, which can be used for inspection and validation purposes.

A step 1574 can comprise sending the roadmap and the engineering documents to another individual (e.g., in a Customer Services role) for the purpose of generating a cost estimate.

A step 1576 can comprise requesting customer approval of the engineering documents (and, as requested, the cost). If the answer is "yes," the user can move to the next step (i.e., order submission). If the answer is "no," the user can repeat one or more steps of the second stage 1530 starting with step 1534 for any geometric feature 100 of concern to the customer. A customer can withhold approval for any one of a number of reasons unrelated to the dimensions listed in the engineering documents, in which case other steps can be helpful, including steps not requiring the measurement tool 510 or the app.

A step (not shown) can comprise the app automatically preparing a combined document (e.g., in PDF format) with a signature block for the client. The step can comprise sending the engineering document document(s) to the engineers, the client, and/or the RTS.

The step 1578 can comprise submitting an order for parts to cap or encapsulate or in some other way cover at least a portion of the parapet wall.

A step (not shown) can comprise sharing the roadmap with any one or more of the RTS, the building owner, the manufacturer of the parts, and the installers of the parts.

A step (not shown) can comprise generating a list of parts (e.g., coping parts) based on the measurements collected from the measurement tool 510 or, more generally, the system 500.

Figure 16A:
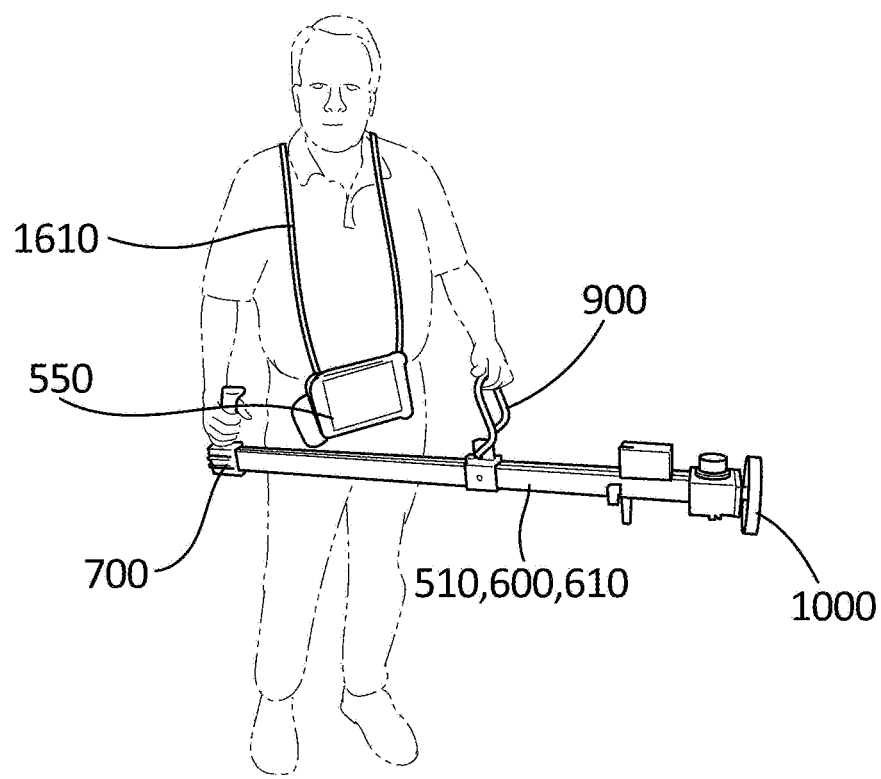
Figure 16B:
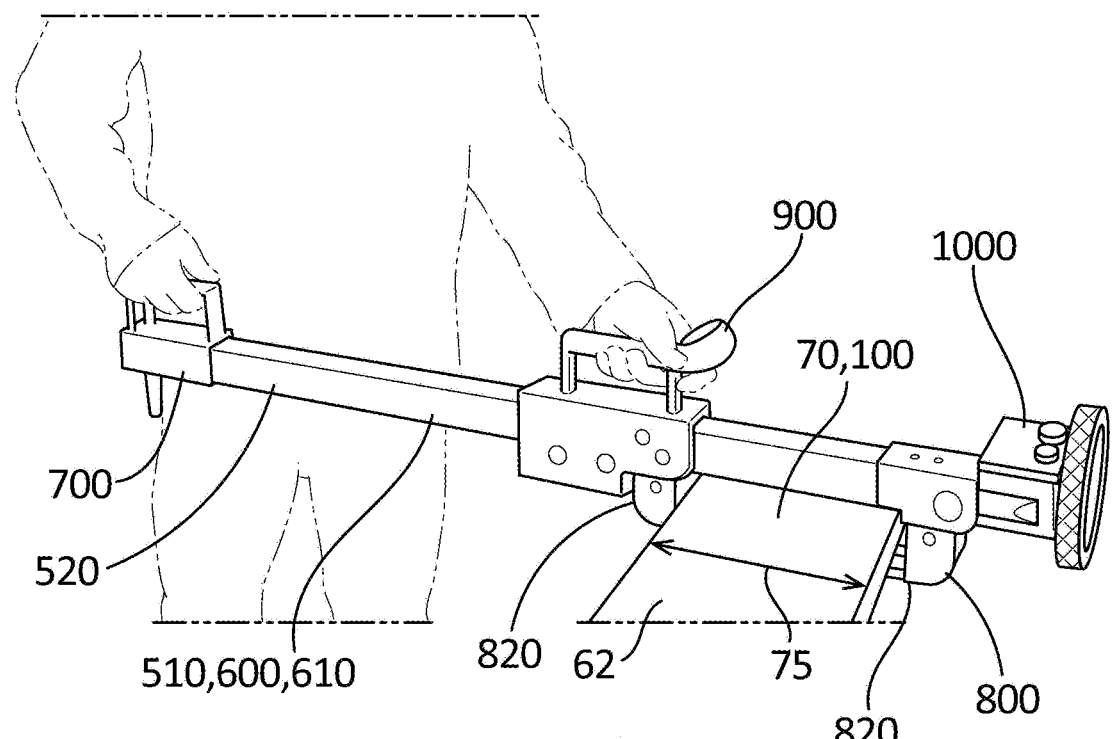

FIGS. 16A-16F are various views of a user holding or carrying the measurement tool 510 and the user device 550 of the system 500 of FIG. 5A. FIG. 16A is specifically a perspective view of a user holding or carrying the measurement tool 510 and the user device 550 of the system 500. As shown, the user can hold the static handle 700 with one hand and the sliding dynamic clamp 900 with the other hand (which, as drawn, can resemble the static handle 700 but can incorporate one or more features of the dynamic clamp 900 of the measurement tool 510 as described elsewhere herein and shown in FIG. 16B), and a portion of the measurement tool 510 can extend beyond the dynamic clamp 900 in cantilever fashion. As also shown, a strap 1610 can be secured to the user device 550, and the strap 1610 can be suspended around the neck of a user.

FIG. 16B is a perspective view of a user positioning the measurement tool 510 of FIG. 16A on a parapet wall 70 of a roof such as the roof 60 of FIG. 1A and taking a measurement of the wall width 75 with a caliper portion 520 of the measurement tool 510. The user can rest the bar body 610 or, more generally, the bar assembly 600 of the measurement tool 510 on a top surface of the parapet wall 70. The jaws 820 can be tightened by moving the dynamic clamp 900 relative to the stationary clamp 800 and squeezing down the membrane to obtain the wall width 75. In some aspects, the static handle 700 can be useful not only to support the tool 510 but can also be useful in being able to comfortably and consistently draw the stationary clamp 800 toward the user and thereby sufficiently compress the membrane 62 installed over the parapet 70.

The measurement tool 510 can be ambidextrous, i.e., equally usable by those who are left-handed and those who are right-handed. The jaws 820 of the stationary clamp and the dynamic clamp 900 can be opened by moving the (sliding) dynamic clamp relative to the static handle. In some aspects, as shown, the measurement tool 510 can be driven from the active handle, i.e., by driving the dynamic clamp 900. In some aspects, the jaws 820 of the measurement tool can be driven from the static end, i.e., by driving the static handle 700 like one would drive a pool cue while holding the dynamic clamp fixed in the other hand. The user can hold and otherwise use the measurement tool 510 in such a way that is most comfortable to them. Regardless of how the measurement tool 510 is used, the measurement tool 510 can know its orientation in space in terms of roll, pitch, and yaw because of the operation of the orientation sensor 943.

Once satisfied with the measurement, the user can press a control surface (e.g., the control surface 952 and, more specifically, the control surface 954 on the user input interface 950)—or, in some aspects, make some gesture visible to the measurement tool 510 or the app of the user device—as confirmation. Such gestures can include, for example and without limitation, a user tapping a switch with the user's foot, the user nodding the user's head, the user shrugging the user's shoulders, the user issuing or saying a verbal command (e.g., "Measure" or "Enter"), the user making a whistle noise by pursing one's lips and exhaling, the user using the user's fingers to make a double-tap on either of the tool handles, or another aural, tactile, or visual gesture. One or more gestures can be picked up by the camera 1350 (shown in FIG. 5A) of the user device 550. The distance 560 (shown in FIG. 5A) between the two clamps can be digitized and can be wirelessly transmitted to the user device 550. As will be described below, depending on the type of the geometric feature 100, measurements of the wall width 75 can be taken at lines A (i.e., proximate to a beginning or first end and shown in FIG. 16C) and B (i.e., proximate to an end or second end and also shown in FIG. 16C) of the geometric feature 100.

Figure 16C:
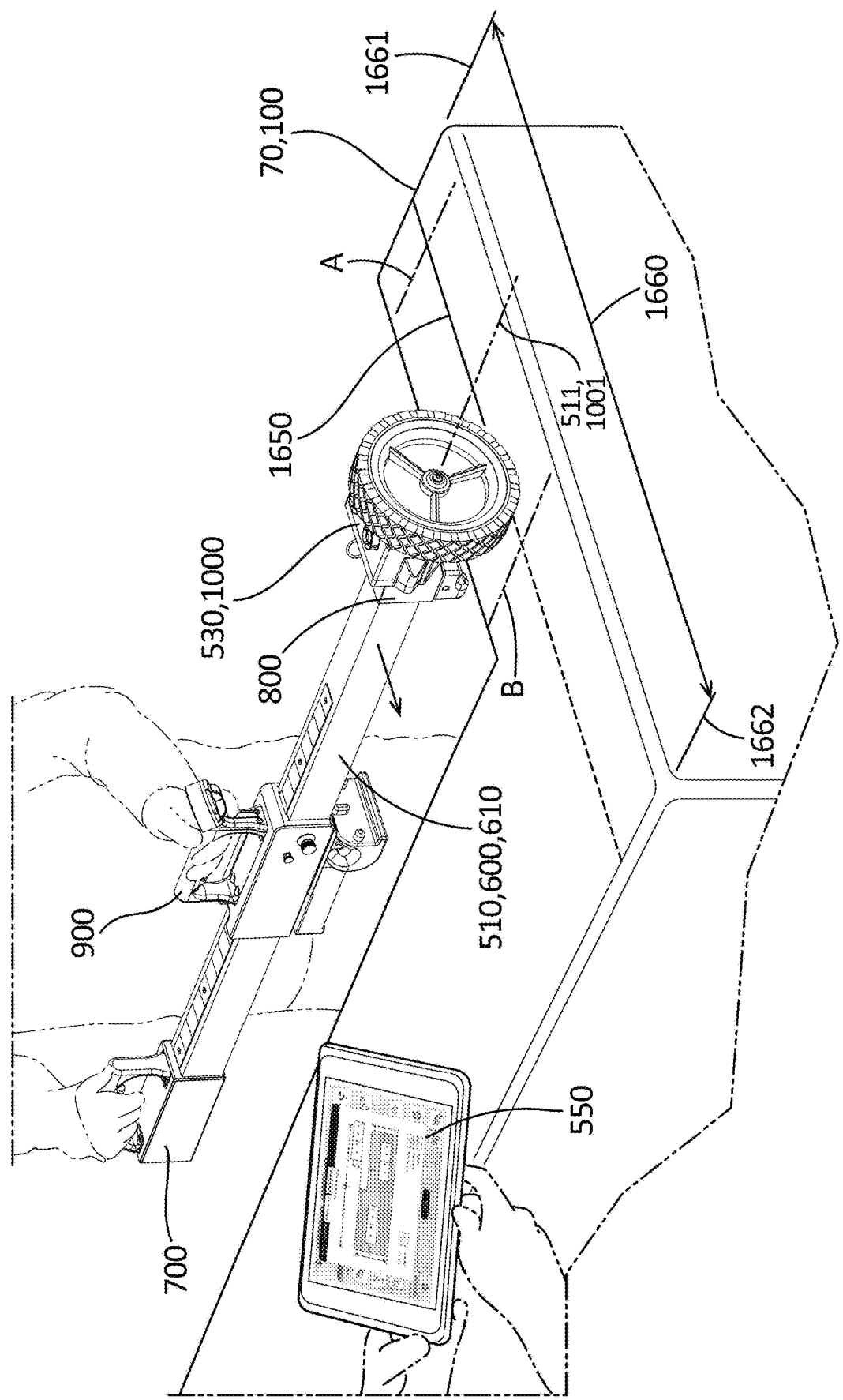

FIG. 16C is a perspective view of a user positioning the measurement tool 510 of FIG. 16A on a parapet wall 70 of a roof such as the roof 60 of FIG. 1A and taking a measurement of a wall length 1660 with an odometer portion 530 of the measurement tool 510. The sensor 1030 (shown in FIG. 10C) and, more specifically, the encoder 1032 (shown in FIG. 10C) of the odometer portion 530, can measure a distance traveled down the length or, in some aspects in which a wall length or length 1660 is oriented vertically, a height of the parapet 70. More specifically, the sensor 1030 can measure the length 1660 or a height of the parapet 70 as desired by repositioning or otherwise reconfiguring the wheel 1020 to contact and travel along a path 1650 of the parapet wall 70 or, more specifically, the geometric feature 100, equaling the length 1660 between a start point 1661 and an end point 1662. Note that the axes 511,1001 need not remain parallel with the surface traversed because a circumference of the wheel 1020 can be the same—for example only, by the wheel 1020 defining a constant diameter from one axial end to an opposite axial end—whether or not an entire radially outermost surface or just a portion thereof is in contact with the geometric feature 100. In some aspects, depending on the geometry of the wheel 1020 and other aspects of the tool 510, data regarding the orientation of the tool 510 and captured by the tool 510 can be used to adjust for any difference in measurements resulting from any variance in such orientation. As shown, the dynamic clamp 900 can be pulled away from the geometric feature 100 during use of the odometer 1000. As also shown, a second user can optionally hold the user device 550.

Figure 16E:
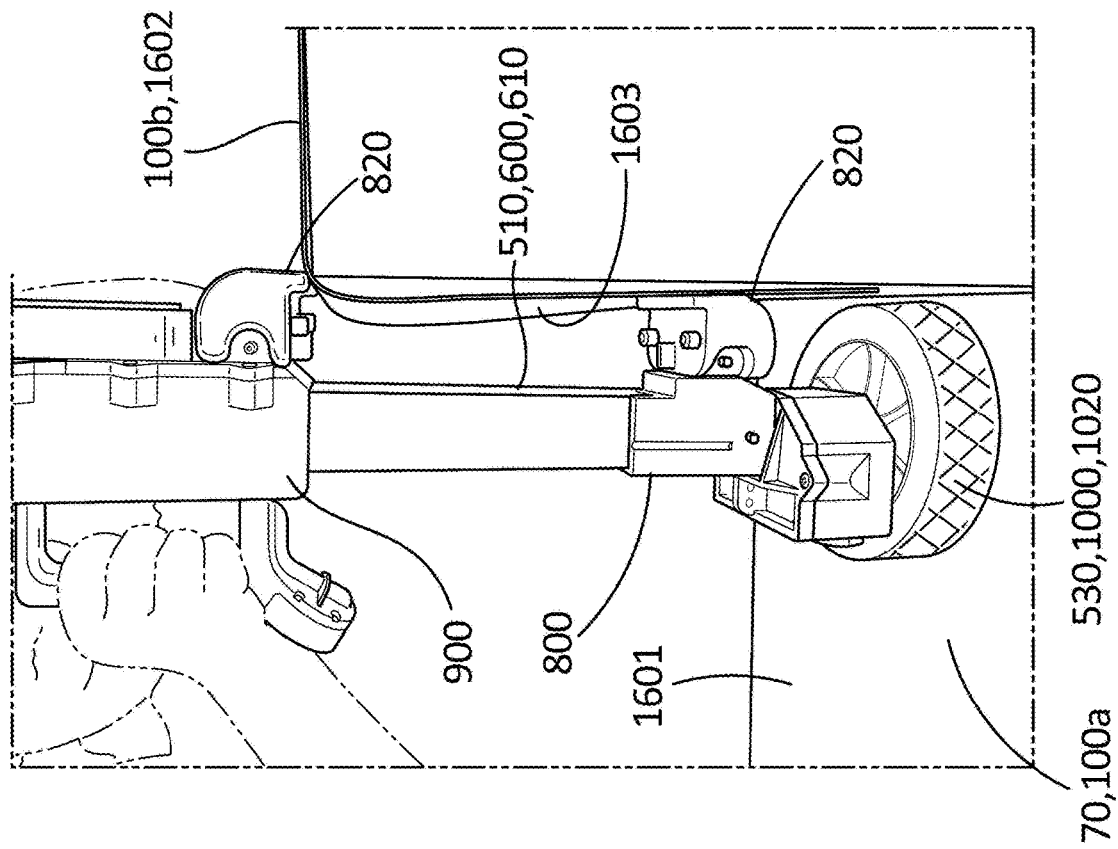
Figure 16D:
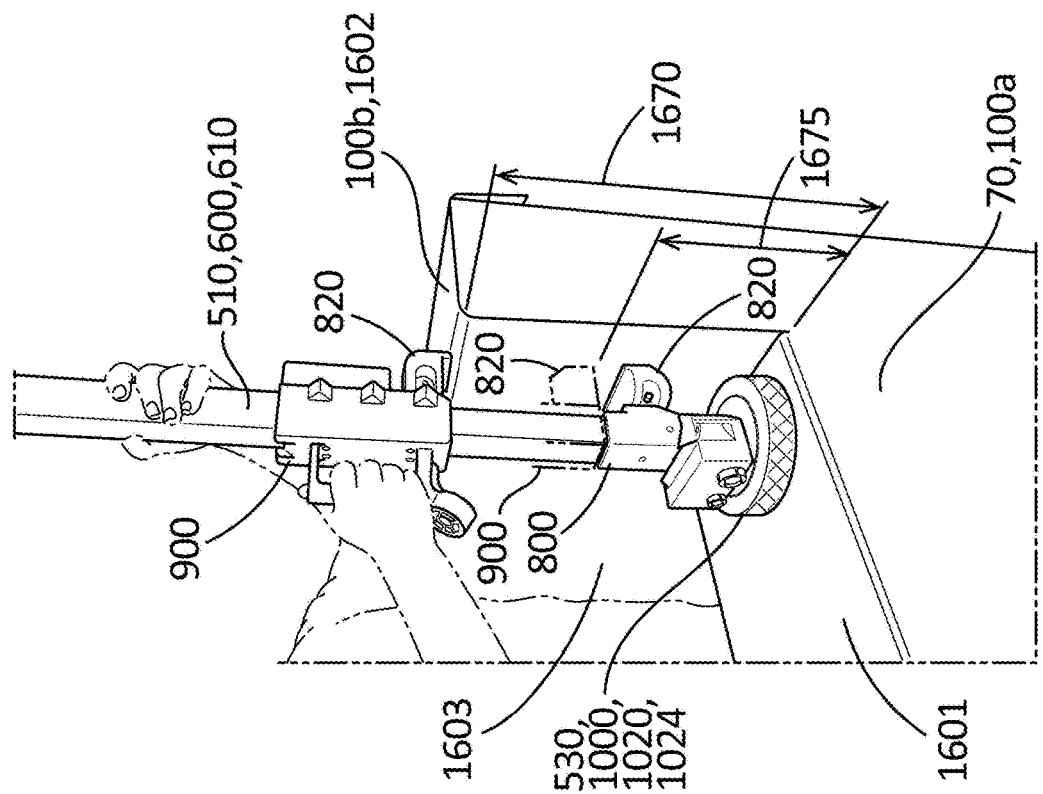

FIG. 16D is a top perspective view and FIG. 16E is a side perspective view of a user positioning the measurement tool 510 of FIG. 16A on a parapet step 70 of a roof such as the roof 60 of FIG. 1A and taking measurement of a wall height or step height 1670 with the measurement tool 510 in accordance with another aspect of the current disclosure. Coined a "Wheel-iper" mode of measurement or use of the measurement tool 510 by the inventors, an axial end of the wheel 1020 can rest on a top surface 1601 of a lower geometric feature 100a of the parapet 70 and the jaw 820 of the dynamic clamp 900 can rest on a top surface 1602 of an upper geometric feature 100b. Note that the jaw 820 of the stationary clamp 800 need not be used and, as a technical matter, can be removed without changing the operation of the tool 510 but can help the user maintain a vertical position of the tool 510. This can be especially true if the jaw 820 and the wheel 1020 extend the same distance towards a vertical surface 1603 of the geometric feature 100b. In some aspects, each of the surfaces 1601,1602,1603 can be oriented other than in the horizontal or vertical directions, as shown. In some aspects, the user can push against the odometer 1000 and, more specifically, the wheel 1020 before and/or during the measurement to ensure that the wheel and, more generally, the tool 510 is in contact with the vertical surface 1603 or, alternatively, to ensure that the axial end, i.e., a flat side, of the wheel 1020 is in full contact with the top surface 1601 of the geometric feature 100a. The hub 1022 (shown in FIG. 10D) and other portions of the wheel 1020 can be minimized and, in any case, made to not extend in an axial direction with respect to the axis 1001 (shown in FIG. 10D) past a radially outermost surface or tread 1024 of the wheel 1020. In some aspects, a height of the jaw 820 along the extension direction 827 (shown in FIG. 8A) can be increased for greater and more secure contact against the top surface 1602 of the geometric feature 100b by replacing the jaw 820 shown with a different jaw such as, for example and without limitation, the jaw 820 shown in FIG. 8A.

The orientation sensor 943 (shown in FIG. 9D), which as noted previously can comprise the IMU and can be housed in the dynamic clamp 900, can sense the vertical orientation of the tool 510 and can calculate the step height 1670 based on knowing the additional distance between the front edge of the jaw 820 of the stationary clamp 800 and the axial end of the wheel 1020 now resting on the top surface 1601 of the geometric feature 100*a*. In contrast to depth or step measurements of the type shown but made with other tools (i.e., a depth gage on a set of dial or electronic calipers), the tool 510 can be aware of its own orientation via input from the orientation sensor 943 and can adjust its measurement mode automatically upon the tool being rotated 90 degrees (or some other minimum angle) or being in a vertical or nearly vertical position and can collect and transmit and further process the data automatically. In some aspects, the Wheel-iper mode can be entered manually and without the tool being oriented vertically.

If and when the step height 1670 is less than a minimum dimension 1675 measurable in a standard Wheel-iper setup (with, for example, a rear end of the dynamic clamp 900 shown in broken lines and pushed as far as possible towards the stationary clamp 800), the Wheel-iper setup can be modified by any one of a number of aspects such as, for example and without limitation, removing the odometer 1000 and/or adjusting for this in a setting on the app on the user device 550, changing one or both jaws 820 and adjusting for this in a setting on the app, adjusting the dimensions of the measurement tool 510 to reduce the minimum dimension 1675, or manually entering the step height 1670 into the app.

Figure 16F:
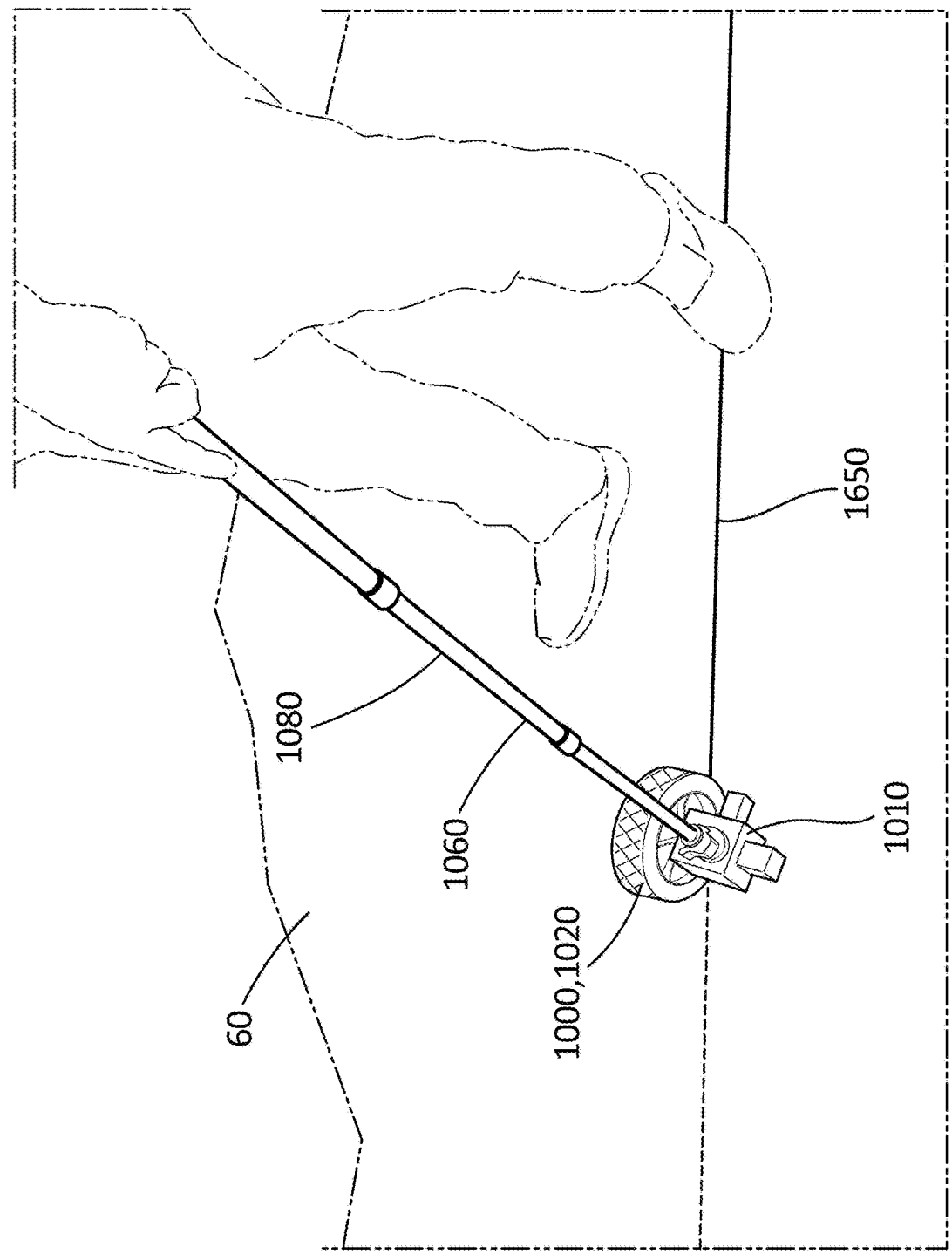

FIG. 16F is a top perspective view of a user using the assembly 1060 comprising the odometer 1000 of the measurement tool 510 of FIG. 16A assembled to the handle 1080 and being pushed along the path 1650 on a horizontal surface (e.g., a portion of the roof 60) in accordance with another aspect of the current disclosure. When adding the handle 1080, the internal operation of the odometer 1000 need not but can be altered. As shown, the handle 1080 can be configured to be held by a user to direct movement of the odometer 1000 on a surface while the user moves with the odometer 1000.

Figure 17A:
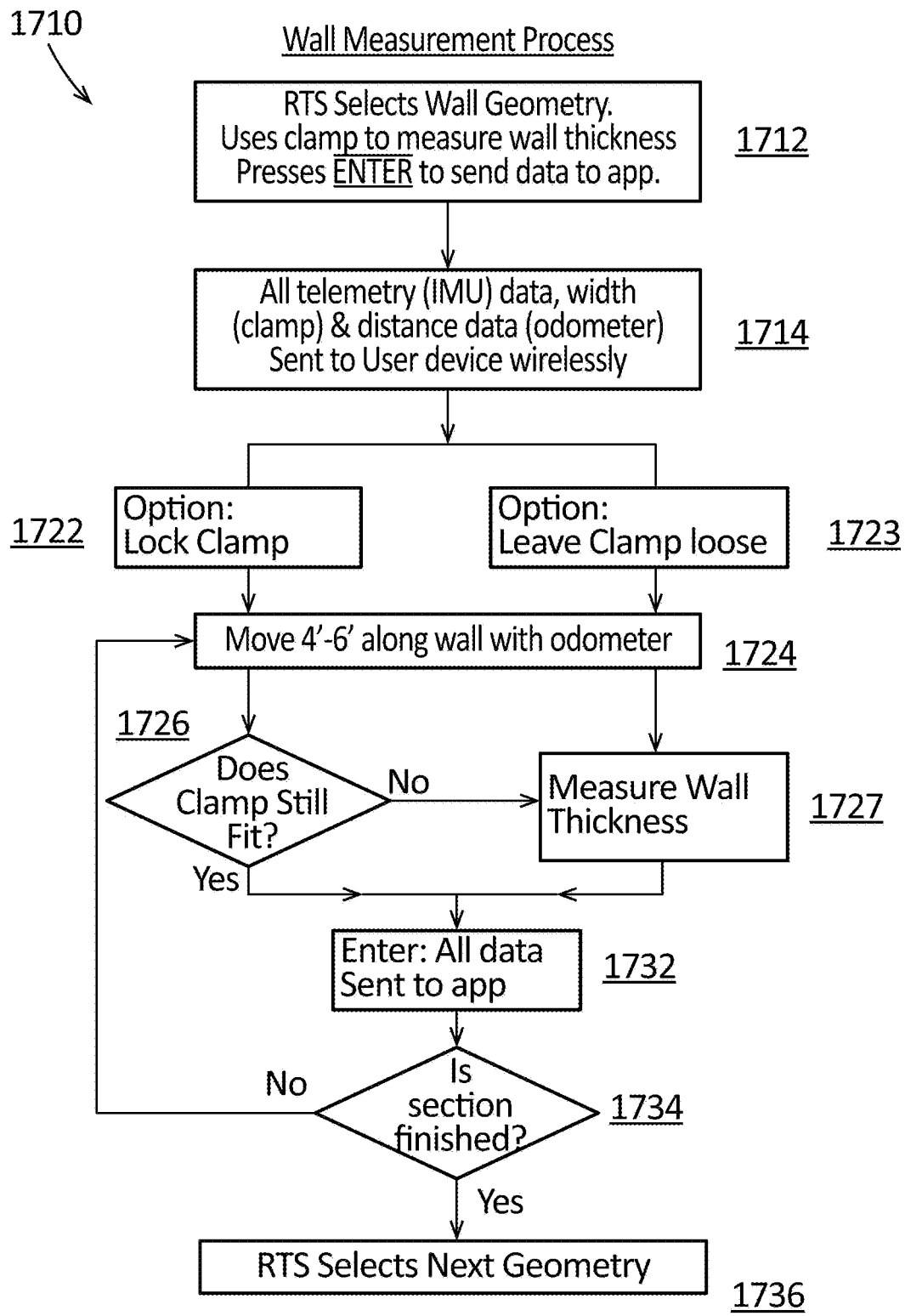
Figure 17B:
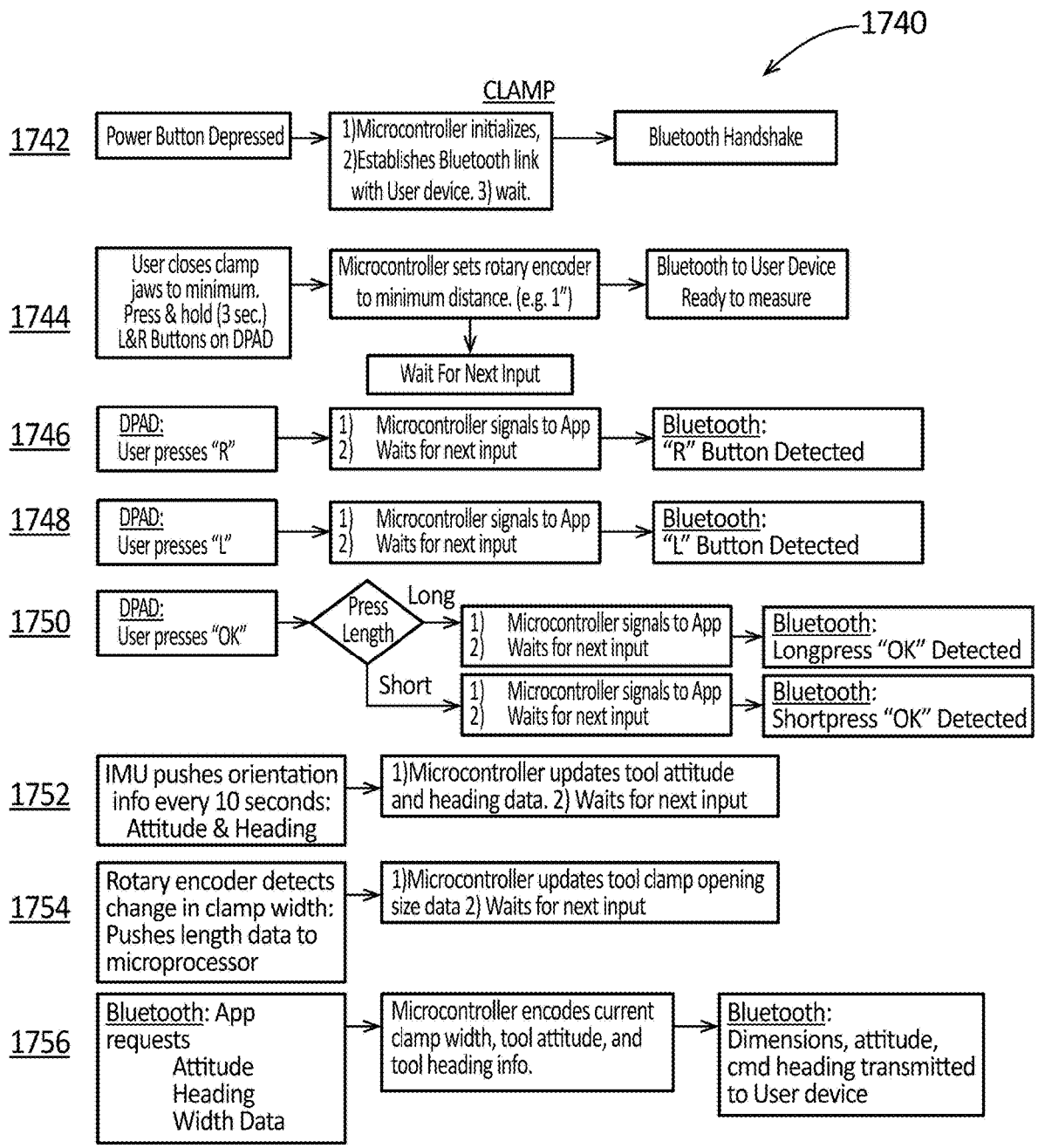
Figure 17C:
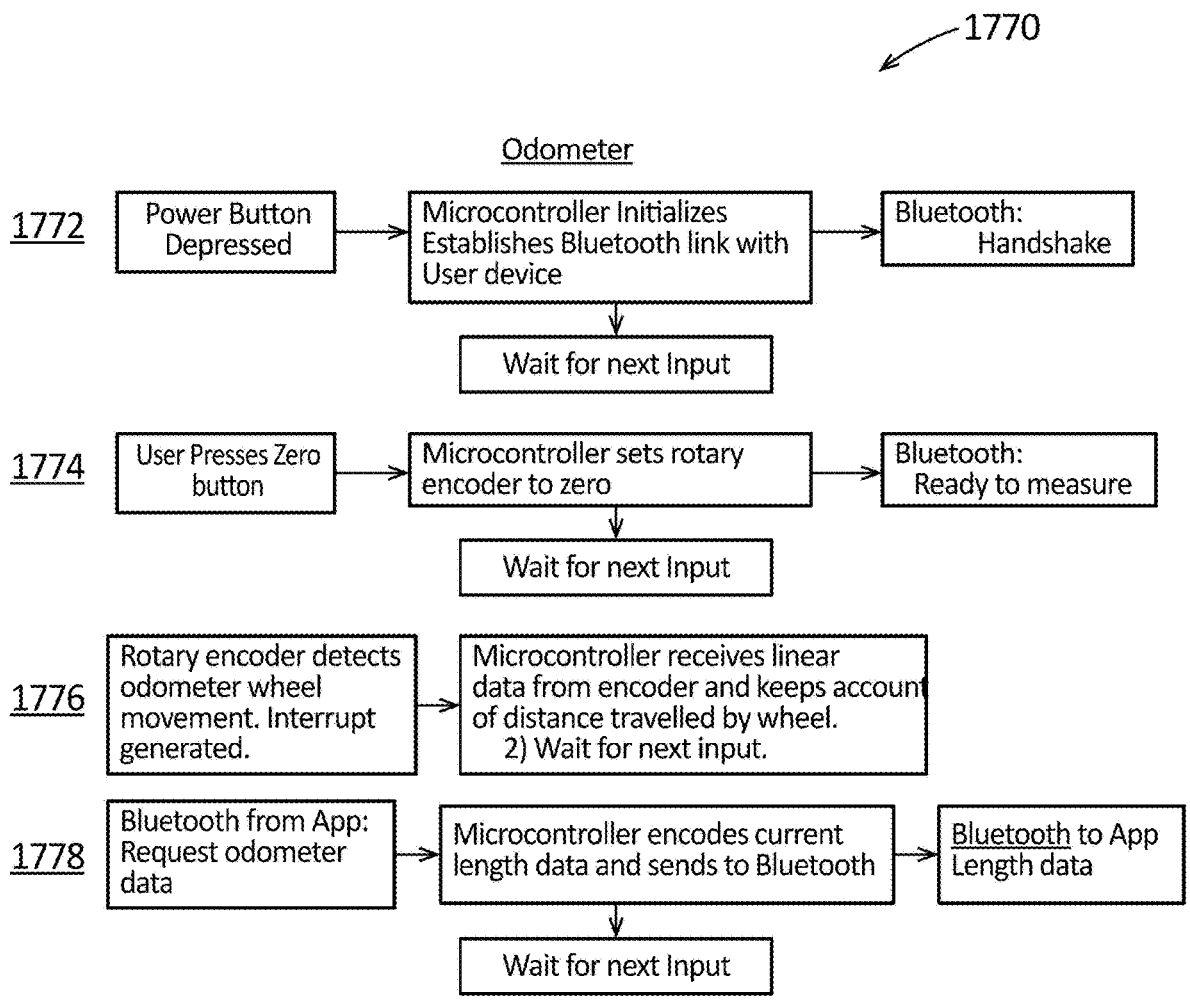

FIGS. 17A-17C are various views of a semi-automated method of taking measurements with the system 500 (shown in FIG. 5A) of FIG. 5A. The method can be semi-automated in that it receives input form a user but then takes additional steps that do not require user input. FIG. 17A is specifically a flow chart 1710 showing a semi-automated method of taking measurements with the caliper portion 520 (shown in FIG. 5A) of the system 500. Again, one or more of the steps below can be performed by a user, and the remaining steps can be performed automatically, e.g., by the app on the user device 550 (shown in FIG. 5A). The flow chart 1710 and, more specifically, a method of measuring a geometric feature 100 (e.g., a wall geometry) can comprise any one or more of the following steps, including exemplary steps 1712 through 1736:

The step 1712 can comprise the user selecting wall geometry as the type of geometric feature 100. An associated step can comprise the user measuring the geometry, e.g., the wall width 75 and the wall length. An associated step can comprise pressing "Enter" on the app—or by pressing a portion of the user input interface 950 such as, for example and without limitation, the central control surface 954—to send the measurement data to the app.

A step 1714 can comprise sending the telemetry (IMU) data, e.g., width data (clamp) and distance data (odometer), to the user device 550 wirelessly.

The user can have a choice at this point between steps 1722 and 1723.

In one or more of steps 1722 through 1726, the method can comprise locking a position of the dynamic clamp 900 and checking the wall width 75 with the dynamic clamp 900 in that locked position. More specifically, the step 1722 can comprise locking the clamp.

The step 1724 can comprise moving some distance (e.g., four to six feet) along the top of the wall with the wheel 1020 of the odometer 1000.

The step 1726 can comprise determining whether the caliper portion 520 still fits over the wall. If the answer is "yes," the user can proceed to step 1732. If the answer is "no," the user can move to step 1727.

The step 1727 can comprise unlocking the dynamic clamp 900 and measuring the wall width 75 at that point and in desired increments of distance (e.g., four to six feet) along the wall thereafter until the end of the geometric feature 100 (here, the wall) is reached.

In one or more of steps 1723 through 1727, the method can comprise leaving the clamp loose during the measurement process and proceeding as shown.

A step 1732 can comprise sending all data to the app, which can again comprise the user requesting same, including through any of the methods disclosed herein.

A step 1734 can comprise determining whether the measuring process is complete on the current section of the parapet (i.e., the current wall). If the answer is "no," the method can comprise returning to step 1724 to restart the process. If the answer is "yes," the user can move to step 1736.

The step 1736 can comprise the user selecting the next geometry (i.e., the next geometric feature 100) and starting a new process of measurement for that new geometry.

FIG. 17B is a flow chart 1740 showing aspects of the method of FIG. 17A showing, more specifically, a method of using the clamp controller or controller 940 or caliper portion 520 of the dynamic clamp 900 of FIG. 9H. More specifically, the flow chart 1740 shows inputs (on the left) and outputs (on the right) of the controller 940. The flow chart 1740 and, more specifically, a method of using the controller 940 can comprise any one or more of the following steps, including exemplary steps 1742 through 1756:

The step 1742 can comprise the user depressing the power control 525. The step 1742 can further comprise the controller 940 initializing and establishing a wireless link (e.g., via Bluetooth® technology) with the user device 550 and waiting for the next input. The step 1742 can further comprise performing a wireless (e.g., Bluetooth®) "handshake" between the controller 940 (of the caliper portion 520 of the measurement tool 510) and the user device 550.

A step 1744 can comprise the user closing the clamp jaws 820 to a minimum distance and pressing—and holding (e.g., for at least one second or at least three seconds)—the left and right control surfaces (e.g., the control surfaces 953*b* and 953*d*) on the user input interface 950. The step 1744 can further comprise the controller 940 setting the sensor 930 and, more specifically, the rotary encoder 932 to the minimum distance (e.g., one inch) and waiting for the next measurement input. The step 1744 can further comprise the controller 940 signaling to the user device 550 that the caliper portion 520 of the tool 510 is ready to measure.

A step 1746 can comprise the user pressing the right or "R" control surface (e.g., the control surface 953*d*) on the user input interface 950. The step 1746 can comprise the controller 940 signaling same to the user device 550 and waiting for the next input. The step 1746 can further comprise the user device 550 detecting the selection of the "R" control surface.

A step 1748 can comprise the user pressing the left or "L" control surface (e.g., the control surface 953*b*) on the user input interface 950. The step 1748 can comprise the controller 940 signaling same to the user device 550 and waiting for the next input. The step 1748 can further comprise the user device 550 detecting the selection of the "L" control surface.

A step (not shown) can comprise the user pressing the top or "UP" control surface (e.g., the control surface 953*c*) on the user input interface 950. The step can comprise the controller 940 signaling same to the user device 550 and waiting for the next input. The step can further comprise the user device 550 detecting the selection of the "UP" control surface.

A step (not shown) can comprise the user pressing the bottom or "DOWN" control surface (e.g., the control surface 953*a*) on the user input interface 950. The step can comprise the controller 940 signaling same to the user device 550 and waiting for the next input. The step can further comprise the user device 550 detecting the selection of the "DOWN" control surface.

A step 1750 can comprise the user pressing the "OK" control surface (e.g., the control surface 954) on the user input interface 950. The step 1750 can comprise the controller determining whether the pressing of the "OK" control surface was long (e.g., at least one second) or short. The step 1750 can comprise the controller 940 signaling to the user device 550 that the "OK" control surface was pressed and whether the pressing of the control surface was long or short, and waiting for the next input. The step 1750 can further comprise the user device 550 detecting the selection of the "OK" control surface and either the long or short press.

A step 1752 can comprise the sensor 732 (e.g., the IMU) pushing orientation data (e.g., attitude and heading or pitch, roll, and yaw data) at a predetermined rate, e.g., 10 times every second. The step 1752 can comprise the controller 940 updating the tool orientation and waiting for the next input.

A step 1754 can comprise the sensor 930 detecting a change in clamp width and pushing length data to the controller 940. The step 1754 can further comprise the controller 940 updating the tool clamp opening size data and waiting for the next input. In some aspects, the step 1754 or another step in the process can comprise the controller 940 sending data only upon request by the app. In such aspects, the controller 940 can still collect and save the data. More specifically, a continuous connection between the tool 510 and the app on the user device 550 is not required for the tool 510 to collect and store—and the app later use—data.

The step 1756 can comprise the user device 955, via the app, requesting orientation data and clamp opening width data. The step 1756 can comprise the controller 940 encoding the current clamp width and tool orientation data and waiting for the next input. The step 1756 can comprise the controller 940 sending and the user device 955 receiving the orientation data and the clamp opening width data.

FIG. 17C is a flow chart 1770 showing aspects of the method of FIG. 17A showing, more specifically, a method of using the odometer 1000 of FIG. 11A. More specifically, the flow chart 1770 shows inputs (on the left) and outputs (on the right) of the controller 1040 of the odometer 1000. The flow chart 1770 and, more specifically, a method of using the odometer 1000 can comprise any one or more of the following steps, including exemplary steps 1772 through 1778:

The step 1772 can comprise the user depressing the power control 535. The step 1772 can further comprise the controller 1040 initializing and establishing a wireless link (e.g., via Bluetooth® technology) with the user device 550 and waiting for the next input. The step 1772 can further comprise performing a wireless (e.g., Bluetooth®) "handshake" between the controller 1040 (of the odometer portion 530 of the measurement tool 510) and the user device 550.

A step 1774 can comprise the user pressing the zero control 1035. The step 1774 can further comprise the controller 1040 setting the sensor 1030 (e.g., the rotary encoder) to zero and waiting for the next measurement input. The step 1744 can further comprise the controller 1040 signaling to the user device 550 that the odometer portion 530 of the tool 510 is ready to measure. In some aspects, the step 1774 need not include the user pressing the zero control 1035, and the user device 550 or the tool 510 can instead automatically zero the sensor 1030 without such user intervention.

A step 1776 can comprise the sensor 1030 detecting rotation of the wheel 1020 and generating an interrupt process. The step 1776 can further comprise the controller 1040 receiving linear data from the sensor 1030, keeping account of same, and waiting for the next input.

The step 1778 can comprise the user device 955, via the app, requesting odometer data. The step 1778 can comprise the controller 1040 encoding the current length data and waiting for the next input. The step 1778 can comprise the controller 1040 sending and the user device 955 receiving the length data.

The measurement tool 510 and/or the app of the user device 550 can provide aural or audible cues, signals, or commands to the user that a measurement has been taken via the control surfaces on the tool 510. Having received such cues, the user can continue measuring the various geometric features 100 of the roof 60 or, as appropriate, move to the next geometric feature 100 without picking up or manipulating the user device 550 or even releasing the handles of the tool 510. Where the user has an opportunity to select from a menus of options (e.g., in the selection of a particular geometry from several geometries), the app can read out the menu of options as they are scrolled through using the control surfaces on the tool 510. The use of audible cues and, more generally, hands-free operation, can be beneficial for multiple reasons including productivity and safety, since as a general matter measuring the roof 60 can require two hands and full attention to safety. In addition, roofs 60 are often colored white, making the display 1320 of the user device 550 more difficult to read. Again, the app can speak to the user as the user works, providing feedback to the user, and can be used for the most part without the user having to touch the user device 550 or even look at it. In some aspects, the cues can be pre-recorded messages saved inside the app for each of the cues. In some aspects, the cues can be formed and voiced out of a text-to-speech feature of the app. In some aspects, however, it is not necessary to hear or respond directly to the cues. A user can turn the voice from the app down or off and collect measurements at any desired rate, including before the cue is provided, and the app can respond based on the data received at the user device 550.

FIGS. 18-24G are various views of processes for taking measurements of various geometries of the geometric features 100 (shown in FIG. 1B) on the roof 60 (shown in FIG. 1B). Each geometry type can have its own set of associated rules, which can depend upon manufacturing considerations and can be further adjusted to allow for more complex or non-standard shapes. In some aspects, due to the flexibility of the tool 510 (shown in FIG. 5A) and, more generally, the system 500 (shown in FIG. 5A) disclosed herein, geometries can be measured or otherwise captured by the system 500 that are more complex than would usually be fabricated. In some aspects, the app on the user device 550 (shown in FIG. 5A) can apply the rules automatically after user selection of the geometry type and even apply default measurements were appropriate (e.g., the standard leg lengths on a corner piece). In some aspects, the user can decide to not use measurements from the tool 510 and can enter dimensions into the computing device manually (after being captured by the tool 510 or by some other tool).

As a general matter, the user of the system 500 and the app on the user device 550 can enable the app to fully describe most geometries by capturing two main sets of information. The first main set of data can comprise an "A" dimension or measurement and a "B" dimension or measurement for each geometric feature 100. For the purposes of the current disclosure (both here and in the accompanying figures), the "A" dimension can be described as dimension A or just A, and the "B" dimension can be described as dimension B or just B. More specifically, capturing the dimensions A and B can comprise measuring the wall width 75 (shown in FIG. 16B) of the geometric feature 100 at each of points A and B (exemplarily shown in FIG. 16C) on the geometric feature 100 with the caliper portion 520 of the measurement tool 510. Some geometries, however, can require the collection of a "C" dimension, which can be described as the dimension C or just C.

The second main set of data can comprise a length for each geometric feature 100. For the purposes of the current disclosure (both here and in the accompanying figures), the length dimension can be described as the aforementioned wall length 1660 (shown in FIG. 16B). For the purposes of the current disclosure (both here and in the accompanying figures), the length dimension, represented elsewhere as the wall length 1660, can be described as dimension L or just L. More specifically, capturing the length dimension can comprise traversing, with the wheel 1020 (shown in FIG. 5A) of the odometer portion 530 (shown in FIG. 5A) of the tool 510, in a direction along the length of each straight or curved section of wall of the geometric feature, the geometry of the geometric feature 100 defining the wall length 1660. Some geometries, however, can be described without capturing any of the length dimensions (e.g., an end cap as shown in FIG. 24A), and some geometries can be made to require the collection of more than one length dimension (e.g., Z-miter geometry as shown in FIG. 24A).

A third set of data can comprise an angle between intersecting surfaces of certain types of geometric features 100 (e.g., corners and tees). For the purposes of the current disclosure (both here and in the accompanying figures), such an angle can be described as angle $\Theta$ (shown in FIG. 19A) or just $\Theta$. While various term definitions or default dimensions or rules are described below for each of several exemplary geometries, such definitions, definitions, or rules can be defined otherwise as desired by a particular user or use condition by adjusting settings of the measurement tool 510 or the app on the user device 550.

FIG. 18 is a top plan view of a geometric feature 100 showing also a process for taking measurements of the geometric feature 100 when it defines a wall geometry. In summary, a user can capture the wall geometry by taking dimensions A and B with the caliper portion 520 of the measurement tool 510 (as shown in FIG. 16A) and then by taking a dimension L with the odometer portion 530 of the measurement tool 510. Below is a glossary of several terms and/or default dimensions (where "wall" is a section of the parapet 70 defining the geometric feature 100):

Width: The wall width 75. This value can be determined by taking several measurements down the length of the wall. In some aspects, such measurements can be taken every 4 to 6 feet or, more specifically, every 5 feet. The largest Width can be taken as the value.

Width Tolerance (Default: 1 inch): The maximum difference between all measurements of the wall Width and the geometric feature 100 still be classified as defining a wall geometry. If the width tolerance is exceeded, a more appropriate geometry (e.g., custom geometry) can be chosen and the appropriate measurements taken.

Minimum Radius (Default: 100 ft): As currently set, this is the minimum Radius (not shown) allowed for any "straight" Wall. This is the calculated radius between measurements A and B (calculated through data collected from a sensor on the measurement tool 510 such as the orientation sensor 943). The radius can theoretically be infinite, meaning that the wall is perfectly straight. Any Wall that has a radius smaller than 100 ft has too much of a curve to be a Wall and is now considered a Radius or, in some aspects, can be redrawn as a radius geometry.

Length: This is the entire length of the wall from edge/termination to edge/termination. In other words, the length L can generally be measured—and, as applicable, past where the dimensions A and B are measured at ends of the wall geometry—to termination edges 101,102 where a top surface of the wall physically terminates, even if such edges are part of adjacent geometries (e.g., the corner geometries shown). Where the position of the measurement (and, more specifically, the odometer wheel 1020 relative to an inner or outer edge of the geometric feature) would not impact the measurement because the distance traveled by the odometer wheel 1020 is the same, any position relative to an outer edge 103 of the geometric feature 100 or on an inner edge 104 of the geometric feature 100 can be used. Where the distance traveled by the odometer wheel 1020 is not the same, the length L can be measured on the outer edge 103 or on the inner edge 104 depending on how the geometry rules are set. Unless otherwise noted, as with other geometric features 100, the length L can be measured at the longest edge between the edges 103,104. As with the measurement of any dimension on any geometric feature 100, the geometry rules and measurement process for dimension of each geometric feature 100 can be adjusted for accuracy and for the convenience of the user of the measurement tool 510. When measured by the measurement tool 510, a single measurement can be taken or several measurements can be taken—can be taken every 4-6 feet or, more specifically, every 5 feet. The longest Odometer "Distance" value from all the measurements can be used for this value (which, in some aspects, can be the last measurement taken).

Wall Slope (Default=0°): The slope of a top surface of the wall without coping. The user input interface 950 (e.g., the D-Pad) can manipulate this field with the UP/DOWN control surfaces 953*a,c* to alter it one degree at a time.

Outside Face (Default=0): The length of the coping down the outside face of the wall. Resolution can be around ⅛ of an inch.

Inside Face: (Default=0): The length of the coping down the inside face of the wall. Resolution can be around ⅛ of an inch.

Common Properties: As shown in FIG. 19E and discussed below or disclosed elsewhere herein.

Unique ID: (String):

Flange: As discussed below with respect to FIG. 19E, under "Common Properties," or disclosed elsewhere herein.

A wall is a straight geometry defining an A end and a B end. When following a clockwise path around the roof 60, the A end is to the user's left, and the B end is to the user's right. In addition to taking the A and B measurements, in some aspects the user can take measurements of the wall width 75 along the wall at every 5 feet. In some aspects, the user can take measurements of the wall width 75 along the wall every 4 to 6 feet or every 4 to 8 feet. When a measurement is taken from the tool, that measurement can be recorded—even though all measurements are not necessarily needed. Each wall width measurement can comprise a Clamp CaliperLength, Clamp Orientation Data (Both Euler and Quaternion), and Odometer Distance. The CaliperLength can be used to determine the wall width 75. The Odometer Distance can be used to determine the Wall Length L, which can be equivalent to the wall length 1660.

Several geometry rules can be made to apply to the wall geometry. Definitionally, a "Warning" involves geometry that can be accepted but marked with a warning, while an "Error" involves geometry that is in error and cannot be accepted. As the app for the user device 550 is currently configured, the geometry rules for a wall are as follows (and in parentheses is the nature of the rule, selected from General, Warning, or Error):

1. (General) As currently set, a top surface of the wall always slopes towards the user. There is therefore no need to specify "Inside" or "Outside". The user can but need not specify whether the wall is sloped, e.g., whether "CopingIsSloped" is YES or NO.
2. (Warning) If an average of at least one measurement every 5 feet is not taken, then a warning can be generated. The app need not stop advanced users from taking fewer measurements, but the app can advise that these measurements be taken so the tool 510 can find wider Widths in the Wall (in case, for example, another geometry such as custom geometry is more appropriate).
3. (Error) A wall can be required to have two or more measurements to be a wall or can be considered incomplete. The user can be invited to take additional measurements.
4. (Error) The Wall can be required to be straight. The app can check the orientation of each measurement against each other measurement and ensure no Radius is shorter than the Minimum Radius. In some aspects, a User can be invited to choose a Radius geometry and take the appropriate measurements. In some aspects, a User can be allowed to Convert a Wall into a Radius.
5. (Error) The smallest and largest Widths for all measurements of the Wall can be required to be within the "Wall Tolerance."
6. (Connection Error) The A-side and B-side connections can be required to be compatible or consistent with the corresponding measurements of corresponding adjacent geometric features 100. This means that the dimension B for one part can be expected to equal, within an acceptable tolerance, dimension A for an adjacent section of the parapet 70.

FIGS. 19A-19E are various views or top plan views of a geometric feature 100 showing also a process for taking measurements of the geometric feature 100 when it defines a corner geometry. FIG. 19A is specifically a top plan view of a geometric feature 100 showing also a process for taking measurements of a geometric feature 100 defining the corner geometry. FIGS. 19B and 19C are diagrams showing inputs in a process for taking measurements of geometric features 100 specifically defining an outside corner geometry and an inside corner geometry, respectively, and FIG. 19D is a diagram helping illustrate a process for taking and calculating measurements of a geometric feature 100 defining a corner geometry in accordance with another aspect of the current disclosure, which can also apply to a pier miter condition. FIG. 19E is a sectional view showing edge metal, drawn as fascia, for covering the geometric feature 100 on either an outside edge or an inside edge of the geometric feature 100.

In summary, a user can capture the corner geometry by simply taking dimensions A and B with the caliper portion 520 (shown in FIG. 5A) of the measurement tool 510 (as shown in FIG. 16A). No wall length measurement (e.g., measurement of the length L with the odometer 1000 shown in FIG. 5A) is needed because standard leg length dimensions can be applied by the app. No angle measurements are required either. Rather, the orientation sensor 943 (shown in FIG. 9G) and, more specifically, the IMU thereof can feed the orientation of the measurement tool 510 at each of measurement points A and B to the app, and the angle Θ between the legs of the corner section can be calculated from those orientations. Below is a glossary of several terms and/or default dimensions (where the corner geometry is a section of the parapet 70 defining the geometric feature 100):

A & B Legs

Width (Min=3.5 in, Max=32 in): The Width of the wall as measured by the CaliperLength for this value, i.e., the measured wall width 75 (shown in FIG. 16A).

Length (Default=24 in, Max=48 in): Length value uses the default value when possible. This value can be automatically updated when the opposite leg is measured to ensure "Leg Length Rules" are enforced, as desired when configuring the app. When the End Condition is not "Open", the Leg Length can be overridden by using the Odometer Distance for this value or by manually entering a value in the app.

Wall Slope)(Default=0°: The slope of a top surface of the wall relative to the side of the wall without coping. The user input interface 950 can manipulate this field (e.g., by the UP/DOWN controls) to adjust the slope 1 degree at a time. A positive slope angle indicates the wall is sloped towards an interior of the roof, and a negative slope angle indicates the wall is sloped away from the roof. This value is not validated.

End Condition: (Default=Open) [Open, Term, Cap] This can be a dropdown menu in the app. The user input interface 950 (e.g., the D-Pad) Up/Down navigation can, if so configured, allow for changing this as well.

Corner Angle (Default=90°, Min=60°, Max=179°): This is the smallest angle value between the A-Leg and the B-leg. This value can be determined automatically by measuring the A-Leg width and the B-Leg width. The orientation values captured by the tool can be used to automatically determine the Corner Angle. This can be manually overridden in the app.

Joint Splice: Clip/Splice, which can be 1 foot in length.

Common Properties:

OutsideFace or outside flange 1903 (Default: 0, Min: 2 in, Max: 12 in): This is a portion, usually vertical, of a formed edge metal component that is visible on the outer edge of the building 50 or, more specifically, the roof 60. This value can be set for the entire roof after measuring all geometric features 100 and determining what common dimension will cover the outer edge everywhere (including where such dimension needs to be larger).

InsideFace or inside flange 1904 (Default: 0, Min: 2 in, Max: 12 in): This is a portion, usually vertical, of a formed edge metal component that is visible on the outer edge of the building 50 or, more specifically, the roof 60. This value can be set for the entire roof after measuring all geometric features 100 and determining what common dimension will cover the outer edge everywhere (including where such dimension needs to be larger).

Flange or top flange 1910 (Min: 2 in, Max: 8 in, Default: 0): This is a portion, usually horizontal, of a formed edge metal component that extends across at least a portion of a top surface of the geometric feature 100 (e.g., a horizontal flange used in fascia systems but not generally coping). This is effectively the "width" in fascia products but is still separate from the width of the wall, which can be a different value. A value of 0 indicates an empty or non-specified value. Any other value can be required to be between the Min and Max allowed figures.

UniqueID (Default: can vary): This can be any text/string value that the user can apply to any part or geometric feature 100. It can be completely freeform and any value from the user can be used. Specification of values for this variable can facilitate communication with the customer during installation of any special parts.

Leg Length Rules:

One leg's Length L can be impacted by the other leg's Width. The length of a leg can be required to be long enough to support having a Joint Splice. So as the Width 75 of one leg grows, the Length of the other leg can be required to always allow for a Clearance Length 1975 (shown in FIG. 19D) measuring, for example and without limitation, at least 9 inches. The default length of a leg can be 24". This allows for the opposite leg's Width to be as large as 15" (24" minus 9") with no changes. Once a Width of the leg in question gets larger than 15", the opposite leg's Length can be required to also get larger to accommodate the Joint Splice.

Example Calculations: So, if a leg's Width 75, i.e., the A dimension, is 16", the opposite leg's Length can be required to be increased beyond 24" because 16" is greater than 15". But each leg Length can be required to be in increments of 6". So, in that case, the new Length of the opposite leg would not be 25" (16" plus the minimum Clearance Length 1975 of 9") but rather 30" (not 25") after rounding up 25 to the nearest multiple of 6. As shown in FIG. 19D, if a leg's Width is 24", the opposite leg's Length can be required to be increased because 24" is also greater than 15". The Length of the opposite leg would be 36" (not 33") after rounding up 33 to the nearest multiple of 6.

Several geometry rules can be made to apply to the corner geometry. As the app for the user device 550 is currently configured, the geometry rules for the corner geometry are as follows (and in parentheses is the nature of the rule, selected from General, Warning, or Error):

1. (Error) Check for missing measurements.
2. (Error) The corner Angle of an Inside Corner can be no greater than 179 degrees. More than this would result in the measurements describing an Outside Corner.
3. (Error) All Values can be required to fall with Min/Max ranges.
4. (Connection Error) The A-side and B-side connections can be required to be compatible or consistent with the corresponding measurements of corresponding adjacent geometric features 100.

FIGS. 20A and 20B include a top plan view of a geometric feature 100 and also a process for taking measurements of the geometric feature 100 when the geometric feature 100 defines a radius geometry. With adjustments based on the differences in the geometries, the same process can be used for taking measurements of a vault or arch geometry, which can be considered a radius geometry extending in a vertical orientation.

FIG. 20A is a diagram showing a process for taking measurements of a geometric feature defining a radius geometry, and FIG. 20B is a user interface 2010 on an app as displayed on a screen of the user device 550 and specifically as used for entry and/or display of measurements of the radius geometry.

In summary, a user can capture the radius geometry by simply taking three measurements along the radiused section—the measurement A, a measurement (or, if desired, multiple measurements) in the middle between the measurements A and B, and the measurement B, in order from left to right—with the caliper portion 520 of the measurement tool 510 (as shown in FIG. 16A) and taking a wall length measurement along a radially innermost or outermost edge of a top surface of the wall—whichever is the longest. For an outside radius, the outside edge is generally the longest. For an inside radius, the inside edge is generally the longest. For more accurate measurements, the user can change the jaw 820 (shown in FIG. 9A) on the dynamic clamp from the fatter jaw with a flat surface (e.g., the jaw 820 shown in FIG. 8I) to a thinner jaw with a radiused surface (e.g., the jaw 820 shown in FIG. 8F). The blade can go on the concave side. Using the tool 510, the arcLength and IMU yaw heading values can be used to automatically determine the Radius and other helpful parameters. Using manual measurements, chord and rise measurements can be used to calculate the radius. Below is a glossary of several terms and/or default dimensions (where the radius geometry is a section of the parapet 70 defining the geometric feature 100):

Width Tolerance (1 inch): The maximum allowable difference between width measurements. Anything greater than this tolerance can be made to cause an error in the radius.

Orientation (Enumeration: [Inside, Outside, Complex], no default): The property determines whether the curve of the radius makes it an inside radius (Curve is concave to the building edge, i.e., the building edge is pushed in) or an outside radius (Curve is convex to the building, i.e., the building edge is pushed out). When using the tool 510, this can be determined automatically with at least two measurements.

The "Complex" value can be used when the radius geometry is not a pure arc, which can be required for the radius geometry to be a portion of a circle. Such a non-circular geometry can be described with a spline, and Manufacturing can help define the part based on the measurements captured by the measurement tool 510.

Max Angle per Measurement)(<90°: This is how often the user can be expected to take a measurement on a wall as the user moves down or across the arc. The tighter a radius of the radius geometry, the more measurements can be sought and the shorter the arc length per measurement. More specifically, one measurement per 90° can help determine whether the radius geometry defines an inside or outside radius.

Minimum Measurements per Radius (Default=3): The user can be required to take three measurements to effectively measure a Radius. If only three measurements are taken, they should be at the start, approximately in the middle (does not have to be exactly in the middle), and at the end of the arc.

Preferred Maximum ArcLength per Measurement (3 ft per measurement): The more measurements that are taken, the more accurate the result can be.

Width (Min=3.5, Max=32): The thickness of the wall, i.e., the wall width 75. This value can be determined by taking several measurements down the arc length of the wall. The largest Width of all the measurements can be taken as the value. Width values are taken from the Caliper Length of the tool.

Radius: This is the resulting Radius that would fit the Arc. The final value can be taken from the average of all Radii calculated from all combinations of arcs (The factorial evaluation of all measurements against all other measurements)

Minimum Radius: The arc with the smallest resulting radius.

Maximum Radius: The arc with the largest resulting radius.

Average Radius: The average of all computed radii from all arcs across all measurements.

Length: This is the Length taken from the longest edge of the wall as measured by the Odometer Distance.

Sweep Angle: The portion of a circle that the arc sweeps across. This can be read-only and summed against all the measurements of the Radius. This value can be calculated in both tool and user contexts.

Radius (Min=3 ft, Max=100 ft): This is the resulting Radius that would fit the Arc. The final value is taken from the average of all Radii calculated from all combinations of arcs (i.e., the factorial evaluation of all measurements against all other measurements). This field can be calculated in both Tool (automatic or semi-automatic) and User (manual) measurement contexts.

Minimum Radius: The arc with the smallest resulting radius.

Maximum Radius: The arc with the largest resulting radius. A radius larger than 100 ft becomes a wall.

Average Radius: The average of all computed radii from all arcs across all measurements.

Rise: Available in case the user is measuring the geometric feature 100 without the measurement tool 510. The rise is the distance measured in a direction perpendicular to a chord of the circle between the chord and the arc and assumes a 36-inch chord.

Rise Tolerance (0.5 inches): The curve need not be a pure arc. The geometry can be accepted as long as the rise does not exceed the rise tolerance.

Common Properties: As shown in FIG. 19E and discussed below or disclosed elsewhere herein.

The app can assume that all curved sections on the parapet wall are formed from one or more circular chords. Making use of the orientation sensor 943 (e.g., the IMU and shown in FIG. 9G) of the tool 510, the chord can be characterized by measuring three points along the chord. Additional measurements can optionally be made, however. Again, the tool 510 can be placed at the beginning of the curve and the wall width 75 can be recorded and sent to the user device 550. The odometer wheel 1020 can then rolled along the wall surface, and a second point along the curve can be clamped and measured. The orientation data, the odometer data, and the wall width data can be transmitted to the user device 550. In the end, more than one edge metal component can be fabricated—and can be required—to cover the geometric feature when it defines a radius geometry, and this need not be determined by the tool 510 nor by the user but can be determined based on the measurements of the geometry, sufficient information about the material to be used for the edge metal, and other design inputs as appropriate.

In some aspects, the screen or graphical control element of the app in which the geometry is entered or displayed—or both—before return to a higher level screen can be described as a "modal", and the app can be configured such that no other part of the app can be used while this screen is up. After entering the modal for the radius geometry, the user can be greeted with an introduction and/or instructions for how to measure a radius. The user can stop the message at any time by using the user input interface 950 (e.g., the D-Pad) or by taking a measurement. The modal can support measurements taken with the tool 510 and measurements entered manually by the user. Measurements can be collected both manually and with the tool and the two sets of measurements can be kept separate. The screen of the user device 550 can be configured to render or display the curve as the user collects data.

As shown in FIG. 20B, a portion of the modal, e.g., one instance of the user interface on the screen of the user device 550, can comprise a list of measurements from the tool, which can comprise values for "path length" (taken from odometer distance) and heading (taken from IMU yaw). The modal can further comprise a list of calculations, which can be factorial calculations against all possible combinations of data points from the tool, of one or more of the following: Measurement A, Measurement B, Arc Length, Calculated Rise, and Radius. In some aspects, the modal can render the arc or spline of the radius geometry as it is being measured.

Several geometry rules can be made to apply to the radius geometry. As the app for the user device 550 is currently configured, the geometry rules for the radius geometry are as follows (and in parentheses is the nature of the rule, selected from General, Warning, or Error):

1. (Warning) The user has taken less than the Preferred Measurements per Arc Length or has exceeded the Max Angle per Measurement.

2. (Warning) The Rise deviation can be required to be within the tolerance. When this value is outside of the tolerance, the "Orientation" Field can be moved to "Complex" because of the perceived non-circular shape.
3. (Error) The smallest and largest measurements of the radius can be required to be within the "Width Tolerance."
4. (Error) Can be required to have 3 or more measurements.
5. (Error) The Radius can be required to be larger than 3 ft.
6. (Connection Error) The A-side and B-side connections can be required to have compatible measurements with their corresponding neighbors.

FIG. 21 is a top plan view or diagram of the geometric feature 100 showing also a process for taking measurements of the geometric feature 100 when the geometric feature 100 defines a tee geometry.

In summary, a user can capture a tee miter or tee geometry by taking dimensions A, B, and C with the caliper portion 520 of the measurement tool 510 (as shown in FIG. 16A). While shown, no wall length measurements (e.g., lengths $L_A$, $L_B$, and $L_C$) are needed because standard leg length dimensions can be applied. No direct angle measurements with a protractor such as the protractor 320 are required either. Rather, the orientation sensor 943 and, more specifically, the IMU thereof can feed the orientation of the measurement tool 510 at each of measurement points A, B, and C, and the angle between the legs can be calculated from those orientations. Below is a glossary of several terms and/or default dimensions (where the tee geometry is a section of the parapet 70 defining the geometric feature 100):

A, B & C Legs
  Width (Min=4 in, Max=32 in): Use CaliperLength for this value.
  C Length (Default=9 in, Max=12 in): Use CaliperLength to measure the longest of the sides of the C-leg.
  A & B Lengths (Default=24 in):
    Max length of longest edge=144 in.
  Wall Slope)(Default=0°: The slope of a top surface of the wall relative to the side of the wall without coping. The user input interface 950 can manipulate this field (e.g., by the UP/DOWN controls) to adjust the slope 1 degree at a time. A positive slope angle indicates the wall is sloped towards an interior of the roof, and a negative slope angle indicates the wall is sloped away from the roof. This value is not validated.
  Coping Slope: Each leg can slope one way or the other. The direction of the slope is defined slightly differently for each leg. The "Long Edge" is composed of both the top of the Tee where the A and B legs meet.
    A Leg Slope
      Towards the "Long Edge"
      Towards C Leg
      None
    B Leg
      Towards the "Long Edge"
      Towards C Leg
      None
    C Leg
      Toward A Leg
      Toward B Leg
      None
  End Condition (Default=Open) [Open, Term, Cap]: This can be a dropdown in the App. The D-Pad Up/Down navigation can allow for changing this as well.
  Corner Angle (Default=90°, Min=60°, Max=120°): This is the angle between the B-Leg and the C-Leg.
  Joint Splice: Clip/Splice can have a 1-foot length.
  Leg Length Rules:
    As with a corner miter, [A,B] leg's Length can be impacted by C leg's Width and vice versa. The Length of a leg can be required to be long enough to support having a Joint Splice. So as the Width of one leg grows, the Length of the other leg can be required to allow for at least 9 inches of clearance. The default length of a leg can be 24". This allows for the opposite leg's Width to be as large as 15" (24"-9") with no changes. Once the leg in question's Width gets larger than 15", the opposite leg's Length can be required to also get larger to accommodate the Joint Splice.
  Example Calculations: As described above in the description of FIGS. 19A-19E.
  Common Properties: As shown in FIG. 19E and discussed above or disclosed elsewhere herein.

Several geometry rules can be made to apply to the tee miter geometry. As the app for the user device 550 is currently configured, the geometry rules for the tee miter geometry are as follows (and in parentheses is the nature of the rule, selected from General, Warning, or Error):

1. (General) A+B Leg can be required to be less than 48 inches, but these and other geometric limits disclosed herein (and not just for the current geometric feature 100) can be adjusted by adjusting the raw material used to fabricate the parts.
2. (General) Each Wall width for A B C can go up to 32 inches.
3. (Error) Each width for each leg can be required to be specified.
4. (Error) The Corner angle (Between B and C legs) can be required to be within the Min and Max angle allowed.
5. (Error) All Values can be required to fall with Min/Max.
6. (Connection Error) The A-side and B-side connections can be required to have compatible measurements with their corresponding neighbors.

FIGS. 22A and 22B are perspective views of the geometric feature 100 when it defines a vertical wall with a step-change in height. More specifically, FIG. 22A is a perspective view showing the measurements needed to define the vertical wall with the step, including a wall width and a vertical rise of the vertical miter step. FIG. 22B is an exploded perspective view showing the wall and coping components. The coping components can comprise three wall elements or components 80a,b,c and two custom corner miter components 80d,e. The corner miter component 80d can be an inner corner miter component and the corner miter component 80e can be an outer corner miter component and, as shown, each component can have an outside flange and an inside flange.

In summary, a user can capture a vertical step miter geometry by taking dimensions A, B, and C with the caliper portion 520 of the measurement tool 510 (as shown in FIG. 16A). All of dimensions of the wall sections covered by coping components 80a and 80c can be measured separately, one wall section before and one wall section after measurement of the step geometry currently being described. The only wall length measurement can be the length L, which can be measured by the measurement tool 510 in Wheel-iper mode (as shown in FIG. 16D). No angle measurements are required if each of the angles between the top surfaces of the wall and the vertical surface connecting the top surfaces is 90 degrees. Below is a glossary of several terms and/or default dimensions (where the vertical step geometry is a section of the parapet 70 defining the geometric feature 100):

A&B Legs
- Width: (Min=4 in, Max=32 in): Use CaliperLength for this value.
- Length (Default=9 in, Max=12 in): Use Odometer Distance for this value.
- Slope)(Default=0°: The slope of the wall without coping.
- End Condition (Default=Open): [Open, Term, Cap] This can be a dropdown in the App. The D-Pad Up/Down navigation can allow for changing this as well.

Inside Leg: This leg can be situated vertically between the A and B horizontal legs.
- Width: (Min=4, Max: 32) Use CaliperLength for this value.
- Height: (Min=9, Max=12) Use WheeliperLength for this value.

Corner Angle: In some aspects, the geometry can be configured to accommodate corner angles measuring exactly 90°. Any other angle can be entered as custom geometry or can be broken into peak or ridge miters and/or valley miters. In some aspects, the geometry can be configured to accommodate other corner angles.

Several geometry rules can be made to apply to the vertical step miter geometry. As the app for the user device 550 is currently configured, the geometry rules for the vertical step geometry are as follows (and in parentheses is the nature of the rule, selected from General, Warning, or Error):
1. (Error) All values can be required to be within their Min and Max.
2. (Error) All necessary fields can be required to be filled out (All Widths can be required to be provided and the "Inside Height").
3. (Error) Check orientation data from all widths to make sure this Z is at 90°, with an appropriate tolerance as desired.
4. (Connection Error) The A-side and B-side connections can be required to have compatible measurements with their corresponding neighbors.

FIGS. 23A-23G are various views or top plan views of the geometric feature 100 when it defines a double-miter or step or Z-miter geometry, which in each case below can be oriented either vertically or horizontally, showing also a process for taking measurements of the geometric feature 100 when it defines the Z-miter geometry.

FIG. 23A is a top view of a geometric feature defining a Z-miter geometry showing also a process for taking measurements of the geometry.

FIG. 23B is a top view of a geometric feature defining a Z-miter geometry showing also a process for taking measurements of the geometry in accordance with another aspect of the current disclosure.

FIG. 23C is a top view of a geometric feature defining a Z-miter geometry showing also a process for taking measurements of the geometry in accordance with another aspect of the current disclosure.

FIG. 23D is a top view of a geometric feature defining a Z-miter geometry showing also a process for taking measurements of the geometry in accordance with another aspect of the current disclosure.

FIG. 23E is a top view of a geometric feature defining a Z-miter geometry showing also a process for taking measurements of the geometry in accordance with another aspect of the current disclosure.

FIG. 23F is a top view of a geometric feature defining a Z-miter geometry showing also a process for taking measurements of the geometry in accordance with another aspect of the current disclosure.

FIG. 23G is a top view of a geometric feature defining a Z-miter geometry showing also a process for taking measurements of the geometry in accordance with another aspect of the current disclosure.

In summary, a user can capture a Z-miter or step miter geometry by taking dimensions A, B, and C with the caliper portion 520 of the measurement tool 510 (as shown in FIG. 16A). In some aspects, provided that the length of the two legs are greater than the length of the wall section, then no wall length measurements (e.g., the lengths $L_A$ and $L_B$) are needed because standard leg length dimensions can be applied. No angle measurements are required either. Rather, the orientation sensor 943 and, more specifically, the IMU thereof can feed the orientation of the measurement tool 510 at each of measurement points A, B, and C, and the angle between the legs of the miter section can be calculated from those orientations. Below is a glossary of several terms and/or default dimensions (where the horizontal Z-miter geometry is a section of the parapet 70 defining the geometric feature 100):

A&B Legs
- Width (Min=4 in, Max=32 in): Use CaliperLength for this value.
- Long Length (Need Defaults Min=, Max=) This is the outer edge of the Leg. It can be the longer of the two edges that make up the leg. (See diagram)
- Slope)(Default=0°: The slope of the wall without coping.
- End Condition (Default=Open): [Open, Term, Cap] This can be a dropdown in the App. The D-Pad Up/Down navigation can allow for changing this as well C-Leg
- Width: As disclosed elsewhere herein for similar features.
- $L_{CA}$: The Length of the C-Leg on the A Side (See diagram)
- $L_{CB}$: The Length of the C-Leg on the B Side (See diagram)
- AC Angle: The angle between the A-Leg and the C-Leg. In some aspects, this angle can be presumed to be 90 degrees. In other aspects, this angle can be calculated from measurements from the measurement tool 510 or can be entered manually by the user.
- BC Angle: The angle between the B-Leg and the C-Leg. In some aspects, this angle can be presumed to be 90 degrees. In other aspects, this angle can be calculated from measurements from the measurement tool 510 or can be entered manually by the user.
- AC' Angle (By default, is the same as BC): While uncommon, this angle can differ from BC when the edges of the A leg are NOT parallel.
- BC' Angle (By default, can be the same as AC): While uncommon, this angle can differ from AC is when the edges of the B leg are NOT parallel.

Corner Angle (Default=90°, Min=60°, Max=179°): This is the smallest angle value between the A-Leg, Inside Leg, and B-leg.

Two different horizontal Z miters can be reflections of each other. There can be a "Left-Z" and a "Right-Z". As you move from the A-Leg to the B-Leg, the B-Leg can be to the left of the A-Leg. Same goes for the Right-Z. As you move from the A-Leg to the B-Leg, the B-Leg can be to the right. This works whether you are moving clockwise or counter-clockwise around the wall. As currently configured, if the C-Width cannot be measured with the Caliper, in some aspects, the entire Geometry can be measured by hand in the absence of orientation data from the IMU for the C-Leg as a whole. In some aspects, the geometry can be separated into two separate sections (e.g., outside and inside corners for a horizontal Z-miter and peak and valley miters for a vertical Z-miter).

Several geometry rules can be made to apply to the horizontal Z-miter geometry. As the app for the user device 550 is currently configured, the geometry rules for the horizontal Z-miter geometry are as follows (and in parentheses is the nature of the rule, selected from Goal, General, Warning, or Error):

1. (Goal) In some aspects, the entire part can fit on a 4 ft×4 ft sheet.
2. (Goal) In some aspects, clearance can be provided on a Leg so that a splice can snap the leg to the adjoining part.
3. (Connection Error) The A-side and B-side connections can be required to have compatible measurements with their corresponding neighbors.

FIGS. 24A-24C are various views or top plan views of the geometric feature 100 when it defines a terminating or end-condition geometry, showing also a process for taking measurements of the geometric feature 100 when it defines the Z-miter geometry. FIG. 24A is a top perspective view of a geometric feature defining an end-condition geometry and, more specifically, an end cap; FIG. 24B is a top perspective view of a geometric feature defining an end-condition geometry and, more specifically, an end wall; and FIG. 24C is a top perspective view of a geometric feature defining an end-condition geometry and, more specifically, an end-wall splice.

In summary, a user can capture end-condition or terminating geometry by taking dimension A with the caliper portion 520 of the measurement tool 510 (as shown in FIG. 16A) or by separately determining and manually entering the value. No wall length or angle measurements are required. Rather, default dimensions can generally apply. Below is a glossary of several terms and/or default dimensions (where the terminating geometry is a section of the parapet 70 defining the geometric feature 100):

Handedness (No default—App/User can be required to pick): Gives the orientation of the geometry. It can be "Left" or "Right" handed.

Termination: (Enum: {End-Cap, EndWall, EndWall-Splice}, Default: No Default): This property determines how the End-Condition will terminate. On the app, this value can be a three-position "slider" that either the user or the tool can modify. The user input interface 950 (e.g., the UP/DOWN control surfaces on the D-Pad of the tool 510) can also be used to modify this value. Shown in respective FIGS. 24A-24C, the termination geometry can be any one of at least the following three configurations: end cap, end wall, or end wall splice.

Width (Min=3.5 in, Max=32 in, Default: none): With Width of the wall as measured by the CaliperLength for this value.

Length (Min=12 in, Max=32 in, Default=24 in): Length value uses the default value when possible.

Angled Flange: This is a special condition where an End-Condition meets a wall that is not at 90° to the End-Condition. The system can be configured to adjust for this condition as desired.

Wall Slope)(Default=0°: The slope of a top surface of the wall relative to the side of the wall without coping. The user input interface 950 can manipulate this field (e.g., by the UP/DOWN controls) to adjust the slope 1 degree at a time. A positive slope angle indicates the wall is sloped towards an interior of the roof, and a negative slope angle indicates the wall is sloped away from the roof. This value need not be validated.

Common Properties: As shown in FIG. 19E and discussed below or disclosed elsewhere herein.

This geometry is a terminus. As such, this geometry can either start or "kill" the "hot-edge" data collection. If this kills the hot edge, the user can manually place the next geometric feature 100, which can start a new hot edge, where the user wants it on the screen of the user device 550, and the new geometric feature 100 can thereby define the next hot-edge starting point. End-Conditions are geometries that start and end walls. In some aspects, the wall can stop in space (e.g., an End-Wall or end "cap"). In some aspects, the wall can "dead end" into another larger wall (e.g., an End-Wall or End-Splice).

After entering the modal for the end-condition geometry, the app can automatically determine the Orientation property and automatically fill it out. More specifically, the modal for the End-Condition starts with the app automatically determining the Orientation of the geometry (Left or Right handedness). The app can determine this based on its knowledge of whether another geometric feature 100 preceded this one (i.e., a hot edge was previously created). If the user is going around the roof in a clockwise fashion (which can be the default scenario and assumption) and no current or live hot edge, then the app can know the orientation is Left-handed because a new wall is being initiated in the clockwise direction. If a hot edge already exists, then the app can know that the end-condition geometry is right-handed because the wall is now being terminated in the clockwise direction. The app can give aural feedback of this decision to the user for acceptance. Once the app selects the orientation, the app can automatically move to the next field: "Termination." By default, the app can proceed without making a selection. The user can be given an opportunity to pick which termination condition applies using the user input interface 950 (e.g., the D-Pad).

More specifically, with respect to the Orientation Field, the user can manipulate a display on the app (e.g., through a slider on the app) between "Left" and "Right" if the app-selected orientation is not desirable (if, for example, the user is starting a new wall and intends to move in the counterclockwise direction). The user input interface 950 (e.g., the UP/DOWN control surfaces of the D-Pad) can allow the user to also toggle between values when this field has focus. When this field gets focus, the app can TTS (text-to-speech) the field name and its current value. The user can press the user input interface 950 (e.g., the OK/LEFT/RIGHT on the D-Pad) to move focus to a different field.

More specifically, with respect to the Termination Field, the user can manipulate a display on the app (e.g., a 3-position slider on the app) to select between "End-Cap", "End-Wall", and "End-Wall Splice." In some aspects, with respect to this and other selections for this and other geometries, a dropdown menu can be used. The user can use the graphical control to change the value or can press the D-Pad UP/DOWN control surfaces to change the value. Pressing OK/LEFT/RIGHT on the D-Pad can move focus to a different field.

After both the Orientation and Termination fields are populated, the user can select the correct image to render to the background. Both fields can be deemed necessary to identify one of the at least six configurations available, including those configurations shown in FIGS. 24A-24C and mirror configurations thereof. A selection can cause the input fields to change to match the corresponding image.

More specifically, with respect to the Width Field, the app can draw a single measurement of the dimension A from the tool 510 (using CaliperLength) or can receive a manual input from the user via the app. More specifically, with respect to the Length Field the app can draw a single measurement from the tool 510 (using Odometer Distance) or can receive a manual input from the user via the app.

Several geometry rules can be made to apply to the terminating geometry. As the app for the user device 550 is currently configured, the geometry rules for the terminating geometry are as follows (and in parentheses is the nature of the rule, selected from Goal, General, Warning, or Error):

1. (Error) Check for missing measurements.
2. (Error) One or both of the legs can be required to end in a term/cap.
3. (Error) All Values can be required to fall with Min/Max.
4. (Connection Error) The A-side and B-side connections can be required to have compatible measurements with their corresponding neighbors.

FIGS. 24D-24G are various views or diagrams of the geometric feature 100 when it defines a transition geometry, showing also a process for taking measurements of the geometric feature 100 when it defines the transition geometry. More specifically, FIGS. 24D-24G are top views of a geometric feature defining a transition geometry and, more specifically, a transition geometry extending between walls defining different wall widths and, more specifically, a left-handed face leg, a right-handed face leg, a left-handed back leg, and a right-handed back leg, respectively.

In summary, a user can capture the transition geometry by taking dimensions A and B with the caliper portion 520 of the measurement tool 510 (as shown in FIG. 16A). In some aspects, provided that the transition geometry is sufficiently far from any adjacent geometry that would create interference with the legs of the transition part, then no wall length measurement is needed because standard leg length dimension 2410 (an example of the aforementioned leg length L) can be applied. No angle measurements are required either. Below is a glossary of several terms and/or default dimensions (where the transition geometry is a section of the parapet 70 defining the geometric feature 100):

A & B Legs
  Width (Min=3.5 in, Max=32 in): Width of the wall as derived from the measured CaliperLength.
  Length (Default=24 in, Max=48 in): Length value uses the default value when possible. This value can be automatically updated when the opposite leg is measured to ensure "Leg Length Rules" are enforced. When the End Condition is not "Open", the Leg Length can be overridden by using the Odometer Distance for this value or by manually entering a value in the app.

Handedness (No default-measurement/user input determines): Gives the orientation of the geometry. The handedness, which can be "Left-Handed" or "Right-Handed," determines which side of the wall is thicker. As currently set, this value cannot be picked by the user or switched by the user input interface 950 (e.g., the D-Pad). This value can be directly determined by the A and B width values.

Orientation (No default—User can be required to pick): This value can be either "Face Leg" or "Back Leg."
  Face Leg: The "notch" that is created by the A and B sides having different widths is on the roof side of the wall.
  Back Leg: The "notch" that is created by the A and B sides having different widths is on the space side of the wall.

Common Properties: As shown in FIG. 19E and discussed above or disclosed elsewhere herein.

Transitions allow for a wall to increase or decrease in width with a stepped transition. The "step" or "notch" can be on the inside or outside of the part, and the larger side of the transition can be on the left or the right. This allows for at least 4 different variations of a transition: Left-handed Face Leg, Right-handed Face Leg, Left-handed Back Leg, and Right-handed Back Leg.

After entering the modal for the transition geometry, the user can be greeted with instructions to specify whether this is Face-Leg or Back-leg transition geometry. In some aspects, the user can specify a Back-Leg or Face-Leg condition using the user input interface 950 (i.e., the D-Pad) and, more specifically, the LEFT/RIGHT control surfaces. The app can determine itself, e.g., based on measurements collected by the tool 510, whether it is Right or Left-handed based on the measurements taken or input by the user. The Left-handed/Right-handed toggle control surfaces can be visible on the app but can be configured to only display the condition and not accept manual input by the user. The measurements, whether from the tool 510 or entered manually by the user, can determine the handedness.

Several geometry rules can be made to apply to the transition geometry. As the app for the user device 550 is currently configured, the geometry rules for the transition geometry are as follows (and in parentheses is the nature of the rule, selected from Goal, General, Warning, or Error):

1. (Error) Check for missing values.
2. (Error) All Values can be required to fall with Min/Max.
3. (Connection Error) The A-side and B-side connections can be required to have compatible measurements with their corresponding neighbors.

Custom parts can include wall height transitions, the confluence of two walls into a "T", unusual sloping areas, and other unusual parts that need custom metal coping fabrication. The user of the user device 550 can take photographs of the wall section with the user device 550. Measurements can be entered manually onto the photograph, including angles, widths, etc. Custom parts can be sent to engineering during the quotation process, and the workflow includes logic to flag this to Customer Services during the engineering document and quotation generation process.

A similar process as described above for particular geometries can be used for taking measurements of a geometric feature 100 defining some other geometry. While not explicitly described herein, other geometries such as, for example and without limitation, peaks and valleys, vaults, in-line wall transitions, end wall coping, and end wall splices can follow the principles laid out for the other geometries.

FIGS. 25A-25D are various flowcharts of a method of using an app on the user device 550 of FIG. 5A. FIG. 25A is a flow chart 2510 showing an overall operational workflow or method of using an app on the user device 550 of FIG. 5A. The app can lead the user through each type of measurement to help them record each of the desired measurements accurately the first time and yet be able to go back and address errors when and where they surface. This can all be done in non-ideal environmental conditions (e.g., in high wind or in sleet or other precipitation) that can make the current manual pen and paper process impractical. Upon completion of the data collection process, the app can process the data, communicate errors and request re-measurements as needed and can, again, prepare various drawings including a "roadmap" that captures the overall parapet roof design and the construction of a set of edge metal parts for review, quote, approval, fabrication, and installation by others. The app can fill in gaps that a user in the field cannot easily fill in.

More specifically, the flow chart 2510 and, more specifically, a method captured therein can comprise any one or more of the following steps, including exemplary steps 2512-2532:

The step 2512 can comprise downloading the app.

A step 2514 can comprise completing a registration or sign-up process, which can comprise setting up login credentials (e.g., user name and password).

A step 2516 can comprise setting up a new project or job.

A step 2518 can comprise entering information into a background layer (e.g., a reference image of a top view of the roof 60).

A step 2520 can comprise entering information into a drawing later (e.g., a sketch of some portion of the roof 60 or some structure positioned thereon).

A step 2522 can comprise entering information about edge metal parts and/or their dimensions.

A step 2524 can comprise entering notes and/or photos on the measured geometric feature 100 or other structure being measured.

A step 2526 can comprise finalizing a roadmap capturing the collected data. The step 2526, as well as any other step disclosed herein, can comprise saving the captured information and closing the present screen.

A step 2528 can comprise generating an output file for later use by others, e.g., engineering, manufacturing, and/or the customer or end user.

A step 2530 can comprise previewing an output of the app (e.g., a PDF file), which output can be configured for distribution to others.

The step 2532 can comprise exporting the output file to others (e.g., by email, hard copy, or upload to a network).

FIG. 25B is a first flow chart 2540 showing a first operational workflow or method of using an app on the user device 550 of FIG. 5A. More specifically, the first flow chart 2540 and, more specifically, a method captured therein can comprise any one or more of the following steps, including exemplary steps 2542-2550:

The step 2542 can comprise initializing the app on a touchscreen (e.g., the display 1320 on the screen 552). The step 2542 can comprise the app opening on the user device 550 and displaying a user interface (UI). The step 2542 can comprise the user interface displaying options from which the user can select.

A step 2544 can comprise the user selecting New Project on the display 1320, and a step 2546 can comprise entering an address for the project, entering global variables, and/or entering a reference image or picture from a file. Either or both of the steps 2544,2546 can comprise the app prompting entry of data through the user interface. In some aspects, either or both of the steps 2544,2546 can comprise displaying prompts and inputs on the user interface. In some aspects, either or both of the steps 2544,2546 can comprise the app accessing a list of geometries (e.g., walls and corners) and input rules. either or both of the steps 2544,2546 can comprise the app connecting to the caliper portion 520 and/or the odometer portion 530 of the measurement tool 510 via a wireless protocol (e.g., a connection using a Bluetooth® protocol). Either or both of the steps 2544,2546 can comprise the app waiting for subsequent input from the user.

A step 2548 can comprise, upon the user pressing the RIGHT control surface, i.e., the control surface 953d, on the user input interface 950 (shown in FIG. 9H), the app moving to the next geometry in the aforementioned list of geometries. The step 2548 can comprise the app, through the user device 550, playing a sound file (e.g., an audio recording) associated with the geometry ID. The step 2548 can comprise the app waiting for subsequent input from the user.

The step 2550 can comprise, upon the user pressing the LEFT control surface, i.e., the control surface 953b, on the user input interface 950, the app moving to the previous geometry in the aforementioned list of geometries. The step 2550 can comprise the app, through the user device 550, playing a sound file associated with the geometry ID. The step 2550 can comprise the app waiting for subsequent input from the user.

FIG. 25C is a second flow chart 2560 showing a second operational workflow or method of using an app on the user device 550 of FIG. 5A. More specifically, the second flow chart 2560 and, more specifically, a method captured therein can comprise any one or more of the following steps, including exemplary steps 2562-2568:

The step 2562 can comprise the user pressing the "OK" control surface, i.e., the control surface 954, on the user input interface 950. More specifically, the step 2562 can comprise the user pressing the control surface for a short duration, which can be less than a predetermined threshold duration such as, for example and without limitation, two seconds. The step 2562 can comprise the app entering the modal mode, in which no other parts of the app can be used. More specifically, the step 2562 can comprise the display 1320 displaying the selected geometry, and/or the app, through the user device 550, playing a sound file associated with the geometry ID. The step 2562 can comprise the app, through the user device 550, playing a recording of "Selected" to indicate to the user that selection is complete. The step 2562 can comprise the app accessing, loading, or displaying a list of fields associated with the selected geometry for subsequent filling in with collected measurements. The step 2562 can comprise the app, through the user device 550, playing a recording associated with measurement instructions for the selected geometry. The step 2562 can comprise the app waiting for subsequent input from the user.

A step 2564, which can follow the step 2562, can comprise the user pressing the OK control surface and, more specifically, for a short duration. The step 2564 can comprise the app preparing a request for data (e.g., current data) from the caliper portion 520 and/or the odometer portion 530 of the measurement tool 510, which can be made via the wireless protocol.

A step 2566, which can follow the step 2564, can comprise the caliper portion 520 and/or the odometer portion 530 providing data (e.g., length, width, attitude, and/or heading data) to the app as requested or needed. The step 2566 can comprise the app performing calculations as necessary and filling in fields associated with the selected geometry. More specifically, the step 2566 can comprise the app, through the display 1320, updating the displayed information and/or the app, through the user device 550, playing a recording of the next measurement instructions. The step 2566 can comprise the app waiting for subsequent input from the user.

The step 2568 can comprise the user pressing the OK control surface and, more specifically, for a long duration, which can be equal to or greater than the predetermined threshold duration (e.g., two seconds). The step 2568 can comprise the app verifying that all measurements (and/or default values) associated with the selected geometry have been stored. More specifically, the step 2568 can comprise the app, through the display 1320, updating the displayed information and/or the app, through the user device 550, playing a sound file associated with the completion of entry of information for the selected geometry. The step 2568 can comprise the app exiting modal mode and waiting for subsequent input from the user.

FIG. 25D is a third flow chart 2570 showing a third operational workflow or method of using an app on the user device 550 of FIG. 5A. More specifically, the third flow chart 2570 and, more specifically, a method captured therein can comprise any one or more of the following steps, including exemplary steps 2572-2576:

The step 2572 can comprise the user selecting "Submit" on the display 1320 to indicate their believe that measurements (e.g., roof measurements) are complete. The step 2572 can comprise the app executing second-level validation routines on the stored measurements (e.g., during the error-checking stage 1550 shown in FIG. 15A). More specifically, the step 2572 can comprise the app, through the display 1320, updating the displayed information. The step 2572 can comprise determining whether errors associated with the stored measurements have been detected by the app.

In the case that errors are found in the stored measurements, a step 2574 can comprise generating a list of the errors and details on where information is missing. The step 2574 can comprise the app, through the display 1320, updating the list of the errors and other details. In some aspects, the displayed information can identify for the user where on the roof 60 an error exists, which can be sufficient for the user to return to that portion of the roof 60 to collect corrective or confirming measurements. The step 2574 can comprise the user, via the display 1320, inputting the erroneous or missing information. In some aspect, the step 2574 can comprise the user returning to a portion of the roof 60 associated with an error or missing information and collecting data with the measurement tool 510. In some aspects, including those in which it is determined that a geometry that was originally believed to be a wall tapers to a degree beyond that allowed for a wall geometry, a step (not shown) can comprise the user selecting a different geometry (e.g., a custom geometry) and entering data for the new geometry. The step need not comprise deleting the previously collected data, in which case the original and new data can both be referenced later. The step 2574 can comprise the user returning to the step 2572 and repeating some or all portions thereof.

In the case that errors are not found in the stored measurements, the step 2576 can comprise using the stored measurements to generate a roof roadmap and engineering documents associated with each affected geometry. The step 2576 can comprise the app, through the display 1320, updating the displayed information and, more specifically, displaying the generated documents and user options associated therewith. The step 2576 can comprise the app sending, electronically and/or wirelessly, the generated documents to others such as, for example and without limitation, engineering, the customer, and/or an installer. More specifically, the step 2576 can comprise the app, through the display 1320, updating the displayed information and, more specifically, confirming completion of the requested task and/or current user options and/or, via the wireless protocol or other communication means, updating the server and sending the documents.

A method of manufacturing the measurement tool 510 can comprise any one or more of the following exemplary steps:

The method can comprise assembling the dynamic clamp 900 to the bar body 610 or, more generally, the bar assembly 600 of the measurement tool 510, the dynamic clamp 900 configured to move with respect to the bar body 610 during use to capture distance measurements.

The method can comprise assembling a first sensor to the measurement tool, the first sensor being the orientation sensor 943. More specifically, the first sensor 943 can be configured to sense roll, pitch, and yaw of the tool. Assembling the first sensor 943 to the measurement tool 510 can comprise assembling the first sensor 943 to the dynamic clamp 900. The first sensor 943 can be positioned inside the base 910 of the dynamic clamp 900.

The method can comprise assembling the controller 940 to the measurement tool 510, the controller 940 comprising a printed circuit board (PCB) 942.

The method can comprise placing the controller 940 in communication with the first sensor 943, the controller 940 configured to receive data from the first sensor 943.

The method can comprise assembling the stationary clamp 800 to the bar, the stationary clamp 800 and the dynamic clamp 900 defining an adjustable clamp distance 560 therebetween, the stationary clamp 800 being positioned closer to a second end 606 of the bar assembly 600 than a first end 605 of the bar body 610.

The method can comprise assembling the jaw 820 to at least one of the stationary clamp 800 and dynamic clamp 900, the jaw 820 removable from one of the stationary clamp 800 and the dynamic clamp 900 by a user without tools.

The method can comprise assembling a second sensor 930 to the measurement tool 510, the second sensor 930 configured to sense movement of the dynamic clamp 900 with respect to the bar body 610.

The method can comprise placing the controller 940 in communication with the second sensor 930, the controller 940 configured to receive data from the second sensor 930.

The method can comprise assembling the odometer 1000 to the measurement tool 510.

The method can comprise assembling a third sensor 1030 to the measurement tool 510, the third sensor 1030 configured to sense rotation of a first portion (e.g., the wheel 1020) of the odometer 1000 with respect to second portion (e.g., the housing 1010) of the odometer 1000.

The method can comprise assembling the controller 1040 to the measurement tool 510, the controller 1040 comprising a printed circuit board; and The method can comprise placing the controller 1040 in communication with the third sensor 1030, the controller 1040 being configured to receive data from the third sensor 1030.

A method for measuring physical characteristics of the membrane attachment systems 63, including the systems 63 shown in FIGS. 1I-1L and comprising the adhesive material 64 (shown in FIG. 1I), can comprise any one or more of the following exemplary steps:

A step can comprise performing one or more of steps of a method of using the controller 940 and, more generally, the caliper portion 520 (shown in FIG. 5) of the measurement tool 510 (shown in FIG. 5), including steps 1742 through 1756 described above.

A step can comprise performing one or more of steps of a method of using the odometer 1000 and, more generally, the odometer portion 530 of the measurement tool 510, including steps 1772 through 1778 described above.

The method can comprise measuring physical characteristics of the membrane attachment systems 63 using both the caliper portion 520 and the odometer portion 530 of the measurement tool 510, which can comprise one or more of the following steps:

A step can comprise, using the caliper portion 520, taking a first or starting wall width measurement 105 of a geometric feature 100, which can be at an identifiable portion of the geometric feature 100.

A step can comprise, using the odometer portion 530, traversing a path from the identifiable portion of the geometric feature 100 to a starting point of the adhesive material 64 (which can be any identifiable portion of the adhesive material 64).

A step can comprise measuring, directly or indirectly, a physical characteristic of the adhesive material 64 at the starting point.

A step can comprise measuring, directly or indirectly, the physical characteristic of the adhesive material 64 at each of multiple points along the adhesive material.

A step can comprise measuring, upon return to the starting point of the adhesive material 64, the physical characteristic of the adhesive material 64 at the starting point.

A step can comprise, using the odometer portion 530, traversing a path from the starting point of the adhesive material to the identifiable portion of the geometric feature 100.

A step can comprise taking a second or ending wall width measurement 106 of the geometric feature 100 at the same location at which the starting wall width measurement 105 was taken.

The method can comprise taking the starting wall width measurement 105, measuring the physical characteristic of the adhesive material 64, and taking the ending wall width measurement 106 in this order.

The method can comprise measuring physical characteristics of the membrane attachment systems 63 using both the caliper portion 520 and the odometer portion 530 of the measurement tool 510, which can comprise one or more of the following steps:

A step can comprise, using the caliper portion 520, physically measuring the width W (e.g., of the adhesive bead segment 64a), the spacing S, the bead segment length BL, the pattern length PL, and/or another physical characteristic of the adhesive material 64 securing or configured to secure the roof membrane to the remaining structure of the roof 60.

The method can comprise performing this step before or after installation of the membrane 62.

The method can comprise measuring the width W along the length of the adhesive material 64 at regular dimensional intervals (for example, measuring the width of the adhesive bead segment 64a, the width of the adhesive bead segments 64b, and the width of the adhesive bead segment 64c along the respective length of each at predetermined intervals, e.g., in inches).

A step can comprise, using the odometer portion 530 with or without the caliper portion 520, measuring the distance between adjacent measurements of the physical characteristic of the adhesive material 64.

The method can comprise creating, with the app, a roadmap showing the pattern and dimensions of one or more physical aspects of this and any other membrane attachment system 63.

A method for measuring physical characteristics of the membrane attachment systems 63, including the systems 63 shown in FIGS. 1M-1Q and comprising the fasteners 69, can comprise any one or more of the following exemplary steps:

A step can comprise performing one or more of steps of a method of using the controller 940 and, more generally, the caliper portion 520 (shown in FIG. 5) of the measurement tool 510 (shown in FIG. 5), including steps 1742 through 1756 described above.

A step can comprise performing one or more of steps of a method of using the odometer 1000 and, more generally, the odometer portion 530 of the measurement tool 510, including steps 1772 through 1778 described above.

A step can comprise using the caliper portion 520 to measure a diameter of one of the fasteners 69 or the spacing S between a pair of adjacent fasteners 69.

A step can comprise using the odometer portion 530 to measure a length associated with the fasteners 69 or the spacing S between a pair of adjacent fasteners 69.

Again, the method can comprise creating, with the app, a roadmap showing the pattern and dimensions of one or more physical aspects of this and any other membrane attachment system 63.

A method for measuring physical characteristics of an insulation drainage system of the roof 60, including for the exemplary roof 60 shown in FIG. 1R, can comprise any one or more of the following exemplary steps:

A step can comprise performing one or more of steps of a method of using the controller 940 and, more generally, the caliper portion 520 (shown in FIG. 5) of the measurement tool 510 (shown in FIG. 5), including steps 1742 through 1756 described above.

A step can comprise performing one or more of steps of a method of using the odometer 1000 and, more generally, the odometer portion 530 of the measurement tool 510, including steps 1772 through 1778 described above.

A step can comprise using the caliper portion 520 to measure a diameter, e.g., of a drain of the insulation drainage system.

A step can comprise using the odometer portion 530 to measure a length, e.g., of a portion of a surface of the insulation drainage system.

The method can comprise creating, with the app, a roadmap showing the pattern and dimensions of one or more physical aspects of the insulation drainage system.

A method for measuring physical characteristics of equipment and other structures such as the structure 68a,b,c,d (shown in FIG. 1S) on the roof 60, including for the exemplary roof 60 shown in FIG. 1S, can comprise any one or more of the following exemplary steps:

A step can comprise performing one or more of steps of a method of using the controller 940 and, more generally, the caliper portion 520 (shown in FIG. 5) of the measurement tool 510 (shown in FIG. 5), including steps 1742 through 1756 described above.

A step can comprise performing one or more of steps of a method of using the odometer 1000 and, more generally, the odometer portion 530 of the measurement tool 510, including steps 1772 through 1778 described above.

A step can comprise using the caliper portion 520 to measure a diameter, e.g., of the structure 68d.

A step can comprise using the odometer portion 530 to measure a length, e.g., of any of the structures 68a,b, c,d.

The method can comprise creating, with the app, a roadmap showing physical characteristics of equipment and other structures on the roof 60.

A method for measuring physical characteristics of the fascia, collection box, or downspout of a building, including the building 50 shown in FIG. 2D, can comprise any one or more of the following exemplary steps:

A step can comprise performing one or more of steps of a method of using the controller 940 and, more generally, the caliper portion 520 (shown in FIG. 5) of the measurement tool 510 (shown in FIG. 5), including steps 1742 through 1756 described above.

A step can comprise performing one or more of steps of a method of using the odometer 1000 and, more generally, the odometer portion 530 of the measurement tool 510, including steps 1772 through 1778 described above.

A step can comprise using the caliper portion 520 to measure a diameter, e.g., of a portion of the building 50.

A step can comprise using the odometer portion 530 to measure a length, e.g., of a portion of the building 50.

The method can comprise creating, with the app, roadmap showing the pattern and dimensions of one or more physical aspects of this and any other membrane attachment system 63.

FIGS. 26-51 are various screen views of a user interface of the display 1320 of the user device 550 of FIG. 5A during use. FIG. 26 is a screen view of a user interface of the display 1320 of the user device 550 of FIG. 5A during use, the screen view showing a login screen. This screen can be presented to the user upon the user opening the app. Secure log-in credentials can be entered here by the user via an input device (e.g., a keyboard of the user device 550). The app and various aspects thereof can exist and can be controlled at a device or network or enterprise level.

FIG. 27 is a screen view of a user interface of the display 1320 of the user device 550 of FIG. 5A during use, the screen view showing a pre-measure or project set-up screen. This screen can be presented to the user upon the user successfully logging into the app with proper login credentials. Basic information about the project can be entered here by the user, and in some aspects more or less information can be requested and/or required from the user. In some aspects, this screen or graphical control element can be described as a "modal", and the app can be configured such that no other part of the app can be used while this screen is up.

FIG. 28 is a screen view of a user interface of the display 1320 of the user device 550 of FIG. 5A during use, the screen view showing a drawing layer of a geometry input screen. As shown, when a tab S310 is selected, it can become highlighted (as shown, in orange) and can become active and, therefore, any data in that layer can be visible to the user. Various data and additional functionality can be accessed through additional screens or modals, which can be accessed by selected any one of various icons on the screen. For example and without limitation, information related to the caliper portion 520 (shown in FIG. 5A) of the measurement tool 510 (shown in FIG. 5A) can be accessed, as exemplarily shown in Figure S21 by contacting or selecting a wireless connection icon S320 (e.g., the blue Bluetooth® icon) while the caliper portion 520 is powered on and in range. In the Drawing Layer, various modes, pen settings, and an eraser can be selected, as well as undo, redo, and delete functions.

FIG. 29 is a screen view of a user interface of the display 1320 of the user device 550 of FIG. 5A during use, the screen view showing the drawing layer and, on top, an image input pop-up window or modal screen for adding an aerial image of a roof or the equivalent and with a background layer of the geometry input screen also active. The app itself need not use such an image. The image is only reference information for the user. In some aspects, as shown, while on one layer (e.g., the Drawing layer) a user can click on or select the "eye" icon S410 on another layer and make that other layer also active, while still being able to use the tools on the primary active layer. When a layer is active, the eye icon can be made to appear as black or filled in.

FIG. 30 is a screen view of a user interface of the display 1320 of the user device 550 of FIG. 5A during use, the screen view showing, with the background layer of the geometry input screen also active, the drawing layer with a first line (in black) manually drawn and showing a first length of a parapet wall.

FIG. 31 is a screen view of a user interface of the display 1320 of the user device 550 of FIG. 5A during use, the screen view showing the drawing layer of Figure S3 with lines drawn to represent the layout of a parapet on a roof and with an icon layer of the geometry input screen also active, as evidenced by the status of the eye icons. In some aspects, as shown, the user can draw freehand notes or annotations on the drawing layer by selecting a desired tool, and such information can be stored along with other information stored in the app and, more specifically, in the layers of a particular project.

FIG. 32 is a screen view of a user interface of the display 1320 of the user device 550 of FIG. 5A during use, the screen view showing the icon layer and, on top, a geometry input pop-up window for input of wall geometry details. In some aspects, the user can manually input the wall length and width. In some aspects, as described elsewhere herein, the app can automatically pull in the wall length and width from the measurement tool 510. Tabs S710, when selected, can bring up particular geometry configurations. The user can also enter other information to identify the particular geometric feature or to add other dimensions such as, for example and without limitation, dimensions of various inside and outside legs. If not collected, the app can use other default values entered by the user or by the app developer. For example, global parameters (e.g., for a particular edge metal product) input elsewhere in the app can be made to apply across all geometric features 100.

FIG. 33 is a screen view of a user interface of the display 1320 of the user device 550 of FIG. 5A during use, the screen view showing the icon layer and, on top, a geometry input pop-up window for input of wall geometry details in accordance with another aspect of the current disclosure.

FIG. 34 is a screen view of a user interface of the display 1320 of the user device 550 of FIG. 5A during use, the screen view showing the icon layer and, on top, a product selection screen or tab S910. The user can input or select information for an edge metal product (e.g., fascia, wood nailer alternatives, accessories, water control, expansion joints, or coping).

FIG. 35 is a screen view of a user interface of the display 1320 of the user device 550 of FIG. 5A during use, the screen view showing the icon layer and, on top, a geometry input pop-up window for input of Z-miter geometry details.

FIG. 36 is a screen view of a user interface of the display 1320 of the user device 550 of FIG. 5A during use, the screen view showing the icon layer and, on top, a geometry input pop-up window for input of in-line transition geometry details. Dimensions supplied by the app can be displayed, while data needed from the user or the tool 510 can be highlighted or boxed.

FIG. 37 is a screen view of a user interface of the display 1320 of the user device 550 of FIG. 5A during use, the screen view showing, with only a rendering layer or tool layer active, the drawing layer with a first line manually drawn and showing two sections of a parapet wall and a corner section connecting the two sections.

FIG. 38 is a screen view of a user interface of the display 1320 of the user device 550 of FIG. 5A during use, the screen view showing the drawing layer and, on top, an activity feed pop-up window showing information on specific geometries and an invitation to view or edit the geometry details.

FIG. 39 is a screen view of a user interface of the display 1320 of the user device 550 of FIG. 5A during use, the screen view showing the drawing layer and, on top, an activity feed pop-up window showing warnings related to specific geometries and an invitation to view or edit the geometry details. The specific warnings shown here involve corner min/max, missing measurement, and connection error warnings. The user can be given an opportunity to view and edit the inputs.

FIG. 40 is a screen view of a user interface of the display 1320 of the user device 550 of FIG. 5A during use, the screen view showing export selection screen in accordance with one aspect of the current disclosure.

FIG. 41 is a screen view of a user interface of the display 1320 of the user device 550 of FIG. 5A during use, the screen view showing export menu screen in accordance with one aspect of the current disclosure.

FIG. 42 is a screen view of a user interface of the display 1320 of the user device 550 of FIG. 5A during use, the screen view showing a product list output preview and an invitation to share or save same in accordance with one aspect of the current disclosure. The product list can comprise various details about the project and the product for which measurements have been gathered and documented including, for example and without limitation, the kind of product being specified, a quantity, and other details collected by the app. As shown, the prepared product list and any other engineering documents (e.g., a roadmap showing the entire roof and prepared by the app) can be saved or shared, including by the various communication channels or methods shown in FIG. 14.

FIG. 43 is a screen view of a user interface of the display 1320 of the user device 550 of FIG. 5A during use, the screen view showing a product list output preview and an invitation to share or save same in accordance with another aspect of the current disclosure.

FIG. 44 is a screen view of a user interface of the display 1320 of the user device 550 of FIG. 5A during use, the screen view showing a roadmap output preview and an invitation to share or save same in accordance with another aspect of the current disclosure. As shown here and elsewhere in the present disclosure, the app on the user device 550 can, upon user input, automatically create the roadmap, the list of the required parts, and any required engineering documents.

FIG. 45 is a screen view of a user interface of the display 1320 of the user device 550 (shown in FIG. 5A) of FIG. 5A during use, the screen view showing a Tool Connection or Wireless Connection Status Screen (alternatively titled "Bluetooth Status Screen," as shown) before the measurement tool 510 (shown in FIG. 5A) is connected to the user device 550.

FIG. 46 is a screen view of a user interface of the display 1320 of the user device 550 of FIG. 5A during use, the screen view showing the Wireless Connection Status Screen after the measurement tool 510 is connected to the user device 550 but before the measurement tool 510 is zeroed. In some aspects, again, the screen can thus indicate whether either or both of the caliper portion 520 and the odometer portion 530 is zero-ed. The Wireless Connection Status Screen can display information about the caliper portion 520 (shown in FIG. 5A) of the measurement tool 510 such as, for example and without limitation, identity, battery status, D-Pad status, clamp status and current measurement, configuration, and Wheel-iper mode and other offset values. The Wireless Connection Status Screen can display information about the odometer portion 530 of the measurement tool 510 such as, for example and without limitation, identity, battery status, and a distance measurement and related settings. The information displayed can be useful for understanding the status of the tool, for troubleshooting, and for completing certain tasks.

FIG. 47 is a screen view of a user interface of the display 1320 of the user device 550 of FIG. 5A during use, the screen view showing the Wireless Connection Status Screen after the measurement tool 510 is connected to the user device 550 and after the measurement tool 510 is zero-ed. More specifically, the screen can display a positive 25.506 mm (1 inch) value when the caliper portion 520 is zero-ed. As such, when zero-ed the stationary clamp and the dynamic clamp can be offset by this same amount. In some aspects, when different jaws are used, the screen can display a different dimension when zero-ed. In some aspects, different jaws can be shaped and the measurement tool 510 otherwise configured to measure and deliver the same dimension when zero-ed.

The configuration and offset values (circled in red) can make zero-ing even more precise, because the housing in which the orientation sensor 943 and, more specifically, the IMU is installed will typically not be perfectly flat or level with the horizon and aligned with a direction of earth's gravitational force. This feature can render eliminate manufacturing inconsistencies with the caliper portion 520 by essentially allowing the caliper portion 520 to be calibrated. A first task can comprise "zero-ing" the caliper portion 520. In some aspects, as shown, this screen can thus indicate whether the caliper portion 520 is zero-ed. More specifically, the screen can display a negative 3.00 mm value when the caliper portion 520 is not zero-ed. As described above, the user input interface 950 (e.g., the D-Pad) can be a "backdoor" to the zero-ing function. In some aspects, zero-ing can be done on a dedicated screen on the user device 550. Roll, pitch, and yaw figures can be used by a user to see if the system 500 (shown in FIG. 5A) is working properly. Quaternion figures (also circled in red) can be used by an advanced user or a repair technician for troubleshooting purposes. If the user thinks the measurement tool 510 is not working properly, the user can call a support team to help troubleshoot the measurement tool 510.

FIG. 48 is a screen view of a user interface of the display 1320 of the user device 550 of FIG. 5A during use, the screen view showing a measurement layer, which can correspond to the aforementioned icon layer and a geometry input display for input and error-checking of outside corner geometry details. A "Warnings & Errors" portion (circled in red) of the current screen view, which can comprise a Secondary Pass Validation feature, can permit the app on the user device to doublecheck the tool measurements (measurements taken with the measurement tool 510) or the manual measurements (measurements entered direction into the app without the measurement tool 510). Based on the rules for each category of geometric feature 100, the app can evaluate the measurements and flag for further review by the user.

FIG. 49 is a screen view of a user interface of the display 1320 of the user device 550 of FIG. 5A during use, the screen view showing a measurement layer and a geometry input display for input and error-checking of end cap geometry details. As shown, the app can interpret the Roll, Pitch, Yaw data coming from the measurement tool 510 and can determine on which side of the wall (e.g., left or right) the user is starting. This can be advantageous when the geometric feature 100 being measured is an End Condition (e.g., an end cap). The app can automatically determine whether the required End Condition should be Right or Left oriented. More specifically, if you are looking at the wall, the app can automatically determine and communicate to the user whether the End Condition needs to go on the right of the wall or the left side of the wall.

FIG. 50 is a screen view of a user interface of the display 1320 of the user device 550 of FIG. 5A during use, the screen view showing a measurement layer and a geometry summary display for reporting and error-checking of radius geometry details. For some geometries, the app can utilize the measurement tool 510 outputs and can compare, calculate, and provide additional data to manufacturing, and this can help manufacturing double-check what has been submitted by the user, and could allow manufacturing to re-create more complex parts. For example, with the radius geometry, the app can identify some "arcs" as complex curves rather than perfect arcs defining a constant radius. The app can deliver the measurement and calculation info (see tables on the screenshot) to allow manufacturing to create a more precise end product that can fit the roofline better. Additionally, Tool data points (especially for the radius) could be converted by the app into another format (e.g., a DXF format), which would then be supplied directly to manufacturing. Without aspects of the system 500 disclosed herein and especially the app, a manufacturing engineer generally can create the DXF file by hand.

FIG. 51 is a perspective view of the screen 552 of the user device 550 of FIG. 5A being manipulated during use of the app, the screen view also showing a measured wall as rendered on the display 1320.

In various aspects, the app can incorporate automatic zoom and/or recentering functions, which can automatically zoom to the extents of the captured parapet geometry and/or automatically recenter the captured geometry or a latest portion of same on the display 1320. In some aspects, such zoom and recentering functions can be done upon a request by the user.

In some aspects, in summary, the user can power on both the clamp device or caliper portion 520 (shown in FIG. 5A) and the odometer device or odometer portion 530 (shown in FIG. 5A) of the tool 510 (shown in FIG. 5A). Either or each of the caliper portion 520 and the odometer portion 530 can start broadcasting that it is available and can wait for the app to establish a wireless connection, e.g., a Bluetooth® Low Energy (BLE) connection. Once connected, normal operations can start (e.g., configuring the devices' sensors and using the device to measure parapet walls).

The app and the user can be the main driving force behind measuring operations, and the tool 510 can give the app measurement data from one or more of the onboard sensors 930,943,1030 (930,943 shown in FIG. 9G and 1030 shown in FIG. 10C), which in various aspects are described above.

The user can create a new project in the app and can store under this project any and all pertinent customer information. Once the user is on the roof 60 (shown in FIG. 1A), the user can scout for a good location to start the measuring and can move in a consistent direction around the roof 60 (clockwise can be the default). The user can carry the tool 510, which can a two-handed device as shown, and can also carry the user device 550 (shown in FIG. 5A) (e.g., an electronic tablet on a strap over their shoulder). The user can have a choice about whether to use the tool 510 to take physical measurements, or whether to enter this data by hand using the app. Either method can be acceptable, and the two methods can be used together in a hybrid approach. Some of the flowcharts disclosed herein assume that the user uses the tool 510 for all measurement operations on the roof 60.

Using the user input interface 950 (shown in FIG. 5A) (e.g., the D-Pad), the user can select the type of geometric feature 100 (shown in FIG. 1B) to measure. Using the LEFT/RIGHT control surfaces on the D-Pad, they can scroll thru the list of available geometric features 100 without looking at the display 1320 of the user device 550. This can be facilitated through aural feedback of the app to the user by using, for example and without limitation, a speaker on the user device 550 or a wireless, headset. The user need not lay down or even release hold of the tool and need not pick up the user device 550 to use the app.

When the user is ready to choose a geometric feature 100 in the app, the user can select the geometric feature 100 with the "OK" control surface (e.g., the control surface 954) in the middle of the D-Pad, and the screen dedicated to this geometric feature 100 can be brought into the foreground. Again, this screen can be known as a "Modal", because no other part of the app can be used while this screen is up. This modal can include and display all the fields that make up the geometry. Each time a field gets "application focus" (i.e. becomes the active field), the app can give aural feedback to the user so that the user knows which field is active (thus relieving them of having to look at the 550 while holding the tool 510). The user can now take a measurement with the tool 510 to enter data into this field, or the user can navigate to other fields using the D-Pad. To further facilitate convenient operation, when a measurement is taken for the active field, the app can automatically move to the next field and give aural feedback of this new "focused" field by saying the field name. The user can continue taking measurements until such time that all the fields have measurement data, the user decides to manually override a default value or standard procedure, or the user abandons the geometry. Not all fields on a modal need to be filled out. Many fields have reasonable defaults and can safely be skipped.

When the user is done with a particular geometric feature 100, they can press and hold the "OK" control surface which can tell the app that they are done. The app can remember that this was the last geometric feature 100 that was measured so that it can be automatically connected to the next geometry that is measured. This method of tying geometric features 100 together can be called the aforementioned "hot edge" method, in which the measurements taken around the roof 60 in sequential order can be automatically connected together to automatically create the roadmap of the roof 60. This can be made possible by the orientation sensor 943, which can give the app heading and orientation data. With the heading from the orientation sensor 943, and the location of the last geometric feature 100 known, the app can automatically build the roadmap without user intervention.

This roadmap can facilitate both the quoting process and, ultimately, the installation process as a blueprint for installing parts on the roof 60.

In some aspects, data coming back from the tool 510 can be used to automatically validate the geometric features 100 that the user is measuring and can thereby ensure they are within manufacturing tolerances for the parts (e.g., edge metal) to be manufactured and then installed on them. Measurements of the geometric feature 100 can be required to follow one or more rules for the geometric feature 100 to be considered that kind of geometric feature 100. The data from the tool 510 can be used to run this validation prior to the user leaving the roof 60 and can warn the user if and when there is a problem is automatically identified. Substantial time and cost savings can thereby be achieved by knowing about issues up front.

The "Second Pass Validation" (e.g., the error-checking stage 1550) can be another helpful validation routine. During measurement of a geometry, the "First Pass Validation" can ensure that the measurements taken of the geometric feature 100 follow the rules set in the app. But, once all the individual geometric features have been measured, the measurements can all be checked against each other to ensure that the geometries connect properly to each other. The "Second Pass Validation" can "crawl" thru all the connection data that has been created through measuring the roof 60 and can ensure that all these connections work and that they are sized correctly. Any issues found can be brought to the attention of the user so that the user can take additional measurements or otherwise address the issues.

Once the roof 60 has been measured and any issue corrected, the user can simply output all of this work to a separate engineering document (e.g., in PDF format), which can be sent (e.g., by hard copy, email, or other communication channels) to both the customer (e.g., as a quote) and to the main office (e.g., for manufacturing). All the part data and roadmap information can be automatically rendered to the engineering document in electronic form, which can eliminate many hours of manual drawing and redrawing of the roof 60.

Benefits of the structures and systems disclosed herein can include, for example and without limitation, the following:

1. In comparison to optical scanning or imaging technologies, the measurement tool 510 and accompanying system can be superior in accuracy because the tool is able to physical compress the roof membrane 62 covering the parapet wall 70 during measurements, which can significantly improve the accuracy of the measurements.
2. The system disclosed herein need not replace the trained technician. Customization and human judgement can still be beneficial in and accommodated by—even complementary to—the new system, while facilitating a much improved degree of efficiency with the digitization of roof measurements.
3. Auditory verbal feedback can facilitate the convenient and efficient collection of measurements with the measurement tool 510 under a wide range of conditions, e.g., while working on a high roof during wind and sleet.
4. The ability to go back and re-take measurements without needing to return to a specific location or know the precise location of an error to correct the error or omission. Related to this, measurements taken before the error do not need to be erased during the correction process. At the same time, the app can walk the user through each type of measurement to help assist technicians in recording all of the needed measurements accurately first time so that the need for any error correction is reduced.
5. The user of the system 500 can be offered quite a degree of inherent flexibility in its use. For example, the user can use the measurement tool 510 with the app or the app by itself. The user can make many other decisions about whether to use a reference image in a background layer of the app, where to start measuring and how to proceed around the roof 60, and exactly how to characterize each geometry, among many other options. In some aspects, the app can standardize and improve data collection by encouraging, through visual and/or audible clues, the collection of more or better data either during the initial measurement stage or during the error-checking stage or both.

The systems and methods disclosed herein are more than simply a time-saving device. The app can run, cross-check, and report measurements and calculations from the measurements that would make the manual process not just time-consuming, but impossible or at least not easily reproducible by every user. In other words, the app can perform some error-checking tasks that could not or would not be done by hand. The traditional manual process is not only very time-consuming but relies on accurate measurements and very good judgment to avoid parts that do not properly fit the roof. The system as disclosed herein, with a good user but not necessarily a user who is perfect, can ensure both a more efficient process and accurate parts. With the time saved, in some aspects the user can take extra time to be careful that the user is following the process and not rushed.

In summary, the disclosed system can efficiently and accurately measure and record the parapet wall sections of a given roof 60 for the purpose of fabricating metal products covering the parapet 70. The system can also automate the generation of engineering drawings of the products needed to cap the parapet 70 so that a firm quotation for the metal product (e.g., edge metal) can be quickly provided to the building custodian. The process of measuring and estimating the metal parts for the roof 60 can be done in a fraction of the time (with time savings estimated at 80%). With the measurement tool 510, the app, and the interaction therebetween and with other system components disclosed herein, the user can measure, send, process, and error-check data and use that data with other inputs to automatically create a set of drawings for review, quotation, approval, and manufacturing purposes.

Other construction-related uses of the system 500 can include, for example and without limitation, measuring sections—and especially connecting sections—of the roof 60 and/or the parapet 70 for the purpose of preparing engineering documents for fascia parts. In addition to fascia, the size, orientation, and location of any edge metal components including, for example and without limitation, gutters and termination bars can be measured and documented. Currently there is no commercially available method for locating objects on the roof 60 such as, for example and without limitation, ventilation stacks, curbs, piping systems, or HVAC units. Currently there is also no commercially available method for measuring membrane attachment systems 63 such as, for example and without limitation, those comprising attachment plates (e.g., the fasteners 69) for securing the roof membrane 62 and those comprising the adhesive material 64. The tool 510 can not only measure a thickness or width for edge conditions or curbs but can also relay points in space for the specific measurements to the app on the user device 550, which can render the content and create a blueprint (e.g., the roadmap) for the specific information.

The tool 510 can be used to measure, record, and deliver all dimensions for the location of the components of the membrane attachment system 63. Using the tool 510 to determine the size of plates and their location in space on the roof 60 can ensure their adequate placement on the roof 60 in relation to a perimeter thereof. Such use can capture bead width, spacing, and pattern size, which can facilitate fully adhered insulation and the meeting of other requirements of the roof membrane 62. Other measurable physical characteristics of the membrane attachment system 63 can include the size of the laps or seams of overlapping sheets of the roof membrane 62 and the angle and direction for all insulation or roofing systems (to ensure water direction either toward an internal drainage system or off the edge of the roof to ensure such systems are accurately manufactured and installed). Other measurable physical characteristics include the sizing of conductor heads, gutters, scuppers, downspouts. In some aspects, surface area calculations resulting from use of the tool 510 can also be used to generate a bill of materials for accurate ordering of materials needed to complete the project. This information can be relayed into a roadmap and associated engineering documents, which the manufacturer, contractor, and building owner can use for warranty assessments and to reduce liability.

Other uses of the system 500 include, for example and without limitation, forestry management, quarry harvesting, and non-roof building measurements (i.e., building measurements not necessarily tied to or made on the roof 60). In the area of forest management, the measurement tool 510, with appropriately long jaws depending on the size of the trees being measured, can be used to quickly and accurately measure tree diameter, tree location, and other tree characteristics, and to simultaneously capture photos and notes accompanying such measurements. More specifically, GPS positioning functionality can further help mark an absolute location of each tree. In the area of quarry harvesting, harvested slabs or rock or other materials can be measured and rapidly characterized using the tool 510. In the area of non-roof building measurements, windows, door frames, stairs, and other architectural elements distributed throughout large buildings in relatively large numbers could be characterized with the tool 510. Furthermore, the tool 510 and the app can be adapted for specific use with any of the above uses and others.

Regarding general construction of the measurement tool 510, the user device 550, and other structures disclosed herein, in some aspects no adhesive need be used to join mating parts. In some aspects, an adhesive can be used to join mating parts. In some aspects, any of the components of the measurement tool 510 can be joined to each other using a friction fit connection, a snap-fit connection, a threaded connection, a magnetic connection, a fastener, or any other connection as desired.

The components of any of the measurement tool 510 and any portion thereof can be manufactured using any one or more of a number of different materials. For example and without limitation, the bar body 610 and other components disclosed herein can comprise or be formed from aluminum. For example and without limitation, structural parts can be formed from polymer materials, including high-impact polymers such as ABS and a blend of polycarbonate (PC) and polybutylene terephthalate (PBT) such as "PC+PBT" 3D printing filament, available from PushPlastic.com.

The components of any of the measurement tool 510 and any portion thereof can be manufactured using any one or more of a number of different processes. In some aspects, portions of the measurement tool 510 can be manufactured using a molding process such as injection molding. In other aspects, any of these same parts can be manufactured through an additive manufacturing process such as, for example and without limitation, three-dimensional printing or through a subtractive manufacturing process such as, for example and without limitation, machining. Other features of the measurement tool 510 are described below with respect to other figures.

As disclosed herein, the measurement tool 510 can be generally robust, drop-proof, and able to withstand knocks, vibration, and other loads arising from transportation, climbing up and down ladders, and the conditions otherwise encountered on the roof 60 and/or in a construction environment.

One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily comprise logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which comprise one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described aspect(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. An oriented distance measuring system comprising:
   a rail;
   an odometer comprising:
      a wheel;
      a first controller; and
      a first sensor in communication with the first controller, the first sensor configured to sense rotation of the wheel, the first controller configured to collect data from the first sensor, the data being associated with the rotation of the wheel; and
   a second sensor configured to sense roll, pitch, and yaw of the system.

2. The system of claim 1, wherein the system comprises an odometer portion comprising the odometer and a caliper portion comprising the rail, the odometer portion being detachable from the caliper portion.

3. The system of claim 1, wherein the odometer comprises at least one battery configured to power the odometer.

4. The system of claim 1, further comprising a dynamic clamp assembled to the rail and configured to move with respect to the rail in a longitudinal direction of the rail during capture of distance measurements.

5. The system of claim 4, wherein the dynamic clamp is selectably lockable to the rail with a locking fastener.

6. The system of claim 4, wherein the system comprises a third sensor configured to sense movement of the dynamic clamp with respect to the rail.

7. The system of claim 6, wherein the third sensor is assembled to the dynamic clamp, a portion of the dynamic clamp engaging a portion of the rail during use, such engagement causing rotation of a portion of the third sensor.

8. The system of claim 4, wherein the dynamic clamp comprises a user input interface comprising a control surface, the system is configured to send a wireless signal from the user input interface to a user device and/or receive a wireless signal from the user device.

9. The system of claim 1, wherein the second sensor comprises at least one of an accelerometer, a magnetometer, and a gyroscope.

10. A measurement tool comprising:
    at least one of a caliper portion and an odometer portion, the caliper portion configured to take a thickness measurement and the odometer portion configured to take a distance measurement;
    a plurality of input devices defining a user input interface; and
    a controller configured to transmit a signal from the measurement tool to a user device separate from the measurement tool and configured to control the user device based on activation, by a user, of an input device of the plurality of input devices, the signal comprising:
       instructions to the user device; and
       data corresponding to the thickness measurement, the user device configured to display on a screen thereof at least one of the instructions and the data.

11. The measurement tool of claim 10, further comprising a sensor.

12. The measurement tool of claim 11, wherein the sensor is an orientation sensor.

13. The measurement tool of claim 10, wherein the caliper portion comprises:
    a bar; and
    a dynamic clamp assembled to the bar and configured to move with respect to the bar during use to take the thickness measurement.

14. The measurement tool of claim 13, further comprising a stationary clamp assembled to the bar, the stationary clamp and the dynamic clamp defining an adjustable clamp distance therebetween.

15. The measurement tool of claim 10, further comprising a jaw fixably assembled to a portion of the measurement tool, the jaw configured to contact an object to be measured, the jaw removable from the portion of the measurement tool by a user without tools.

16. The measurement tool of claim 15, wherein the jaw defines a front end extending from a surrounding portion of the jaw and configured to contact the object to be measured, a contact surface area of the front end being smaller than a cross-sectional area of a portion of the jaw that is offset from the front end and that is taken in a plane that is parallel to the front end.

17. The measurement tool of claim 10, wherein the controller is configured to control a device app stored on a non-transitory computer-readable medium of the user device.

18. An error-checking system comprising:
    a measurement tool comprising a caliper portion defining an adjustable clamp distance, the measurement tool configured to capture at least two thickness measurements for each of a plurality of physical objects, each of the plurality of physical objects arranged in series, each of the plurality of physical objects joined with at least one other of the plurality of physical objects; and
    a non-transitory computer-readable medium having stored thereon a device app in wireless communication with the measurement tool, the device app configured to wirelessly receive the at least two thickness measurements from the measurement tool and check for continuity in each transition between adjacent physical objects of the plurality of physical objects.

19. The system of claim 18, wherein the caliper portion comprises:
    a bar;
    a stationary clamp fixably assembled to the bar; and
    a dynamic clamp slideably assembled to the bar and offset from the stationary clamp, the stationary clamp and the dynamic clamp defining the clamp distance therebetween.

20. The system of claim 18, further comprising a user device comprising:
    the non-transitory computer-readable medium having stored thereon the device app; and
    a screen defining a display for communicating with a user of the user device.

21. A method of using the system of claim 18, the method comprising:
applying a rule, the rule being applicable to a single geometric feature; and
checking for violation of the rule arising from the at least two thickness measurements on a single geometric feature.

22. The method of claim 21, further comprising notifying a user of the system of the violation of the rule.

23. A method of using the system of claim 18, the method comprising:
capturing at least two thickness measurements of each of a first physical object and a second physical object of the plurality of physical objects, the first physical object and the second physical object positioned adjacent to each other; and
comparing one of the at least two thickness measurements of the second physical object with one of the at least two thickness measurements of the first physical object.

24. The method of claim 23, wherein the first physical object and the second physical object are adjacent geometric features of a parapet of a roof.

25. The method of claim 23, further comprising:
applying a rule, the rule being applicable to a single geometric feature; and
checking for violation of the rule arising from the at least two thickness measurements on the single geometric feature.

26. A method comprising:
capturing, with a measurement tool, at least one of a thickness measurement and a length measurement of a physical object; and
transmitting data associated with the at least one of the thickness measurement and the length measurement to a user device, the data comprising data corresponding to roll, pitch, and yaw of the measurement tool during capture of the at least one of the thickness measurement and the length measurement.

27. The method of claim 26, wherein capturing the at least one of the thickness measurement and the length measurement comprises capturing at least one of a thickness measurement and a length measurement of each of a plurality of physical objects, the plurality of physical objects being geometric features of a parapet of a roof.

28. The method of claim 27, wherein capturing the at least one of the thickness measurement and the length measurement comprises capturing at least two thickness measurements of each of a first geometric feature and a second geometric feature, the first geometric feature and the second geometric feature positioned adjacent to each other and sharing a common measurement location, one of the at least two thickness measurements of the second geometric feature and one of the at least two thickness measurements of the first geometric feature being taken at approximately the common measurement location.

29. The method of claim 28, further comprising:
comparing one of the at least two thickness measurements of the second geometric feature with one of the at least two thickness measurements of the first geometric feature; and
communicating an error to the user of the user app if a difference between the one of the at least two thickness measurements of the second geometric feature and the one of the at least two thickness measurements of the first geometric feature exceeds a predetermined threshold.

30. The method of claim 26, further comprising a user pressing an input device of a user input interface to indicate to a system comprising the measurement tool that the data is ready to transmit to the user device.

31. The method of claim 30, further comprising providing feedback to a user, the feedback being one of visual and aural feedback.

32. A method of manufacturing a measurement tool, the method comprising:
assembling a dynamic clamp to a bar of the measurement tool, the dynamic clamp configured to move with respect to the bar during use to capture distance measurements; and
assembling a first sensor to the measurement tool, the first sensor configured to sense roll, pitch, and yaw of the measurement tool.

33. The method of claim 32, wherein assembling the first sensor to the measurement tool comprises assembling the first sensor to the dynamic clamp, the first sensor positioned inside a housing of the dynamic clamp.

34. The method of claim 32, further comprising:
assembling a controller to the measurement tool, the controller comprising a printed circuit board; and
placing the controller in communication with the first sensor, the controller configured to receive data from the first sensor.

35. The method of claim 32, further comprising assembling a stationary clamp to the bar, the stationary clamp and the dynamic clamp defining an adjustable clamp distance therebetween.

36. The method of claim 35, wherein the stationary clamp is positioned closer to a second end of the bar than a first end of the bar.

37. The method of claim 32, further comprising assembling a jaw to the dynamic clamp, the jaw removable from the dynamic clamp by a user without tools.

38. The method of claim 32, further comprising assembling a second sensor to the measurement tool, the second sensor configured to sense movement of the dynamic clamp with respect to the bar.

39. The method of claim 38, further comprising:
assembling a controller to the measurement tool, the controller comprising a printed circuit board; and
placing the controller in communication with the second sensor, the controller configured to receive data from the second sensor.

40. The method of claim 32, further comprising assembling an odometer to the measurement tool.

41. The method of claim 40, further comprising assembling a third sensor to the measurement tool, the third sensor configured to sense rotation of a first portion of the odometer with respect to second portion of the odometer.

42. The method of claim 41, further comprising:
assembling a controller to the measurement tool, the controller comprising a printed circuit board; and
placing the controller in communication with the third sensor, the controller configured to receive data from the third sensor.

* * * * *